United States Patent
Neubrand

(10) Patent No.: US 8,913,285 B1
(45) Date of Patent: Dec. 16, 2014

(54) AUTOMATED METHOD OF DECOMPOSING SCANNED DOCUMENTS

(75) Inventor: Hans-Werner Neubrand, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 737 days.

(21) Appl. No.: 12/479,851

(22) Filed: Jun. 7, 2009

(51) Int. Cl.
| H04N 1/387 | (2006.01) |
| H04N 1/46 | (2006.01) |
| H04N 1/40 | (2006.01) |
| H04N 1/04 | (2006.01) |

(52) U.S. Cl.
USPC ............ 358/1.9; 358/452; 358/453; 358/462; 358/458; 358/537; 358/538

(58) Field of Classification Search
None
See application file for complete search history.

(56) References Cited

U.S. PATENT DOCUMENTS

| 5,440,403 A | 8/1995 | Hashimoto et al. |
| 5,506,918 A * | 4/1996 | Ishitani .................... 382/289 |
| 6,209,048 B1 | 3/2001 | Wolff |
| 6,263,122 B1 * | 7/2001 | Simske et al. .............. 382/311 |
| 6,327,613 B1 | 12/2001 | Goshey et al. |
| 6,373,590 B1 * | 4/2002 | Ancin et al. ................. 358/1.18 |
| 6,549,934 B1 | 4/2003 | Peterson et al. |
| 6,704,819 B1 | 3/2004 | Chrysanthakopoulos |
| 6,754,695 B2 | 6/2004 | Kuroshima |
| 7,047,344 B2 | 5/2006 | Lou et al. |
| 7,164,500 B2 | 1/2007 | Bean et al. |
| 7,430,066 B2 * | 9/2008 | Hsu et al. ..................... 358/474 |
| 7,546,353 B2 | 6/2009 | Hesselink et al. |
| 7,587,467 B2 | 9/2009 | Hesselink et al. |
| 2002/0054321 A1 | 5/2002 | Kikuchi |
| 2002/0141646 A1 * | 10/2002 | Mushano ..................... 382/199 |
| 2003/0048487 A1 | 3/2003 | Johnston et al. |
| 2003/0191848 A1 | 10/2003 | Hesselink et al. |
| 2004/0076346 A1 * | 4/2004 | Russon .......................... 382/318 |
| 2005/0030375 A1 | 2/2005 | Zangrande et al. |
| 2005/0105135 A1 | 5/2005 | Takahashi |
| 2005/0114711 A1 | 5/2005 | Hesselink et al. |
| 2005/0120082 A1 | 6/2005 | Hesselink et al. |
| 2005/0168783 A1 * | 8/2005 | Thomas ........................ 358/2.1 |
| 2005/0238205 A1 * | 10/2005 | Kimura et al. ............... 382/112 |
| 2006/0026600 A1 | 2/2006 | Yoshida |
| 2006/0206605 A1 | 9/2006 | Machida |
| 2007/0146819 A1 | 6/2007 | Kai |
| 2007/0199033 A1 | 8/2007 | Nakagawa et al. |
| 2007/0209023 A1 | 9/2007 | Nakagawa et al. |

(Continued)

OTHER PUBLICATIONS

U.S. Appl. No. 12/479,853, filed Jun. 7, 2009, Neubrand, Hans-Werner.

(Continued)

*Primary Examiner* — Benny Q Tieu
*Assistant Examiner* — Haris Sabah
(74) *Attorney, Agent, or Firm* — Blakely, Sokoloff, Taylor & Zafman LLP

(57) ABSTRACT

Some embodiments produce an image capture application that implements a novel auto scan feature. The auto scan feature directs a scanner to perform an initial scan and then decomposes the scanned document into component regions. Some embodiments then identify a set of attributes of each region from the initial scan, select a set of optimal scanning parameters for each region based on the identified set of attributes, and then direct the scanner to perform a detailed secondary scan of each region with the identified set of scanning parameters. Following the secondary scan, some embodiments perform post-scan operations on the image of the scanned region.

38 Claims, 60 Drawing Sheets

(56) References Cited

U.S. PATENT DOCUMENTS

| | | | |
|---|---|---|---|
| 2008/0226196 A1* | 9/2008 | Kojima | 382/289 |
| 2008/0247005 A1 | 10/2008 | Marappan | |
| 2008/0301234 A1 | 12/2008 | Tonegawa | |
| 2009/0040569 A1* | 2/2009 | Hamzy | 358/488 |
| 2009/0115852 A1 | 5/2009 | Jung et al. | |

OTHER PUBLICATIONS

U.S. Appl. No. 12/479,854, filed Jun. 7, 2009, Neubrand, Hans-Werner.

U.S. Appl. No. 10/873,822, filed Jun. 22, 2004, Neubrand, Hans-Werner, et al.

Portions of prosecution history of U.S. Appl. No. 12/479,853, Dec. 2, 2011, Neubrand, Hans-Werner.

Portions of prosecution history of U.S. Appl. No. 12/479,854, Jun. 8, 2011, Neubrand, Hans-Werner.

Updated portions of prosecution history of U.S. Appl. No. 12/479,853, Apr. 2, 2012, Neubrand, Hans-Werner.

Updated portions of prosecution history of U.S. Appl. No. 12/479,854, Apr. 11, 2012, Neubrand, Hans-Werner.

Updated portions of prosecution history of U.S. Appl. No. 12/479,853, filed Jul. 16, 2012, Neubrand, Hans-Werner.

Updated portions of prosecution history of U.S. Appl. No. 12/479,854, Jul. 17, 2012, Neubrand, Hans-Werner.

* cited by examiner

AUTOMATED METHOD OF DECOMPOSING SCANNED DOCUMENTS

CROSS REFERENCE TO RELATED APPLICATIONS

This Application is related to the following applications: U.S. patent application Ser. No. 12/479,853, filed Jun. 7, 2009; and U.S. patent application Ser. No. 12/479,854, filed Jun. 7, 2009.

FIELD OF THE INVENTION

The present inventions relate to image capture software.

BACKGROUND OF THE INVENTION

Many devices are available to capture images for a computer. Computer applications that control individual image capture devices are often provided by the manufactures of those devices. For example, makers of document scanners provide software to enable a user of a computer to scan documents into the computer.

Some image capture devices allow a user to lay an item such as a photograph flat upon a glass scanning bed through which a scanning head of the image capture device shines a light and through which the scanning head takes an image of the item. The image data is converted into binary form and the scanner sends the data to a computer. Some scanners are capable of scanning a subsection of the glass. Such scanners receive identifications of subsections to be scanned from the computer. By scanning small areas of the glass, instead of the entire glass the scanners save and produce less image data. At higher resolutions, the amount of image data required to represent a small subsection of the glass is much smaller than the amount of image data required to represent the entire glass.

Some image capture applications are available that control more than one image capture device. However, such image capture applications do not easily switch between image capture devices.

SUMMARY OF THE INVENTION

Some embodiments of the invention provide an image capture application that detects available image capture devices and controls them. The image capture application of some embodiments implements the following novel features: (1) a novel user interface (UI) feature, (2) a novel auto-scan feature, and (3) a novel manual scan feature. Each of these features will be sequentially described below.

Some embodiments of the image capture application implement a novel UI feature. In some embodiments, the UI feature provides a GUI that displays a window with multiple window areas including (1) a first window area that includes a menu of the available image capture devices automatically detected by the image capture application and (2) a second window for displaying controls for individual scanners. The menu allows a user to select a particular device from among the multiple devices in the first window area. In some embodiments, when a user selects a particular image capture device in the first window area, the GUI manifests controls for that particular device in the second window area. The controls allow the user to set various parameters for the image capture device.

Some embodiments display different controls for different scanners. In some embodiments, the specific set of controls displayed for a particular scanner is chosen by a driver associated with that scanner. Some embodiments provide a set of generic controls that are usable by device driver manufacturers to allow a particular scanner to interface with the image capture application. These controls include controls that are common to most if not all scanners, such as a control for setting the resolution of a scan, a control for setting the color depth (the number of colors per pixel) of a scan, and controls for setting the orientation of a scan. Some embodiments also allow scanner drivers to define the features of controls which are (1) not previously defined by the image capture application, and (2) specific to the scanner associated with the driver. In some embodiments, the image capture application provides a control that allows a user to select a separate application to receive scanned images.

Some embodiments of the image capture application implement a novel auto-scan feature. Some embodiments of the auto-scan feature (1) automatically decompose a scanned document into one or more component regions and (2) perform scans of the component regions. In some embodiments, the image capture application directs the scanner to first produce an initial scan. The image capture application then identifies a set of attributes of the document from the initial scan, selects a set of optimal scanning parameters based on the identified set of attributes, and then directs the scanner to perform a detailed secondary scan with the identified set of scanning parameters. Following the secondary scan, some embodiments of the image capture application with an auto-scan feature perform post-scan operations.

The initial scan produces a scanned document. The scanned document, sometimes referred to as a scanned electronic document, is an electronic image of the contents of the scanner glass of a flatbed scanner, or a page that is fed through a document feeder on a scanner. In some embodiments the scanned document is a relatively low resolution image. Some embodiments perform a series of image processing operations on the scanned document to ascertain the borders of component regions and to distinguish the component regions from the scanner background and noise artifacts. In some embodiments, these operations include thresholding, seed filling, group seed filling, edge detection, and boundary identification (e.g., by a Hough transform).

The auto-scan feature analyzes each component region to identify a set of attributes for each component region. Examples of such attributes include the type of content (e.g., text, image, etc.), the color of the content (e.g., black and white, grey scale, color, etc.), and the orientation of the component region. The auto-scan feature derives a set of scan parameters for each component region according to the component region's identified attributes. Some embodiments then perform a secondary scan on each component region using the scan parameters derived from the component region's attributes.

In some embodiments, the image capture application performs post-scan operations on a component region after the secondary scan. Specifically as needed, the auto-scan feature performs alignment, optical character recognition (OCR), storage or other operations on the component region. In some embodiments, the auto-scan feature also delivers data or images to applications other than the image capture application.

Some embodiments of the image capture application also implement a novel manual scan feature. In some embodiments, an image capture application with a manual scan feature automatically identifies regions in a similar manner to the auto-scan, but rather than automatically performing the secondary scans, the image capture application provides a manual scanning tool that enables the user to manually adjust the regions. Some embodiments further provide tools such as visual indicators of the size, location, and orientation of identified regions. In some embodiments, a set of guidelines are provided to show the user the original location and orientation of the automatically identified region. The guidelines provide a set of reference lines that allow a user to identify directions relative to a selected, automatically identified region. In some embodiments, since the image capture application automatically selects a set of scan parameters for automatically identified regions, the manual scan feature provides scanner controls that enable the user to manually override the automatically selected scan parameters.

Some embodiments implement all of the above described features. Other embodiments implement a subset of the above described features For example, an image capture application may implement some of the above described features without implementing all of them. Moreover, some embodiments do not implement these features as one image capture application, but instead provide the features as frameworks (sometimes called libraries) for other applications to build image capture interfaces upon. For instance, some embodiments provide some or all these features as APIs in a framework provided by the operating system of a device such as a computer. Some embodiments provide these features to third party application developers to integrate into third party applications. The frameworks of some embodiments are designed to interact with modules of the operating system. Under such an approach, a developer of an application that runs on the operating system can access the above described features through the APIs. By accessing the frameworks through the APIs the developers can add functionalities such as the novel UI feature, the novel auto-scan feature or the novel manual scan feature to their applications.

BRIEF DESCRIPTION OF THE DRAWINGS

The novel features of the invention are set forth in the appended claims. However, for purpose of explanation, several embodiments of the invention are set forth in the following figures.

FIG. 11 illustrates bounding boxes of individual items aligned with a scanner.

FIG. 46 illustrates a GUI that provides visual indicators of the size, location, and orientation of identified regions when a detect-separate-items option is selected.

DETAILED DESCRIPTION OF THE INVENTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide an image capture application that manages multiple image capture devices from multiple manufacturers. The image capture application of some embodiments detects image capture devices connected to the computer on which the image capture application is running. In some embodiments the image capture application also detects image capture devices that are shared on a network that is connected to the computer on which the image capture application is running. The image capture application of some embodiments detects multiple types of devices include scanners, cameras, and memory devices that store images. Some embodiments manage multiple types of devices (e.g., cameras and scanners). Some embodiments manage a single type of device (e.g., scanners only).

In some embodiments, the image capture application includes a graphical user interface ("GUI"). The GUIs of some embodiments display a window with a first window area that includes a menu of the available image capture devices. The menu allows a user to select a particular device from among the multiple devices in the first window area. In some embodiments, when a user selects a particular image capture device in the first window area, the GUI manifests controls for that particular device in a second area of the window that includes the menu of available image capture devices. That is, the GUI simultaneously displays, in a single window, the multiple image capture devices (from different manufacturers) and the particular controls for the selected image capture device. The controls allow the user to set various parameters for the image capture device. An example of such an image capture application is illustrated in FIG. 1.

Figure 1:
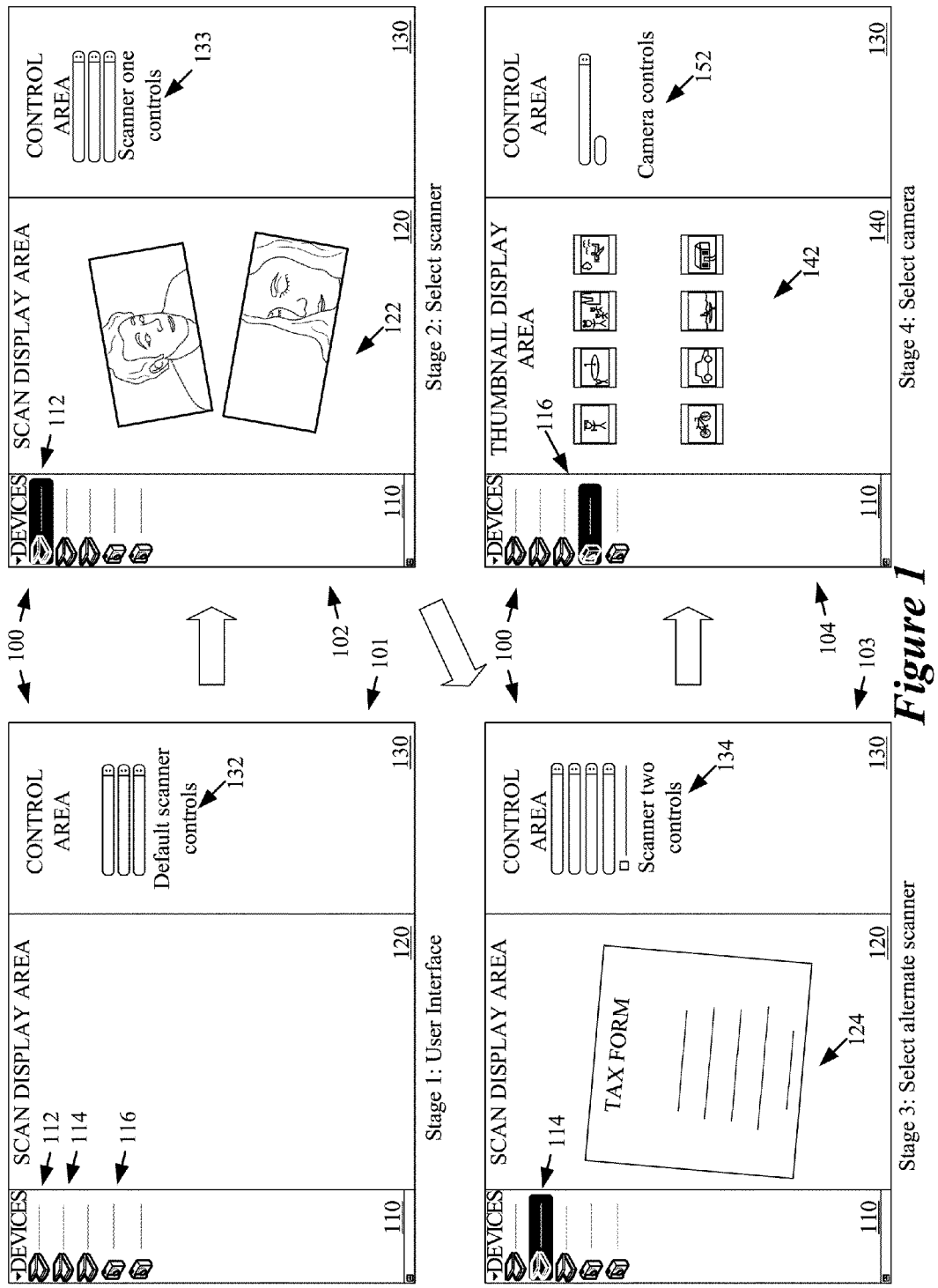
FIG. 1 illustrates multiple stages of a GUI of an image capture application of some embodiments.

FIG. 1 illustrates multiple stages of a GUI 100 of an image capture application of some embodiments. The figure shows the GUI 100 providing different controls and images at various stages when various image capture devices are selected. Specifically, this figure illustrates the GUI 100 at four different stages: (1) a first stage 101 that is before the selection of any image capture device; (2) a second stage 102 that is after the selection of a first scanner; (3) a third stage 103 that is after the selection of a second scanner; and (4) a fourth stage 104 that is after the selection of a camera. One of ordinary skill in the art will understand that the individual stages can be reached in any order. The stages are presented in the order that they are in FIG. 1 for demonstration purposes only.

As shown in FIG. 1, the GUI 100 includes device display area 110, which includes icons 112, 114, and 116, scan display area 120 (in stages 101-103), control area 130, and thumbnail display area 140 (in stage 104). The device display area 110 displays a menu of image capture devices that are available to the image capture application. The scan display area 120 visually presents images captured by scanners. The control area 130 displays controls that manage particular scanners and functions of the image capture application that relate to particular scanners. Thumbnail display area 140 shows miniature representations of images stored in a digital camera or other image recording device.

The operation of the GUI 100 will now be described by reference to the state of the GUI 100 during the four stages 101-104. Stage 101 shows the GUI 100 after the image capture application has detected available image capture devices and populated the menu in device display area 110 with the detected devices. The image capture application allows users to select image capture devices from the menu. The device display area 110 shows icons 112 and 114, which represent detected scanners, and icon 116, which represents a detected camera. None of the icons have been selected in stage 101. Accordingly, the scan display area 120 is empty. As shown in stage 101, in some embodiments, when no image capture device is selected, the GUI 100 displays a default set of scanner controls 132 in control area 130. In some embodiments, the default controls 132 are not shown when no scanner has been selected. In other embodiments, default controls 132 are shown even when no scanner has been selected, though the controls remain inactive.

Stage 102 shows the GUI 100 when scanner icon 112 is selected (as indicated by its inverted colors). As a result of the selection, the image capture application has commanded the scanner represented by scanner icon 112 to perform a preview scan of the glass of the scanner. The preview scan is a low resolution scan performed to get general data about the item(s) on the glass. As used herein, the glass of the scanner refers to the area of the scanner on which items are placed to have their images captured. The scanner glass is sometimes referred to as a "scanner bed". In the illustrated embodiment, the scanner has performed the scan and is displaying preview 122 in scan display area 120. Preview 122 shows the images of photographs on the scanner. As used herein "preview data" is the raw data received from the scanner during a preview scan. A "preview" refers to the display of that preview data as an image. In some embodiments, a preview may include various overlays and indicators as well as the image itself.

As another result of the selection of icon 112, the GUI 100 in stage 102 displays a set of controls 133, which are controls that apply to the selected scanner. Some embodiments display multiple sets of controls. For example, separate sets of controls provided by the image capture application programmers and controls provided by the scanner manufacturers. Additional details about sets of scanner controls are found in section I.B., below.

Stage 103 shows the GUI 100 when scanner icon 114 is selected. As a result of the selection, the image capture application has commanded the scanner represented by scanner icon 114 to perform a preview scan of the glass of the scanner to generate a replacement of preview 122. In the illustrated embodiment, the scanner has performed the scan and is displaying preview 124 in scan display area 120. Preview 124 shows the image of a tax form on the newly selected scanner. Preview 122 is different from preview 124 because different items are on the different scanners.

Also in stage 103, the GUI 100 displays a set of controls 134, which are controls that apply to the newly selected scanner. The GUI 100 provides each particular scanner with a set of controls that apply to that particular scanner. The scanner represented by icon 114 is different from the scanner represented by icon 112; therefore the GUI 100 provides a different set of controls for each of the selected scanners. That is, set of controls 134 are different from set of controls 133 because they are controls for different models of scanner.

Stage 104 shows that GUI 100 manages cameras as well as scanners. Stage 104 shows the GUI 100 when camera icon 116 is selected. As a result of the selection, the image capture application has retrieved or generated thumbnails 142 of images on the camera and has displayed the thumbnails in thumbnail display area 140. The GUI 100 displays a set of camera controls 152 in control area 130. The camera controls 152 allow a user to perform various operations with the camera (e.g., downloading the photographs).

I. GUI

Though the GUI 100 and other GUIs described herein are drawn with particular areas associated with particular features of an image capture application, one of ordinary skill in the art will realize that in some embodiments the areas or controls will be provided in different configurations. For example, in some embodiments a device display area is on the right side of a GUI rather than the left. Similarly, in some embodiments, the location of the control area depends on which device is selected. For example, when a scanner is selected, the scanner controls appear on the right, but when a camera is selected the camera controls appear along the bottom of the window (in a similar fashion to the simplified GUI illustrated in FIG. 13, below). In some such embodiments, the display area extends to the right edge of the window in order to provide more room for thumbnails or other image data.

In some embodiments, an image capture application automatically detects scanners from multiple manufacturers that are accessible to the computer on which the image capture application is running. The image capture application provides a GUI with a single window that includes (1) a first area for displaying a set of icons that represent the detected scanners from multiple manufacturers and (2) a second area for displaying controls of a scanner when that scanner is selected from the set of icons. In some embodiments the set of icons represents both scanners that are directly connected to the computer on which the image capture application is running (the "local computer") and scanners that are shared on a computer network to which the local computer is connected. A local computer that can access a device either through the network or directly can be described as "communicatively coupled" to the device. The GUI of some embodiments continues to display the set of icons in the first area of the window while simultaneously displaying the controls in the second area of the window. The GUI of some embodiments provides different controls for scanners with different features.

Figure 2:
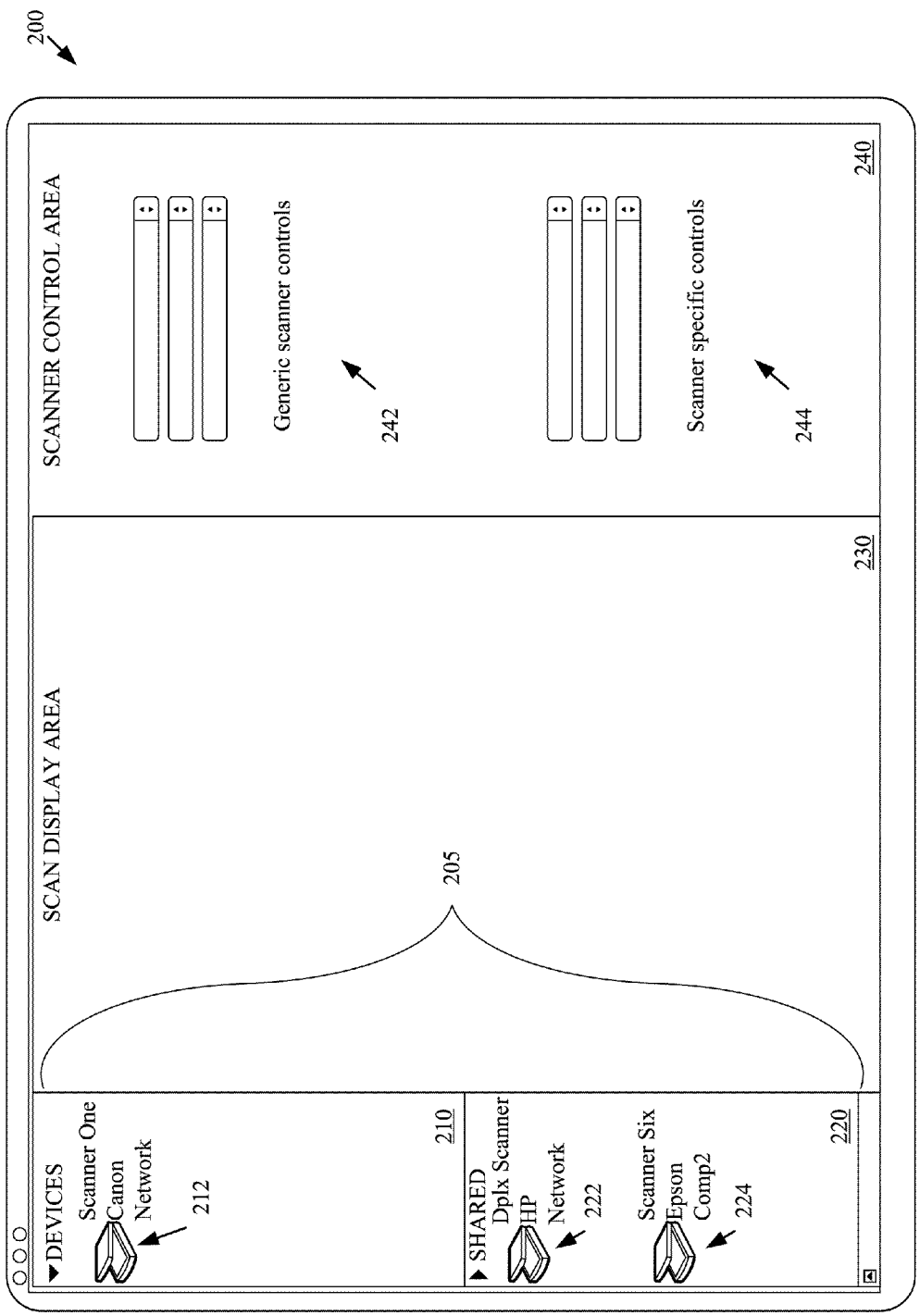
FIG. 2 illustrates a GUI of an image capture application of some embodiments.

FIG. 2 illustrates a GUI 200 of an image capture application of some embodiments. The image capture application runs on a computer. For simplicity of identification, the computer running the image capture application will be described herein as the "local computer". This GUI allows the image capture application to simultaneously display multiple accessible scanners, from multiple manufacturers, that are connected to the local computer. GUI 200 will be described by reference to an example of a computer system 300 illustrated in FIG. 3.

Figure 3:
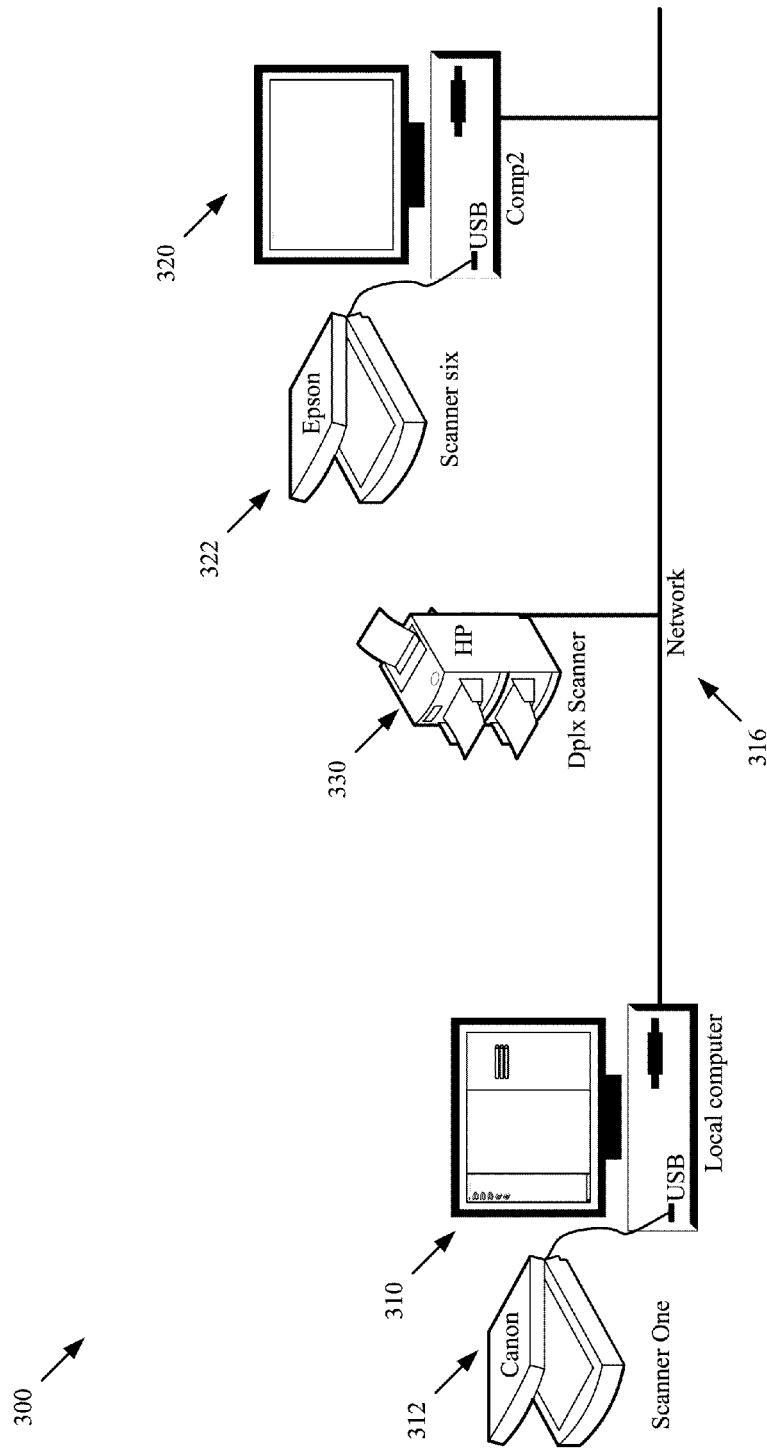
FIG. 3 illustrates a local computer that runs an image capture application and is connected to a computer system with multiple scanners.

FIG. 3 illustrates a local computer that runs an image capture application and is connected to a computer system with multiple scanners. This figure shows examples of scanners that are connected to the local computer directly and examples of scanners that are connected to the local computer through a computer network. As shown in this figure, the computer system 300 is formed by two computers 310 and 320, a flatbed scanners 312 manufactured by Epson®, a flatbed scanner 322 manufactured by Canon®, a multi-function device 330 manufactured by HP®, and network 316. In this example, the computer 310 is the local computer on which the image capture application runs. Computer 310 has a flatbed scanner 312 directly connected to it through a USB port. Computer 320 also has a flatbed scanner, flatbed scanner 322, connected to it through a USB port. Both computers 310 and 320 are connected to the multi-function device 330 through the network 316. The illustrated multi-function device 330 is a printer/scanner/copier device. Computer 310 is able to access shared scanner 322 through a set of connections, specifically (1) the connection of computer 310 to network 316, (2) the connection of the network 316 to computer 320, and (4) the connection of computer 320 to scanner 322.

Computer 310 is able to access devices that are connected to it directly as well as shared devices that are connected to it via the network. A device is shared when the computer to which it is connected makes the device accessible to other computers on a computer network. In some cases, devices connected directly to a network may be set to be shared devices by default. For the purposes of describing GUIs herein the flatbed scanner 322 and the multi-function device 330 will be assumed to be shared devices. The scanners as shown in the figures have arbitrary names (e.g., scanner six). One of ordinary skill in the art will recognize that the use of arbitrary individual names for devices on a network is a common practice.

As mentioned above, FIG. 2 illustrates a GUI 200 of an image capture application of some embodiments. The GUI 200 of FIG. 2 includes (1) a device display area 205, which includes a local device display area 210 and a shared device display area 220, (2) a scan display area 230, and (3) a scanner control area 240. Local device display area 210 shows icons that represent scanners that are connected directly to the local computer. The shared device display area 220 shows scanners that are available to the local computer through a network. The scanner control area 240 is where the GUI displays the particular set of controls that apply to a particular scanner once the scanner has been selected.

The image capture application detects scanners by different manufacturers locally and through the network. This detection can be performed by various modules of the image capture application. As described in relation to FIG. 54, below, in some embodiments, the image capture application is provided as a set of modules including a client module and an extension module. In some embodiments, the client module detects the devices. In other embodiments, the extension module detects the devices. In still other embodiments, the image capture application is provided as a single module and that single module detects the devices. Similarly, many other operations described herein as being performed by an image capture application are performed by an image capture extension module or an image capture client module. Examples of image capture extension modules are described in U.S. patent application Ser. No. 10/873,822, titled "Image Sharing", filed on Jun. 22, 2004, which is incorporated herein by reference.

As shown in FIG. 2, the image capture application has detected the scanners of the example computer system 300 illustrated in FIG. 3. The application has detected (1) scanner 312 (manufactured by Canon®), which is connected to the USB port of computer 310, (2) duplex scanner 330 (manufactured by HP®), which is connected to network 316 and (3) scanner 322 (manufactured by Epson®), which is connected to computer 320. The GUI 200 displays these scanners from different manufacturers in device display area 205, which shows graphical representations ("icons") of the various available scanners.

After detecting the scanners, the GUI 200 displays icons representing these scanners from different manufacturers in the device display area 205. Icon 212 represents scanner 312, which is connected directly to the local computer 310 on which GUI 200 is displayed. Therefore, the GUI 200 displays icon 212 in local device display area 210. Icon 224 represents scanner 322, which is accessible to computer 310 through the connection of computer 310 to network 316. Therefore, GUI 200 displays icon 224 in the shared device menu 220. Icon 222 represents multi-function device 330, which is accessible to computer 310 through the connection of computer 310 to network 316. Therefore, GUI 200 displays icon 222 in the shared device menu 220. In the embodiment shown in FIG. 2, the local devices are separated from the shared devices; however, the GUIs of some embodiments do not separate scanners into local and shared areas.

As shown in FIG. 3, each of the illustrated scanners is made by a different hardware manufacturing company. However, all the available scanners are displayed together in device display area 205. One of ordinary skill in the art will realize that in computer systems that have scanners from only one manufacturer, the GUI 200 will display scanners from only that manufacturer in the device display area. Some embodiments allow available scanners to be excluded from the device display area (e.g., scanners that the user chooses to exclude, scanners which are in use by another computer, etc.).

The icons 212, 224, and 222 have text that indicates the name of the scanner, the manufacturer of the scanner, and the location of the scanner. For example, scanner 322 is an Epson® brand scanner connected to computer 320 which has the name "Comp2". Accordingly the text for icon 224, which represents scanner 322 shows that it is an Epson® scanner connected to Comp2. One of ordinary skill in the art will realize that some embodiments do not provide the same type of information for the icons as illustrated in FIG. 2. For example, some embodiments do not display the brand names of the scanners in the device display area. Some embodiments display the brand names of some scanners but not other scanners. For example, older model scanners might not provide a brand name to the image capture application. Similarly, some embodiments omit the location of the scanner, or show the location of only some of the scanners. For example, some embodiments omit the locations of some network scanners; such as scanners directly connected to the local network 316 that do not employ the protocols that the image capture application uses to identify the locations of scanners.

In some embodiments, the GUI 200 receives elections of particular scanners through GUI operations (e.g., a click operation) on the icons in device display area 205. When a particular scanner has been selected, the GUI 200 displays controls that apply to that particular scanner in the scanner control area 240 while continuing to display the scanners from different manufacturers in the device display area 205. The GUI 200 is then able to receive commands from users to control the selected scanner through the controls displayed in the scanner control area 240. When a scanner has been selected and a scan of the image capture area ("glass") of the scanner has been performed, scan display area 230 graphically displays the results of that scan.

In some embodiments, when the GUI 200 receives a selection of a particular scanner the image capture application directs the scanner to perform a low resolution preview scan of the glass of the scanner. Details of the preview scan will be further described below in reference to FIG. 4. Other embodiments direct the scanner to perform the preview scan at the regular full resolution. GUI 200 displays the results of such preview scans in scan display area 230. However, scan display area 230 is shown in FIG. 2 as empty because the figure illustrates a state of the GUI 200 in which no scanner has been selected and no preview scan has been performed.

As an additional consequence of a scanner being selected, the scanner control area 240 displays GUI controls for the scanner. In FIG. 2, the scanner control area includes blank GUI controls 242 and 244. Blank controls 242 are provided in the figure for the purpose of showing the typical location of generic scanner controls. Blank controls 244 are provided in the figure for the purpose of showing the typical location of scanner specific controls.

Generic scanner controls are provided by the makers of the image capture application. Scanner specific controls manage features that are built into a specific model of scanner but are not provided by the makers of the image control application. More details about generic and scanner specific controls are provided in section I.A., below.

When no scanner has been selected, some embodiments display all the available generic scanner controls. Some embodiments display a subset of the available generic scanner controls. Still other embodiments do not display any scanner controls until a particular scanner has been selected. In some embodiments, a scanner is automatically selected by default and the controls (generic and scanner specific) that apply to that scanner are displayed in scanner control area 240 until a different device has been selected.

To illustrate different generic and scanner specific controls for different scanners. Two more detailed examples of the GUI of some embodiments will be described below in relation to FIGS. 4 and 5.

A. Individual Scanner Controls

Different scanners have different features. Accordingly, some embodiments display different controls for different scanners. In some embodiments, the specific set of controls displayed for a particular scanner is chosen by a driver associated with that scanner. As mentioned above, some embodiments provide a regular set of controls (referred to herein as "generic controls") that are usable by device driver manufacturers to allow a particular scanner to interface with the image capture application. These controls include controls that are common to most if not all scanners, such as a control for setting the resolution of a scan, a control for setting the color depth (the number of colors per pixel) of a scan, and controls for setting the orientation of a scan. Different scanners may require different sets of generic controls. Accordingly, the scanner manufacturers program a device driver associated with a particular scanner to select a specific subset of the available generic controls that apply to that particular scanner. In some embodiments, the individual scanner drivers provide codes that identify the generic controls for a scanner and their associated menu items but do not provide the names of the controls or the names of menu options for the controls.

A scanner driver that provides an interface between a scanner and the image capture application of some embodiments would not have to provide the names of the generic controls or the names of individual menu items of the generic controls. The drivers would merely indicate which of the available generic controls and menu items were valid options for the particular scanner. That is, the scanner drivers used with some embodiments provide specific codes (from a list of codes supplied by the image capture application producer) that the image capture application uses to determine which of multiple available generic controls and menu options provided by the image capture applications are applicable to a particular scanner. In some embodiments, because the codes refer to specific controls supplied by the makers of the image capture application, generic controls for the same function on two different scanners will always have the same name. For example drivers of a scanner could select a code to include the control that sets the scan resolution in the generic controls for that scanner. The image capture application would display the name "resolution" for that control for all scanners rather than "resolution" for some scanners and "res.", "scan resolution" or "dpi" for other scanners. This serves to eliminate the confusion that would result from different manufacturers giving different names to the same standard control.

The options for individual generic controls of some embodiments are also supplied by the makers of the image capture application. For example, in some embodiments a generic control for color number might have four acceptable values 1) two, 2) 256, 3) thousands, and 4) millions. A driver for use with such embodiments could provide a code, e.g., from a list of codes supplied to the maker of the drivers by the makers of the image capture application. The code would (1) identify the color number control as control for the scanner and (2) append a four-bit word to identify which of the preset menu options the particular scanner supports. The four-bit word would be a binary digit indicating "yes" or "no" for each of the four menu items.

In some embodiments, when a driver indicates that an option is not viable for controlling a scanner the GUI grays out that option on the control menu. In other embodiments, the GUI omits any non-viable options from the control menu and displays only the viable options. For example, a scanner could be made that is able to scan with two colors, 256 colors, or millions of colors, but not thousands of colors. The driver for the scanner would identify, as a control of the scanner, a color number control with options 1), 2), and 4) as viable options for the corresponding scanner and option 3) as non-viable. The GUI would take this identification and display a color number control with options 1) two, 2) 256, and 3) millions.

In addition to the generic controls, some embodiments provide interfaces for controls to set scan parameters that are specific to individual scanners and not provided as part of the generic controls. In contrast to the generic controls, these controls can be anything that the device manufacturer wants them to be. These controls are referred to herein as "scanner specific controls". In some embodiments, the device drivers supply the elements of each scanner specific control. Such elements may include: (1) the type of control such as toggle or menu, (2) the name of the control, (3) the names of the menu options of the control (if applicable), and (4) which of the named options is the default option.

In such embodiments, the image capture application merely displays the scanner specific controls to the user in the manner that the device driver indicates and acts as a pass-through (to the scanner) of the selected menu items or values. The availability of scanner specific controls allows the image capture application to control scanner functions that were not originally contemplated by the programmers of the image capture application. For example, if a scanner manufacturer adds a dust removal feature that is not supported by the regular controls of the image capture application, the scanner manufacturer can program the device driver for the scanner to command the image capture application to show a "dust removal" scanner specific control to the user. The driver could also specify that the control should have menu options "light dust", "medium dust" or "heavy dust". The image capture application would then display a control for the user with exactly the specified control name, "dust removal" and menu options "light dust", "medium dust" and "heavy dust".

Figure 4:
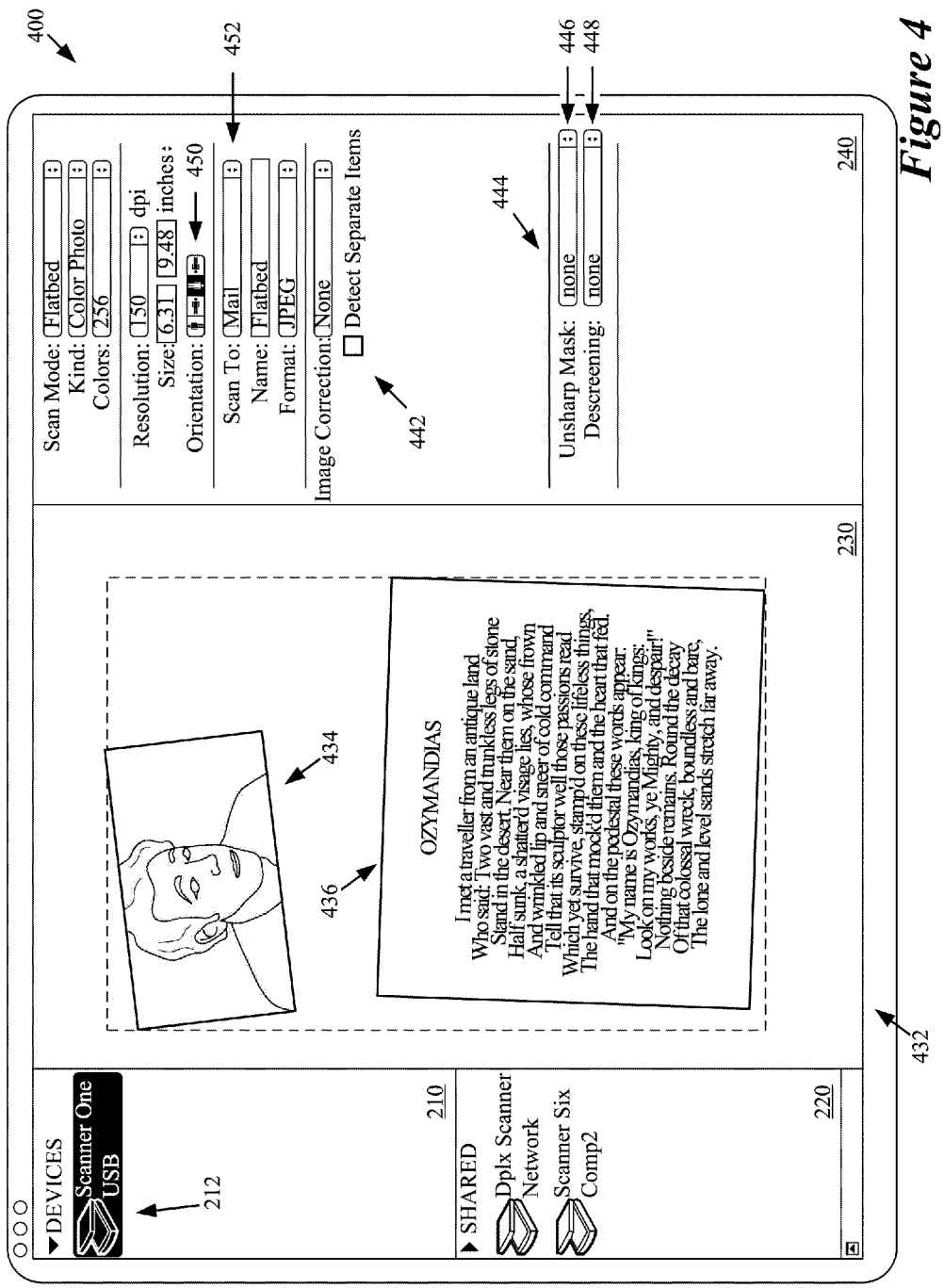
FIG. 4 illustrates a GUI when a particular scanner has been selected.
Figure 5:
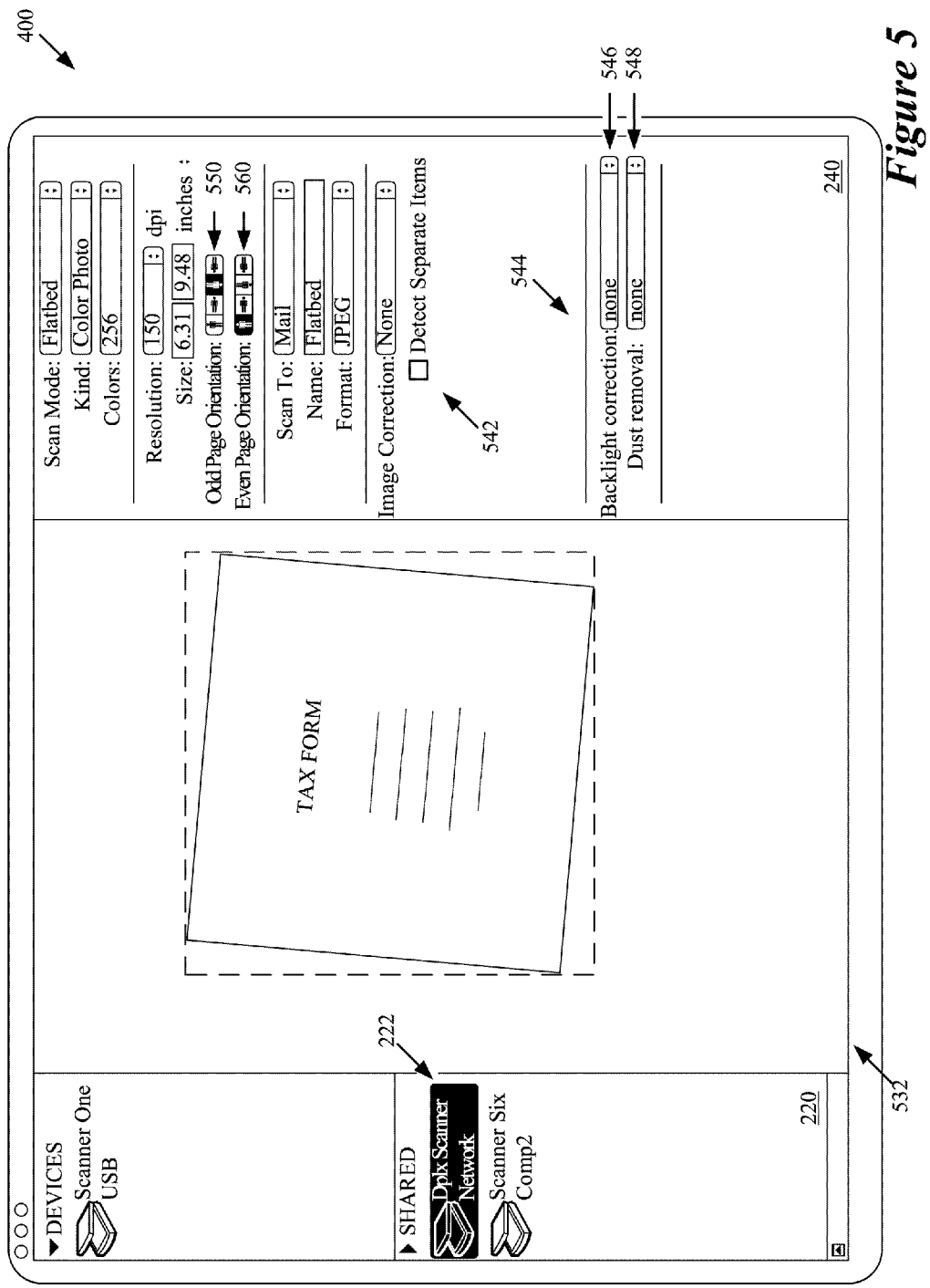
FIG. 5 illustrates GUI when another particular scanner has been selected.

The scanner specific controls are entirely at the discretion of the individual scanner manufacturer. As an example of a feature that is unusual or unknown in existing scanners, a scanner manufacturer could create a scanner with an attached paper shredder. The manufacturer could program the device driver for the scanner to provide the image capture application with a scanner specific "shred document after scanning" control. Some examples of generic and scanner specific controls are illustrated in FIGS. 4 and 5. In giving these examples, additional details are provided regarding the scan display area, generic scanner controls, and scanner specific controls.

FIG. 4 illustrates a GUI 400 when a particular scanner has been selected. The figure shows generic and scanner specific controls that are provided by the GUI 400 to control the selected scanners. The figure also shows a preview scan of the items on the selected scanner. FIG. 4 includes generic scanner controls 442, scanner specific controls 444, and preview 432, which shows scanned items 434 and 436.

As previously mentioned, when a scanner icon in local device display area 210 or shared device display area 220 is selected, the image capture application provides controls for that scanner. The generic scanner controls 442 and the scanner specific controls 444 receive settings from a user that determine various parameters that will be used when scanning the items on the scanner and processing the scanned images. Preview 432 shows a low resolution image of the items that are on the glass of selected scanner 312. Preview scans are described in additional detail in section II, below.

In FIG. 4, icon 212 has been selected. As mentioned in relation to FIG. 2, icon 212 represents scanner 312 of FIG. 3. In FIG. 4, the GUI 400 indicates that scanner 312 has been selected by inverting the colors of the corresponding icon 212. However other embodiments use other visual cues to indicate that a scanner has been selected. For example, some embodiments provide a border box around the icon, altered icon colors, bold lettering for the icon, or other cues.

In FIG. 4, because scanner 312 has been selected, the GUI 400 displays the controls that apply to scanner 312 in scanner control area 240. Generic controls 442 are displayed in the upper section of scanner control area 240, while scanner specific controls 444 are displayed in the lower section of scanner control area 240.

As mentioned above, different scanners can require different sets of generic controls. In such embodiments, the generic controls provided by the GUI 400 for the selected scanner depend on the generic features of the selected scanner. One generic control included in generic controls 442 is an orientation control 450. Orientation controls determine which side of a scanned image is saved as the top of the image. Orientation controls are provided because items may be placed on a scanner in any orientation. Some items are placed on the scanner sideways or upside-down. Orientation control 450 determines the orientation of an image generated by scanner 312.

Scanner 312 is a simplex scanner (a scanner that can only scan on one side of a page without a user turning the page over). Therefore, generic controls 442 in FIG. 4 are generic controls appropriate for a simplex scanner (though other simplex scanners may have other sets of generic controls). Because a simplex scanner can only scan one side of a page, and a stack of pages fed into a sheet feeder of the simplex scanner is generally fed in with a common orientation, there is no need for more than one orientation control for simplex scanner. Therefore, generic controls 442 only include one orientation control. Orientation control 450 is a generic control because orientation control 450 is provided by the makers of the image capture application rather than the scanner manufacturer.

In some embodiments, the section of the scanner control area that displays the generic controls also displays controls that determine the actions of the image capture application beyond controlling the scanner itself. For example, the scan-to control 452 described in section I.C., below, determines to which application (from a provided list of applications) the scanned image will be sent once it has been scanned and processed by the image capture application.

As mentioned above, scanner specific controls manage features that are built in to the specific model of scanner but are not pre-programmed in the image control application. FIG. 4 shows that the selected scanner 312 has features that the scanner manufacturer calls "unsharp mask" and "descreening". In the driver for scanner 312, the manufacturer (or third party driver programmer) has identified the names and menu options of controls that the manufacturer (or programmer) wants the image capture application to display. The image capture application receives the names of the controls and the menu items and generates the scanner specific controls 444. Scanner specific controls 444 include controls 446 and 448. Control 446 is labeled "unsharp mask" because the driver for scanner 312 provided the name "unsharp mask" for a scanner specific control. Control 448 is labeled "descreening" because the driver provided the name "descreening" for a scanner specific control. If the image capture application receives selections of the options of scanner specific control 446 or 448, then the image capture application passes the received selection to the scanner.

In some embodiments, such as the embodiment illustrated in FIG. 4 scanner specific controls are in a separate section from generic controls. In some embodiments, the separate section is a dedicated section set aside for scanner specific controls. In other embodiments, the section for the scanner specific controls is inserted just after the last generic control. In still other embodiments, scanner specific controls are positioned among the generic controls.

Because the names and menu options are set by the driver, in some embodiments, the GUI 400 could provide controls for the same feature on two different scanners with two different names. That is, if a driver for a scanner from a different manufacturer (or even a different driver for the same scanner) called the "unsharp mask" feature by a different name (e.g., "blur") the name of control 446 would be different for the different scanner (or driver). The names would be different even if the result of using the differently named controls would be the same for each scanner. Similarly, in some embodiments, the scanner specific controls for the same features may have different names for the options. For example, one driver could specify that the options for control 446 should be named "heavy", "medium" or "light", while another driver could specify that the options be named "high", "middle", or "low", even though selection of the corresponding options (e.g., selection of "heavy" or "high") would cause the same result.

The amount of time it takes to perform a scan increases for higher resolution scans. Many scanners are capable of performing high resolution scans of specified portions of the glass while ignoring other portions of the glass. Accordingly, scanning time can be reduced by performing an initial scan at a low resolution and then selecting (manually or automatically) portions of the glass on which to perform higher resolution scans. In the embodiment illustrated in FIG. 4, the image capture application automatically commands scanner 312 to perform a low resolution preview scan when the scanner icon 212 is selected. The preview scan generates a preview 432 that shows the items 434 and 436 on scanner 312. Additional details about preview scans are described in section II, below.

Some features of FIG. 4 described above are associated with the particular scanner selected. FIG. 5 illustrates GUI 400 when another particular scanner has been selected. Like FIG. 4, FIG. 5 shows different controls that are provided by the GUI 400 to control the selected scanner and a preview scan of the items on the scanner. However, a different scanner has been selected in FIG. 5 than FIG. 4. FIG. 5 includes generic scanner controls 542, scanner specific controls 544, and preview 532.

Like the controls in FIG. 4 the generic scanner controls 542 and the scanner specific controls 544 receive settings from a user that determine various parameters that will be used when scanning the items on the scanner and processing the scanned images. Preview 532 shows a low resolution image of the item that is on the glass of selected scanner 330.

In FIG. 5, icon 222 has been selected. Icon 222 represents scanner 330 of FIG. 3, which is a duplex scanner. In FIG. 5, because scanner 330 has been selected, the GUI 400 displays the controls that apply to scanner 330 in scanner control area 240. The controls shown in FIG. 5 are different from the controls shown in FIG. 4, demonstrating that the image capture application provides different sets of controls for different scanners. Specifically, FIGS. 4 and 5 show that the GUI 400 provides both different generic controls and different scanner specific controls for scanner 330 than for scanner 312.

Although the particular controls are different in FIG. 5, the generic controls 542 are displayed in the upper section of scanner control area 240 like the generic controls 442 in FIG. 4. Similarly, scanner specific controls 544 are displayed in the lower section of scanner control area 240 like the scanner specific controls 444 in FIG. 4.

As mentioned above, in some embodiments, different sets of generic controls apply to different scanners. In such embodiments, the generic controls provided by the GUI 400 for the selected scanner depend on the generic features of the selected scanner. In the example shown in FIG. 4, the selected scanner 312 was a simplex scanner. In FIG. 5 the selected scanner is a duplex scanner (scanner 330). Therefore, the generic controls 542 of FIG. 5 are generic controls that are appropriate for a duplex scanner (though other duplex scanners may have other sets of generic controls). In contrast to the generic controls 442 of FIG. 4, which included a single orientation control 450, generic controls 542 include dual orientation controls 550 and 560 for setting the orientation of each side of a two-sided page.

The provided orientation controls 550 and 560 are useful for duplex scanners but not to one-sided scanners. They are useful to duplex scanners because duplex scanners can flip pages over. The duplex scanners scan one side of the paper and then flip the paper over to scan the other side. Two-sided pages are sometimes printed so that the text of the even numbered pages will be in the same orientation as the odd numbered pages when the pages are flipped up (rotated through an axis parallel to the top and bottom of the page). However, two-sided pagers are also sometimes printed so the text of the even numbered pages will be in the same orientation as the odd numbered pages when the pages are flipped over (rotated through an axis parallel to the left and right sides of the page). Flipping a page in the wrong direction results in the even numbered pages being oriented in the opposite direction from the odd numbered pages. Duplex scanner 330 can only flip the page in one direction. Accordingly, if the pages are printed so as to require flipping in the other direction then a single orientation control for duplex scanner 330 would leave every other scanned page upside down. The dual orientation controls 550 and 560 solve this problem. This is shown by control 550 being set to save images of the odd pages upside-down and control 560 being set to save images of the even pages right side-up.

Duplex scanners are common enough that in some embodiments, like the one shown in FIG. 5, the image capture application producer provides generic controls to handle the two-sided-page orientation issue. That is, in some embodiments, the different orientation controls 450, 550, and 560 are all generic because all of them are pre-programmed in the image capture application rather than provided by the scanner manufacturer. However, in some embodiments, dual orientation controls are not provided by the makers of the image capture application. In some of such embodiments, the makers of the drivers can provide dual orientation controls as scanner specific controls.

Because the generic controls and their options are pre-programmed in the image capture application, the image capture application of some embodiments is programmed to provide secondary uses of the selected options of generic controls. That is, secondary to passing the control setting to a scanner. For example, the image capture application of some embodiments provides a scanner resolution control. The programmers of the image capture application, knowing how scan resolution affects file size, could program the image capture application to calculate an estimated file size for the scan that varies depending on the resolution setting.

In contrast, scanner specific controls manage features that are built in to the specific model of scanner but are not pre-programmed in the image control application. Because scanner specific controls perform operations that were not anticipated by the programmers of the image capture application, the image capture application of some embodiments has no secondary use for a selected option of a scanner specific control (e.g., the image capture application can only pass it through to the scanner).

FIG. 5 shows that the selected scanner 312 has features that the scanner manufacturer calls "backlight correction" and "dust removal". As was the case for the scanner in FIG. 4, the driver for scanner 330, identifies the names and menu options of controls that the manufacturer (or programmer) wants the image capture application to display for scanner 330. The image capture application receives the names of the controls and the menu items and generates the scanner specific controls 544. Control 546 is labeled "backlight correction" because the driver identified "backlight correction" as the name for a scanner specific control. Control 548 is labeled "dust removal" because the driver identified "dust removal" as the name for another scanner specific control. When the image capture application receives selections of the options of scanner specific control 546 or 548, the image capture application passes the received selection to the scanner.

As mentioned above, in some embodiments, the image capture application automatically commands a scanner to perform a low resolution preview scan of a scanner when the scanner is selected. Therefore, when scanner 330 is selected (e.g., by the selection of icon 222 shown in FIG. 5), the preview scan generates a preview that shows the item on scanner 330. The preview 532 of FIG. 5 is different from the preview 432 of FIG. 4 because they are preview scans of different items on different scanners.

Some embodiments provide a control for the user to command the scanner to redo the preview scan (e.g., when items on the glass have been moved or replaced). Some embodiments provide a control to command a preview scan in addition to or instead of automatically commanding a preview scan when the scanner is first selected.

B. Preview Scans

As mentioned in relation to FIGS. 4 and 5, in some embodiments, an automatic preview scan of the glass of a selected scanner is performed upon selection of the scanner. The preview scan provides the GUI with a low resolution image of the entire glass (including the items on the glass and the surrounding space) to display as a preview. In some embodiments, the image capture application evaluates the data collected in the preview scan to determine the positions and types of items on the glass.

In embodiments that automatically determine scanning parameters based on preview scans and in embodiments in which the user selects parameters based on the preview image, parameters of subsequent detailed scans of the items on the glass (such as which areas of the glass will be scanned in the detailed scans) depend on the information gathered in the preview scan. Therefore, it is important that the information gathered in the preview scan remains accurate. If the positions of the items on the glass change after a preview scan but before a detailed scan, then the existing preview scan data will no longer accurately represent the state of the items on the glass. Such inaccuracies could lead to worthless detailed scans and wasted time, so the preview scan should be redone when items on the glass are moved or replaced. However, many scanners do not have a sensor that identifies when the lid of the scanner has been opened and the items on the glass have been moved or replaced. Therefore, the images on the glass can change without the image capture application being notified. Accordingly, some embodiments provide a control to receive a user command to redo the preview scan. Such a control can be activated by a user. For example, a user can activate the control after the user has moved or replaced items that were previously on the scanner. Activating the control ensures that the image capture application has up-to-date preview scan data to evaluate. An example of the preview scan of some embodiments is illustrated in FIGS. 6 and 7.

Figure 6:
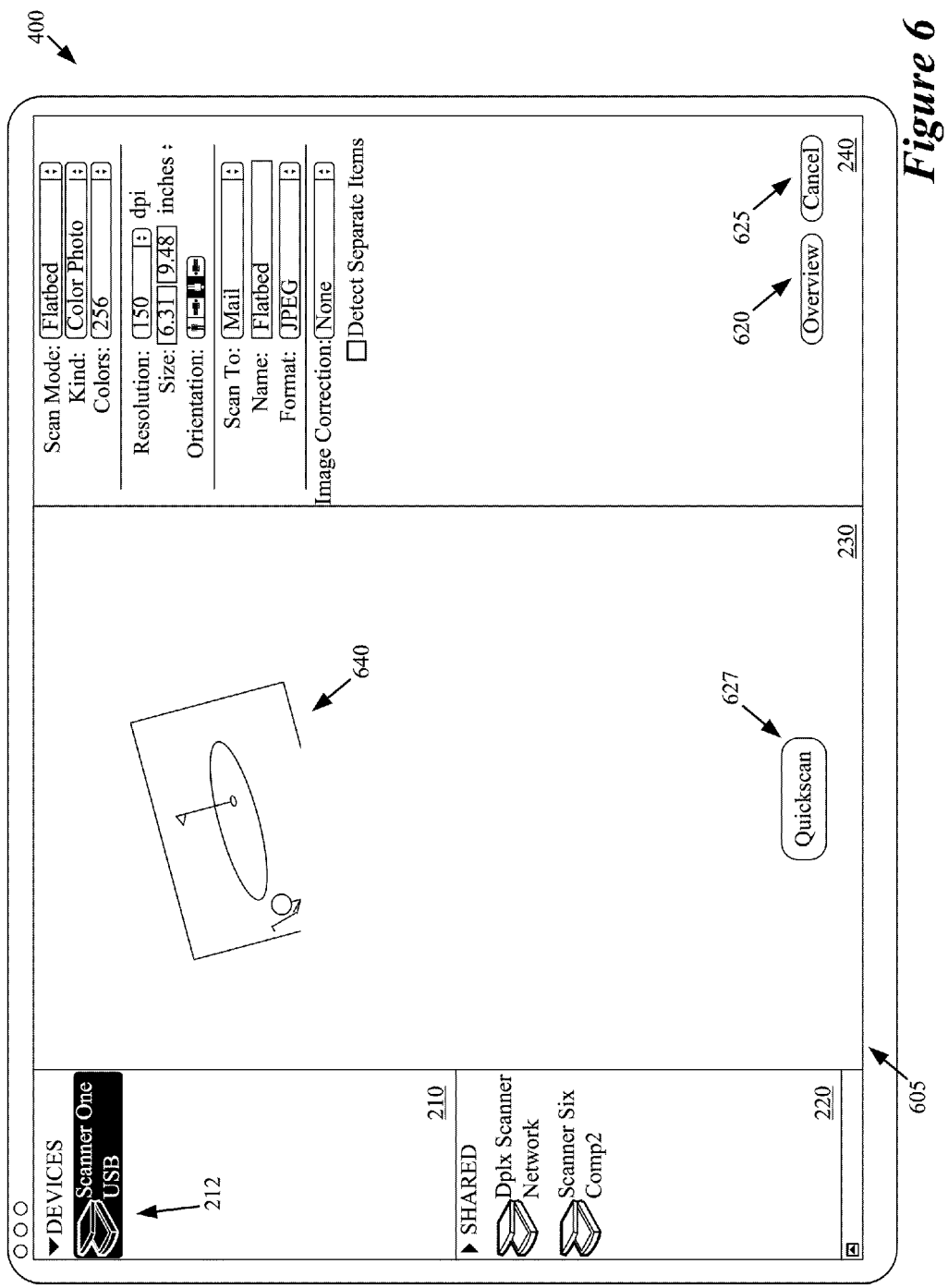
FIG. 6 illustrates GUI during a preview scan.
Figure 7:
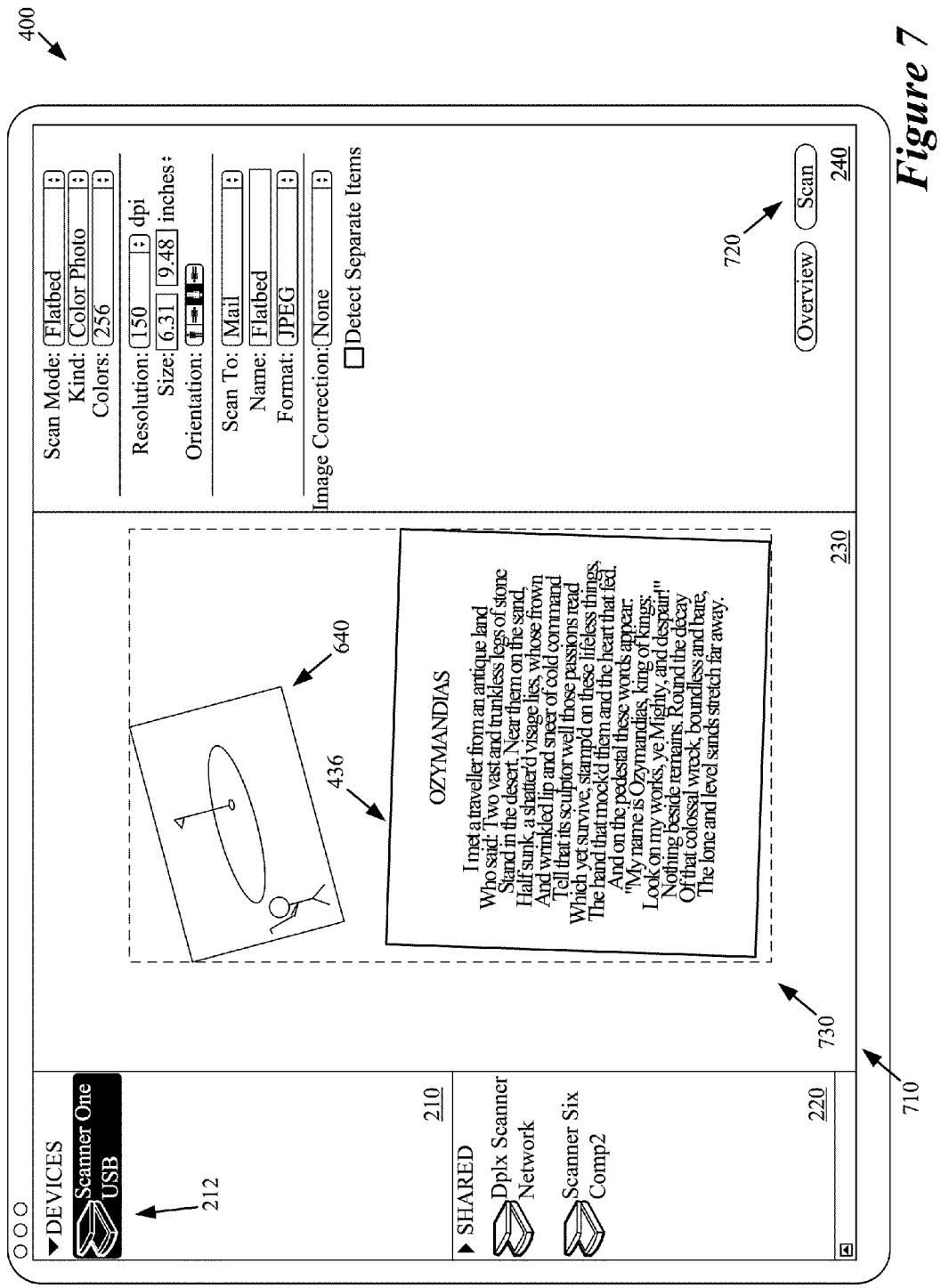
FIG. 7 illustrates the GUI after a scanner has completed a preview scan.

FIG. 6 illustrates GUI 400 during a preview scan. FIG. 6 shows various controls associated with preview scans and a partially complete preview in the preview area 230. FIG. 6 includes incomplete preview 605, overview button 620, cancel button 625, and scan status indicator 627.

Overview button 620 is a control that commands the scanner to redo the preview scan. Cancel button 625 is a control that aborts the preview scan before it is finished. Incomplete preview 605 is an image of the scanner's progress so far at generating the data for the low resolution preview of the items on the scanner glass. Incomplete preview 605 shows a partial scan of item 640. Item 640 is an image of a photograph that has replaced the male portrait represented by scanned image 434 shown in FIG. 4. The scan status indicator 627 indicates what type of scan operation is being performed.

In FIG. 6, the item 640 has replaced item 434 on the scanner glass. In FIG. 4, a preview 432 was generated by the automatic preview scan performed when the scanner icon 212 was selected. Because of the replacement of item 434 with item 640 on the scanner glass, preview 432 does not accurately represent the contents of the glass of scanner 312 at the time of the preview scan shown in FIG. 6. Accordingly, the user has activated overview button 620 (e.g., by clicking on the button) and the image capture application has commanded the scanner to perform another preview scan. The GUI 400 displays the preview scan in progress, showing partially scanned item 640 and status indicator 627. In this figure, status indicator 627 shows that a "quickscan" (i.e. a preview scan) is being performed. While the preview scan is in progress, a user can select the cancel button 625 to command that the preview scan be stopped immediately (or as soon as the software and hardware are able to stop the scan). Some embodiments lock out some or all controls other than the cancel control while the preview scan is being performed.

FIG. 7 illustrates the GUI 400 after the scanner has completed a preview scan. The figure shows various controls and indicators that are provided to the user after preview scans in some embodiments. FIG. 7 includes completed preview 710, scan button 720, and bounding box 730.

Preview 710 is a low resolution image of the glass of a scanner. The preview 710 shows the items 640 and 436, which are images of the items on the glass during the new preview scan. In some embodiments, the GUI 400 provides a bounding box 730 that surrounds the scanned items in the preview 710. The bounding box 730 indicates the outer limits of the scanned group of items. Scan button 720 activates a detailed scan of the scanner glass.

Preview image 710 in FIG. 7 shows an image of the entire glass of the selected scanner after the new preview scan is complete. The items placed on the glass of a scanner (here, items 640 and 436) are generally of interest to the user, while the areas outside of the items are generally not of interest to the user. Accordingly it is desirable that the image capture application should default to not scanning areas outside of the items. That is, unless the image capture application receives overriding commands (e.g., from a user), a detailed scan of items 640 and 436 should exclude the areas outside of those images. Therefore, the image capture application uses the preview scan data to determine the outermost locations of the items on the glass. That is, the highest, lowest, rightmost, and leftmost locations of any items placed on the glass to be scanned. GUI 400 shows the determined limits to the user as bounding box 730 which is a box with edges parallel to the sides of the preview 710 that surrounds all the images (items 640 and 436) in the preview 710. In FIG. 7, bounding box 730 is the smallest possible box with edges parallel to the sides of the preview 710 that surrounds all the images in the preview 710. Bounding box 730 indicates the automatically determined limits of the area that it would be useful to capture in a detailed scan. When the detailed scan button 720 is activated (e.g., by a click of a mouse button) the image capture application will perform a detailed scan of the area represented by bounding box 730.

Figure 8:
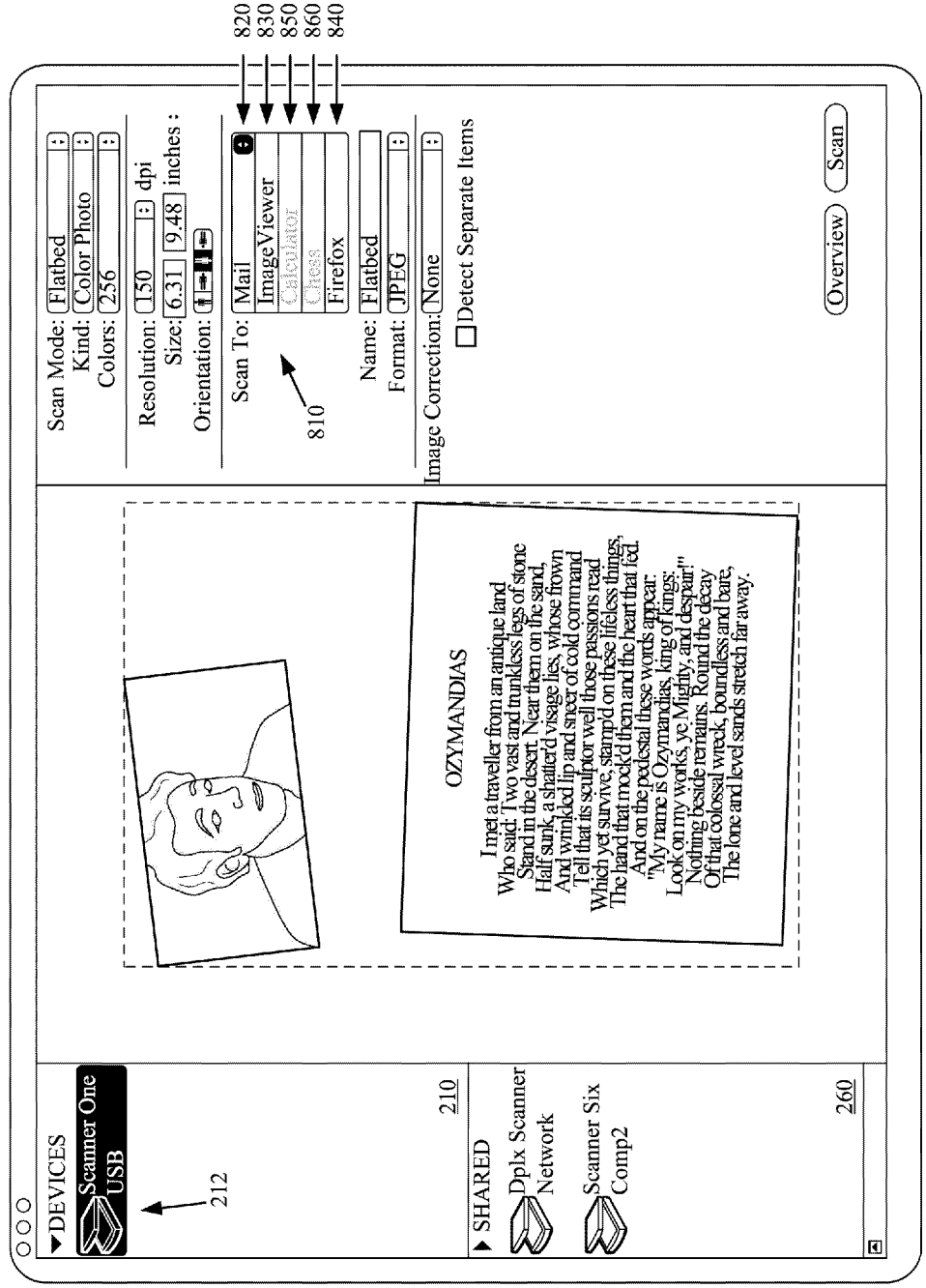
FIG. 8 illustrates a GUI with an application selection menu of some embodiments.

In some cases a user might want to scan a different area of the glass than the automatically determined area (e.g., more of the surrounding blank space). Therefore, some embodiments provide controls to change the location, size, or orientation of the identified bounding box. Some examples of such embodiments are described in section III, below. In some embodiments, the image capture application commands the scanner to perform a detailed scan of the area in the bounding box. In some embodiments, the image or images captured by the detailed scan are sent to an application selected by a user. An example of the controls for selecting an application as a recipient of the scanned image is shown in FIG. 8.

C. Application Menu

The image capture applications of some embodiments provide a control that allows a user to select an application to receive scanned images. FIG. 8 illustrates a GUI with an application selection menu of some embodiments. The figure shows various menu items that a user can select to determine the application to which a scanned image will be sent. The menu includes grayed out (non-selectable) items representing applications to which images cannot be sent. FIG. 8 includes scan-to-application selector 810, which is displayed as a menu of applications. The menu includes selectable menu items (1) mail 820, (2) ImageViewer 830, and (3) Firefox® 840 and non-selectable menu items (1) calculator 850 and (2) chess 860.

The scan-to-application selector 810 allows a user to choose a computer application to which a scanned image should be sent. Individual selectable menu items 820, 830, and 840 represent applications that are capable of displaying or otherwise handling supplied images. Non-selectable menu items 850 and 860 represent applications that are not capable of displaying or otherwise handling supplied images.

Some computer applications are capable of displaying image files that are sent to the application. For example, the Firefox® web browser displays images in a browser window when an image is supplied to the browser. In FIG. 8, applications that are capable of displaying supplied image files (mail 820, ImageViewer® 830, and Firefox® 840) are represented in the scan-to-application selector 810 in black lettering, indicating that they are selectable. When a selectable menu item is selected, a subsequent detailed scan will be sent to the application that corresponds to the selected menu item.

In contrast, some computer applications are not capable of displaying supplied images. For example, a calculator program may not be capable of displaying a supplied image file. In FIG. 8, applications calculator 850 and chess 860, which are incapable of displaying supplied image files, are represented in the scan-to-application selector in grayed out text, preventing the user from accidentally sending a scanned image file to an application that is incapable of handling an image file. Alternate embodiments may provide representations of applications that are not capable of displaying supplied images that are deprecated in other ways than being grayed out. Scan-to-application selector 810 demonstrates the concept of grayed out application options. However, in some embodiments, the scan-to-application selector omits non-viable menu options, but includes an option to browse additional applications, some of which may be non-viable. In some such embodiments the display of the additional applications includes grayed out non-viable applications.

Some applications, such as mail 820 are not programmed to display received images, but are capable of using received images in some manner if the applications are provided with instructions for how to use the received images. In some embodiments, the image capture application (or some other application or operating system component) provides scripts to instruct such applications how to handle scanned images. For example, a script for sending a scan to a mail application could include instructions to the mail application to create a new e-mail and attach the scanned image as a file attachment to the new e-mail.

Some embodiments provide local drive, network drive, SD card and/or other storage medium as an alternative destination for the scanned images. In these instances, the user may select a storage medium to receive the scanned image produced by the image capture application.

D. Automatically Detect Items

As described above, some embodiments perform preview scans of the glass of selected scanners. Some embodiments use the previews to automatically detect separate items on the scanner glass. The GUI controls for setting the image capture application to automatically detect separate items are described in relation to FIGS. 9 and 10. The GUI controls activate the processes of identifying separate items. Additional details about the process of identifying separate items are described in section II below.

Figure 9:
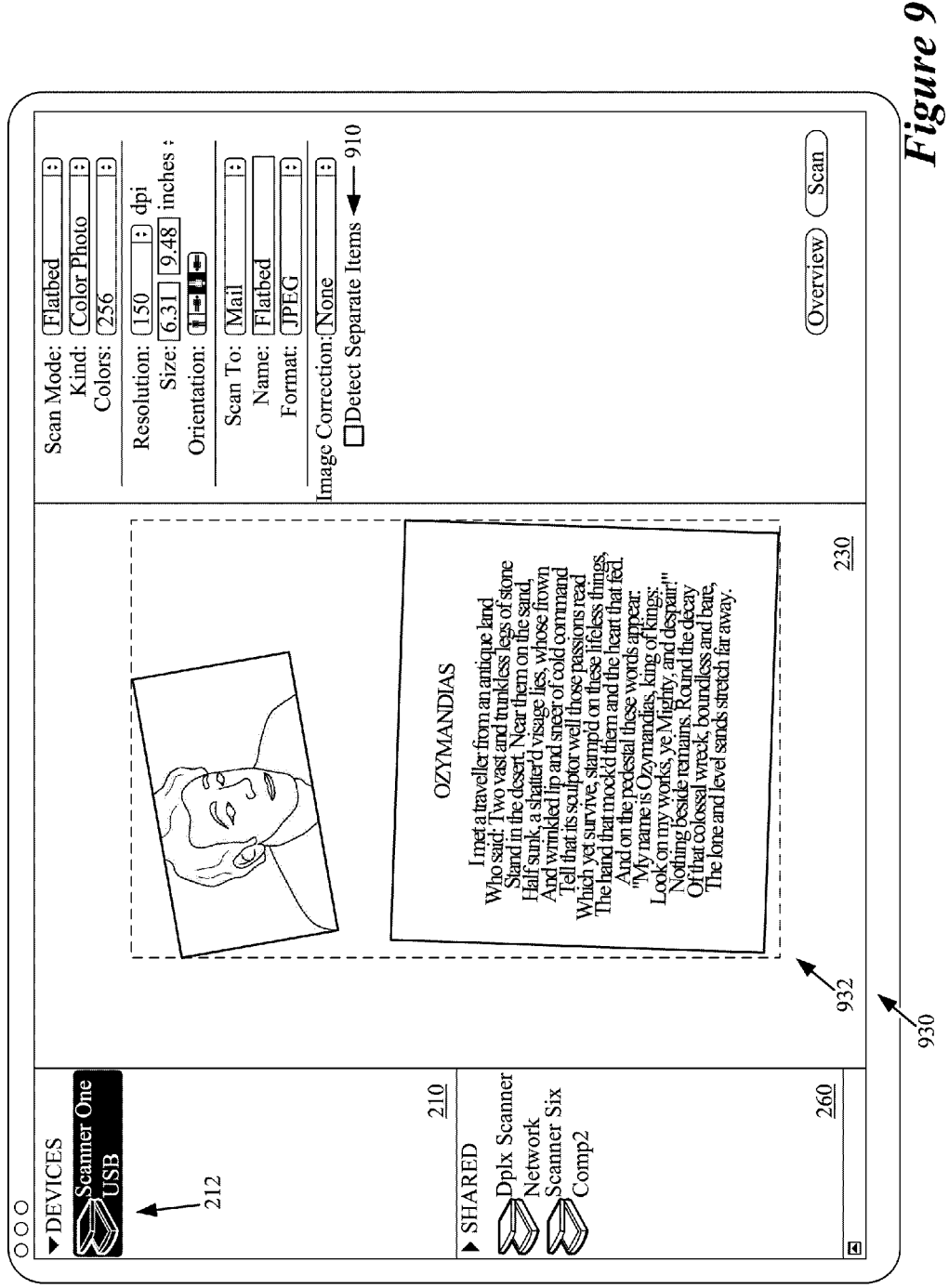
FIG. 9 illustrates a de-activated GUI control for automatically identifying separate items.

FIG. 9 illustrates a de-activated GUI control for automatically identifying separate items. The figure shows how the GUI of some embodiments displays items when the detect-separate-items feature is turned off. FIG. 9 includes detect-separate-items toggle 910 and preview 930. Toggle 910 controls whether the image capture application identifies separate items on the glass individually or as a group. In some embodiments, the toggle 910 also commands the image capture application to automatically identify other characteristics of the items (e.g., color or black and white). Preview 930 shows the results of a low resolution scan of the glass of the selected scanner. In FIG. 9 the detect-separate-item toggle 910 is unchecked. Because the toggle 910 is unchecked, the image capture application detects all items on the glass as one big group. Accordingly, preview 930 displays a single bounding box 932 that encloses all items in the preview 930.

Figure 10:
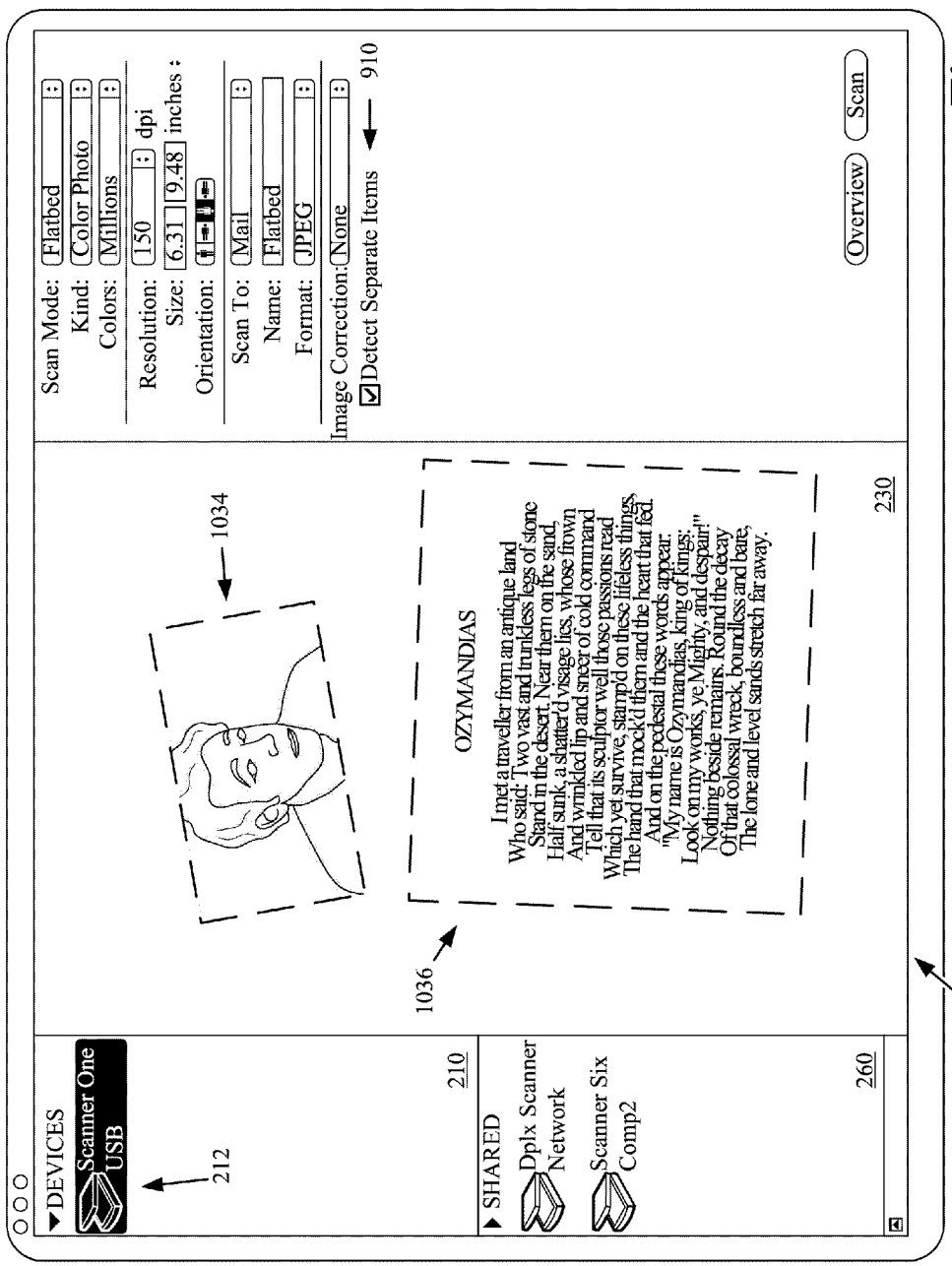
FIG. 10 illustrates an activated GUI control for automatically identifying separate items.

FIG. 10 illustrates an activated GUI control for automatically identifying separate items. The figure shows how the GUI of some embodiments displays items when the detect-separate-items feature is turned on. FIG. 10 includes preview 1030. Preview 1030 shows the results of a low resolution scan of the glass of the selected scanner.

In FIG. 10, the detect-separate-item toggle 910 is checked, commanding the image capture application to identify items individually. When toggle 910 is set to identify items individually the image capture application uses the preview scan data to identify the locations occupied by the separate items. The image capture application then displays the separately identified images to the user. Accordingly, preview 1030 shows each item enclosed in a separate individual bounding box, bounding boxes 1034 and 1036.

Some embodiments switch back and forth between the large bounding box of FIG. 9 and the individual bounding boxes of FIG. 10 when toggle 910 is checked and unchecked. In some embodiments, the image capture application can switch from either of the two modes to the other without performing a new preview scan. In some embodiments, even when toggle 910 is unchecked, the separate items are detected when the original preview scan is performed and the detection data is stored for potential later use. In some embodiments, when the detect-separate items toggle 910 is first checked after a preview scan, the detection of the separate items is performed and the results are stored for later retrieval in the event that the detect-separate-items toggle 910 is unchecked and then checked again. In other embodiments, the detection of the separate items is performed on the preview image each time toggle 910 is checked and rechecked.

Most scanners are only able to scan areas that are aligned with the edges of the glass. The scanners contain a scanner head that captures thin slices of an image at right angles to the sides of the scanner glass. The scanner head is then moved parallel to the sides of the glass, scanning a rectangular area aligned with the edges of the glass. Therefore, in some embodiments, when the image capture application determines the bounding box of an image that is rotated in relation to the glass, the image capture application also determines a larger bounding box for the image that has sides that are aligned with the glass and encompass the first bounding box. The image capture application provides the scanner with the larger bounding box. The scanner then scans the area within the larger bounding box and sends the scan data to the image capture application, which extracts the image within the smaller bounding box from the larger image provided by the scanner.

Figure 11:
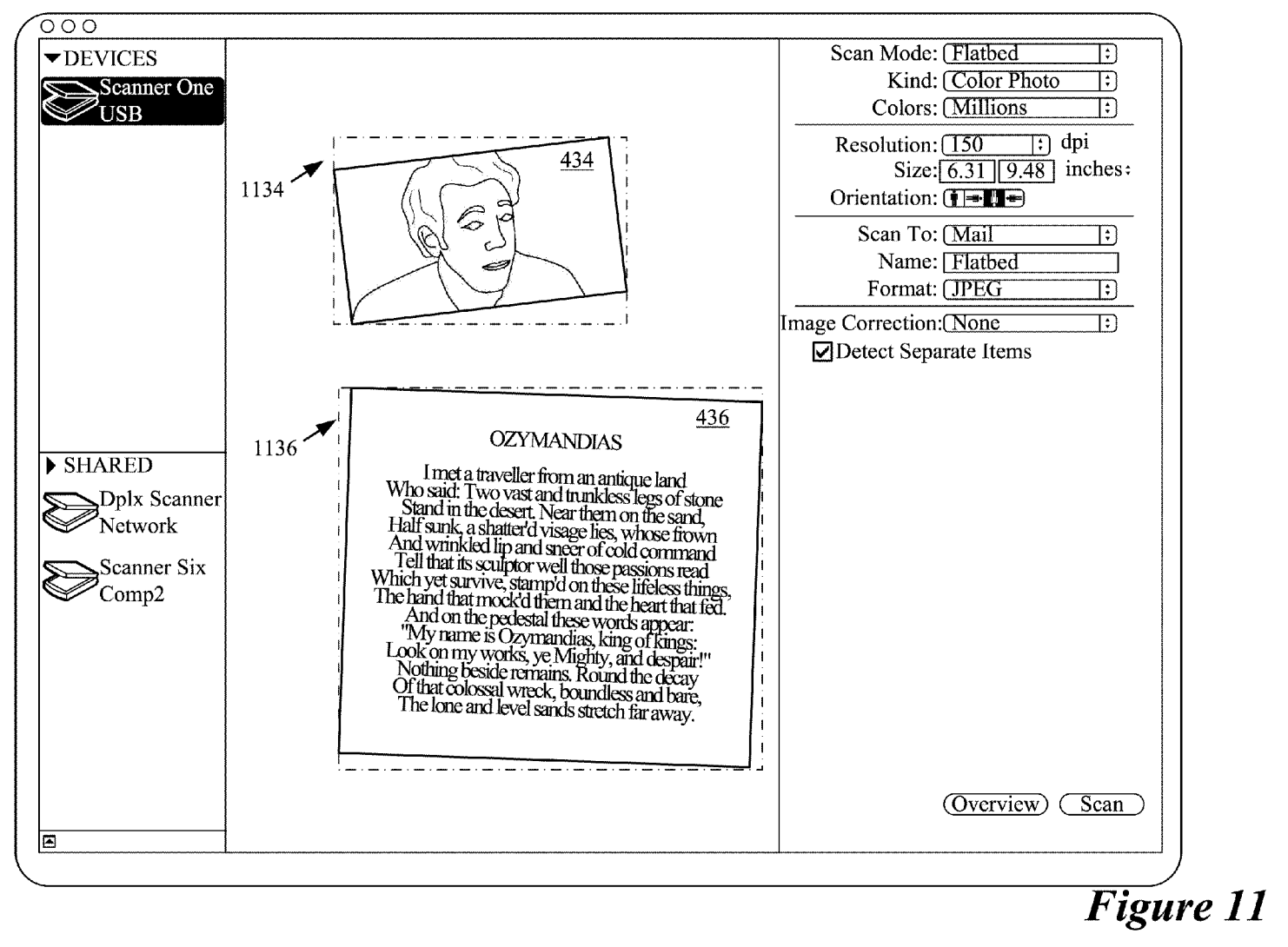

FIG. 11 illustrates bounding boxes of individual items aligned with a scanner. The figure shows items in the preview area inside bounding boxes that are determined by the image capture application as the boundaries to provide to the scanner when commanding a scan of the particular items. FIG. 11 includes bounding boxes 1134 and 1136. Bounding box 1134 surrounds item 434 and bounding box 1136 surrounds item 436.

In FIG. 11, the bounding box 1134 identifies the leftmost, rightmost, top, and bottom corner of item 434. Therefore, when the scanner scans the area of the glass corresponding to bounding box 1134, the entirety of item 434, along with some surrounding blank areas will be provided to the image capture application which will then extract the data within the boundaries of item 434. Similarly, when the scanner scans the area of the glass corresponding to bounding box 1136, the entirety of item 436, along with some surrounding blank areas will be provided to the image capture application which will then extract the image data within the boundaries of item 436.

Some embodiments automatically set parameters for each identified item. For example, some embodiments would identify bounding box 1134 as containing a color picture and set the parameters to scan the color picture at 150 dots-per-inch ("dpi") with millions of colors. Some embodiments would identify item 436 as text and scan it at 300 dpi in black and white, followed by applying an optical character recognition algorithm to the scanned image of item 436.

In some embodiments, once individual items have been identified, the image capture application allows a user to select a particular image and manually adjust the automatically set scanning parameters before commanding the scanner to scan that particular item. Examples of such embodiments are described in section III., below.

E. Simplified Controls—Hide Details

As mentioned above, some embodiments allow a user to manually adjust the automatically identified scan parameters. However, under some circumstances a user may want to sacrifice the ability to manually control the parameters in exchange for the increased speed resulting from not making the image capture application wait for the user to select items and scan each item. Accordingly, some embodiments provide an optional simplified interface for performing multiple steps involved in scanning in rapid succession. One of ordinary skill in the art will understand that in some embodiments, the simplified interface and the standard interface are both aspects of the same user interface, rather than separate and distinct interfaces. Some embodiments provide GUI controls for switching between a simplified interface and a standard interface.

Figure 12:
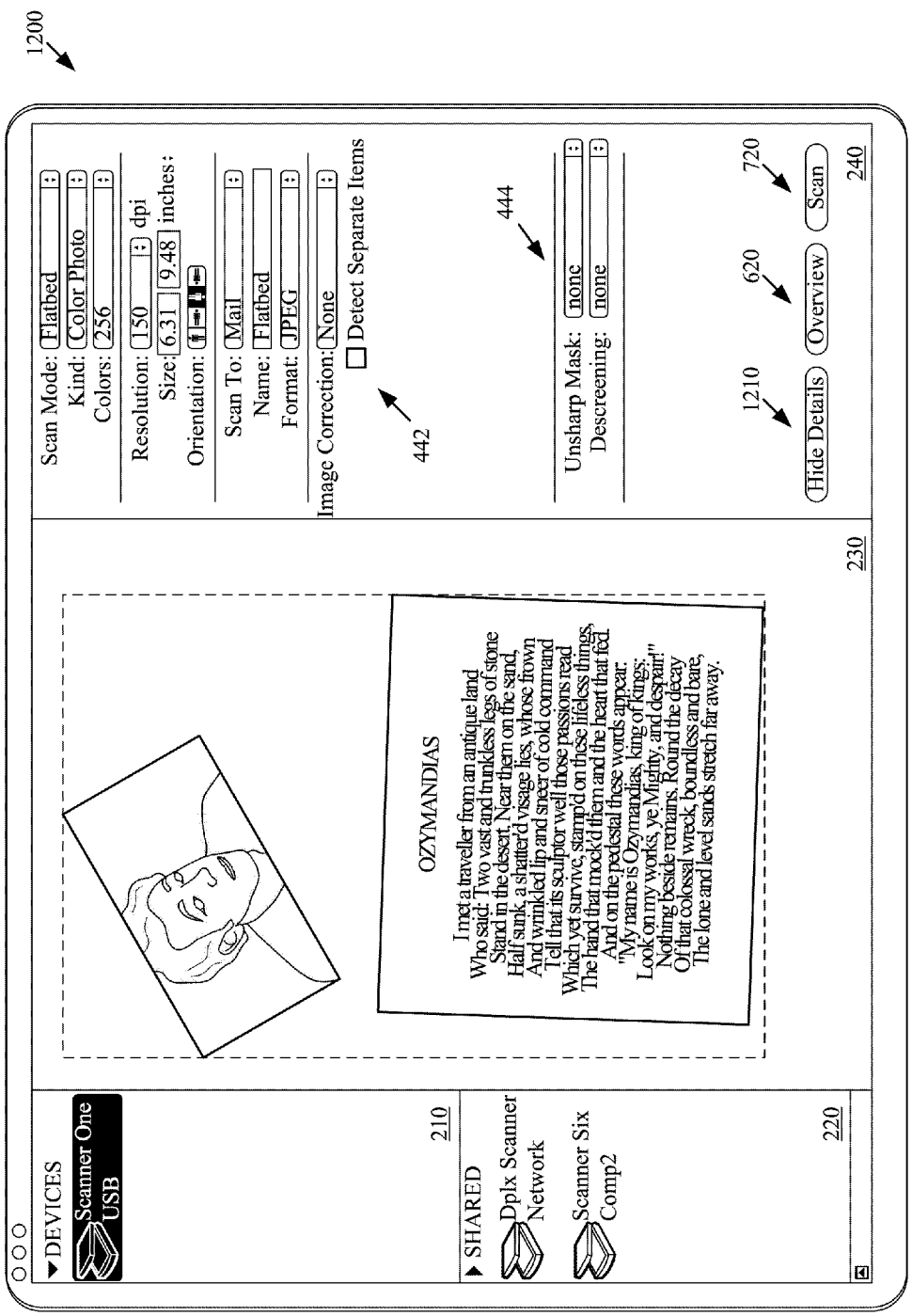
FIG. 12 illustrates a GUI with a control for activating a simplified interface.

FIG. 12 illustrates a GUI 1200 with a control for activating a simplified interface. The figure shows the state of a GUI in its standard mode with many controls available for adjusting the scan parameters. FIG. 12 includes GUI 1200, hide details button 1210, scan button 720, and overview button 620. The GUI 1200 allows a user to control an image capture application. The GUI 1200 allows a user to activate an overview scan by hitting overview button 620. Controls 442 and 444 allow the user to adjust many parameters before hitting scan button 720 to start a detailed scan. The hide details button 1210 switches the GUI 1200 to a simpler set of controls. In some embodiments, when the user activates hide details button, the image capture application switches to a simplified interface and immediately starts an automatic scanning process (e.g., one of the processes described in section II). In other embodiments, the hide details button 1210 activates a simplified interface like the interface illustrated in FIG. 13.

Figure 13:
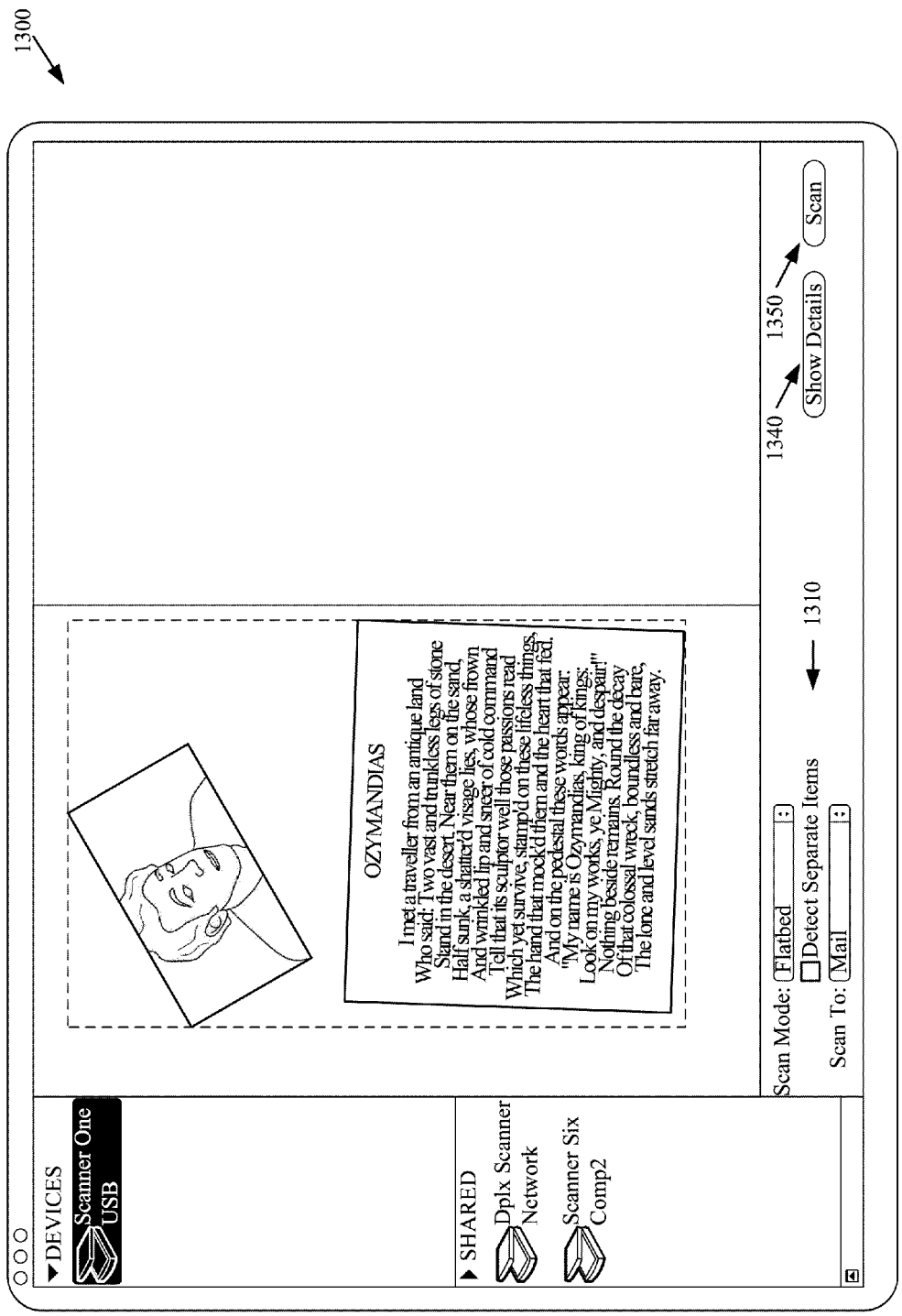
FIG. 13 illustrates a GUI with a simplified interface.

FIG. 13 illustrates a GUI 1300 with a simplified interface. FIG. 13 includes a subset of the controls of the GUI 1200 and excludes the rest of the controls of GUI 1200. FIG. 13 includes GUI 1300, control set 1310, show details button 1340, and scan button 1350. In FIG. 13, control set 1310 allows a user to set a limited number of parameters for the scan. Show details button 1340 changes the GUI 1300 back into GUI 1200. Scan button 1350 starts an automatic process for scanning images on the scanner.

The automated process activated by scan button 1350 performs a preview scan, but does not stop for user input after the preview scan. Accordingly, the simplified interface provides only controls that are relevant before a preview scan is performed. The simplified interface also does not provide a separate overview button 1350 includes a preview scan. A user of GUI 1300 can hit the scan button 1350 to scan multiple items, then replace the items on the scanner and hit the scan button again to scan the new items. Without having to set the parameters, the user can scan large numbers of items very quickly.

F. Additional Devices

Figure 14:
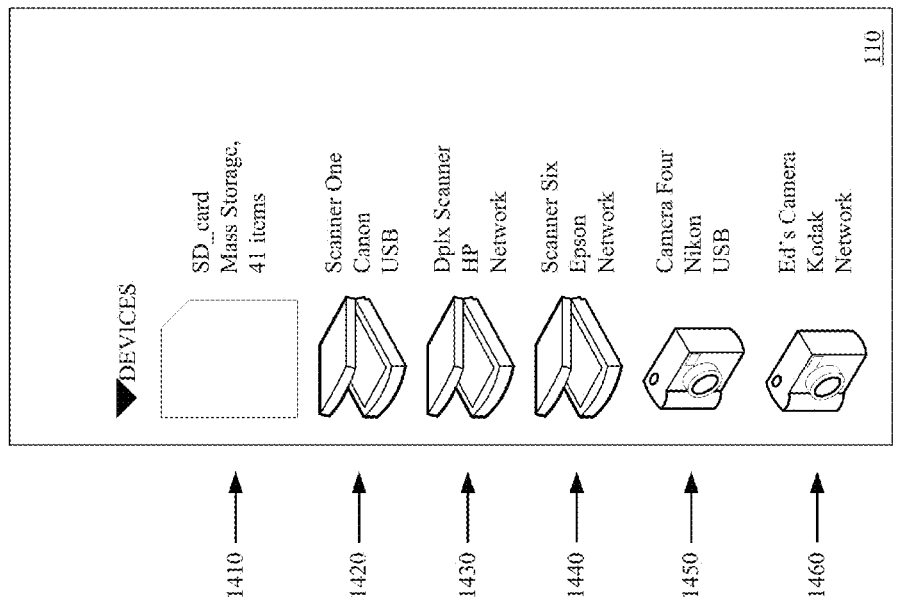
FIG. 14 illustrates a device display area with multiple types of devices from multiple vendors.

Some embodiments provide a GUI that allows the control of both scanners and image capture devices that are not scanners. FIG. 14 illustrates device display area 110 with multiple types of devices from multiple vendors. Device display area 110 displays SD card 1410, scanner 1420 (a Canon brand scanner), duplex scanner 1430 (an HP brand scanner), scanner 1440 (an Epson brand scanner), camera 1450 (a Nikon brand camera), and camera 1460 (a Kodak brand camera).

The image capture application of some embodiments controls SD cards and similar external memory devices because such cards are often used as storage devices for images taken by digital cameras. For example, many digital cameras have an input/output slot for inserting an SD card to store digital photographs on the card as soon as the digital photographs are taken. Therefore, some embodiments provide GUI controls for SD cards that are similar to the GUI controls that the embodiments provide for cameras. Some embodiments provide novel features for the camera interface of the GUI. When a scanner is the active device and a camera is selected, the GUI of some embodiments changes from a state in which the scanner controls are displayed to another state in which the camera controls are displayed. The GUI of some embodiments goes through many states.

Figure 15:
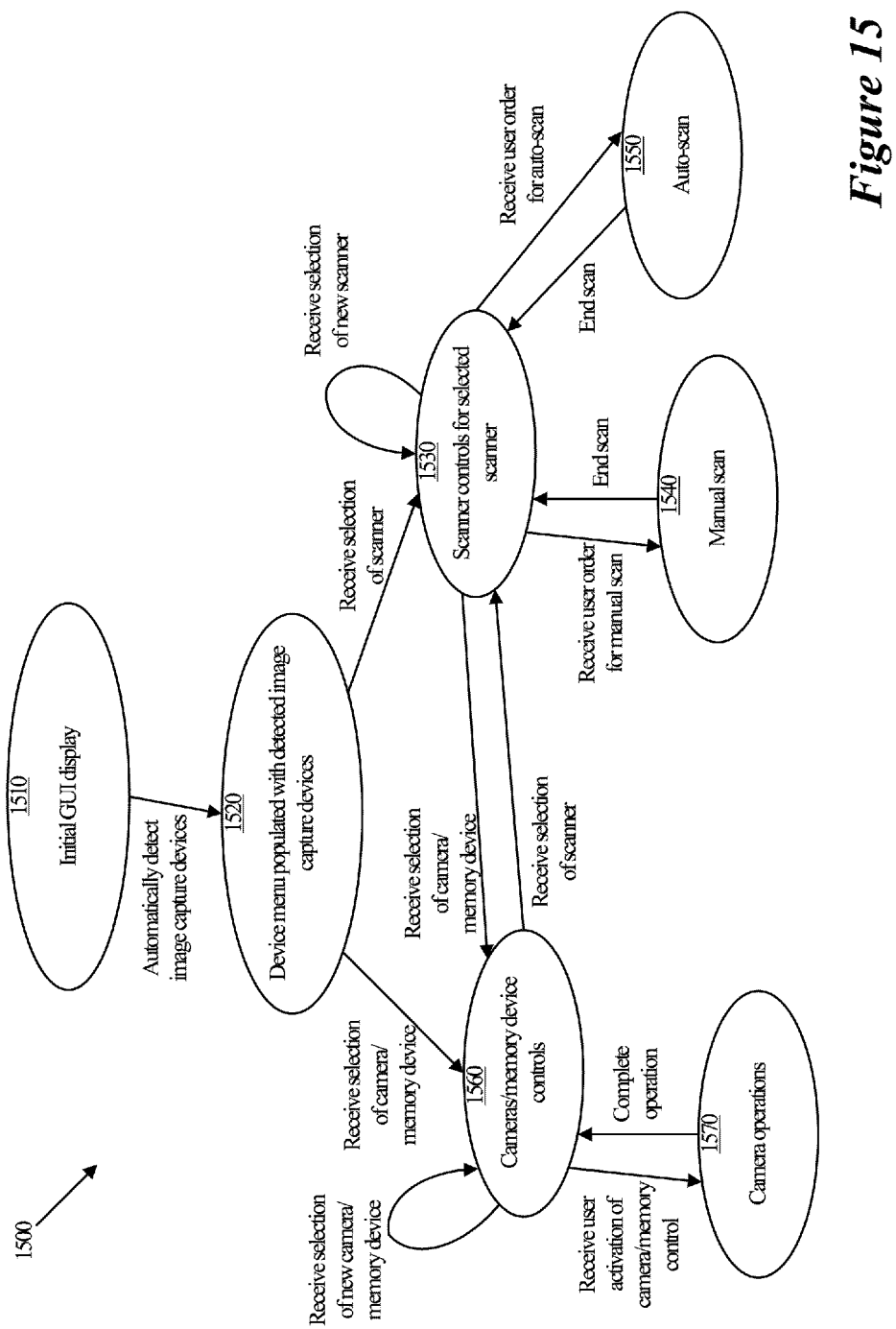
FIG. 15 conceptually illustrates a state diagram that reflects the various states of a GUI of an image capture application and transitions between those states.

FIG. 15 conceptually illustrates a state diagram 1500 that reflects the various states of a GUI of an image capture application of some embodiments and the transitions between those states. The display of the various states of the GUI and the transitions between the states are performed by one or more processes of the image capture application. Some embodiments provide this GUI as part of an operating system, or a stand-alone application, etc. Several figures described after FIG. 15 provide examples of GUIs in the states of state diagram 1500. The description of FIG. 15 will note the figures associated with the various states. FIG. 15 includes states 1510-1570. State 1510 is the initial GUI display when the image capture application is activated. In state 1520 the device menu is populated with the detected image capture devices. In state 1530 the scanner controls for a selected scanner are displayed. In state 1540 the GUI operations of a manual scan are displayed. In state 1550 the GUI operations of an auto-scan are displayed. In state 1560 controls for cameras and memory devices are displayed, and in state 1570 the GUI operations of camera controls are displayed.

When the image capture application is activated, it enters state 1510 in which it displays the GUI. The initial GUI includes a device area to be populated with icons representing image capture devices. The image capture application automatically detects image capture devices (e.g., scanners, cameras, and memory devices) to transition to state 1520 in which the GUI populates the device area with icons representing the detected image capture devices. In some embodiments, the image capture application detects the devices before displaying the initial GUI and state 1520 is the first state shown to the user. In some embodiments, the device area continues to be displayed during all the other states shown in FIG. 15. An example of a GUI in state 1520 is provided above in FIG. 2.

The user of the image capture application can select an image capture device from the device area. When the image capture application receives a selection of a scanner, it transitions to state 1530. In state 1530, the GUI displays the scanner controls for the selected scanner. An example of a GUI in state 1530 is provided in FIG. 4. A user can then direct the image capture device to perform a manual scan or an automatic scan. When the image capture application in state 1530 receives a command to start a manual scan, the GUI transitions to state 1540 in which it displays the manual scan GUI operations. When the manual scan ends the GUI transitions back to state 1530. When the image capture application in state 1530 receives a command to start an automatic scan, the GUI transitions to state 1550 in which it displays the automatic scan GUI operations. Examples of GUI operations during an automatic scan are provided in section II.D. When the automatic scan ends, the GUI transitions back to state 1530.

When the image capture application is in state 1530, the user can select a new scanner or select a camera or memory device. When a new scanner is selected, the GUI transitions to a new iteration of state 1530 in which the GUI displays the controls for the newly selected scanner instead of the pervious scanner. An examples of a GUI displaying scanner controls in state 1530 before such a transition is provided above in FIG. 4. An example of a GUI displaying new scanner controls in state 1530 after such a transition is provided above in FIG. 5.

When the image capture application receives a selection of a camera or memory device when the GUI is in state 1520 or state 1530, the GUI transitions to state 1560. In state 1560, the GUI displays camera/memory device controls. In some embodiments, the image capture application treats memory devices with images in a similar manner to digital cameras with memory in them. Accordingly, some applications provide similar interfaces for cameras and memory devices with slightly different controls depending on whether the device is a camera or a memory device. Other embodiments provide separate states for controlling cameras and memory devices. An example of the GUI in state 1560 is provided as the last stage in FIG. 1, described above. The user can direct the image capture application to perform various camera operations, such as downloading pictures. When the image capture application receives a command to perform a camera operation, the GUI transitions to state 1570. When the camera operation is complete, the GUI transitions back to state 1560. As was the case in state 1530, the user can select a new camera/memory device or scanner. When the user selects a new camera, the GUI transitions from state 1560 to a new iteration of state 1560 with the controls for the new camera displayed. When the user selects a scanner, the GUI transitions to state 1530.

One of ordinary skill in the art will understand that the state diagram 1500 is a conceptual representation of the states of the image capture applications of some embodiments and does not include every possible state or every possible transition between states. For example, in some embodiments, a user can select a new image capture device during a manual scan in state 1540.

II. Auto-Scan Operation

Some embodiments of the invention provide an auto-scan feature that automatically decomposes a scanned document into one or more component regions. In some embodiments, the auto-scan feature directs the scanner to produce the scanned document by performing an initial scan. The scanned document, sometimes referred to as a scanned electronic document, can be an electronic image of one or more items placed on the scanner glass (i.e., a single image of one or more items placed on the scanner glass) of a flatbed scanner or a page passed through a document feeder on a scanner. The auto-scan feature then identifies a set of attributes of the scanned document, selects a set of optimal scanning parameters based on the identified set of attributes, and then directs the scanner to perform a detailed secondary scan with the identified set of scanning parameters. Following the secondary scan, some embodiments of the invention perform post-scan operations.

Figure 16:
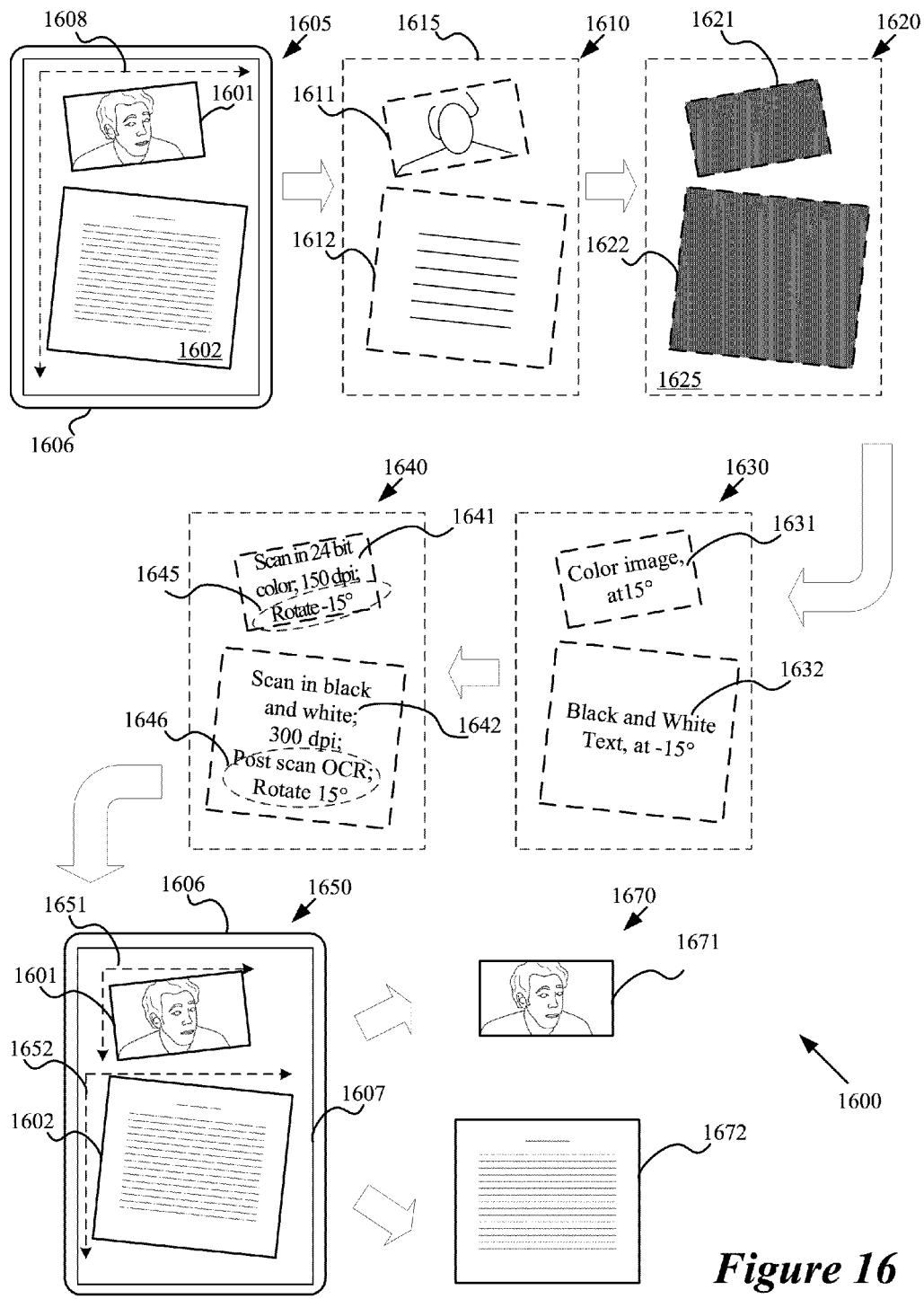
FIG. 16 illustrates an example of an auto-scan operation for some embodiments.

FIG. 16 illustrates an example of an auto-scan operation 1600 for some embodiments. In this example, the auto-scan operation is being performed for a scanned document 1615 that is produced by a scanner 1606. This figure shows seven different stages of the auto-scan operation.

The first stage 1605 shows two pieces of content being scanned by the scanner 1606. One piece of content is a text document 1601, while the other piece of content is an image document 1602. These two pieces of content could be two sections of a single document placed on the scanner bed of a flatbed scanner, or of a single document fed through a document feeder of a scanner. These two pieces of content could further be two separate items placed on the scanner bed of a flatbed scanner. As shown in the stage 1605, the two pieces of content are not aligned with the edge of the scan area. In the first stage 1605, the dashed arrows 1608 conceptually illustrates an initial scan being performed by the scanner. As shown in the second stage 1610, this initial scan produces a scanned document 1615, which includes a relatively low resolution copy 1611 of the photo 1601, and a relatively low resolution copy 1612 of the text 1602.

At the third stage 1620, the auto-scan operation 1600 identifies two component regions 1621 and 1622 in the scanned document 1615. The two component regions 1621 and 1622 are the two regions that included the photo 1601 and the text 1602. To ascertain the borders of component regions and to distinguish the component regions from background and noise artifacts, some embodiments of the invention perform a series of image processing operations on the scanned document 1615 and intermediate binary image document 1625. In some embodiments, these operations include thresholding, seed filling, group seed filling, edge detection, and Hough transform. These operations will be further described below by reference to FIGS. 20-30.

At the fourth stage 1630, the auto-scan operation 1600 analyzes each component region to identify a set of attributes for each component region. Examples of such attributes include the type of content (e.g., text, image, etc.), the color of the content (e.g., black and white, grey scale, color, etc.), and the orientation of the component region. In the example illustrated in FIG. 16, the operation 1630 identifies two sets of attributes 1631 and 1632 for the two component regions 1621 and 1622. Specifically, it determines that the component region 1621 is a color image with a tilt of plus 15 degrees, while it determines that the component region 1622 is a black and white text with a tilt of minus 15 degrees.

In the fifth stage 1640, the auto-scan feature 1600 derives a set of scan parameters for each component region according to the component region's identified attributes. Having identified component region 1621 as a color image, the operation 1600 specifies a set of scan parameters 1641, for example, which calls for a secondary scan performed at 150 dpi using 24-bit color. Likewise for black and white text component region 1622, the operation 1600 specifies a set of scan parameters 1642, for example, which calls for a secondary scan performed at 300 dpi using 1-bit black and white coding. The operation 1600 derives the scan parameters to optimize the secondary, more detailed scans based on the attributes of each component. Also, at stage 1640, the operation 1600 in some embodiments identifies one or more post scan parameters 1645 and 1646 for component regions 1621 and 1622. One example of such a post-scan parameter includes the amount that each component region has to be rotated after the secondary scan.

In the sixth stage 1650, the auto-scan feature 1600 performs two secondary scans, each for a different component region 1621 or 1622. The operation performs each secondary scan by using the scan parameters (1641 or 1642) derived from the component region's attributes during the fifth stage 1640. Unlike the second stage 1610 where the entire scan area is scanned, the operation 1600 performs each secondary scan in some embodiments by scanning only the component region (1601 or 1602) that it is scanning in that iteration, or a region that bounds that component region. The dashed arrows 1651 and 1652 conceptually illustrate that the secondary scans of component regions 1601 and 1602 take place separately and that these scans are about each region being scanned.

At the seventh stage 1670, the auto-scan operation 1600 performs post processing after the secondary scan. The scanned images 1671 and 1672 are post-processed separately. The image 1671 is the result of the secondary scan of component region 1621, whose post-scan parameter 1645 calls for a rotational adjustment of minus 15 degrees. Likewise, the image 1672 is the scan of component region 1622, whose post-scan parameter 1646 calls for its rotation by 15 degrees and performance of OCR to produce a text file.

A. Auto-Scan Process

Figure 17:
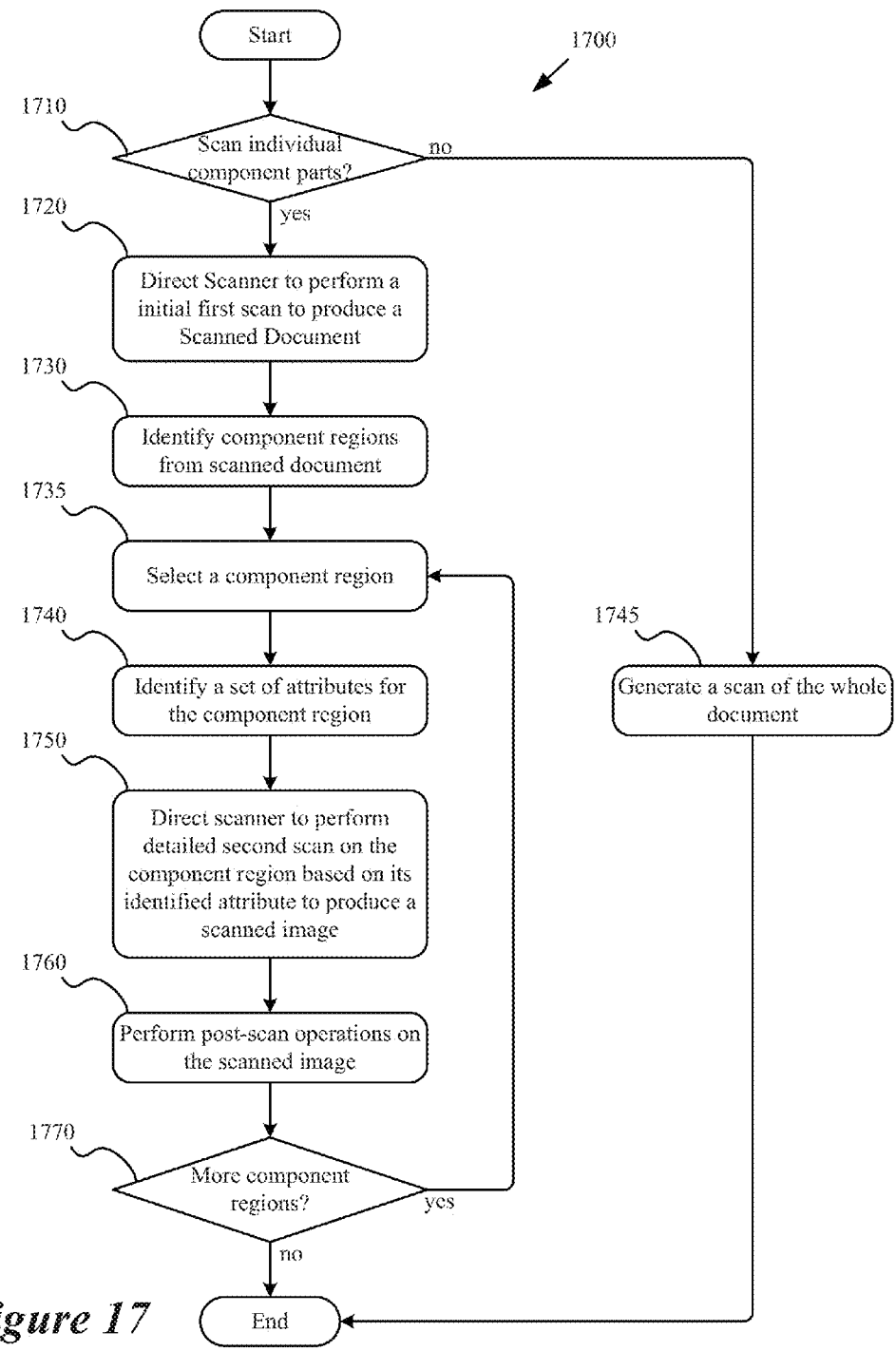
FIG. 17 conceptually illustrates a process of some embodiments to perform an auto-scan operation that decomposes a scanned document into several component regions.

FIG. 17 conceptually illustrates a process 1700 used by some embodiments to perform an auto-scan operation that decomposes a scanned document into several component regions. To perform this operation, the process 1700 employs two scanning stages, (1) an initial scan stage that identifies one or more component regions in a scanned document, and (2) a secondary scan stage that performs a secondary scan for each identified stage. Each secondary scan uses the attributes of a component region that the process 1700 identifies during the initial scan. After the secondary scan, the process performs post scan processing on the resulting scanned regions.

The process 1700 starts when the image capture application receives an auto-scan command. In some cases, the image capture application receives the auto-scan command after the user places one or more documents on a scan bed or in a document feeder. The image capture application then receives in some embodiments the auto-scan command when the user presses a button on the device (e.g., on the scanner or multi-function device), or the user selects an auto-scan option in the application's UI. The auto-scan command can be generated differently in other embodiments.

Next, the process determines (at 1710) whether it needs to try to parse the document into its individual component parts. As mentioned above, the image capture application in some embodiment makes this determination based on whether the user has made the selection (e.g., checked the box) to detect multiple images in the scanned document. If so, then the process performs (at 1720) an initial scan. Otherwise, the process proceeds to operation 1745, which is described further below.

The process directs (at 1720) a scanner to perform an initial scan. The initial scan is performed at a relatively low-resolution setting in some embodiments, in order to save time and to reduce complexity. Many scanners are capable of scanning at multiple resolutions and color depths. However, the amount of data generated by a high-resolution scan of the entire glass of a scanner can be relatively large. For example, an uncompressed image of a scan at 9600 dpi and 24-bit color is over 275 megabytes per square inch. The area of the glass of a scanner can be greater than 100 square inches. A high-resolution scan of such a glass could result in an image file tens of gigabytes in size. Therefore, in some embodiments, an initial scan (sometimes called a "preview scan" or an "overview scan") at a relatively low resolution is performed to allow the application and/or the user to select particular areas or interest for more detailed scans.

The initial scan produces (at 1720) a scanned document. In the case of a flatbed scanner, the scanned document is a low resolution image of the scanner bed, on which the user may simultaneously place multiple items, such as a photo and a page of text. Alternatively, in case of a scan that is performed through a document feeder, the scanned document is a low resolution copy of the page passing through the feeder. The scanned document includes both regions with content and regions without. Regions without content are background regions, which correspond to the image inside of the scanner's cover, or blank spaces in the page being scanned. Background regions may contain noise due to debris, shadow, light leakage or other unwanted artifacts. Regions with content in a scanned document may simultaneously include black and white content, color content, text, photos, and/or other types of contents. Further, different regions in the scanned document may be tilted, and thereby not aligned with each other or with the boundaries of the scan bed, area or document.

After producing the initial scan, the process identifies (at 1730) one or more component regions in the scanned document (i.e., the document generated at 1720). A component region is a contiguous section in a document (1) that is distinct and separate from other possible sections, and (2) that is identified by the process as having content rather than being mere empty background. The identification of component regions also gives the component regions definite sets of borders, which in some embodiments serve as the component regions' scan boundary during the secondary scans. The region-identification operation 1730 will be further described below by reference to FIG. 19.

Figure 18:
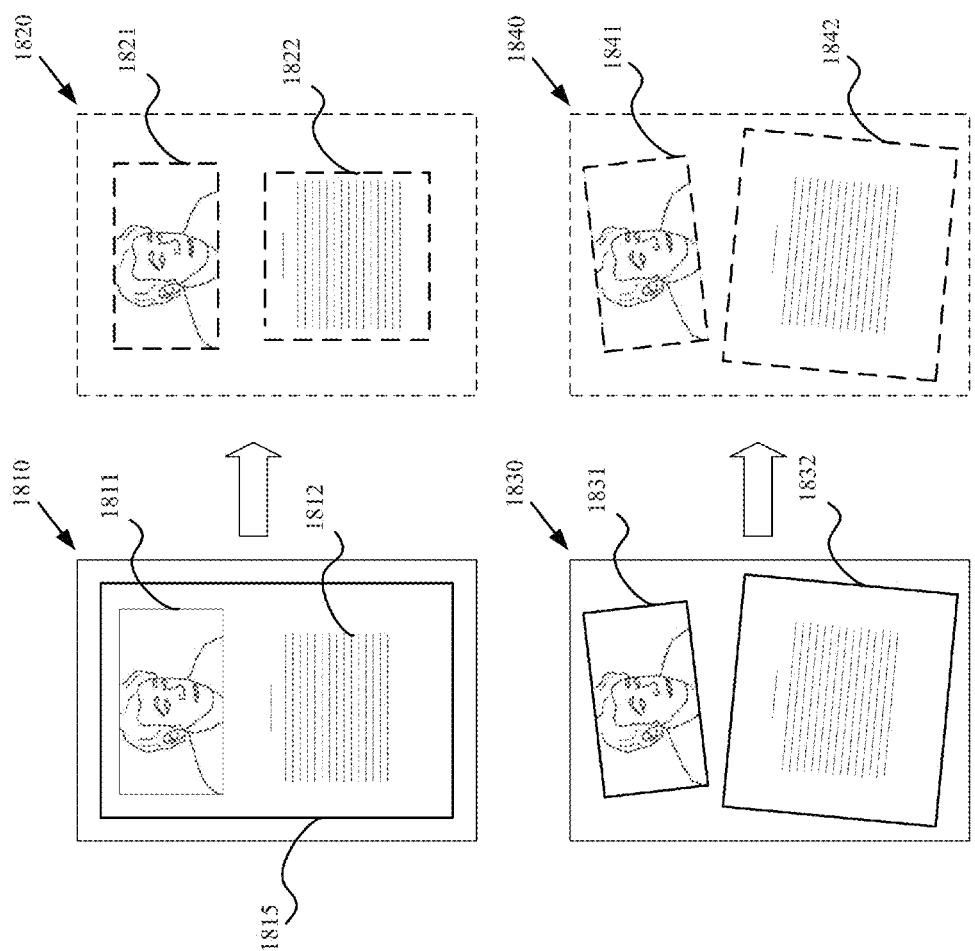
FIG. 18 conceptually illustrates and compares the identification of component regions from separate items on the scanner bed with identification of component region from a single document.

As mentioned above, a scanned document may be a copy of the scanner bed, or a copy of the document currently passing through the document feeder. A component region identified from a scanned document can come from an item on the scanner bed. A component region may also come from a section of a document sitting on the scanner bed that are distinct and separate from background and other sections. FIG. 18 conceptually illustrates and compares the identification of component regions from separate items on the scanner bed with identification of component region from a single document. In FIG. 18, sitting on top of a scanner bed 1810 is a single document 1815. Within the single document 1815 are a photograph section 1811 and a text section 1812. After an initial scan produces a scanned document 1820, the process 1700 identifies component regions 1821 and 1822, which are sections of the scanned document that are distinct and separate from background and other sections. On the other hand, sitting on top of a scanner bed 1830 are two separate items 1831 and 1832. After an initial scan produces a scanned document 1840, the process identifies component regions 1841 and 1842, which correspond to the separate items 1831 and 1832 on the scanner bed.

Once the component regions from the scanned document are identified, the process 1700 selects (at 1735) one of the identified component regions. The process then identifies (at 1740) a set of attributes for the component region selected at 1735. Examples of such attributes include the type of content (e.g., text, image, etc.), the color of the content (e.g., black and white, grey scale, color), etc.

Some embodiments identify the attributes of the component region by analyzing the pixels within the component region. For example, color is one identified attribute when the process determines that the pixels have an amount of chrominance more than a predetermined threshold. Conversely, when the process determines that the component region pixels have an amount of chrominance less than a predetermined threshold, the process identifies black and white as the attribute of the component region. The process also identifies an attribute of a component region as text where a sufficient number of English words are recognizable. Otherwise, it identifies the attribute as either photo or graphics. Some scanners are capable of providing a set of attributes from its own analysis of the scanned document. In those instances, some or all scanner identified attributes may be incorporated into the component region's set of attributes.

When a region includes different types of content, some embodiments assign the region a default set of attributes in some embodiments. Other embodiments assign the region the set of attributes belonging to the most dominant content in other embodiments. Some other embodiments identify the different sub-regions within the component region. One of ordinary skill would recognize that other methods of handling a component region that includes different types of content are available. For example, the image capture application may prompt the user for further instructions.

After identifying (at 1740) the set of attributes for the component region selected at 1735, the process directs (at 1750) the scanner to perform a detailed secondary scan of the selected region. In some embodiments, the process uses (at 1750) the attributes identified at 1740 to identify an optimal set of scan parameters for the selected component region. The process then uses (at 1750) these detailed parameters to perform the secondary scan of the selected region. For example, when the region has been identified as having a color image, the process uses in some embodiments the scan parameters of 150 dpi (dots per inch) and 24-bit color encoding. Alternatively, when the region has been identified as containing only black and white text, the process uses in some embodiments default scan parameters of 300 dpi, 1-bit black and white encoding.

To ensure the quality of the scanned image, some embodiments use 24-bit color encoding to preserve color fidelity of a color image and 300 dpi to preserve textual readability of a text. Where such image quality is not needed, some embodiments use lower resolution settings such as 1-bit black and white encoding or 150 dpi scan resolution to conserve computing resources. One of ordinary skill would recognize that these scan settings are merely illustrative examples, and that other considerations may lead to different optimal scan settings.

In some embodiments, the process 1700 directs (at 1750) the scanner to only scan the boundary of the selected component region (i.e., to forego the scanning of other identified component regions). This allows the scanner and the image capture application to process each scanned region faster. Many scanners are capable of performing high resolution scans of specified portions of the glass while ignoring other portions of the glass. Accordingly, time can be saved by automatically selecting portions of the glass on which to perform higher resolution scans.

After obtaining the secondary scan of the component region, the process performs (at 1760) post-scan operations on the scanned component region. Examples of such post-scan operations will be described further below by reference to FIG. 31. After performing (at 1760) post-scan operations, the process 1700 determines (at 1770) whether it still needs to perform a secondary scan of other component regions identified at 1730. When the process determines (at 1770) that it still needs to generate the secondary scan of one or more other component regions, it transitions back to operation 1735 to select another component region. It then repeats operations 1740-1770. When the process determines (at 1770) that it has generated the secondary scan for all component regions identified at 1730, the process ends.

As mentioned above, the process transitions from 1710 to 1745 when the process 1700 determines (at 1710) that it should scan the whole scanner glass or fed-through page rather than individual component parts. At 1745, the process directs the scanner to generate a scan of the document, i.e., of the scanner bed, or of the document placed in the document feeder of the scanning device.

In some embodiments, the process directs (at 1745) the scanner to generate the scanned document as a detailed scan of the scanner glass or of a page fed through the scanner. However, in other embodiments, the process directs (at 1745) the scanner to perform two-stage scanning operations that are similar to operations 1720 and 1740-1760. In other words, at operation 1745, the process 1700 in some embodiments directs the scanner to first produce an initial scan. It then identifies a set of attributes for the document from the initial scan, selects a set of scanning parameters based on the identified set of attributes, and then directs the scanner to perform a secondary scan with the selected set of scanning parameters. Following the secondary scan, the process 1700 performs post-scan operations in some embodiments. After operation 1745, the process ends.

One of ordinary skill will recognize that process 1700 is an example of one possible process performed by some embodiments in order to perform the auto-scan process. Process 1700 is not necessarily the only example of how to identify component regions. Operations in the process can be performed in a different order. For example, the process can perform operation 1760 after 1770, namely performing post-scan operations on scanned images after the process has completed the detailed secondary scans of all component regions. The process may also perform operation 1740 before 1735, namely identifying a set of attributes for each component region before selecting a component region for detailed secondary scan.

B. Pre-Scan Operations

Figure 19:
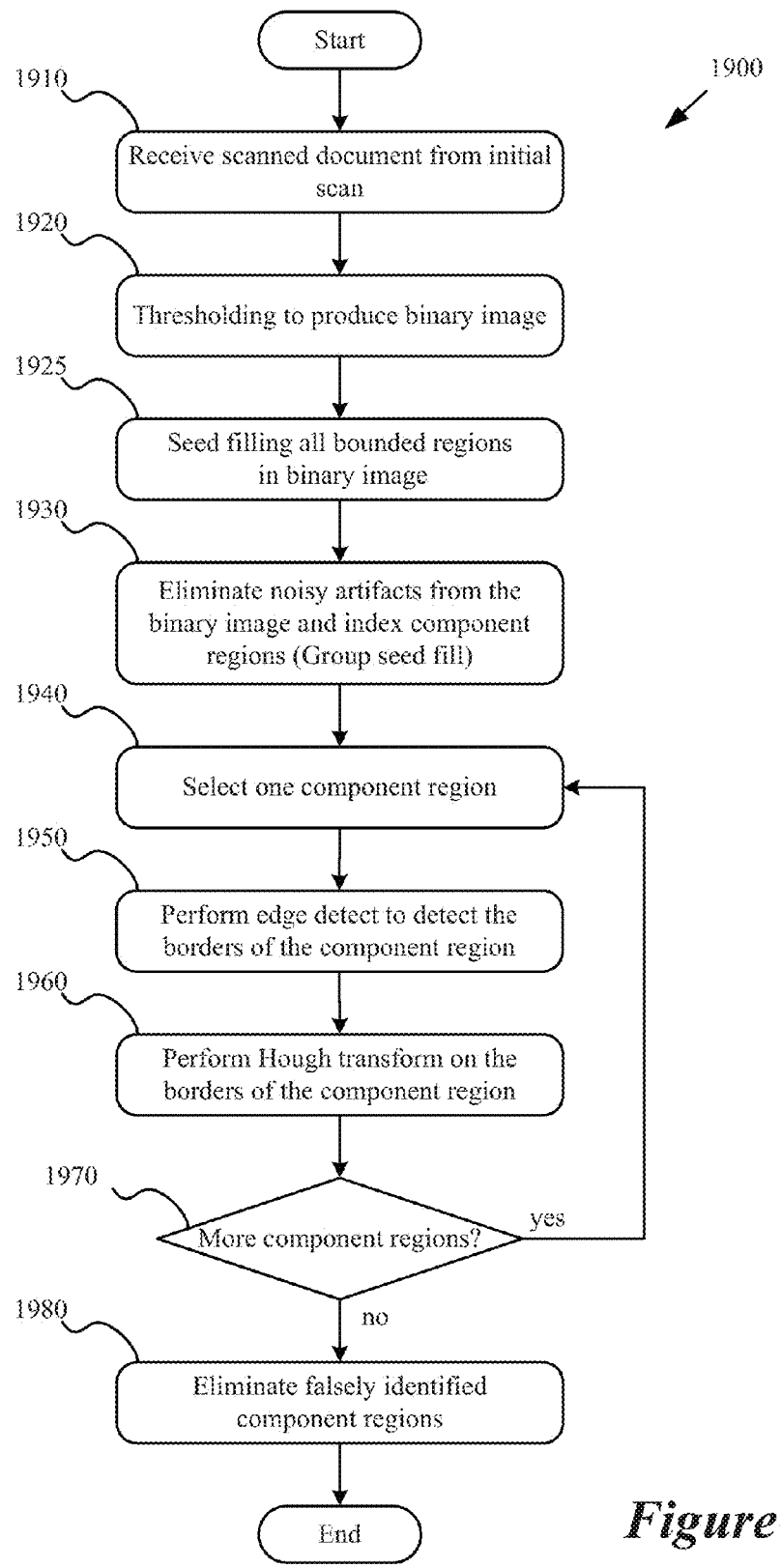
FIG. 19 conceptually illustrates a process that some embodiments use to identify component regions in the scanned document.

FIG. 19 conceptually illustrates a process 1900 that some embodiments use to identify component regions in the scanned document. Some embodiments perform this process at operation 1730 of the process 1700 of FIG. 17. The process 1900 applies a series of operations on the scanned document to distinguish component regions from background regions and to define scan boundaries of the component regions. The process 1900 will be described below by reference to FIGS. 20-30. These figures illustrate the operations of the process 1900 at different stages.

Figure 20:
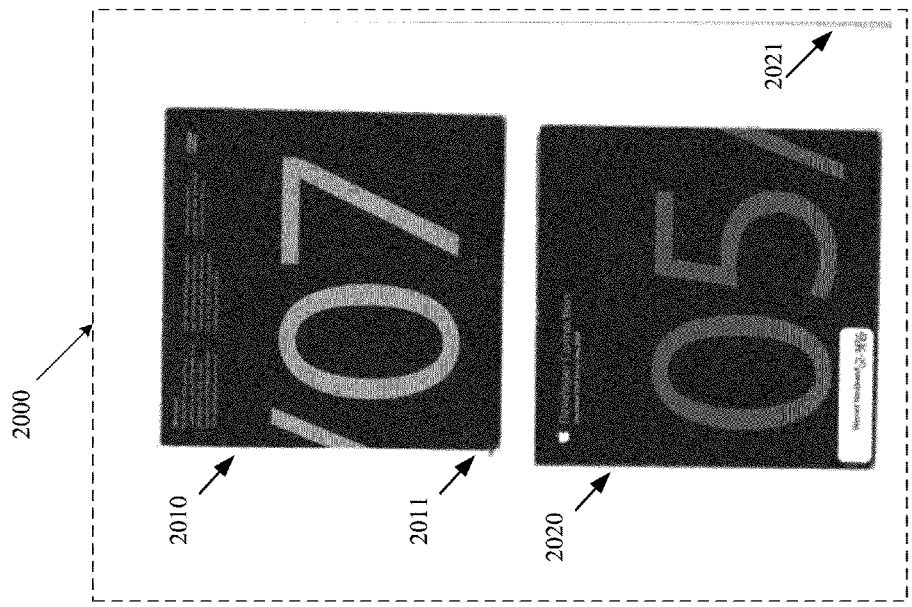
FIG. 20 illustrates an example screenshot of a scanned document.

As shown in FIG. 19, the process 1900 starts (at 1910) when it receives a scanned document from an initial scan. The scanned document includes images of content as well as background and noise. FIG. 20 is an example screenshot of a scanned document 2000. As shown in this figure, the scanned document 2000 includes two sections with content, namely regions 2010 and 2020. This figure further shows that the scanned document includes noisy artifacts, such as shadow 2011 and light leakage 2021.

Figure 21:
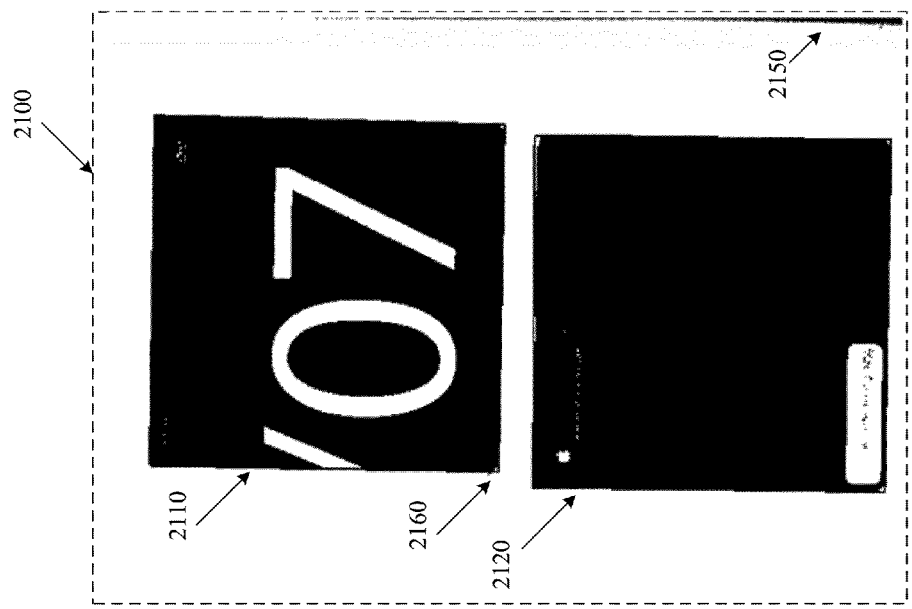
FIG. 21 illustrates the result of a thresholding operation on a scanned document.

Next, the process 1900 performs (at 1920) thresholding on the scanned document to produce a binary document. A binary document has only two colors, unlike a color or gray scale document which may have hundreds or even millions of colors. Thresholding is the operation that converts color or gray-scale pixels into black and white pixels. In some embodiments, thresholding marks a pixel as black if its luminance value compares in a predetermined manner to a certain threshold value (e.g. less than), and as white if otherwise. FIG. 21 illustrates the result of a thresholding operation on the scanned document 2000 of FIG. 20. In binary document 2100, the region 2110 is a binary image version of the region 2010 after thresholding, while the region 2120 is the binary image version of region 2020 after thresholding. Both regions 2110 and 2120 still contain unfilled white regions. Noisy artifacts are also present in this binary document. The artifact 2160 is the binary image of the shadow, while the artifact 2150 is the binary image of the light leakage.

After performing the thresholding operation, the process 1900 performs (at 1925) a seed filling operation to fill all bounded regions in the binary document. In some embodiments, seed filling floods all regions in the binary document that are bounded by black pixels with black pixels. In other words, seed filling leaves only white regions not bounded by black pixels. These white regions are the background regions.

Figure 22:
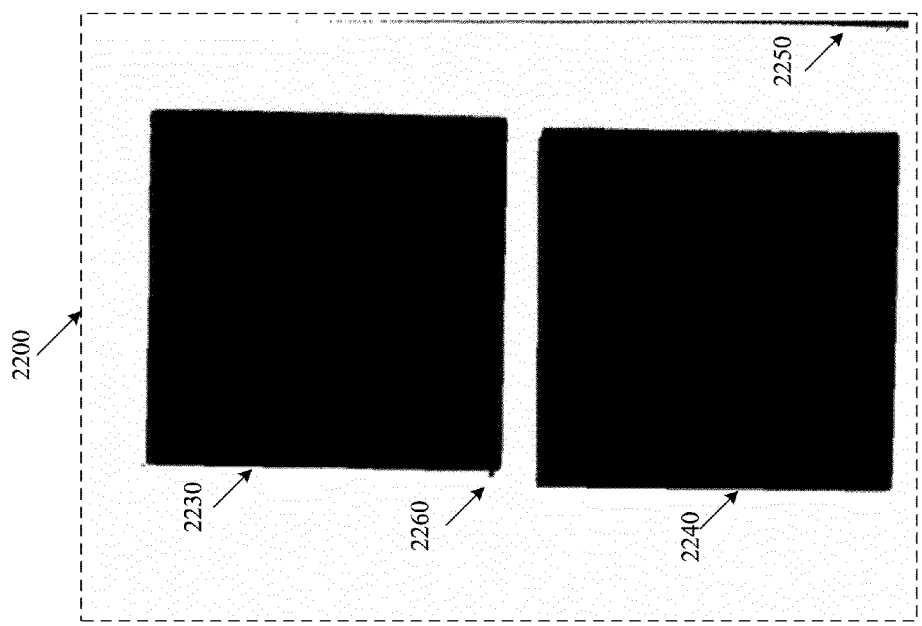
FIG. 22 illustrates the effect of a seed filling operation.

FIG. 22 illustrates the effect of seed filling operation for the example illustrated in FIG. 20. In FIG. 22, the image 2200 is the binary document after the seed fill operation. The seed filling operation fills all bounded regions inside the regions 2110 and 2120 of FIG. 21. The seed filling results in regions 2230 and 2240, which are completely filled with black pixels.

Next, the process 1900 eliminates (at 1930) noisy artifacts from the binary document and indexes the remaining black regions. As illustrated in FIG. 22, noisy artifacts continue to be present in the binary document after the seed filling operation. Artifact 2260 is the binary image of the shadow 2160, while artifact 2250 is the binary image of the light leakage 2150.

In some embodiments, the process 1900 cleans up (at 1930) these artifacts with a group seed filling operation. Group seed fill is a variant of the seed fill operation. In applying the group seed filling operation at 1930, the process 1900 steps through each black region in the binary document to determine whether the black region is too small in size or too odd in shape to have content. If the black region is too small in size or too odd in shape to have content, the process fills the region with white pixels and eliminates it from the binary document. Otherwise, the process leaves the region intact and gives it an index.

Figure 23:
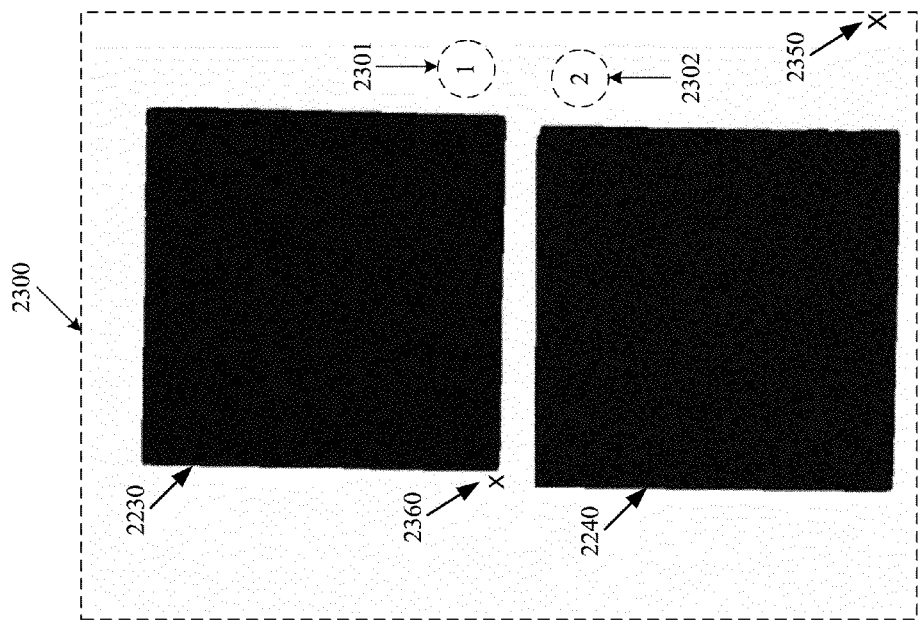
FIG. 23 illustrates the result of the group seed filling operation.

FIG. 23 illustrates the result of the group seed filling operation for the example illustrated in FIG. 20. In the binary document 2300 shown in FIG. 23, the triangular shaped light leak region 2021 and the small shadow region 2011 have both disappeared. The markers 2350 and 2360 mark the noisy artifacts' former locations. The process leaves regions 2230 and 2240 intact and assigns indices 2301 and 2302. These indexed regions are the component regions. In some embodiments, the process 1900 uses the index to ascertain the total number of component regions in the scanned document. Indices 2301 and 2302 in FIG. 23 conceptually represent the indexing of the component regions by the image capture application. The indices in this figure are not intended to represent actual images displayed by a GUI in the process of identifying the regions.

Figure 24:
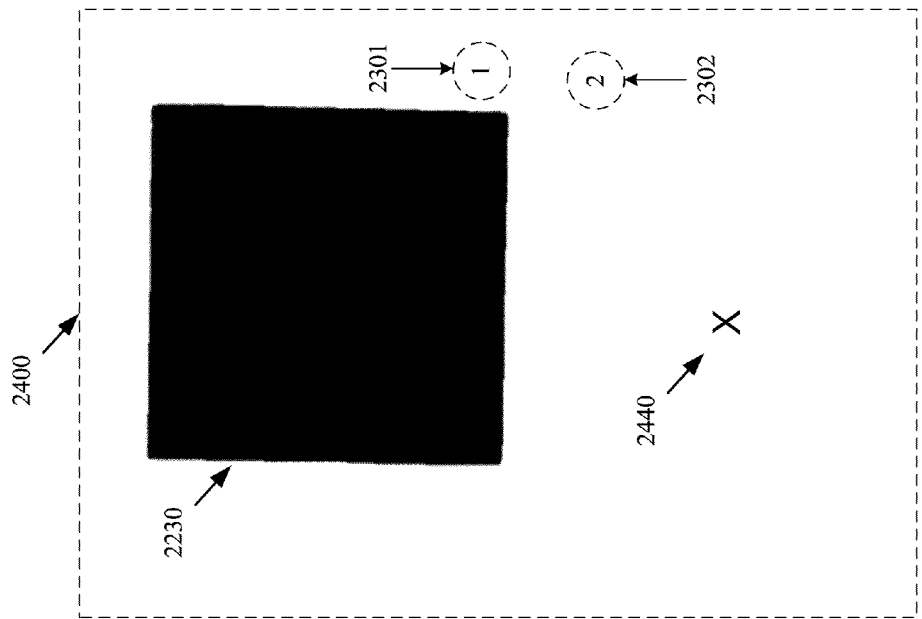
FIG. 24 illustrates the selection of a component region from a binary document.

After applying group seed fill, the process 1900 selects (at 1940) a component region. In some embodiments, the process 1900 selects a component region based on the index assigned to it during group seed filling. FIG. 24 illustrates the selection of a component region from the binary document 2300. As mentioned above, binary document 2300 at the end of group seed filling includes two component regions 2230 and 2240 with indices 2301 and 2302. The process uses index 2301 to select component region 2230 and masks the unselected component region 2240. The result of this operation is the binary document 2400, which has only one component region 2230. The marker 2440 identifies the location of the masked component region 2240.

Figure 25:
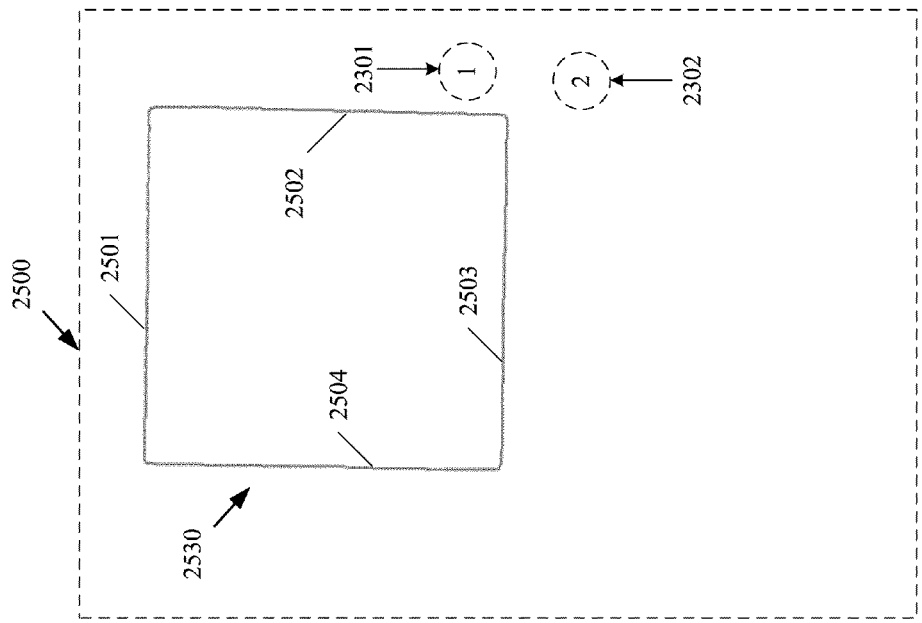
FIG. 25 illustrates the result of applying a Sobel operator to the binary document that remains after the selection of a component region.

After selecting (at 1940) a component region, the process 1900 performs (at 1950) edge detection on the selected component region in order to detect its borders. In some embodiments, the edge detection is accomplished by using a Sobel operator, which calculates the gradient of the image intensity at each point of an image. Because the binary document after thresholding and seed filling operations contain only regions of uniform image intensity, applying the Sobel operator results in the borders of these regions. FIG. 25 illustrates the result of applying the Sobel operator to the binary document 2400 that remains after the selection of the component region 2230. As shown in this figure, the application of the Sobel operator results in the document 2500 a region 2530. The region 2530 specifies the borders of the component region 2230.

Next, the process 1900 performs (at 1960) a Hough transform on the borders of the component region. The Hough transform identifies a set of lines that best represent the borders of the regions identified by the Sobel transform. The Hough transform mathematically generates a series of curves based on a series of test lines through the points on the border. For each point on the border, the Hough transform generates a curve in a parameterized space (the Hough space) that relates the angle of the test line to the distance of the test line from the origin. A point in the Hough space at which large numbers of curves intersect represents the angle and distances of lines that lie along a particular edge of the border. The Hough transform algorithm uses these points to identify lines that lie along the edges of the regions identified by the Sobel transform.

Figure 26:
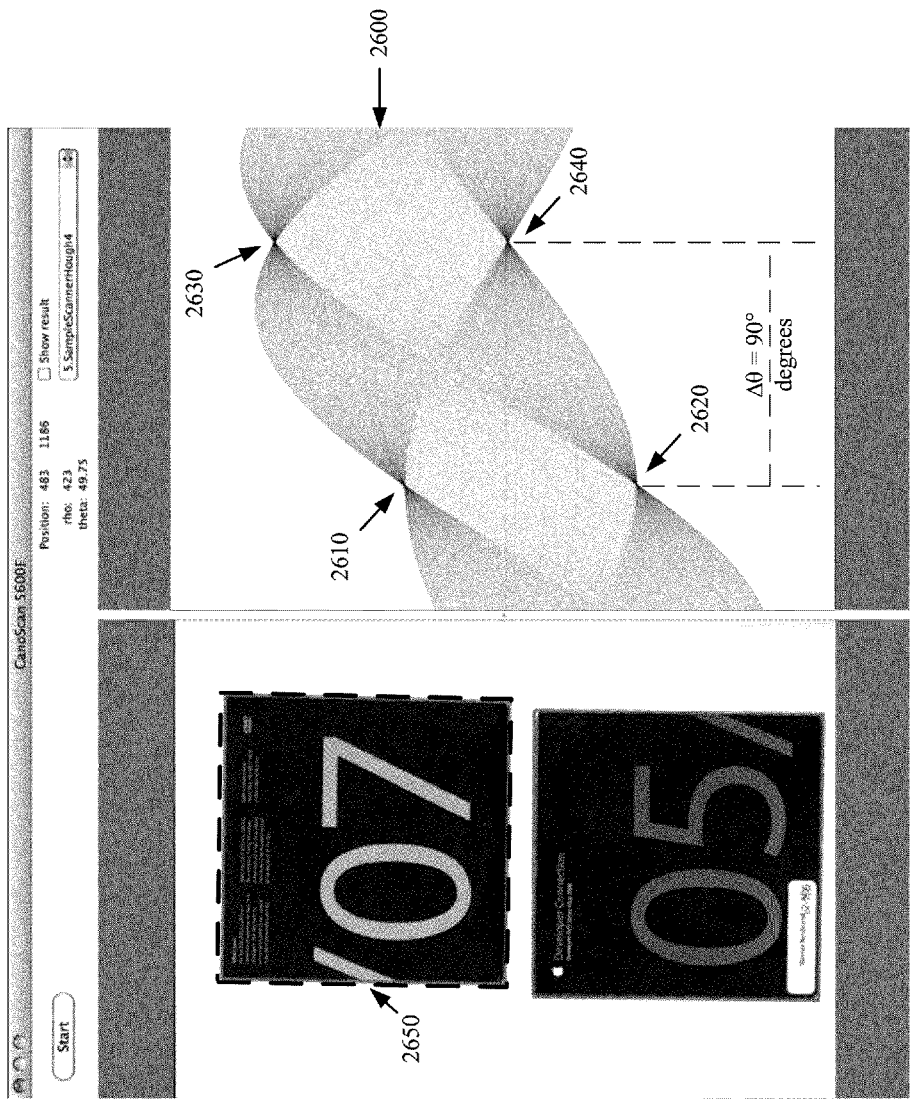
FIG. 26 illustrates the result of Hough transform for a selected component region.

FIG. 26 illustrates the result of Hough transform for the example illustrated in FIG. 25. On a Hough plane 2600 with horizontal O-axis and vertical r-axis, the Hough transforms points on the region 2530 into a series of curves. These curves primarily intersect on four points, 2610, 2620, 2630 and 2640. Points 2610 and 2620 share the same coordinate on the O-axis, thus they represent parallel edges 2501 and 2503 of the region 2530. Points 2630 and 2640 are 90 degrees away from points 2610 and 2620, representing the remaining two parallel edges 2502 and 2504 of the region 2530. These four intersect points precisely and compactly represent the borders of the component region 2530, thus some embodiments use these four points to identify a component region. In some embodiments, the component region is identified graphically by a bounding box 2650 created from the four intersect points in Hough plane 2600. Furthermore, the θ coordinate of these points reveals the rotational angle of each component region with respect to the horizontal. Hence, in some embodiments, the process 1900 uses these θ coordinates to align the component region.

After performing the Hough transform, the process 1900 determines (at 1970) whether there are more component regions to be selected. In some embodiments, the process makes this determination by checking whether the number of component regions already scanned is equal to or more than the total number of component regions in the scanned document. If so, process 1900 proceeds to 1980 to eliminate falsely identified component regions. Otherwise, the process transitions back to operation 1940 to repeat this operation and operations 1950-1970 for each component region.

Figure 27:
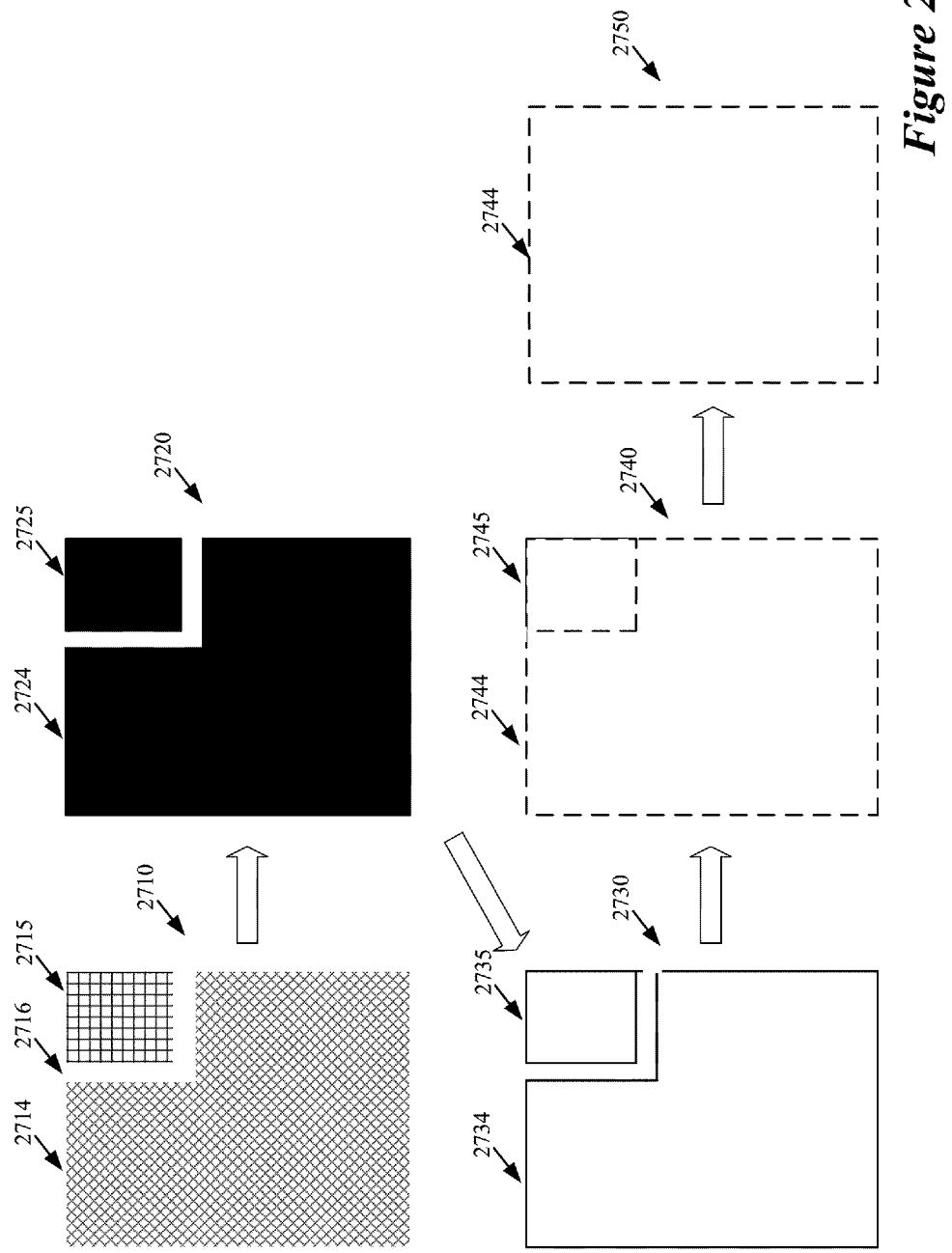
FIG. 27 conceptually illustrates how the process eliminates a falsely identified component region.

At operation 1980, the process 1900 eliminates falsely identified component regions. False identification of component regions may occur in some embodiments due to peculiarities within the scanned document. For example, the layout of the content within a component region may cause some embodiments to falsely identify a component region within the boundary of another, correctly identified component region. FIG. 27 conceptually illustrates how the process 1900 eliminates a falsely identified component region for the above mentioned example.

In FIG. 27, an image 2710 includes two sections 2714 and 2715 separated by a gap 2716. The gap 2716 can be a boundary defined by the document. The gap can also be an artifact in the image 2710 created by lighting or other conditions. Thresholding and seed filling of the image 2710 produces binary document 2720, which separates the image 2710 into a large L-shaped component region 2724 and a smaller rectangular shaped component region 2725. The smaller rectangular shaped component region 2725 is not a real component region, but merely a sub region of the image 2710. The process applies Sobel edge detect to component regions 2724 and 2725 to yield regions 2734 and 2735. The process then applies Hough transform to region 2734 and correctly identifies rectangular component region 2744, which corresponds to the image 2710. However, the process also applies Hough transform on region 2735 and falsely identifies a smaller component region 2745.

The process 1900 then eliminates the smaller, falsely identified region 2745. Some embodiments identify and eliminate all regions that lie within another region, thereby eliminating falsely identified regions such as the region 2745. One of ordinary skill will recognize that other methods of eliminating falsely identified regions are available. For example, the process 1900 may eliminate all regions that are too small and too oddly shaped to be a component region. After eliminating (at 1980) falsely identified component regions, the process 1900 ends.

Figure 29:
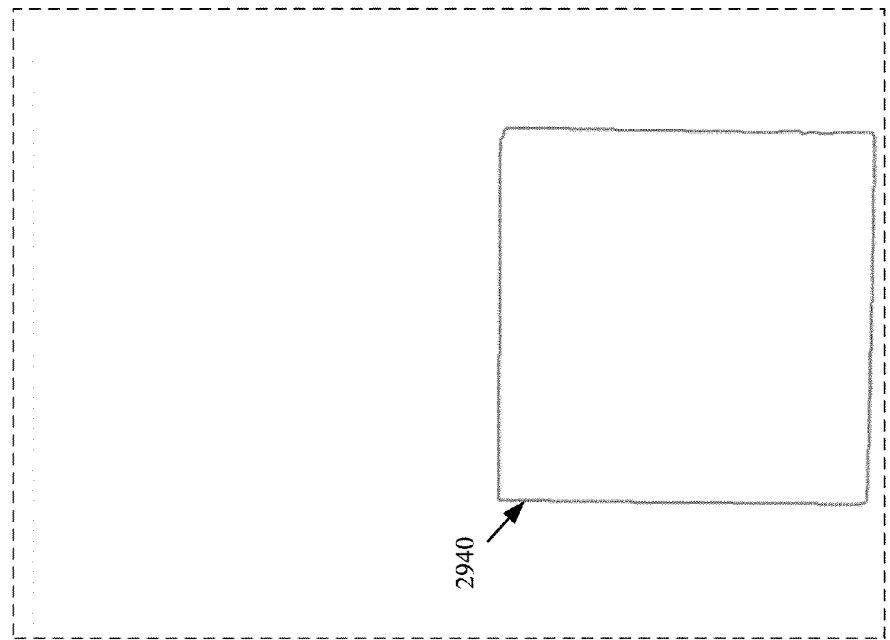
FIG. 29 illustrates the result of applying the Sobel operator to the binary document that remains after the selection of the second component region
Figure 28:
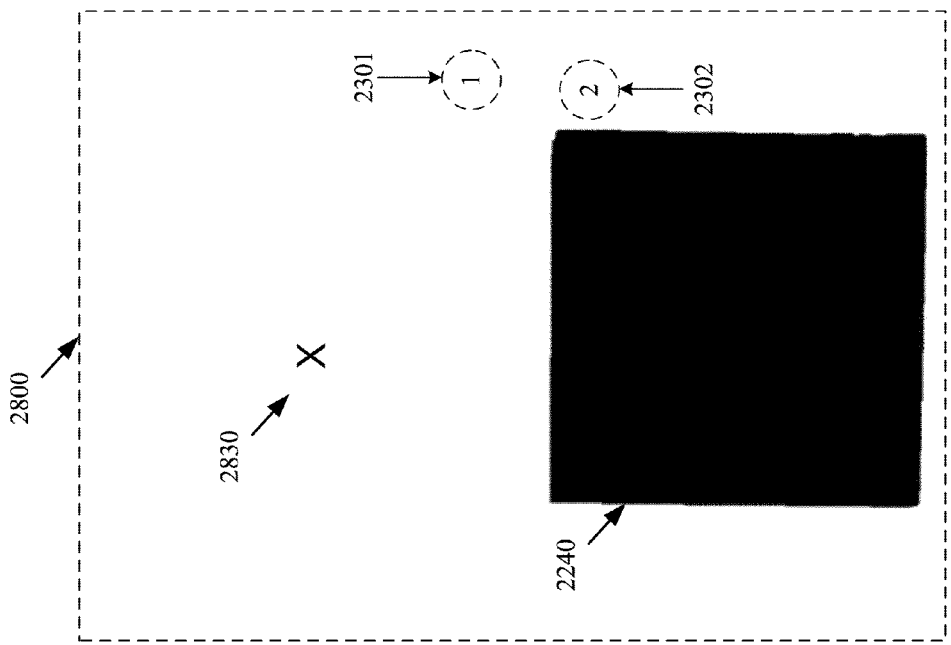
FIG. 28 illustrates the selection of a second component region from the scanned document.
Figure 30:
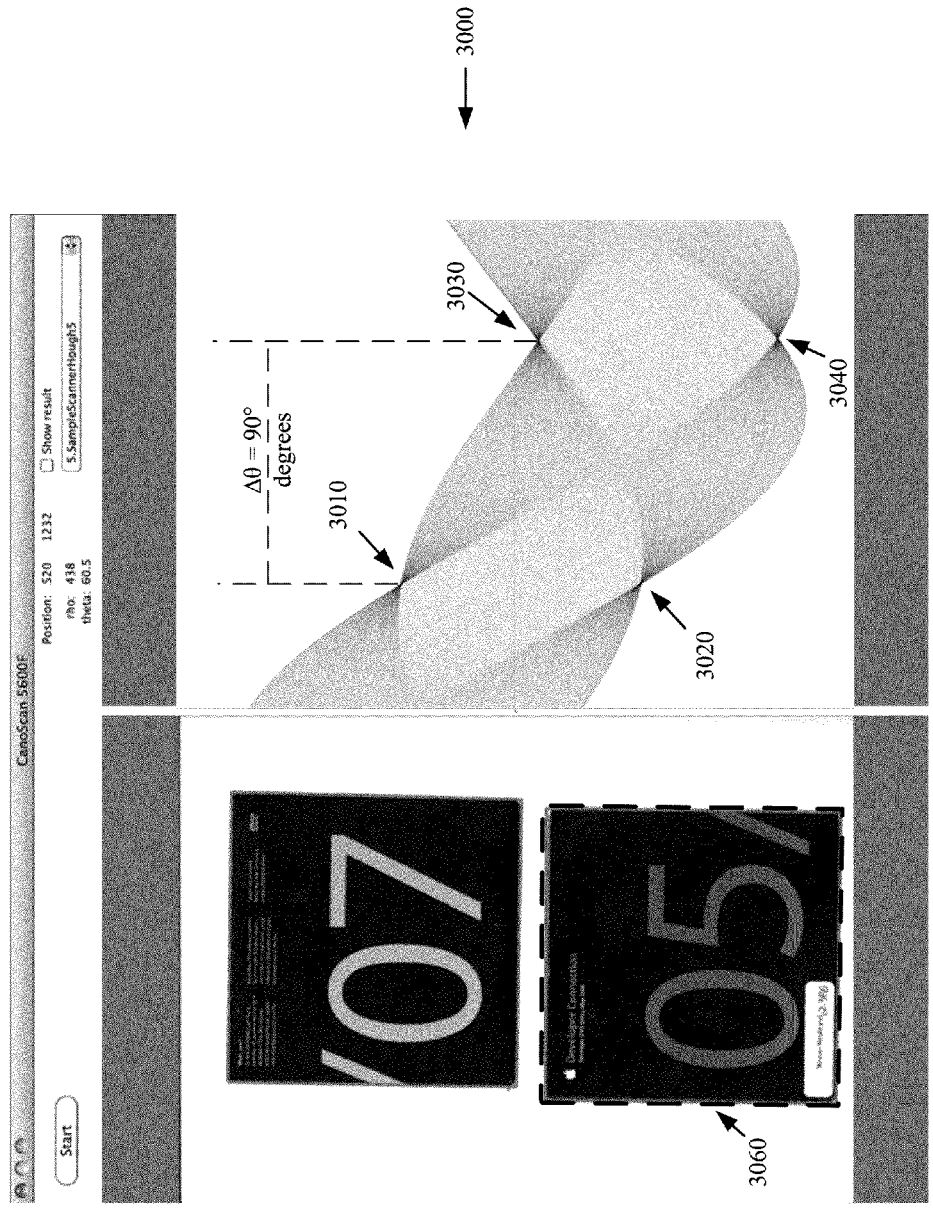
FIG. 30 illustrates the result of Hough transform for the second component region.

The operations 1940-1970 will now be explained again in order to finish describing the example illustrated in FIG. 20. When the process returns to 1940, it selects the component region 2240 as illustrated in FIG. 28. As mentioned above, the binary document 2300 includes both component regions 2230 and 2240 with indices 2301 and 2302. Having already performed edge detect and Hough transform on component region 2230, the process uses index 2302 to select the component region 2240 and masks 2230. This results in the binary document 2800, which has only one component region 2240. FIGS. 29 and 30 illustrate subsequent operations on the component region 2240. The region 2940 in FIG. 29 is the result of Sobel edge detect on the component region 2240. FIG. 30 illustrates the result of Hough transform on the region 2940. The four intersect points 3010, 3020, 3030 and 3040 are used to create a bounding box 3060 to graphically identify the component region 2240. Since the component region 2240 is the last component region, the process 1900 proceeds to operation 1980 and ends.

One of ordinary skill will recognize that process 1900 is an example of one possible process performed by some embodiments in order to identify component regions. Process 1900 is not necessarily the only example of how to identify component regions.

C. Post-Scan Operations

Figure 31:
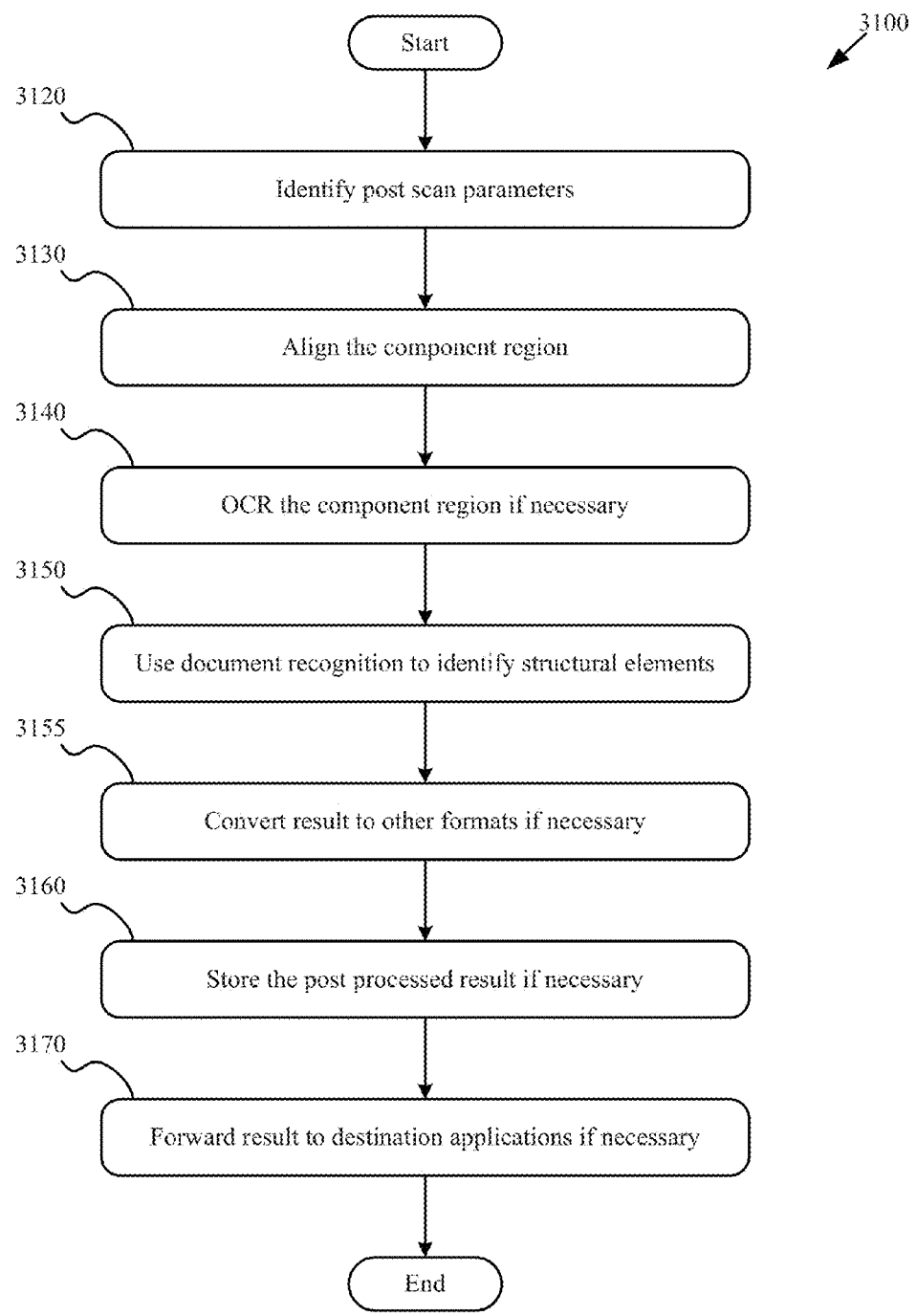
FIG. 31 conceptually illustrates a process that performs post-scan operations on a component region after the secondary scan in some embodiments.

FIG. 31 conceptually illustrates a process 3100 that performs post-scan operations on a component region after the secondary scan in some embodiments. Some embodiments perform this process at operation 1760 of the process 1700 of FIG. 17. Specifically as needed, the process 3100 performs alignment, optical character recognition (OCR), storage or other operations on the component region. In some embodiments, the process 3100 also delivers data or images to applications other than image capture application.

The process 3100 starts when it receives a secondary scan of a component region. The process initially identifies (at 3120) a set of post-scan parameters. Post-scan parameters control a post-scan operation that the process 3100 performs on the component region. These parameters specify whether the process should perform an OCR operation, rotate the scanned region, send the scan result to a particular application, store the scan result, etc. The process 3100 may identify one or more post scan parameters by analyzing the secondary scan of the component region. The process may also derive these post scan parameters from various data (e.g., the set of attributes of the component region) generated by the process 1700 or the process 1900.

After identifying a set of post-scan parameters, the process 3100 rotates (at 3130) the component region if necessary (i.e., if specified by the post-scan parameters.) The process rotates the component region by a rotational adjustment angle. In some embodiment, this rotational adjustment angle is identified when process 1900 performs the Hough transform. Since the $\theta$-coordinate of an intersect point on the Hough plane correspond to the angular separation between a component region's border and the horizontal, the process 3100 of some embodiments uses the angle $\theta$—to arrive at the necessary rotational adjustment. In some embodiments, the process 3100 performs an image transform by using the rotational angle in order to realize the adjustment.

Next, the process performs (at 3140) an OCR on the component region if necessary. The OCR operation if performed produces text. Some embodiments perform this operation only if the component region has been determined to include text as result of the initial or secondary scan.

After performing the OCR operation, the process performs (at 3150) a document recognition operation to identify structural elements in the text. The OCR in some embodiments results in an unstructured document containing a collection of glyphs or characters without any structures such as lines, paragraphs or columns. The document recognition process identifies these structural elements, and these elements are used in some embodiments to construct a structured document from the unstructured document. Structural elements of some embodiments include associated primitive elements (e.g., words, paragraphs, joined graphs, etc.), guides, gutters, text flow, tables, etc. These structural elements are related in a hierarchical manner in some embodiments (e.g., a paragraph includes text lines, a text line includes words, and a word includes primitive glyphs). Several document recognition processes are described in a non-provisional U.S. patent application Ser. No. 12/455,866 filed concurrently with this application, with the title "Identification of Layout and Content Flow of an Unstructured Document", which is incorporated herein by reference.

The process 3100 then converts (at 3155) the result of the above mentioned operations into another data format if necessary. For example, in some embodiments, the process converts OCR recognized text or the resulting structured document into ASCII, Word, WordPerfect, PDF, HTML or any other format capable of supporting a text document. Some embodiments use the structural elements identified at 3150 to assist in the format conversion. The process may also convert an image aligned at 3130 into Bitmap, TGA, TIFF, GIF, JPEG or any other format capable of supporting graphical images. The conversion of an image, however, is performed in some embodiments as part of the image transform operation that some embodiments perform at 3130.

Next, the process 3100 stores (at 3160) a post processed scan data into a storage medium if necessary. A post-processed scan data may be an OCR recognized text, a structured document, an aligned secondary scan, converted scanned result, or other data derived from detailed second scan. The process may save any of these post-processed data into a hard disc, random access memory, or other types of storage medium accessible by computer.

Finally, the process 3100 forwards (at 3170) the post-processed scan data to a destination application if necessary. Applications other than the image capture application may serve as the destinations for any type of post-processed scan data. For example, the process 3100 can forward the scanned result to image editing application, word processor program, print server, mail program, any application capable of view or editing text, or other types of applications that are capable of handling the post-processed scan data.

Some embodiments also communicate a message to the destination application on how to handle the post-processed scan data from the image capture application. In some embodiments, this message is a command or a script understood by the destination application. For example, some embodiment sends an "open image" command in order to notify the destination application that the image capture application is about to deliver an image. In another example, the process may execute a script to instruct a mail application on how to compose a message using an OCR recognized text as the body of the message and a scanned image as the attachment.

One of ordinary skill will recognize that process 3100 is an example of one possible process performed by some embodiments in order to perform post scan operations on a component region. Process 3100 is not necessarily the only example of how post scan operations are performed. For instance, operations 3130, 3140, 3150, 3160 and 3170 need not necessarily be performed in the order shown in FIG. 31.

Moreover, even though the description above describes the document recognition processes as being applied to OCR text, other embodiments apply document recognition processes to scanned documents that contain other types of primitives. For instance, when the scanned document contains region containing text and a region containing an image, some embodiments OCR the text to produce glyphs, and then define the image's bitmap as a primitive element along with the glyphs. Some embodiments then use the glyphs and bitmap to perform additional document recognition processes to try to define additional structural elements for the scanned document.

D. UI for Auto-Scan

During the auto-scan operations described above, some embodiments display the image data as it is received. The displays provide visual feedback to the user to demonstrate the progress of the auto-scan process. In some embodiments, the visual feedback is provided in a scan display area of a GUI such as GUI 1300 shown in FIG. 13. Examples of the displays of some embodiments at various stages of an auto-scan process are provided in FIGS. 32-42.

Figure 32:
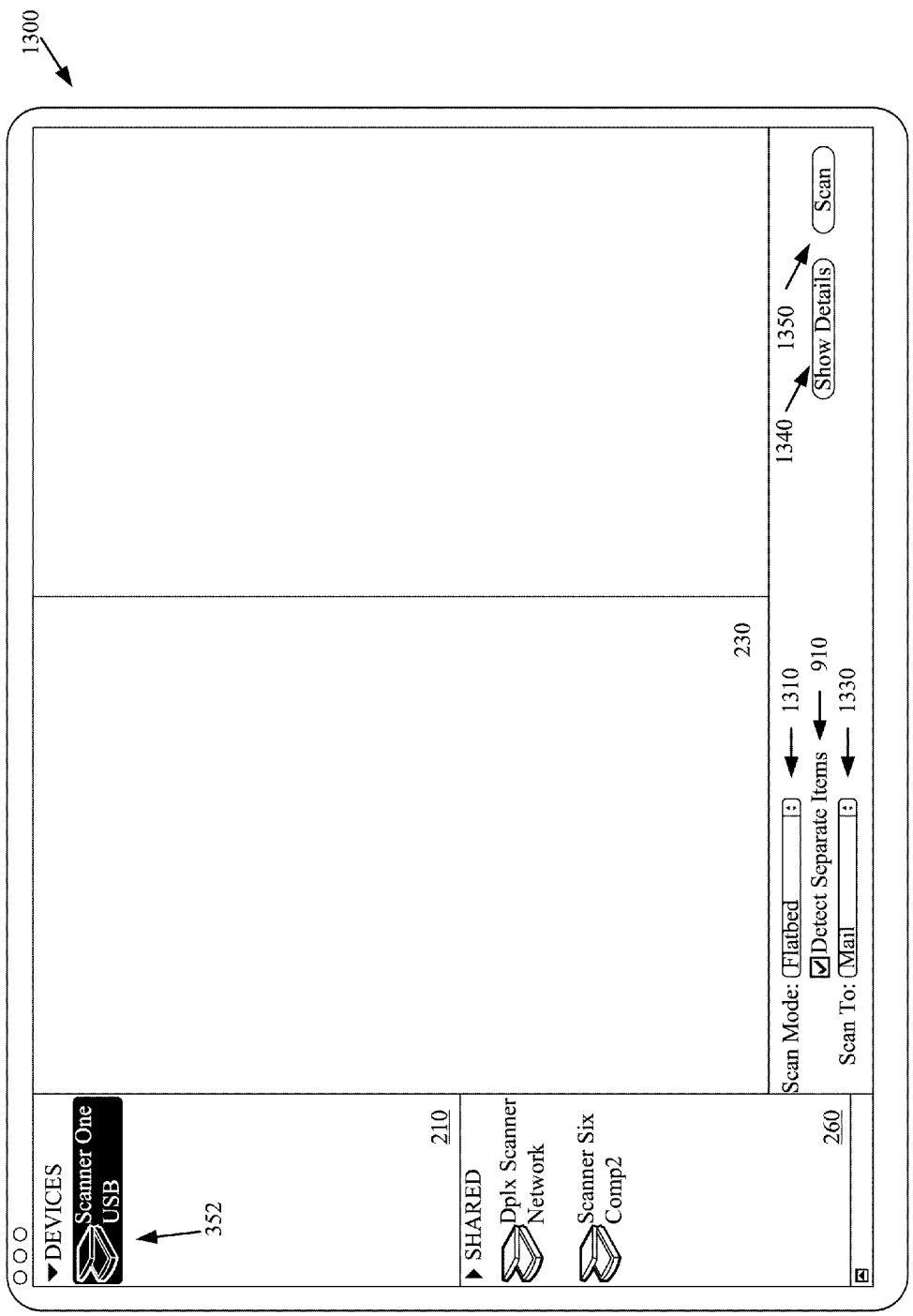
FIG. 32 illustrates the GUI just before the auto-scan begins.
Figure 33:
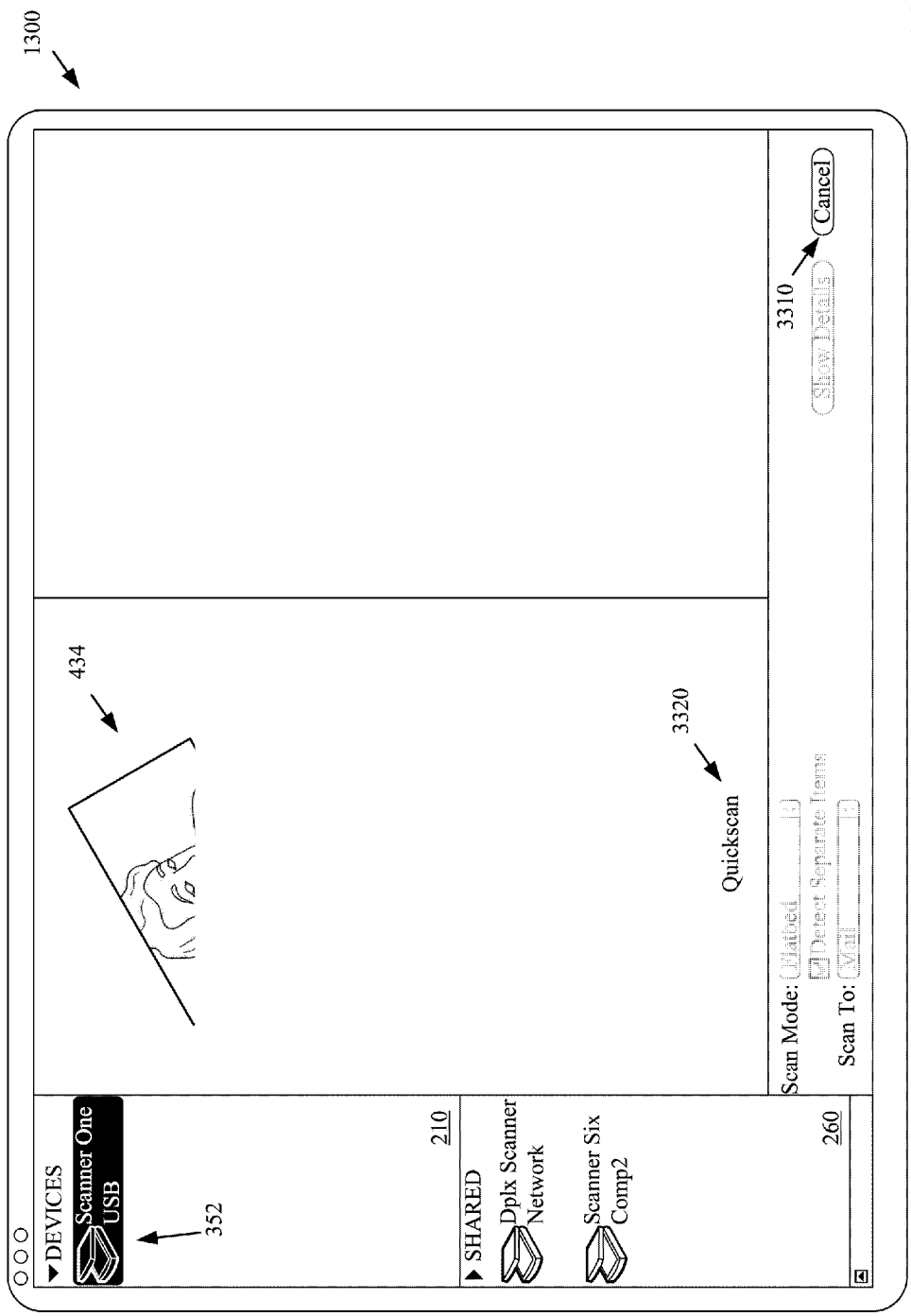
FIG. 33 illustrates the GUI of some embodiments while a preview scan is in progress.
Figure 34:
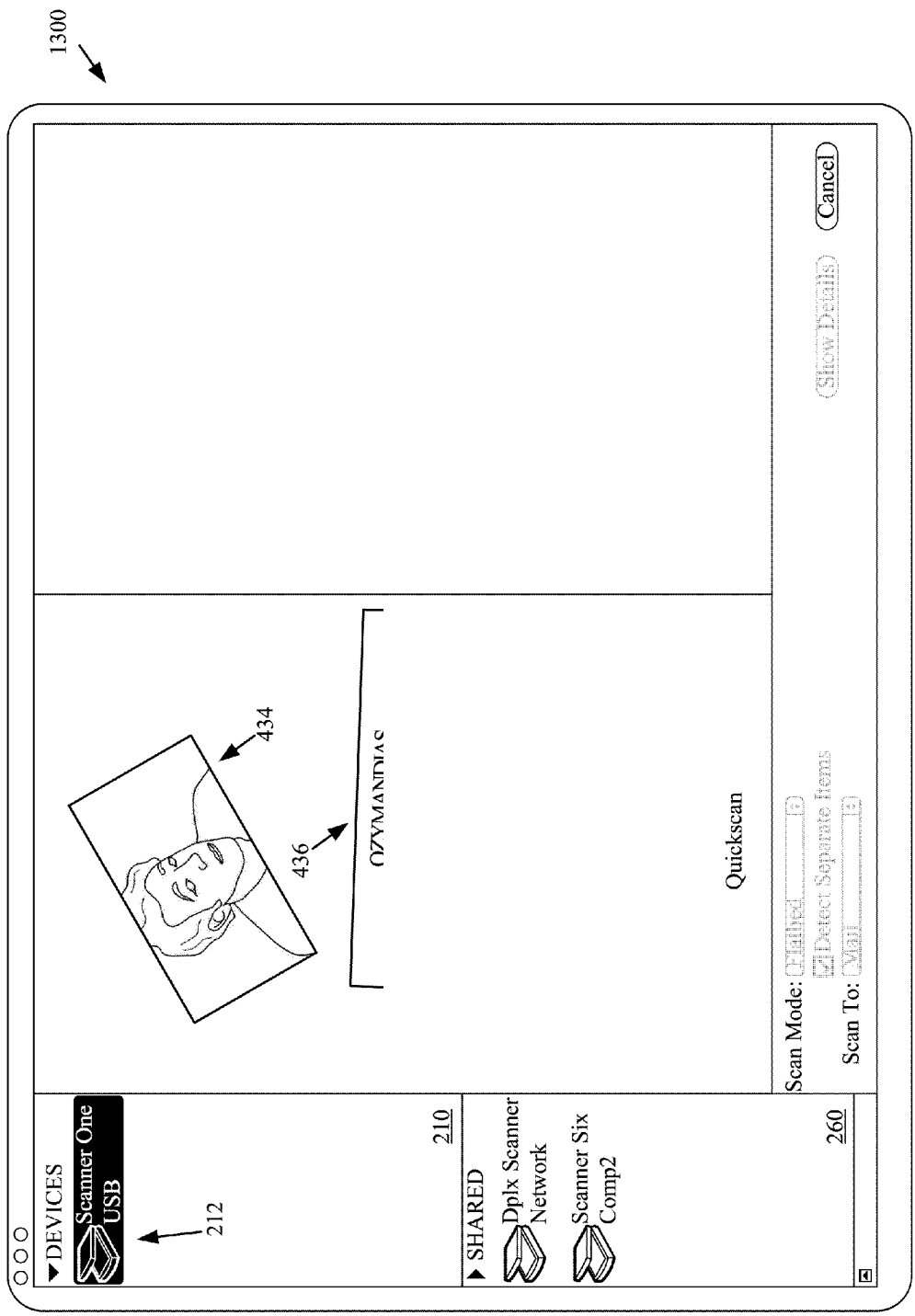
FIG. 34 illustrates the GUI of some embodiments while a preview scan continues.
Figure 35:
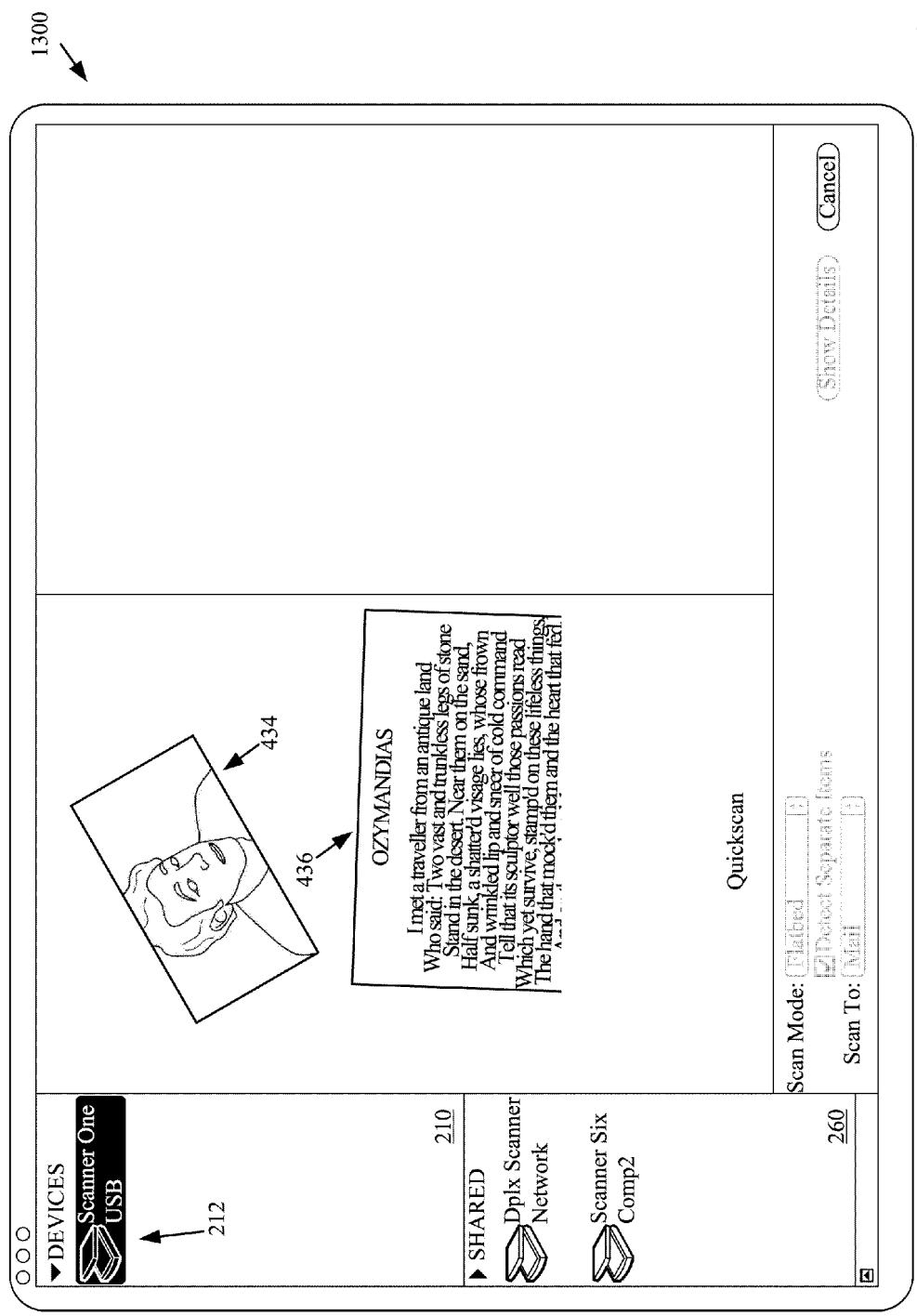
FIG. 35 illustrates the GUI of some embodiments while a preview scan continues.
Figure 36:
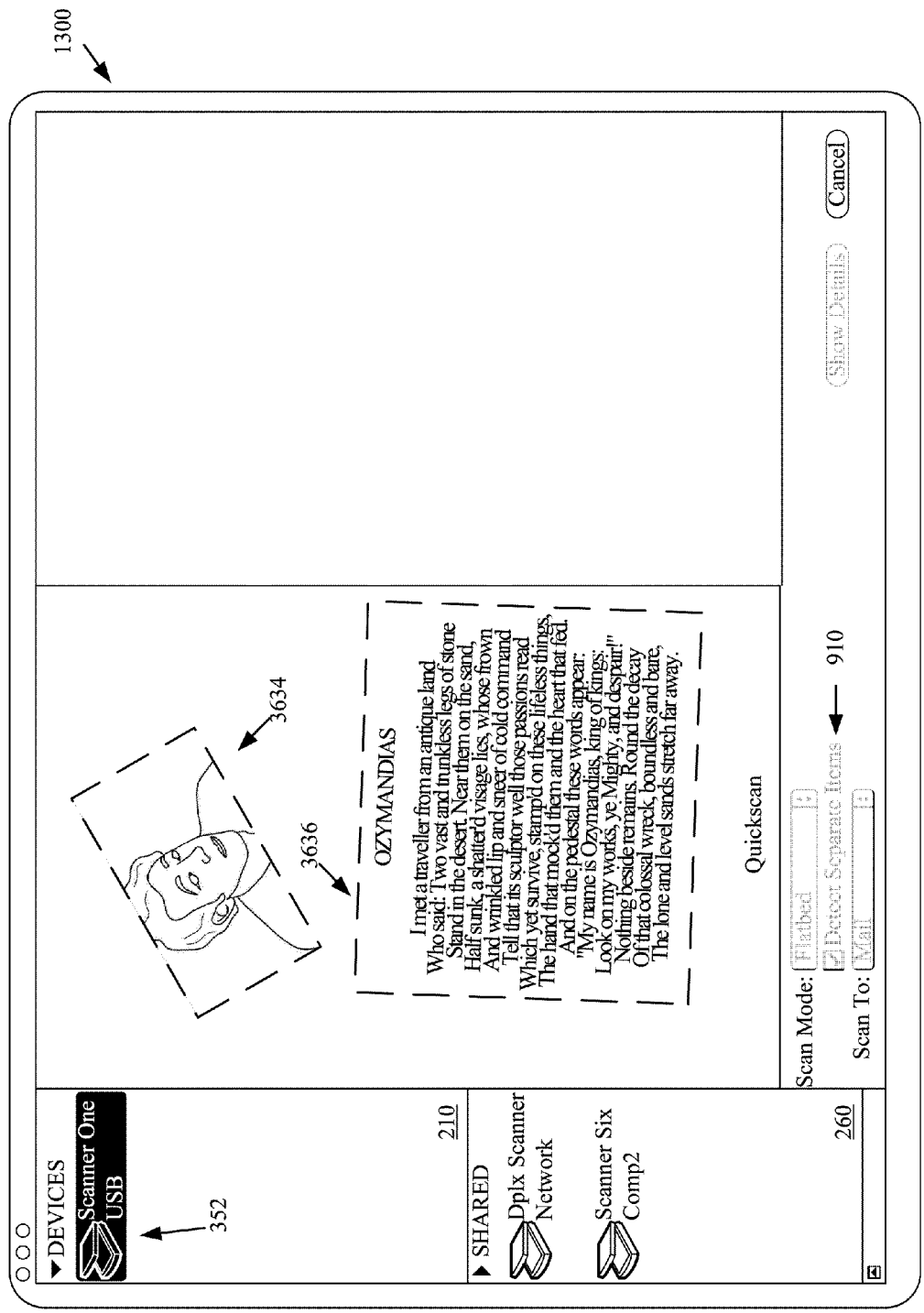
FIG. 36 illustrates the GUI of some embodiments with bounding boxes around the automatically identified regions.
Figure 37:
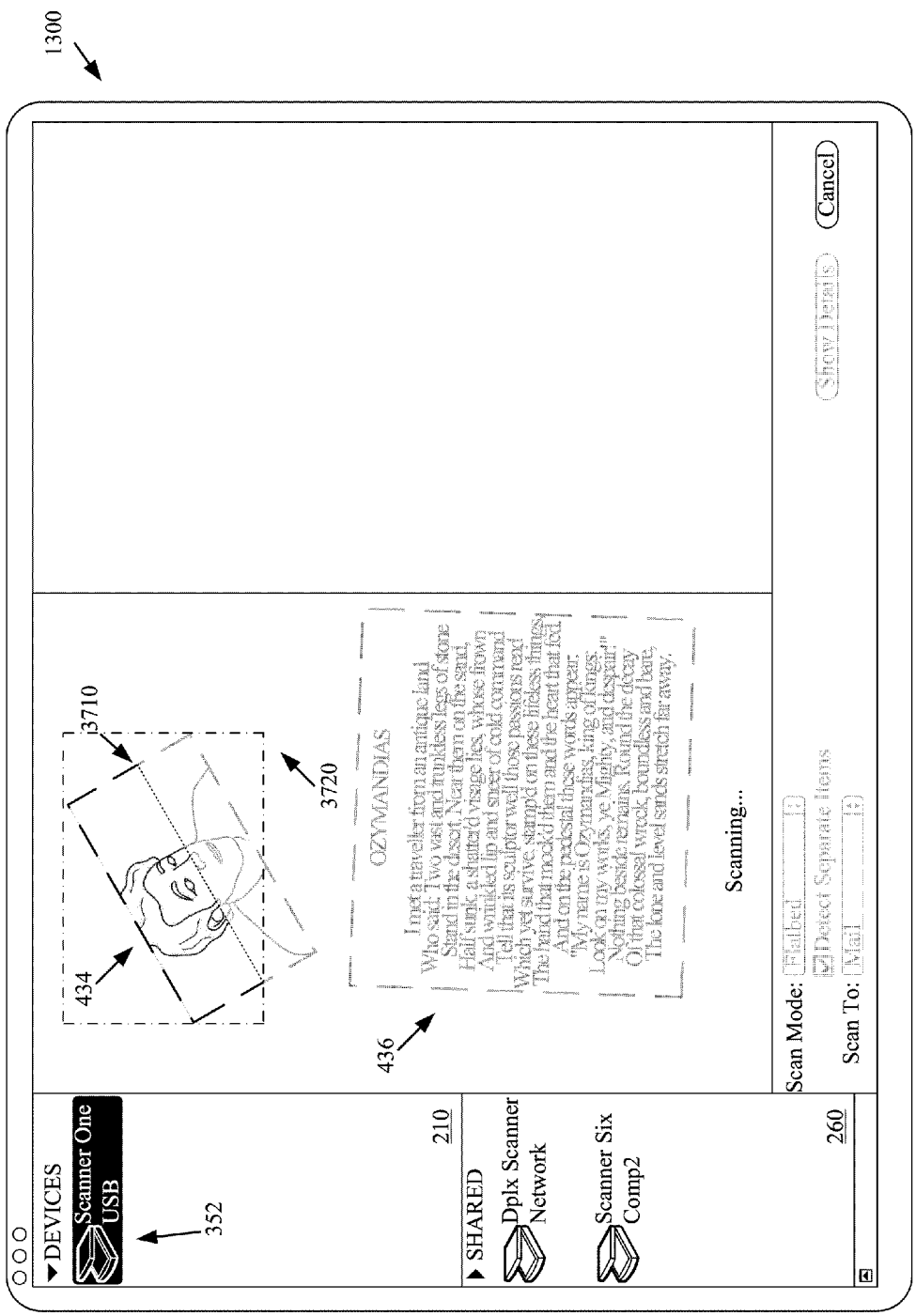
FIG. 37 illustrates a GUI of some embodiments as it progressively displays the results of a detailed scan.
Figure 38:
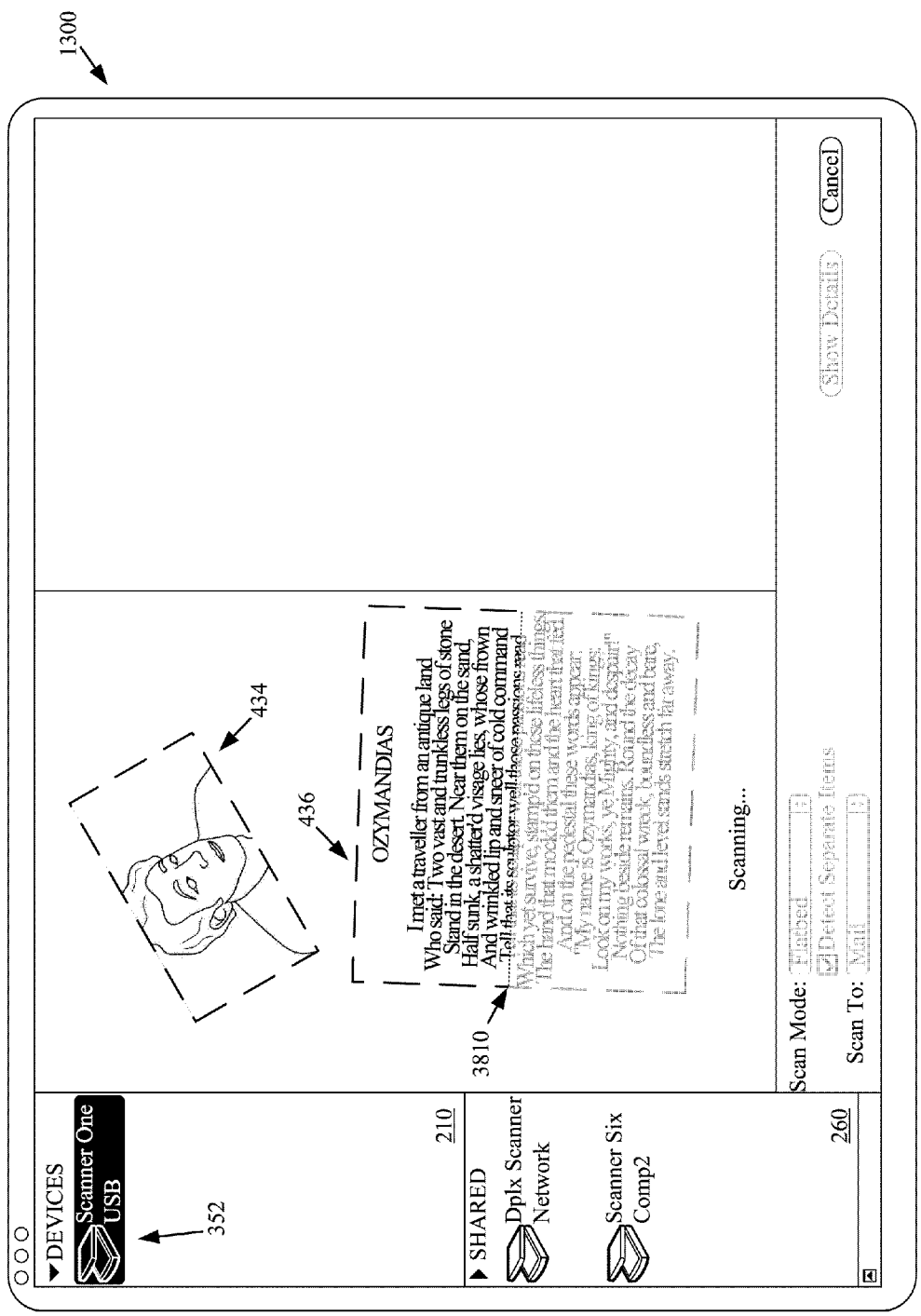
FIG. 38 illustrates the GUI as it progressively displays the results of a second detailed scan.

FIG. 32 illustrates the GUI 1300 just before the auto-scan begins. The scan display area 230 is empty because the preview scan has not yet begun. In this figure, the detect-separate items toggle 910 is checked, indicating that the auto-scan process will identify separate regions after a preview scan. As mentioned in relation to FIG. 13, the auto-scan process will begin when the user clicks the scan button 1350. Once the process begins, the scan display area will sequentially (1) display the images garnered from the preview scan while the preview scan is in progress, as shown in FIGS. 33, 34, and 35; (2) display the identified regions, as shown in FIG. 36; and (3) display the images garnered from the detailed scans of each identified region while the detailed scans are performed, as shown in FIGS. 37 and 38.

FIG. 33 illustrates the GUI #1300 of some embodiments while a preview scan is in progress. The figure displays the image data collected early in the preview scan. FIG. 33 includes cancel button 3310 and status indicator 3320. The cancel button 3310 allows a user to abort the auto-scan. Status indicator 3320 indicates what part of the scan process is being performed (e.g., preview scan or detailed scan).

As mentioned above, while a preview scan is being performed, the GUI 1300 of some embodiments displays an image of the portion of the glass scanned so far. In this figure, the image capture application has received image data from the top of the scanner to a line in the middle of item 434. Accordingly, the scan display area shows an image of part of item 434. While the preview scan is in progress, the GUI does not display indicators (e.g., bounding boxes) of the locations and rotations of the partially scanned item 434. The lack of displayed bounding boxes is because the location and rotation angles of the separate items on the glass have not yet been determined from the data produced by the preview scan. Before the regions are identified, the GUI 1300 does not produce bounding boxes.

The lack of bounding boxes is not the only indication in the GUI 1300 that the scan currently in progress is a preview scan. Some embodiments, such as the one in this figure, provide a status indicator 3320 to inform the user that a preview scan is in progress rather than a detailed scan (e.g., by displaying "quickscan"). Additionally, to indicate that a scan (preview or detailed) is in progress, some embodiments gray-out (render non-selectable) all of the scanner controls except the cancel button 3310. The cancel button 3310 remains selectable so that the user can abort the auto-scan before it is complete. For example, if the preview scan reveals that the wrong items were placed on the scanner, the user can abort the auto-scan before images of the wrong items are saved by clicking the cancel button 3310.

FIG. 34 illustrates the GUI of some embodiments while a preview scan continues. The figure displays the image data collected later in the preview scan shown in FIG. 33. Here, the image capture application has already received visual data from the top of the scanner to the top portion of item 436. Therefore, the scan display area shows all of item 434 and the small portion of item 436 that has already been scanned. The GUI 1300 still has not provided bounding boxes because the image capture application in the illustrated embodiment does not detect separate regions until after the preview scan is complete.

FIG. 35 illustrates the GUI of some embodiments while a preview scan continues. The figure displays the image data collected later in the preview scan shown in FIG. 33. Here, the image capture application has already received visual data from the top of the scanner to the middle of item 436. Therefore, the scan display area shows all of item 434 and the large portion of item 436 that has already been scanned.

FIG. 36 illustrates the GUI of some embodiments with bounding boxes around the automatically identified regions. The GUI 1300 shows the identified separate regions on the glass when the preview scan is complete and the detailed scan is about to start. FIG. 36 includes bounding boxes 3634 and 3636. In FIG. 36 bounding boxes 3634 and 3636 enclose individual items in the preview.

In this figure, the detect-separate-items toggle 910 is checked. Accordingly, the image capture application has identified the regions and the GUI 1300 has provided bounding boxes 3634 and 3636 to surround the identified regions. The bounding boxes provide a visual indicator of the identified regions. By providing a visual indicator of the identified regions, the image capture application allows the user to determine whether the identified regions contain the particular parts of the glass that the user is trying to scan. If the identified regions are not what the user wants, the user can abort the scan. The user can then change to the more complicated GUI described in section I (e.g., by clicking the show-details button shown in FIG. 13). The user can then initiate a scan with manual override options as described in section III, below. Some embodiments pause briefly at this point to allow the user time to abort before the detailed scans begin. Other embodiments do not provide the display shown in FIG. 36, but instead proceed directly from the preview scan to the detailed scans without showing the identified regions before starting the detailed scans.

In some embodiments, while the image capture application receives the detailed scan data for a particular item, the scan display area 230 shows a faded preview and then progressively replaces the faded preview with non-faded images of the detailed scan as the detailed scan data is received from the scanner. In some embodiments, the data is adjusted before it is displayed.

FIG. 37 illustrates a GUI of some embodiments as it progressively displays the results of a detailed scan. The detailed scan is a scan of one automatically identified region. FIG. 37 includes demarcations 3710 and bounding box 3720. Demarcation 3710 conceptually separates the display of the detailed scan of item 434 from the faded display of the preview scan of item 434. As shown in the figures, demarcation 3710 is aligned with the rotation of item 3634 and demarcation 3810 shown in FIG. 38 is aligned with the rotation of item 3636. Bounding box 3720 represents the area of the glass for which the image capture application has received detailed scan data.

In FIG. 37, the detailed scan of image 434 is progressively revealed at right angles to the image 434. That is, during the detailed scan of image 434, the image capture application progressively reveals the received data as a series of angled slices of pixels of image 434. This demonstrates to the user how much of the final scanned image has been received. The slices of pixels are angled relative to the glass, but are at right angles to the edges of the image 434. The image capture application reveals each angled slice of pixels only after it has the image data for every pixel in the entire angled slice of pixels.

Most scanners do not capture images in angled slices of pixels. As explained in section I in relation to FIG. 11, scanners capture images in thin horizontal lines of pixels. The image capture application receives the data in the same manner, as horizontal slices of pixels from the top of the bounding rectangle to the bottom of the bounding rectangle. However, the image capture application of some embodiments receives the scanned image as horizontal slices of pixels and reveals the scanned image as angled slices of pixels.

In order to display the scanned data as angled slices of pixels, the image capture application of some embodiments refrains from revealing all received detailed scan data. In FIG. 37, the image processing application has received data in the area between demarcation 3710 and the bottom of bounding box 3720. However, the image capture application does not reveal the received scan data from below demarcation 3710 because the image capture application has not received all the pixels of any angled slide of pixels from below demarcation 3710.

One of ordinary skill in the art will realize that bounding box 3710 is shown in FIG. 37 to conceptually show the area scanned so far. Some embodiments display such a bounding box aligned with the glass during a detailed scan. Some embodiments do not display a bounding box aligned with the glass during a detailed scan of an identified region, but do display a bounding box aligned with the region, such as bounding box 3634 in FIG. 36. In contrast to the embodiment illustrated in FIG. 37, some embodiments reveal the detailed scan as in slices of pixels that are horizontal relative to the scanner glass.

Once the detailed scan of item 434 is complete, the image capture application begins a detailed scan of the next identified region. In this case, the region containing item 436. In some embodiments, the image capture application directs the scanner to perform the detailed scan of each identified region separately from the detailed scans of the other identified regions. Therefore, the scanner does not scan the areas between the bottom of an identified region and the top of another identified region.

FIG. 38 illustrates the GUI 1300 as it progressively displays the results of a second detailed scan. The detailed scan is a scan of a second automatically identified region. FIG. 38 includes demarcation 3810. Demarcation 3810 conceptually separates the display of the detailed scan of item 436 from the faded display of the preview scan of item 436. Demarcation 3810 is aligned with the rotation of item 3636. As was the case in the scan of item 434 in FIG. 37, the GUI 1300 reveals the scanned data of item 436 at right angles to the edges of the region.

Figure 39:
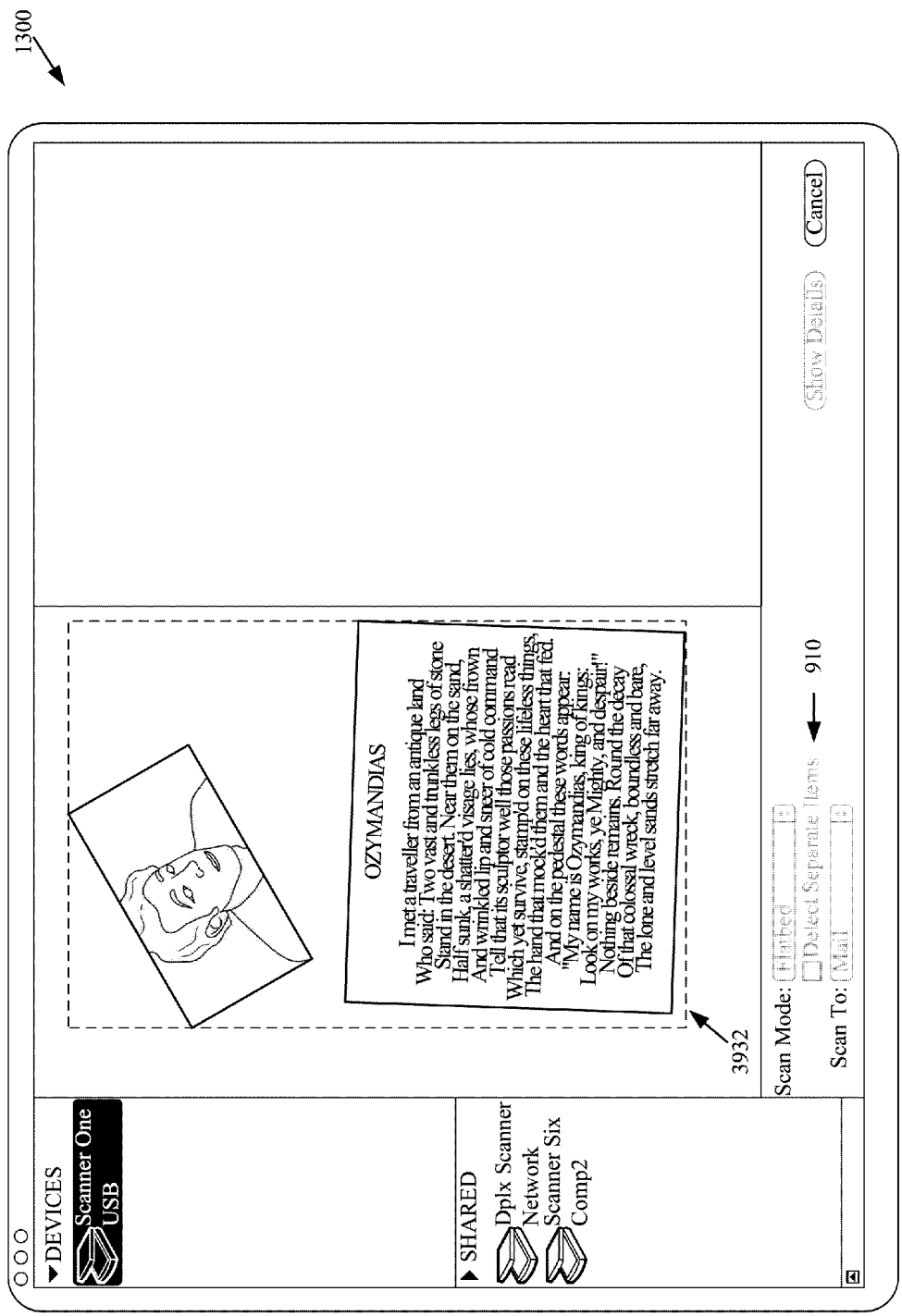
FIG. 39 illustrates the GUI with a single bounding box around an automatically identified region.
Figure 40:
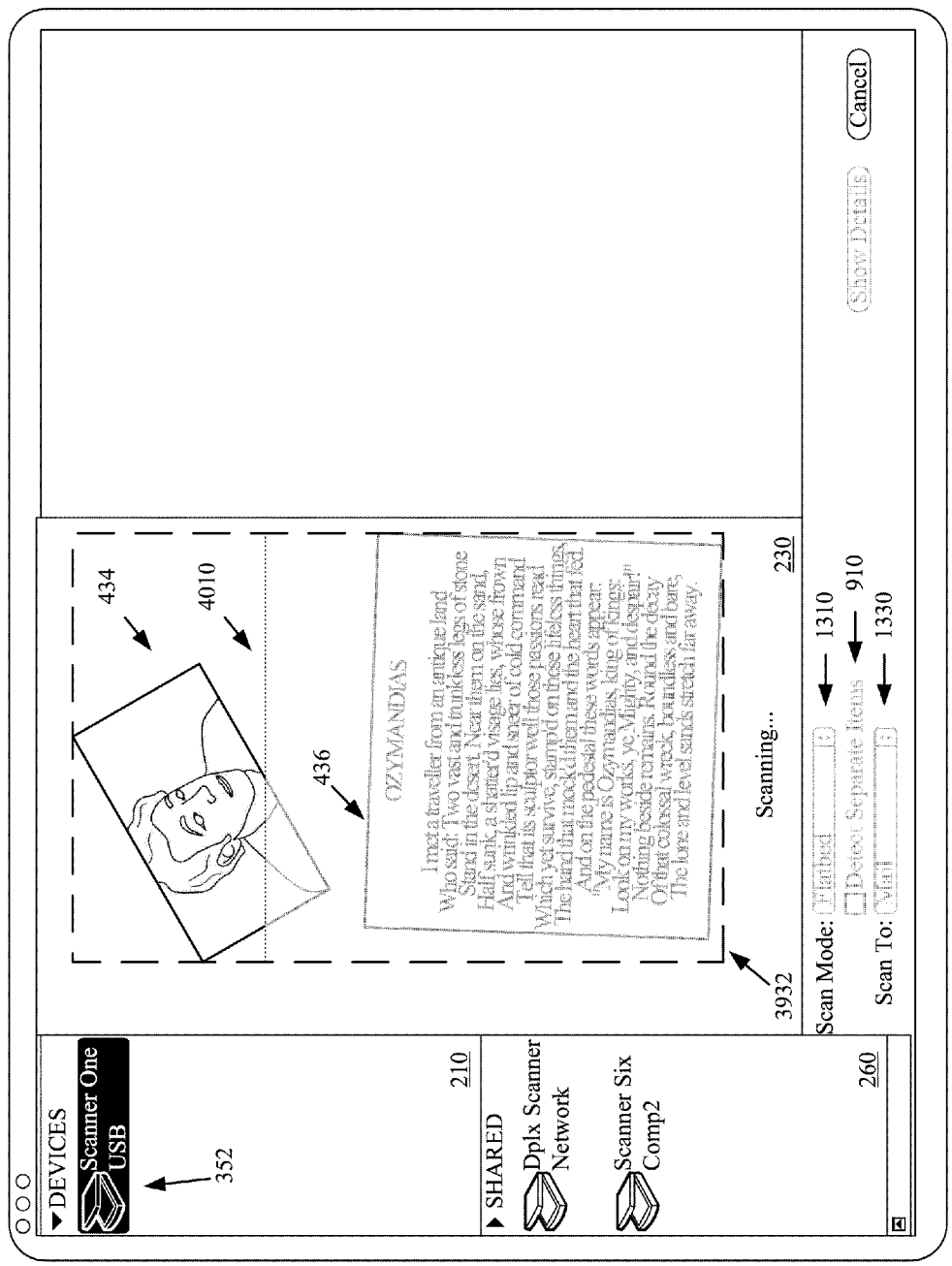
FIG. 40 illustrates a GUI as it progressively displays the results of a detailed scan.
Figure 41:
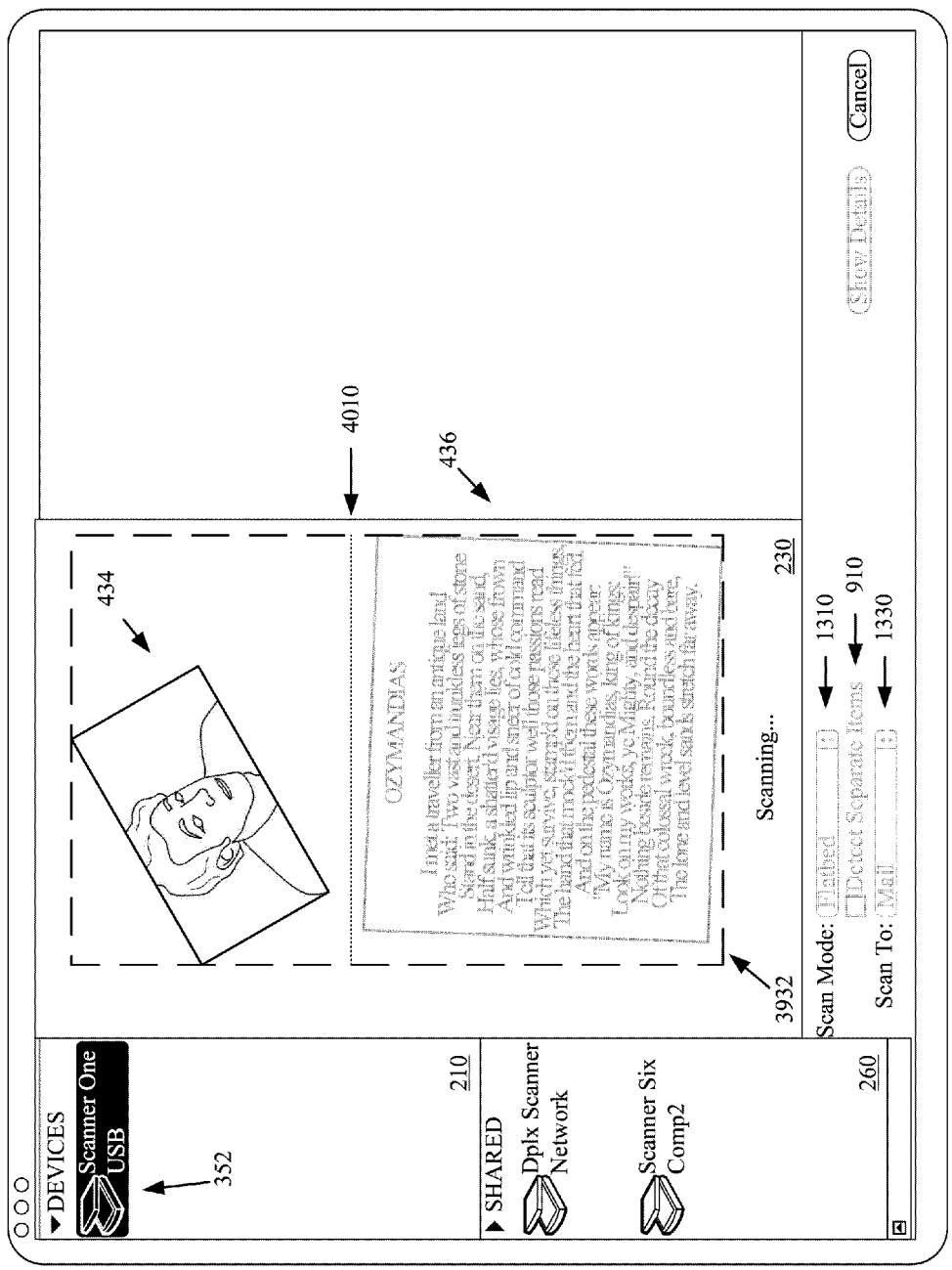
FIG. 41 illustrates the detailed scan of region when the scan is between two items.
Figure 42:
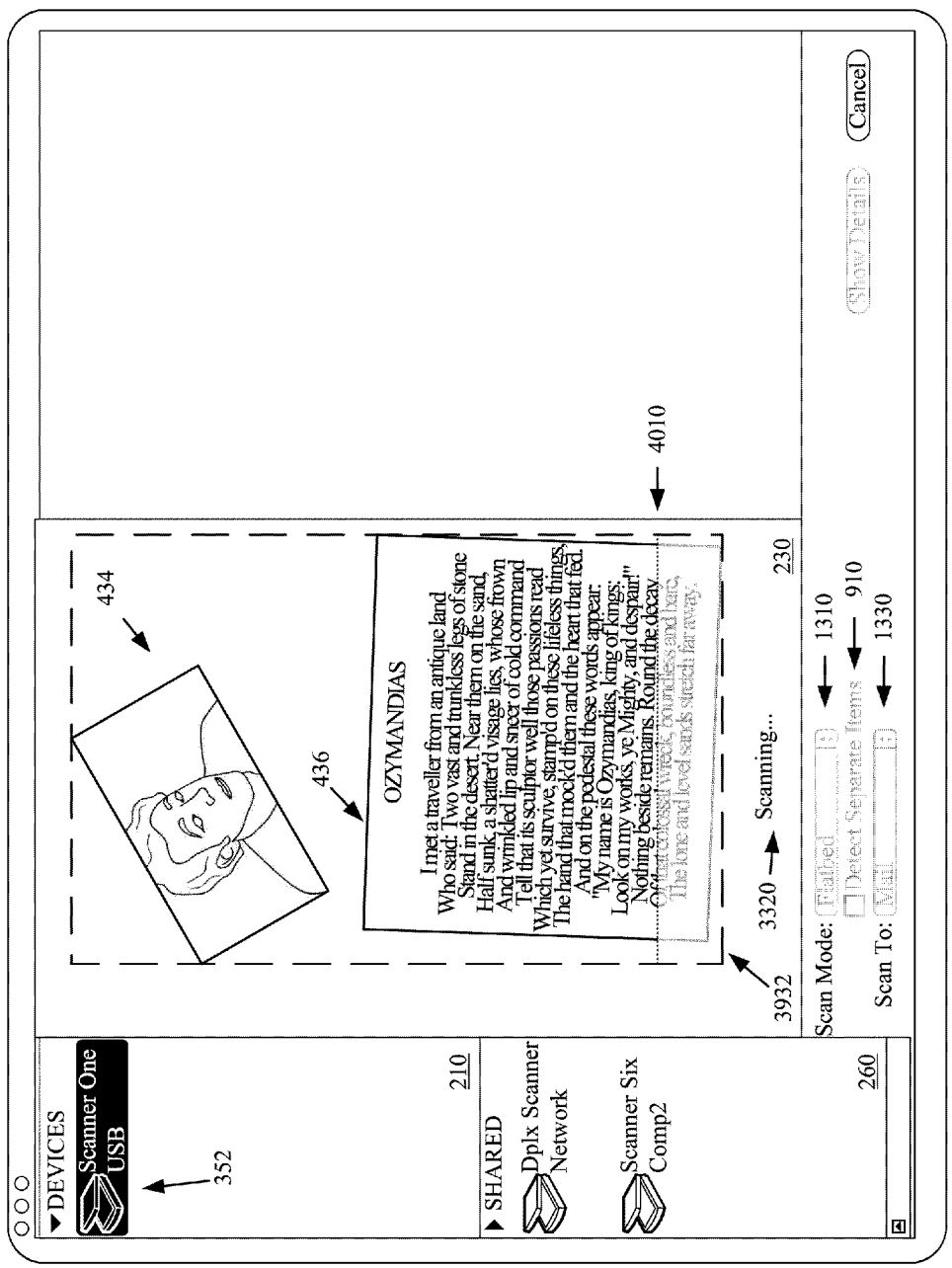
FIG. 42 illustrates the detailed scan of region when the scan is in the middle of item.

The previously described FIGS. 33-38 illustrate the GUI 1300 during an auto-scan when the detect-separate-items function is on. Some embodiments also perform auto-scans without detecting separate items. Such an auto-scan will sequentially (1) display the images garnered from the preview scan while the preview scan is in progress, in the same way as previously shown in FIGS. 33, 34, and 35; (2) identify a single region encompassing all the items on the glass, as shown in FIG. 39; and (3) display the images garnered from a single detailed scans of that single identified region while the detailed scan is performed, as shown in FIGS. 40-42, which are described below.

As mentioned above, until the preview scan is complete, an auto-scan that does not detect separate items is the same as an auto-scan that does detect separate items. Accordingly the description of the GUI 1300 in relation to FIGS. 33-38 applies to auto-scans that do not detect separate items. In an auto-scan that does not detect separate items the image capture applications automatically detects a single region that encloses all the items on the glass. FIG. 39 illustrates the GUI 1300 with a single bounding box around an automatically identified region. The region encloses all the items on the glass because the image capture application has been set to not detect items separately. FIG. 39 includes bounding box 3932. Bounding box 3932 identifies the region that will be scanned in a detailed scan.

As was the case for bounding boxes in auto-scans that identify separate regions, the bounding box 3932 provides a visual indicator of the items to be scanned. If the identified region does not enclose the images the user wants to scan, the user can abort the scan. The user can then change to a GUI that performs manual scans. As with auto-scans that detect separate items, some embodiments pause briefly at this point to allow the user time to abort before the detailed scan begins. Other embodiments do not provide the display shown in FIG. 39, but instead proceed directly from the preview scan to the detailed scans without showing the identified regions before starting the detailed scans.

Just as in auto-scans that detect separate items, in some embodiments, while the image capture application receives the detailed scan data for the single region, the scan display area 230 shows a faded preview and then progressively replaces the faded preview with non-faded images of the detailed scan as the detailed scan data is received from the scanner. FIG. 40 illustrates a GUI as it progressively displays the results of a detailed scan. The detailed scan is a scan of the single automatically identified region. FIG. 40 includes demarcations 4010. Demarcation 4010 conceptually separates the display of the detailed scan of the region in bounding box 3932 from the faded display of the preview scan of the region.

During the detailed scan of region 3932, the image capture application progressively replaces the faded preview with the detailed scan. Unlike the replacement of the preview in FIG.

37, the replacement here is not performed at right angles to the individual items 434 and 436. The replacement is performed at right angles to the bounding box 3932. However, as bounding box 3932 is already aligned with the glass, each slice of pixel data from the scanner provides a full slice of data at right angles to the bounding box 3932. Therefore, the image capture application reveals all scan data as it comes in.

Unlike the detailed scan of separate items shown in FIGS. 37 and 38, the detailed scan in FIG. 40 is being performed for the entire region rather than for the individual items 434 and 436. Accordingly, when the scanner has finished scanning the part of the glass containing item 434, the scanner continues to scan the area between items 434 and 436 instead of skipping that area as it did when performing the scans in FIGS. 37 and 38. FIG. 41 illustrates the detailed scan of region 3932 when the scan is between two items. The scanner head has passed the bottom of item 434, but has not yet reached the top of item 436. Accordingly, demarcation line 4010 is between the items 434 and 436.

Eventually, the scanner head reaches the top of item 436 and continues to scan it as part of the single region in bounding box 3932. FIG. 42 illustrates the detailed scan of region 3932 when the scan is in the middle of item 436. Here, the scanner head has reached the middle of item 436. Accordingly, demarcation line 4010 is across item 436, indicating that scan data for the upper portion of item 436 has been received by the image capture application.

III. Manual Override

As mentioned above, the image capture application of some embodiments provides an automatic scan operation that (1) identifies different regions in an initial scanned documents, (2) re-scans these different regions separately based on parameters that are optimized for each region, and (3) post-processes the individually scanned regions (e.g., post-processes different regions differently). In addition or in lieu of this auto-scan feature, the image capture application of some embodiments also includes a set of manual scanning tools that allow the user to: (1) manually adjust the regions to be scanned (i.e., the location, size, and orientation of the scanned regions); (2) manually adjust the scan parameters (e.g., the scan resolution, the scan color, etc.) for each region; and (3) activate a detailed scan.

Figure 43:
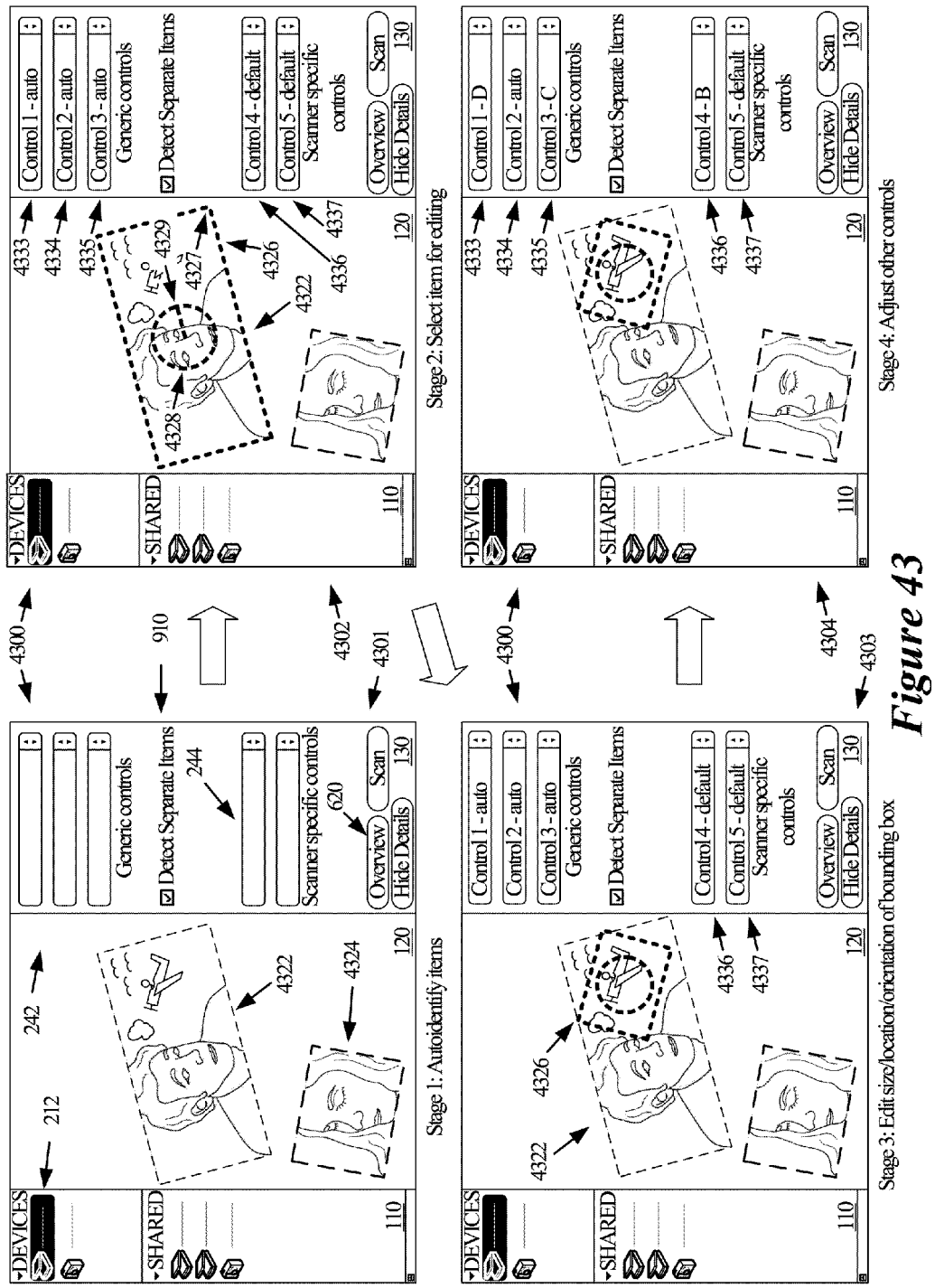
FIG. 43 illustrates a GUI of an image capture application that has a manual selection tool.

FIG. 43 illustrates a GUI 4300 of an image capture application that has a manual selection tool 4326 like the one described above. The figure shows a sequence of operations of the GUI 4300 that modify various scan parameters. Specifically, this figure illustrates the GUI 4300 at four different stages: (1) a first stage 4301 that is after a preview scan has identified two separate regions and before the selection of a specific region; (2) a second stage 4302 that is after the selection of a specific region; (3) a third stage 4303 that is after the user has adjusted the size, location, and orientation of the region; and (4) a fourth stage 4304 that is after the user has adjusted other parameters of a detailed scan.

With the exception of the manual selection tool 4326, the GUI 4300 of FIG. 43 includes many of the same basic elements as the GUIs described in section I, with a layout that closely resembles that of GUI 1200 in FIG. 12. As mentioned above, a user can invoke the manual selection tool 4326 to bound a particular region that is initially identified through a pre-scan operation, by selecting (e.g., clicking or double-clicking) on the region. As shown in FIG. 43, this tool can be a rectangle with a circle inside of it. The rectangle is moveable (e.g., by a drag operation) to move the location of the selection tool. Also, the sides of the rectangle are independently moveable (i.e., each side can be moved independently of the other sides of the rectangle) to adjust the size of the rectangle. The circle has a handle that a user can select and drag to rotate the bounding rectangle of the manual selection tool.

The operations of GUI 4300 will now be described in relation to the four stages 4301-4304. The first stage 4301 shows the GUI after a preview scan has been performed. The image capture application has identified two regions 4322 and 4324 of the scanner glass as containing separate items (e.g., two separate photographs). The image capture application has automatically selected the identified regions 4322 and 4324 to be the default areas for a future detailed scan. The rectangles around regions 4322 and 4324 provide the user with a visual representation of the current boundaries of the regions. The user can select the regions 4322 and 4324 to activate a manual selection tool 4326 to modify the areas of the future detailed scan. The preview scan automatically identified separate regions 4322 and 4324 because the detect-separate-items toggle 910 is checked. The preview scan could have been performed automatically upon the selection of scanner icon 212 or commanded by the overview button 620.

In addition to identifying the regions 4322 and 4324, some embodiments automatically identify the type of content in each region (e.g., color or black and white photograph). As described in section II, the image capture application of some embodiments automatically determines scanning parameters for a subsequent detailed scan of each region. In the first stage 4301, some embodiments leave the controls blank because the user has not yet selected a region for editing. Once a particular region 4322 or 4324 is selected, the automatically determined scanning parameters for that region will be displayed as settings of the generic scanner controls 242 and scanner specific controls 244. As mentioned above, the user can select (e.g., by clicking or double-clicking) one of the identified regions 4322 or 4324 to activate the manual selection tool to operate on that region. Other embodiments display as a list the automatically determined scanning parameters of each region even before the user selects a region.

The second stage 4302 shows the manifestation of the manual selection tool 4326. The manual selection tool 4326 is displayed by GUI 4300 in response to the user's selection of region 4322. Manual selection tool 4326 has manifested over the selected region 4322. Some embodiments display the manual selection tool 4326 as a rectangular border 4327 with a circle 4328 inside it. The circle 4328 has a handle 4329. A user can: (1) adjust the size of the manual selection tool 4326 by dragging an edge or a corner of the border 4327; (2) rotate the manual selection tool 4326 by dragging the handle 4329; and (3) move the manual selection tool 4326 by dragging any place in the manual selection tool 4326 that does not command a rotation or resizing. By adjusting the manual selection tool 4326, the user can select a sub-region of the identified region image, include some of the background of the scanner, or even scan parts or all of multiple images.

The selection of the region 4322 also causes the GUI 4300 to display the automatically determined scanning parameters as settings of the generic controls 242 and the scanner specific controls 244. In stage 4302, the generic controls 4333-4335 are all set to "auto" to conceptually illustrate that they are set to the automatically determined parameters. In some embodiments, the scanner specific controls 244 are also set to automatically determined scanning parameters.

In other embodiments, the image capture application do not automatically set scanning parameters for the scanner specific controls but rather sets the scanner specific controls to default options specified in the scanner driver. Therefore, in stage 4302, the scanner specific controls 4336 and 4337 are set to "default". The parameter names "auto" and "default" are conceptual identifications only and are not intended to indicate the names of actual parameters. The manual editing process allows the user to change the automatically selected settings of the generic controls 4333-4335 and the default settings of the scanner specific controls 4336 and 4337. Changes to the controls are shown later, in relation to the fourth stage 4304.

Returning to the manual selection tool 4326, stage 4302 shows the manual selection tool surrounding the entire region 4322, indicating that a detailed scan at this stage would capture the entire picture in region 4322. However, the user may want to capture a smaller portion of region 4322. For example, the user may want to focus on the section of region 4322 that includes an airplane. The third stage 4303 shows that the user has adjusted the manual selection tool 4326 to closely surround the section of region 4322 that includes the airplane.

Figure 44:
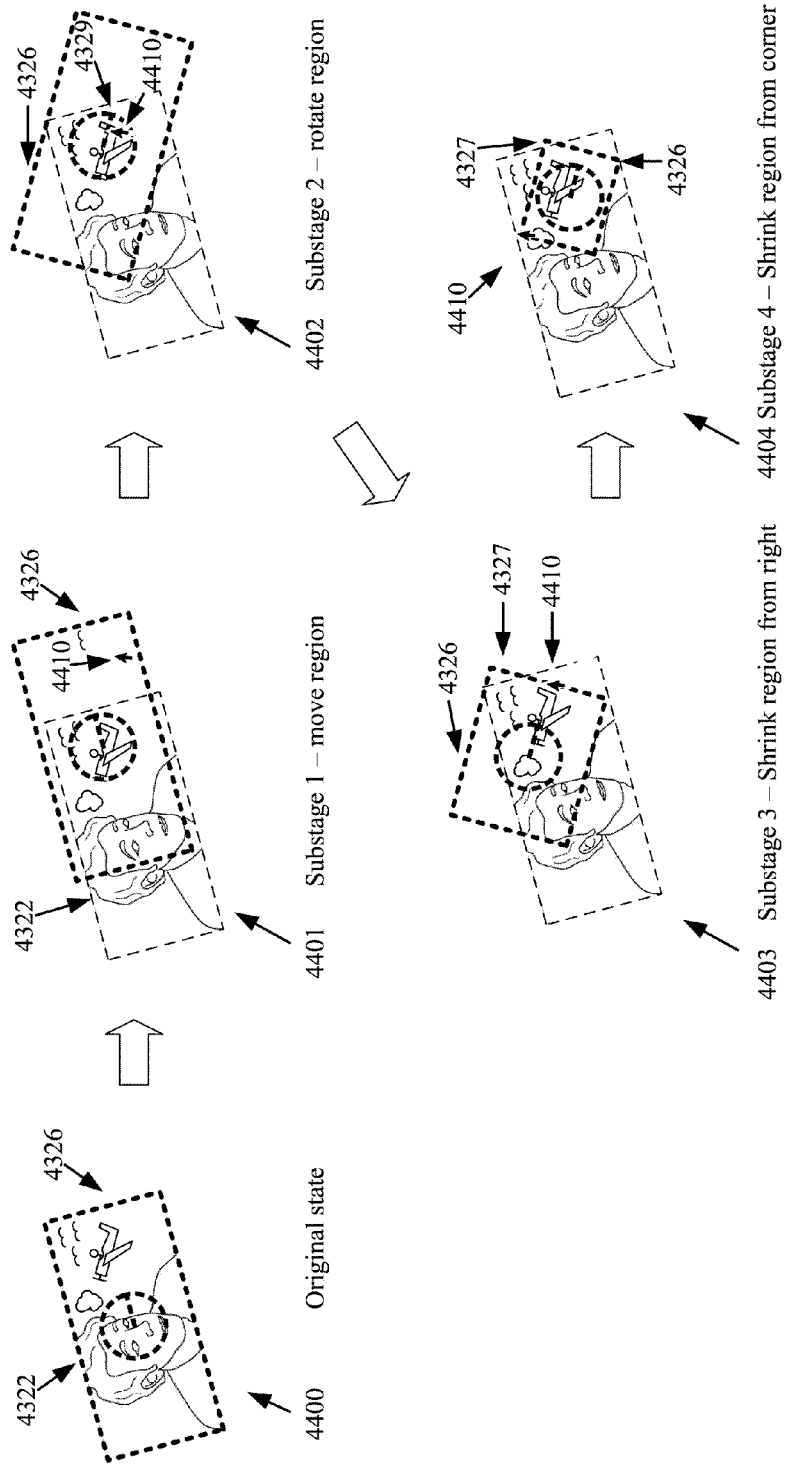
FIG. 44 illustrates one such possible sequence of adjustments of the manual selection tool.

A user may employ many sequences of movement, rotation, and resizing of the manual selection tool to select an area within the region selection tool 4326. FIG. 44 illustrates one such possible sequence of adjustments of the manual selection tool 4326. The sequence includes five substages that change the selected region from the area shown in second stage 4302 to the area shown in third stage 4303 of FIG. 43. The first substage 4401 shows a movement of the manual selection tool 4326; the second substage 4402 shows a rotation of the manual selection tool 4326; the third and fourth substages 4403-4404 show alterations of the size of the manual selection tool 4326. The figure includes original state 4400, substages 4401-4404, and cursor 4410. Original state 4400 shows the manual selection tool 4326 just after it has been selected. The substages 4401-4404 show how the manual selection tool 4326 is manipulated (e.g., by the user) to perform each adjustment to the region for scanning. The cursor 4410 shows which part of the manual selection tool 4326 the user dragged to perform the operation of each substage.

The first substage 4401 shows the end of a movement operation of the manual selection tool 4326. In the movement operation, the user has clicked-and-dragged the manual selection 4326 tool with cursor 4410. As shown by the position of cursor 4410 in the manual selection tool 4326, the user clicked on a part of the manual selection tool 4326 that does not activate a rotation or resizing operation (i.e. anywhere other than the handle or border). As mentioned above, clicking and dragging a part of the manual selection tool 4326 that does not activate a rotation or resizing operation moves the manual selection tool 4326. The user dragged cursor 4410 to the upper right, which moved the manual selection tool 4326 to the upper right. Then the user released cursor 4410 at the position shown in the first stage 4401.

The second substage 4402 shows the end of rotation operation of the manual selection tool 4326. The rotation operation started with the manual selection tool 4326 in the same location as shown in substage 4401. All the completed operations shown in this figure start with the manual selection tool 4326 in the position, size, and orientation shown in the previous stage. The user moved the cursor 4410 to the handle 4329. The user then clicked and dragged the handle 4329 with the cursor 4410. Specifically, the user moved the cursor down, which moved the handle down. By dragging the handle 4329 down, the user rotated the manual selection tool 4326 into the position shown in the second substage 4402. In some embodiments, dragging on the circle would also rotate the manual selection tool 4326.

The third through fourth substages show various resizing operations. The third substage 4403 shows the end of a first resizing operation of the manual selection tool 4326. In the resizing operation of the third substage 4403, the user clicked and dragged the right border of the manual selection tool 4326 and to the left. This reduced the size of the region 4326.

The fourth substage 4404 shows the end of a second resizing operation of the manual selection tool 4326. In this resizing operation, the user has clicked and dragged the upper left corner of the manual selection tool 4326 down and to the right. In the embodiment shown in this figure, dragging a corner of the manual selection tool 4326 changes the size of the manual selection tool 4326 while keeping the aspect ratio (the ratio of height to width) constant. In other embodiments, dragging a corner of the manual selection tool 4326 allows the user to freely change the length of both sides of the manual selection tool 4326 that are connected to the dragged corner. As shown in this figure, moving, rotating, and changing the size of the manual selection tool 4326 has not affected the image in region 4322. The movement and rotation of manual selection tool 4326 has not affected the image in region 4322 because the manual selection tool 4326 is for selecting an area of the glass to scan; it is not a tool for editing the images in the preview scan.

The sequence of operations shown in this figure has produced the change in the size, orientation, and location of the manual selection tool 4326 seen when going from the second stage 4302 to the third stage 4303 in FIG. 43. However this sequence of operations is not the only sequence that would produce such a change. One of ordinary skill in the art will realize that the operations shown could be performed in any order to produce the same change. Additionally, equivalent sequences can make the same changes without exactly duplicating the individual operations shown. For example, the movement operation could be replaced with multiple border shifting operations.

Returning to FIG. 43, in the third stage 4303, the options in the controls 242 and 244, options are the same as in the previous stage 4302, indicating that the user has not yet changed the scanner control options set by the image capture application. Between the third stage 4303 and the fourth stage 4304, the user does change those settings.

The fourth stage 4304 shows user modified settings. The user has changed the settings of some of the generic controls 242 and scanner specific controls 244. Specifically, the user set control 4333 to option D, control 4335 to option C, and control 4336 to option B. The user has not changed the settings of controls 4334 and 4337, so those controls remain at the automatically selected or default values. Specific types of controls with parameters that the user can adjust are described in more detail below.

One of ordinary skill in the art will understand that although the stages 4302-4304 are shown in FIG. 43 in a particular order, other embodiments may receive adjustments to the location, size, and orientation of a region after receiving adjustments to the scanning parameters in the scanner control area or receive multiple adjustments of the controls and the manual selection tool in any order.

Figure 45:
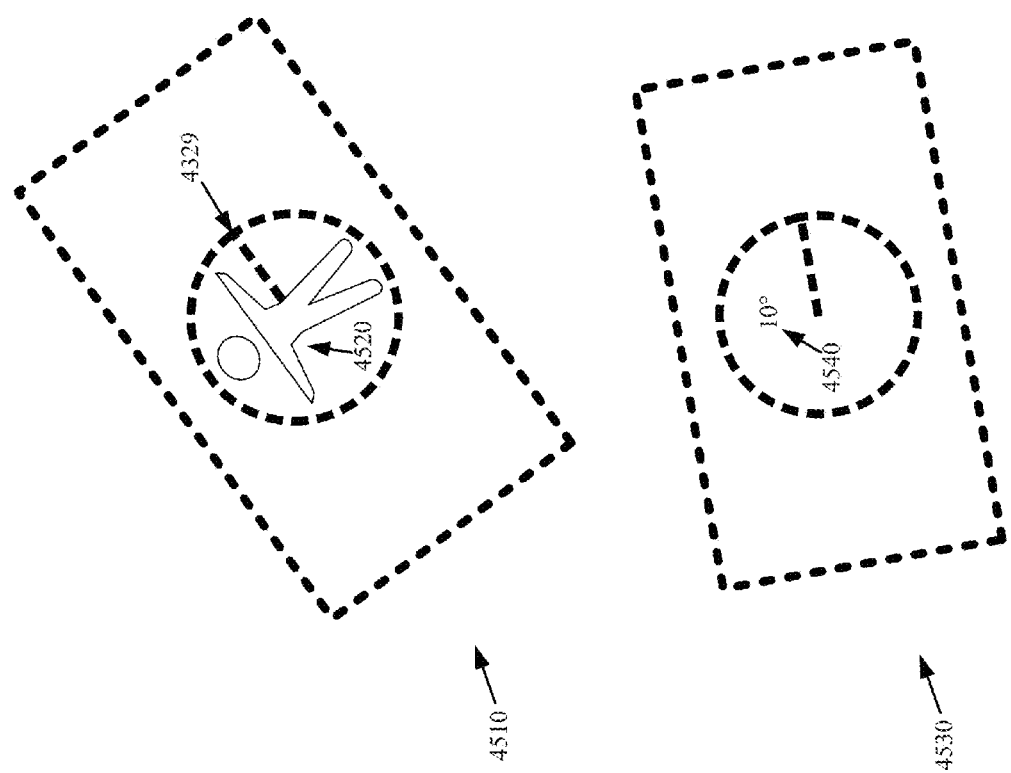
FIG. 45 illustrates two examples of manual selection tools with additional angle indicators.

The manual selection tool 4326 includes multiple features to indicate the angle of the tool, including handle 4329 and the alignment of the border 4327. However, other embodiments may provide different or additional indications of the rotation of the manual selection tool. FIG. 45 illustrates two examples of manual selection tools with additional angle indicators. The angle indicators shown can be used along with the previously described indicators, or can function independently. The figure includes manual selection tool 4510, which includes angle indicator 4520 and manual selection tool 4530, which includes angle indicator 4540. Angle indicator 4520 is a stylized human figure. Angle indicator 4540 is a numerical readout of the angle of the manual selection tool 4530. When manual selection tool 4510 rotates, angle indicator 4520 rotates with the tool. The head of the stylized human figure points in the direction that the GUI will treat as up during a detailed scan of a region selected by manual selection tool 4510. In contrast, when manual selection tool 4530 rotates, the numerical readout of angle indicator 4540 updates to display the new angle of the manual selection tool 4530.

In some embodiments, a manual selection tool might be invoked or implemented differently than as described above. In some embodiments, such as the embodiments described above, this tool is invoked by a user selecting a region that is identified as a separable region in the scanned document. This invocation causes the tool to appear to bound the selected region. Instead or in lieu of this manner of invoking the tool, some embodiments allow a user simply to select the tool from the GUI 4300 and to use the tool to bound any identified region in the scanned document.

The sections that follow describe various aspects of the manual override features of some embodiments. Section III.A. describes the way that the GUIs of some embodiments display automatically identified regions to the user before the user selects a region for editing. Section III.B. describes the results of detailed scans performed after various adjustments to a manual selection tool. Section III.C. describes guidelines that show the frame of reference of the identified regions during adjustments to the manual selection tool. Section III.D. describes manual overrides of various automatically identified parameters for performing a detailed scan on an automatically selected region.

A. Indicators of Separate and Grouped Selectable Regions

Figure 46:
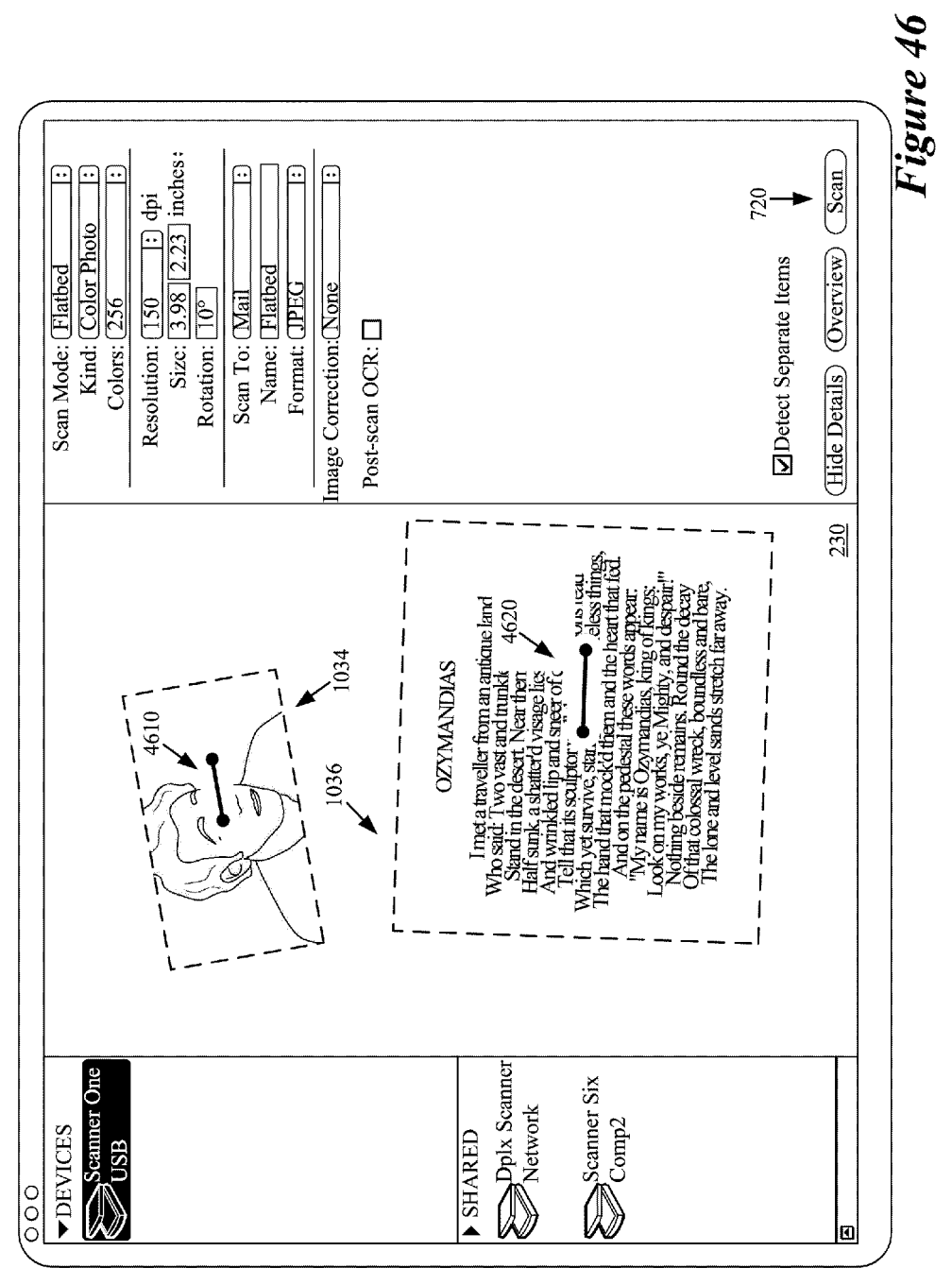

One parameter that a user can control is whether the image capture application will present the results of the preview scan as separate items or as a group of items. A basic user interface for detecting separate regions is described in section I in reference to FIGS. 9 and 10. However, some embodiments provide additional indicators of the separate regions when the regions are presented to the user for manual editing. FIG. 46 illustrates a GUI that provides visual indicators of the size, location, and orientation of identified regions when a detect-separate-items option is selected. The visual indicators help to distinguish between states of the GUI in which separate regions are selectable and states in which a single region is selectable. FIG. 46 includes angle indicators 4610 and 4620. Angle indicators 4610 and 4620 are visual indicators of the presence and orientations of the two identified regions in bounding boxes 1034 and 1036.

The image capture application indicates the selectable regions by displaying the bounding boxes 1034 and 1036 with angle indicators 4610 and 4620 superimposed on the regions. The bounding boxes 1034 and 1036 show the user the separate regions of the glass that will be captured by a detailed scan if the user activates the scan button 720 without adjusting the regions (e.g. with a manual selection tool). Angle indicator 4610 is superimposed on the picture in bounding box 1034 and shows the angular displacement of the bounding box 1034 from the horizontal axis of the GUI. One end of the angle indicator 4610 is positioned on the center of the identified region to show the user where the center of the region is. The angle between angle indicator 4610 and an edge of the preview display area visually presents the identified orientation of bounding box 1034. Angle indicator 4620 provides the same visual indications for bounding box 1036 as angle indicator 4610 provides for bounding box 1034.

Figure 47:
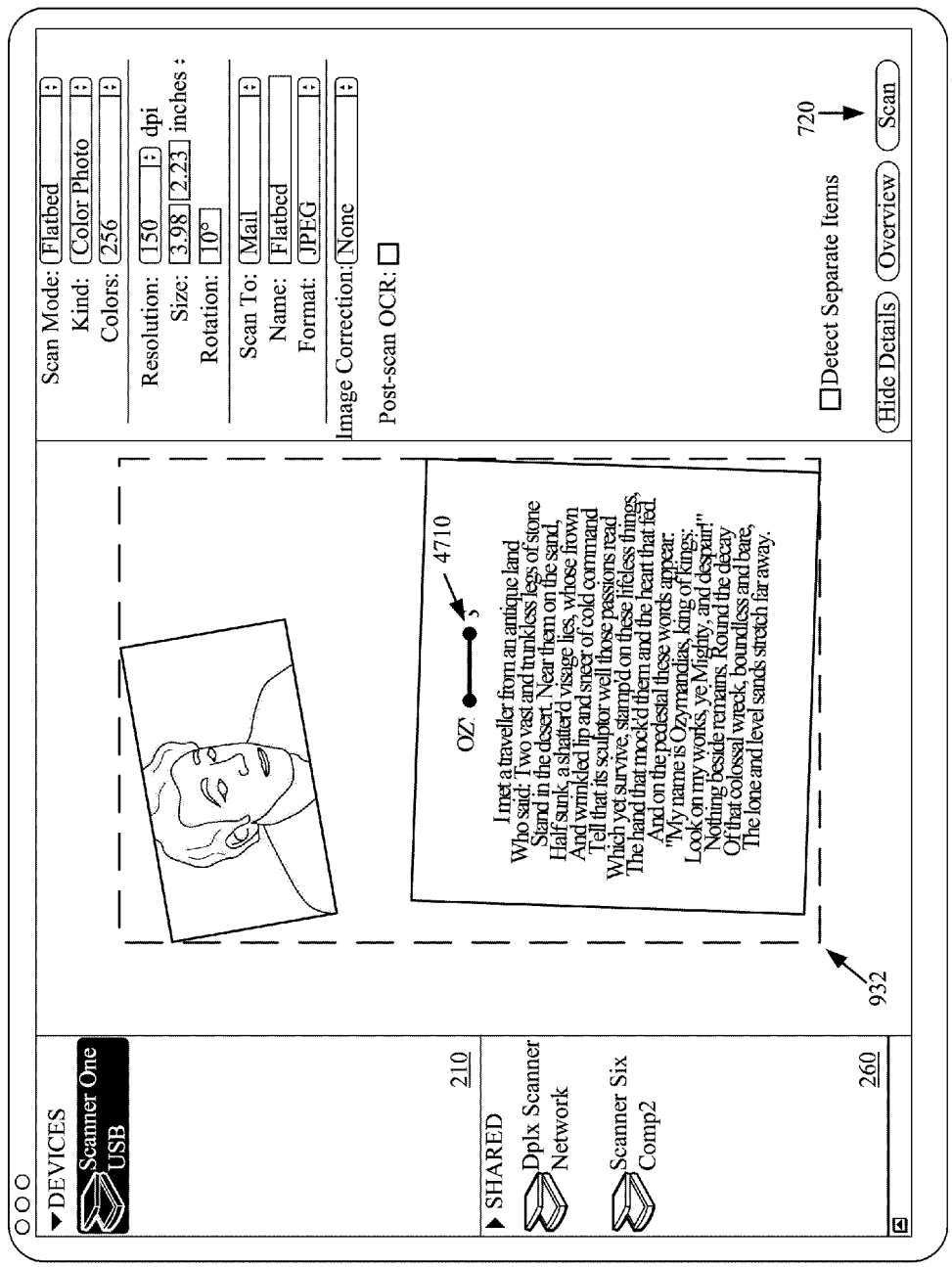
FIG. 47 illustrates a GUI that provides visual indicators of the size, location, and orientation of an identified region containing a group of items when the detect-separate-items option is not selected.

In addition to allowing manual editing of separately detected individual regions, some embodiments allow manual editing of regions containing groups of items when the detect-separate-items option is turned off. Such embodiments identify a single region on the glass that encompasses all the items on the glass. The embodiments then provide visual indicators of the size, location, and orientation of the single identified region. FIG. 47 illustrates a GUI that provides visual indicators of the size, location, and orientation of an identified region containing a group of items when the detect-separate-items option is not selected. The visual indicators show the angle when the region is a group of items rather than a single item. FIG. 47 includes angle indicator 4710. Angle indicator 4710 is superimposed on the middle of bounding box 932 and shows the angular displacement of the bounding box from the horizontal axis of the scanner. As mentioned above, in some embodiments, the bounding box 932 of a group of items is defined by horizontal and vertical lines through the outermost corners of the group of items. In such embodiments, the bounding box 932 is aligned with the scanner by default; therefore the default angle of the angle indicator 4710 is zero. However, if a user (1) selected the region in bounding box 932 for manual adjustment, (2) rotated the manual selection tool that appeared on the region, and (3) unselected the region, then the angle indicator 4710 would change to show the new angle of the bounding box.

B. Detailed Scans of Adjusted Regions

As mentioned above, the manual selection tool of some embodiments can move, rotate, or resize scanning regions. The manual selection tool affects the scanning area, not the underlying images. That is, shrinking the manual selection tool reduces the portion of the image that will be captured, not the size of the image presently shown in the boundaries of the manual selection tool.

Figure 48:
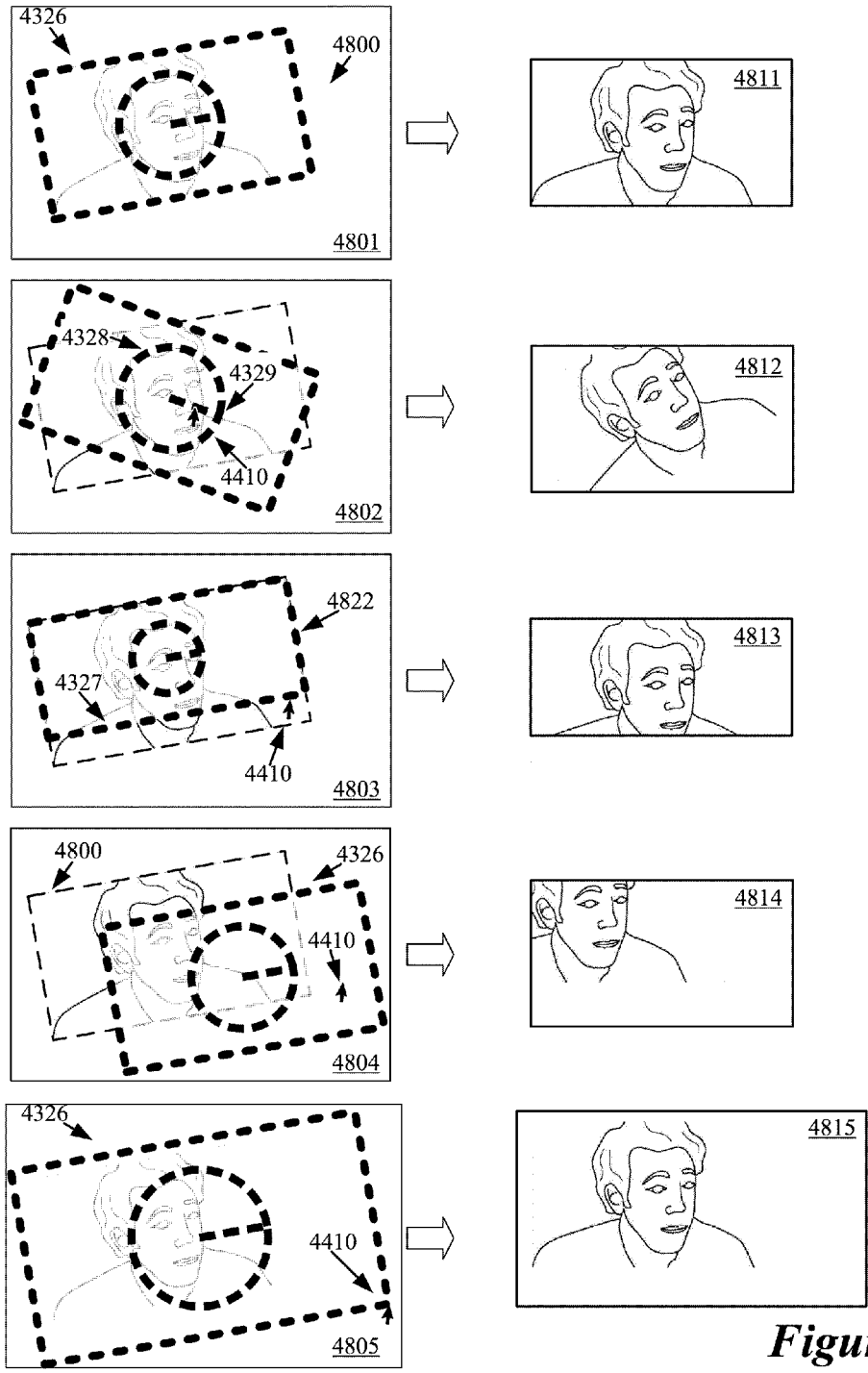
FIG. 48 illustrates the differences in detailed scans performed after various different operations of a manual selection tool.

FIG. 48 illustrates the differences in detailed scans performed after various different operations of a manual selection tool. The figure shows a series of sections of a scan display area during various operations of a manual selection tool 4326. Detailed scans of a photograph are shown in association with the operations of the manual selection tool 4326 that produced the scans. The figure includes photograph 4800, operations 4801-4805 and images 4811-4815. The photograph 4800 is a male portrait. Operations 4801-4805 show various adjustments to the manual selection tool 4326. Images 4811-4815 represent detailed scans of the adjusted regions after the corresponding adjustment.

Image 4811 is a captured image of the entire photograph 4800. Image 4811 includes the entire content of the photograph 4800 and is the same size as the photograph 4800. Because the user has made no changes with the manual selection tool, image 4811 is the same image that the image capture application would produce in the automatic scans described in section II. The corresponding operation 4801 represents the default selection of an identified region. The manual selection tool 4326 completely surrounds the photograph 4800 and the borders of the manual selection tool 4326 are co-extensive with the borders of the photograph. The region was automatically identified after a preview scan and has not been adjusted. A detailed scan after operation 4801 produces image 4811.

Image 4812 is a rotated image of the photograph 4800. More accurately, image 4812 is rotated by a different angle than the angle necessary to counter the actual rotation of the photograph 4800 relative to the scanner glass. Image 4812 includes a counterclockwise rotated view of those portions of photograph 4800 that remain in the manual selection tool 4326 after the rotation operation 4802. The user rotated the manual selection tool 4326 clockwise relative to the default region. Operation 4802 shows that the user rotated the manual selection tool 4326 by clicking and dragging the handle 4329 with cursor 4410. A detailed scan after operation 4802 produces image 4812.

Image 4813 is a shorter version of an image of the photograph 4800. Image 4813 includes a view of the top of the photograph 4800, but does not contain a view of the bottom of the photograph 4800. The user shrank the region and cut off the bottom of the photograph with manual selection tool 4326. Operation 4803 shows that the user shrank the manual selection tool 4326 by clicking and dragging the boundary 4327 with cursor 4410. A detailed scan after operation 4803 produces image 4813.

Image 4814 is an offset image of the photograph 4800. The image 4814 shows the lower-right portion of photograph 5200. The user moved the manual selection tool 4326 down and to the right (which moved the region of the detailed scan). Operation 4804 shows that the user moved the manual selection tool 4326 by clicking and dragging the manual selection tool 4326 with cursor 4410. A detailed scan after operation 4804 produces image 4814.

Image 4815 is an image of photograph 4800 and some of the surrounding area of photograph 4800. The user manipulated manual selection tool 4326 to expand the region for the detailed scan into the area surrounding the photograph 4800, so the image 4815 is larger than image 4811 and unlike image 4811 includes some of the background of the scanner glass. Operation 4805 shows that the user increased the size of manual selection tool 4326 by clicking and dragging the corner of the boundary 4327 with cursor 4410 (and by other, unshown, operations, e.g., dragging the top and left sides of the boundary outward). A detailed scan after operation 4805 produces image 4815.

Some embodiments provide an option to preview the image in the manual selection tool. In such embodiments, clicking the control, or selecting a set of keyboard keys temporarily shows a view of the images that is similar to the images 4812-4815 in FIG. 48. That is, the GUI displays a preview of the adjusted region, aligned with the edges of the GUI, rather than showing the preview with a bounding box of manual selection tool 4326 rotated relative to the edges of the GUI. In some embodiments, once the control or set of keyboard keys that activates the preview of the image is released, the manual selection tool 4326 returns to the position and orientation that it had before the preview of the image was activated.

C. Guidelines

Figure 49:
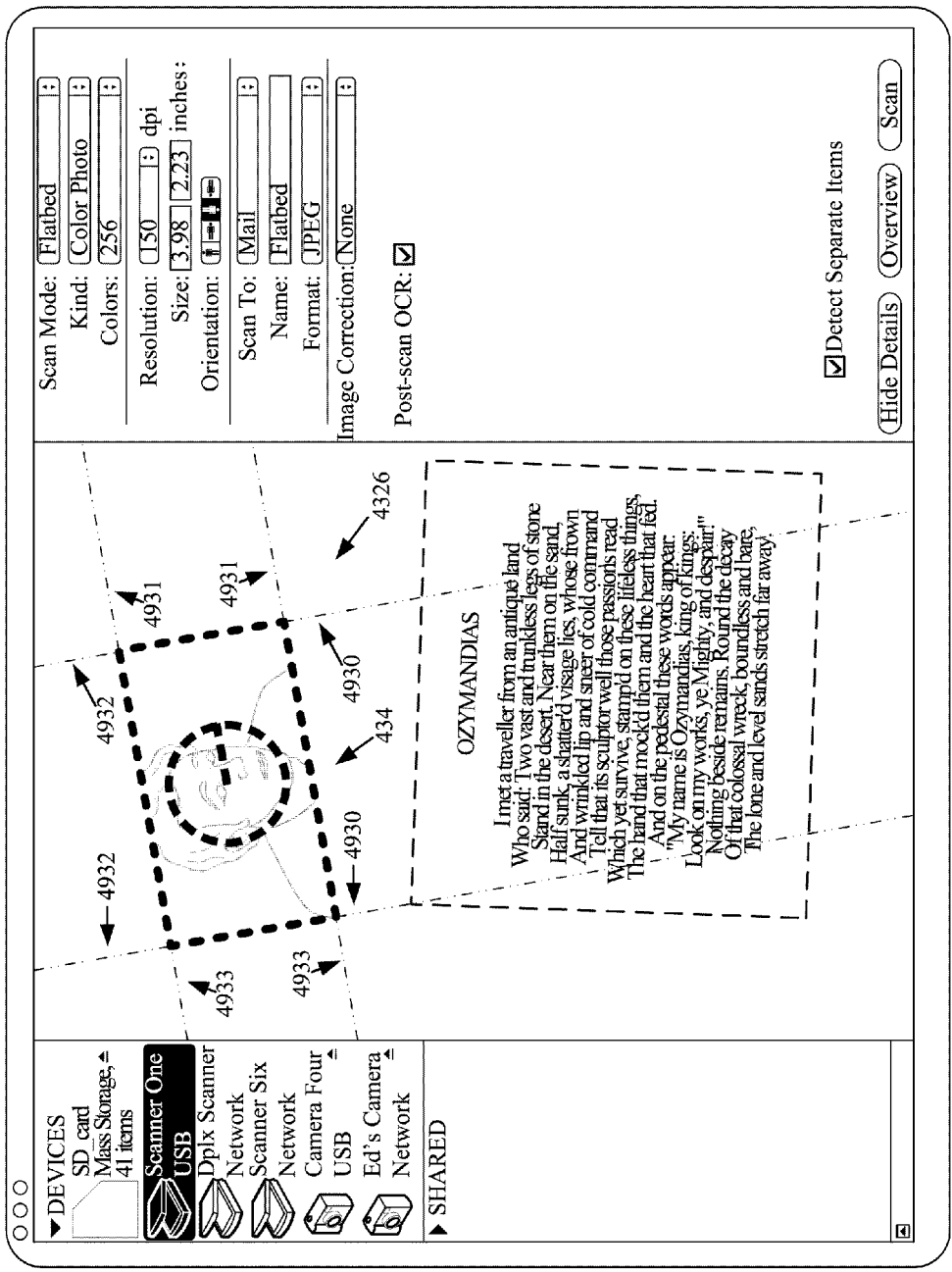
FIG. 49 illustrates a manual selection tool with guidelines of some embodiments.

In some embodiments, when a user selects a region for editing with a manual selection tool, the GUI provides guidelines to show the user the original location and orientation of the automatically identified region. Some embodiments display the guidelines only when the manual selection tool is moved, resized, or rotated. FIG. 49 illustrates a manual selection tool 4326 with guidelines of some embodiments. The guidelines provide the user with location and orientation references relative to the originally identified region. FIG. 49 includes guidelines 4930-4933. The guidelines 4930-4933 outline the originally detected region.

The guidelines 4930-4933 provide a set of reference lines that allow a user to identify directions relative to the original region 434. The guidelines serve two main purposes. First, when a user moves, rotates, or resizes the manual selection tool 4326, the guidelines 4930-4933 show the user the original position and orientation of the automatically identified region 434. Second, when a user moves, rotates, or resizes the manual selection tool 4326, the extension of the guidelines 4930-4933 past the boundaries of the region allow a user to identify places that are offset from the region 434 by right angles to the region. The guidelines show where the manual selection tool 4326 is relative to the region 434. For example, if the user moves manual selection tool 4326 up along the guidelines 4932, then the sides of the manual selection tool 4326 will remain aligned with the sides of region 434. A user can, for example, align the manual select tool with guidelines 4932 to select the entire top half of region 434.

In some embodiments, the manual selection tool 4326 snaps to the guidelines when it gets close to them. The snapping feature allows a user to easily move the manual selection tool to a position at right angles to the original position. The snapping feature also helps to restore parameters of the manual selection tool to their original values after they have been changed. For example, in some embodiments, the snapping feature helps a user to resize a manual selection tool to its original length or width. In some embodiments, the snapping tool helps the user return the manual selection tool to its original position or orientation.

Figure 50:
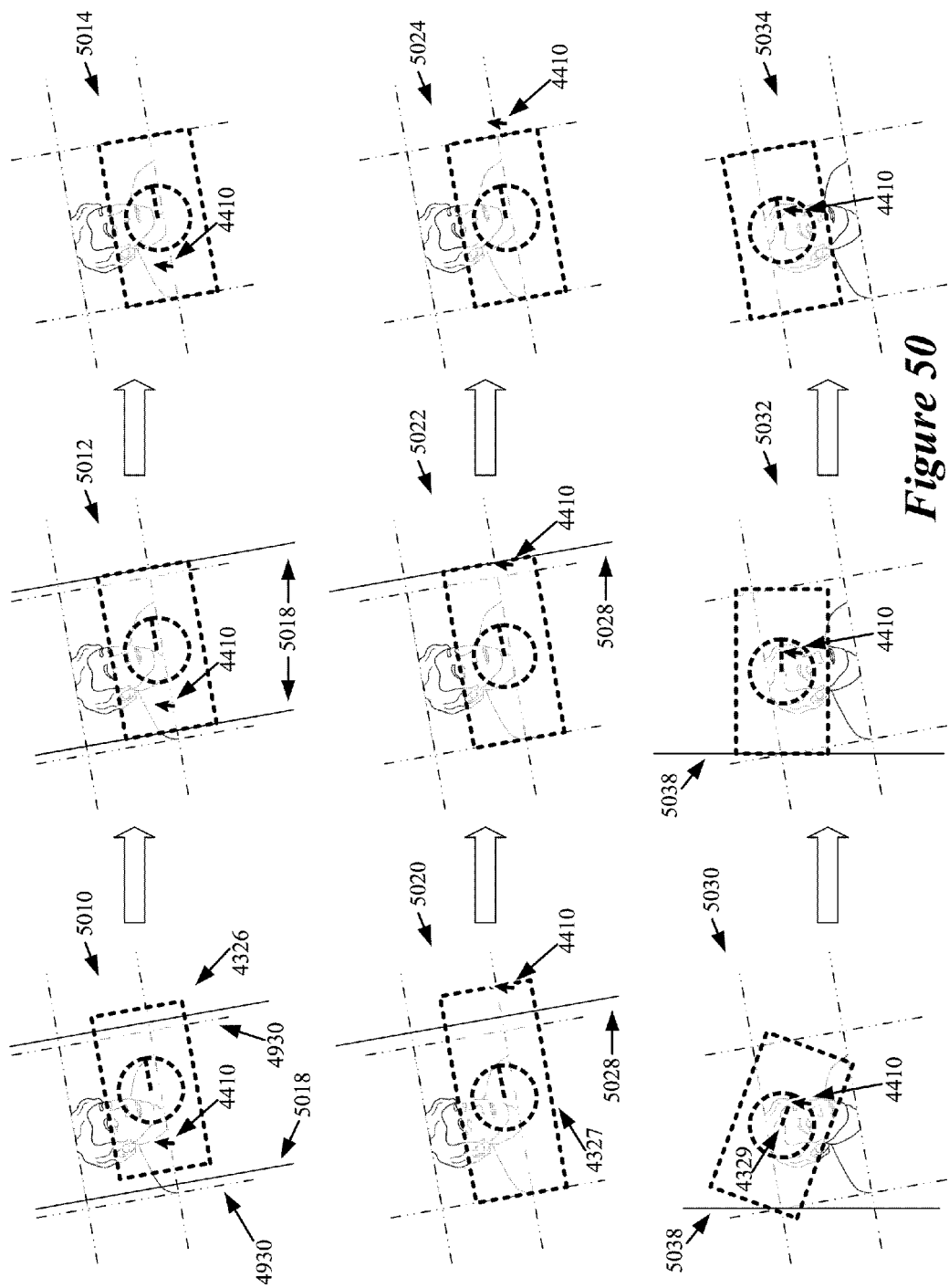
FIG. 50 illustrates the snapping features of some embodiments.

FIG. 50 illustrates the snapping features of some embodiments. The snapping features causes manual selection tool operations that come close to matching parameters set by the guidelines to snap to exactly match the parameters set by the guidelines. The figure illustrates nine stages 5010, 5012, 5014, 5020, 5022, 5024, 5030, 5032, and 5034. Stages 5010, 5012, and 5014 show a snapping feature that activates while a user moves the manual selection tool 4326. Stages 5020, 5022, and 5024 show a snapping feature that activates while a user resizes the manual selection tool 4326. Stages 5030, 5032, and 5034 show a snapping feature that activates while a user rotates the manual selection tool 4326.

The operation of the snapping features will now be described in relation to the stages 5010-5034. As mentioned above, stages 5010-5014 show the snapping feature during a movement operation. The movement related snapping feature is triggered by the proximity of the manual selection tool 4326 to the guidelines. In stages 5010-5014, the user drags the manual selection tool 4326 with the cursor 4410. The manual selection tool 4326 moves progressively closer to the guidelines 4930 until it reaches a proximity that triggers the snapping feature. The proximity at which the snapping feature activates is shown in stages 5010-5012 by proximity lines 5018. In stage 5010, the edges of the manual selection tool 4326 nearest to each of the guidelines 4930 are still farther away from the guidelines than the proximity lines 5018 are, therefore the snapping function is not triggered. In stage 5012, the manual selection tool 4326 reaches the proximity lines 5018 and the snapping feature is triggered. Without further dragging of the manual selection tool 4326 by the user, the manual selection tool 4326 snaps to the guidelines, as shown in stage 5014.

Stages 5020-5024 show the snapping feature during a resizing operation. The resizing related snapping feature is triggered by the proximity between a guideline and the edge (or corner) being dragged. In stages 5020-5024, the user drags the right edge of border 4327 with the cursor 4410. The edge of border 4327 moves progressively closer to the right side guideline 4930 until it reaches a proximity that triggers the snapping feature. The proximity at which the snapping feature activates is shown in stages 5020-5022 by proximity line 5028. In stage 5020, the moving edge of the border 4327 is still farther away from the nearest guideline 4930 than the proximity line 5028 is, therefore the snapping function is not triggered. In stage 5022, the border 4327 reaches the proximity line 5028 and the snapping feature is triggered. Without further dragging of the border 4327 by the user, the border snaps to the guidelines 4930, as shown in stage 5024.

Stages 5030-5034 show the snapping feature during a rotation operation. The resizing related snapping feature is triggered by the proximity and angular proximity between a guideline and an edge of a rotating manual selection tool 4326. In stages 5030-5034, the user drags the handle 4329 with the cursor 4410. The edge the manual selection tool 4326 moves progressively closer to alignment with the right side guideline 4930 until it reaches a proximity that triggers the snapping feature. The proximity at which the snapping feature activates is shown in stages 5030-5032 by proximity line 5038. In stage 5030, the moving edge of the rotating manual selection tool 4326 is still farther away from the nearest guideline 4930 than the proximity line 5038 is, therefore the snapping function is not triggered. In stage 5032, the edge of the rotating manual selection tool 4326 reaches the proximity line 5038 and the snapping feature is triggered. Without further dragging on the handle 4329 by the user, the manual selection tool 4326 snaps into alignment with the guidelines 4930, as shown in stage 5034.

Though the snapping features in this figure were illustrated with proximity lines, some embodiments do not visibly display proximity lines. In some embodiments, the snap features activate after the cursor 4410 is released. That is, the user moves/resizes/rotates the manual selection tool 4326 into the proper proximity and then releases the cursor 4410 to activate the relevant snap feature. In some embodiments, the snap features can be activated by a GUI item, a keyboard key, or a combination of keyboard keys. In some embodiments the snap features can be temporarily turned on or off. For example, some embodiments deactivate the snap features while a user holds down a particular set of keyboard keys and reactivates the snap features when the set of keys are released. In some embodiments, the snapping tool only affects the parameter being modified. For example, when the user is rotating the manual selection tool 4326, the snap feature can rotate the manual selection tool 4326, but cannot move the manual selection tool 4326 laterally.

D. Overriding Automatically Selected Scan Parameters

This section describes manual adjustments to the automatically selected scan parameters. As mentioned above, when the user selects an automatically detected region for editing, the automatically selected scan parameters for that region are displayed as settings on the controls in control area 130.

As described in section II, some embodiments automatically select scan parameters for automatically identified regions. The automatically selected scan parameters act as default parameters for subsequent detailed scans of the identified regions. Some automatically selected scan parameters affect the performance of the detailed scan itself. For example, the scan resolution parameter determines how many dots per inch the scanner will produce. Other scan parameters affect the processing of the images after a scan is performed. For example, scan output format parameters determine the image format in which the image capture application will save the detailed scan. Some embodiments provide the user with various types of scanner controls to manually override the automatically selected scan parameters. Some examples of controls for performing manual overrides for various types of parameters are described below in reference to FIGS. 51 and 52.

Figure 51:
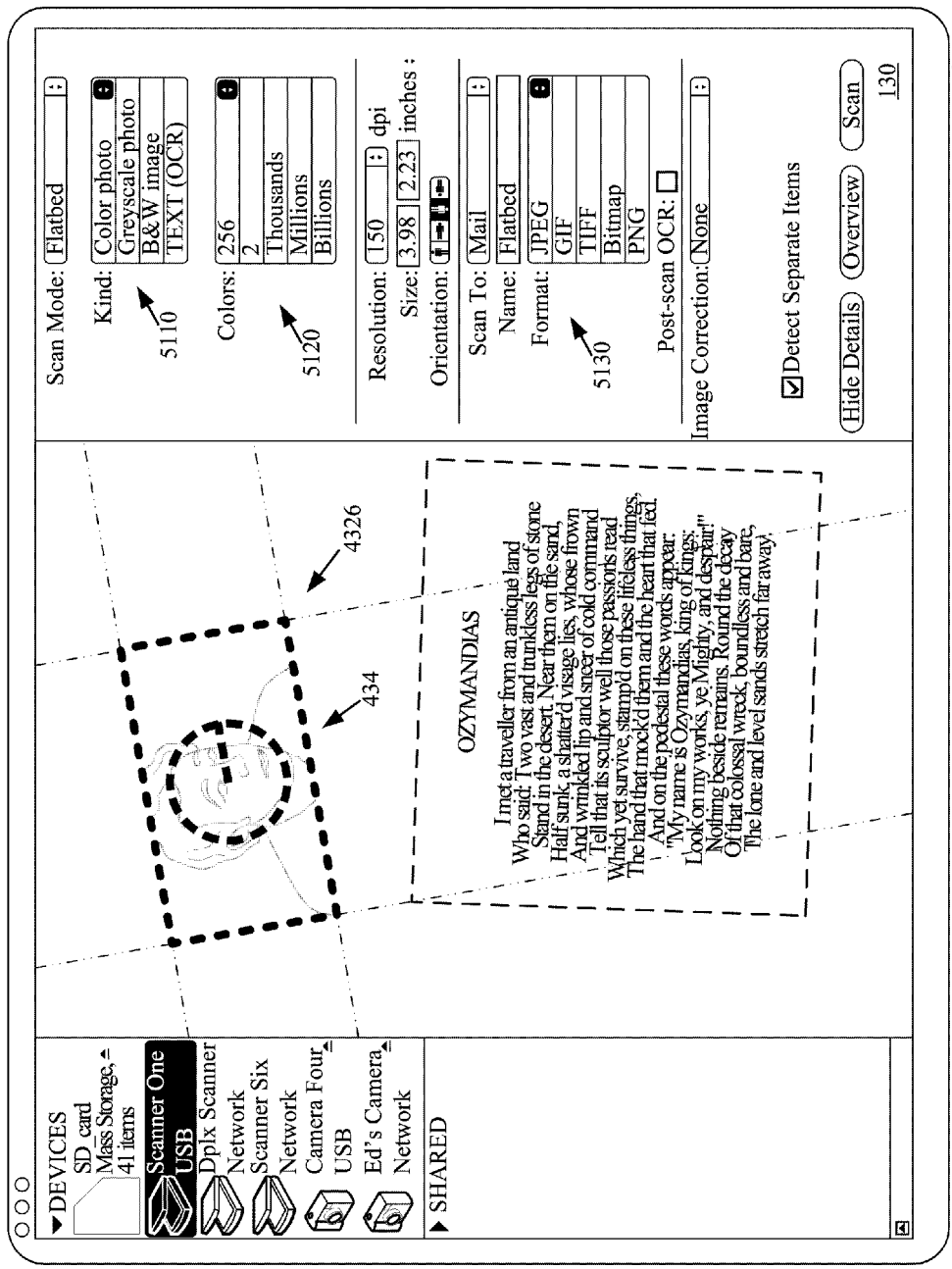
FIG. 51 illustrates adjustable menu controls that are set to automatically selected options.

FIG. 51 illustrates adjustable menu controls that are set to automatically selected options. The menu controls list multiple options that a user can select to override the automatically selected parameters. FIG. 51 includes image type menu 5110 (displayed with the control name "kind"), color number menu 5120, and output format menu 5130. The image type menu 5110 allows a user to select what type of image (e.g., color or grayscale image) the image capture application will treat the selected region as during a detailed scan. The color number menu 5120 allows a user to select the number of bits used to represent the color (or grayscale luminance) of each pixel the scan will produce. The output format menu 5130 allows a user to select the image format in which the scanned images will be saved.

As mentioned above, the scanner controls of FIG. 51 are set to the automatically selected parameters. The way in which the parameters are displayed depends on the type of control that the GUI provides for that parameter. In this figure, controls 5110-5130 are menu controls. Menu controls present a set of options to a user in the form of a list (or menu). In some embodiments, the options are only displayed when the menu control is selected. When the options are displayed, the top listed option of a particular menu can represent the current setting of that particular menu control, while the lower items on the menu represent other available settings of the menu control. As mentioned, the controls in this figure are set to the automatically selected parameters, therefore the top menu options of menus 5110-5130 are the automatically selected parameters for the selected region. A user could change the selected parameters using menu controls 5110-5130 (e.g., by clicking on a menu option other than the top listed option). The specific settings and functions of the individual menus are described below.

The image capture application has identified item 434 as a color photo. Therefore, the image type menu 5110 is set to "color photo". The image type menu 5110 affects how raw data is gathered by the scanner. For example, when the color photo menu option is selected, the scanner gathers both chrominance and luminance data about the image and encodes them using the color number set in color number menu 5120. In contrast, when the grayscale photo menu option is selected, the scanner gathers luminance information about the image, but not chrominance information, and encodes the luminance information using the color number set in color number menu 5120. If the user wants to scan the photograph in grayscale, the user can select the "grayscale" option of menu control 5110 to override the image capture application's selection of the "color photo" option.

The image capture application has chosen 256 colors as the default color number for a future scan of region 434. Therefore, the color number menu is set to 8-bits. Color number menu 5120 determines how many bits to use to encode the color data of each pixel the scanner generates. The color number menu 5120 affects the detailed scan itself. The image capture application commands the scanner to use a particular color number, which affects what data the scanner will capture. If the user wants more color number, the user can select the "thousands", "millions", or "billions" options of menu control 5120 to override the image capture application's selection of 256 colors.

The image capture application has chosen to save the image to a .jpg file. Therefore, the format menu 5130 is set to "JPEG". In some embodiments, the image capture application receives raw data from the scanner and saves the data in format specified by the format menu 5130. In some embodiments, the image capture application commands a scanner to provide the data in the format specified by the format menu 5130 rather than as raw data.

The output format menu 5130 controls the format in which the image capture application will output the image. Some scanners convert images to a selected format themselves, however for some models of scanner the conversion of raw image data to a particular format is performed entirely by the image capture application. That is, the image capture application receives raw image data from the scanner and saves the data in the selected format after (or while) the raw image data has been received from the scanner. Only the post-scan processing of the data is affected by the output format menu 5130, not the data from the scanner itself. If the user prefers not to use the .jpg format, the user can select the "GIF", "TIFF", or other format option of format menu 5130 to override the image capture application's selection of the .jpg format.

In some embodiments, some menu controls are sliders. A slider control includes a line and a knob on that line. The line represents the available range of values for that parameter, and the position of the knob selects from among those values. The user slides the knob back and forth to change the values. In some embodiments, some menu controls are check boxes. A check box is control that toggles between to state, usually the on state and the off state for a particular option.

Figure 52:
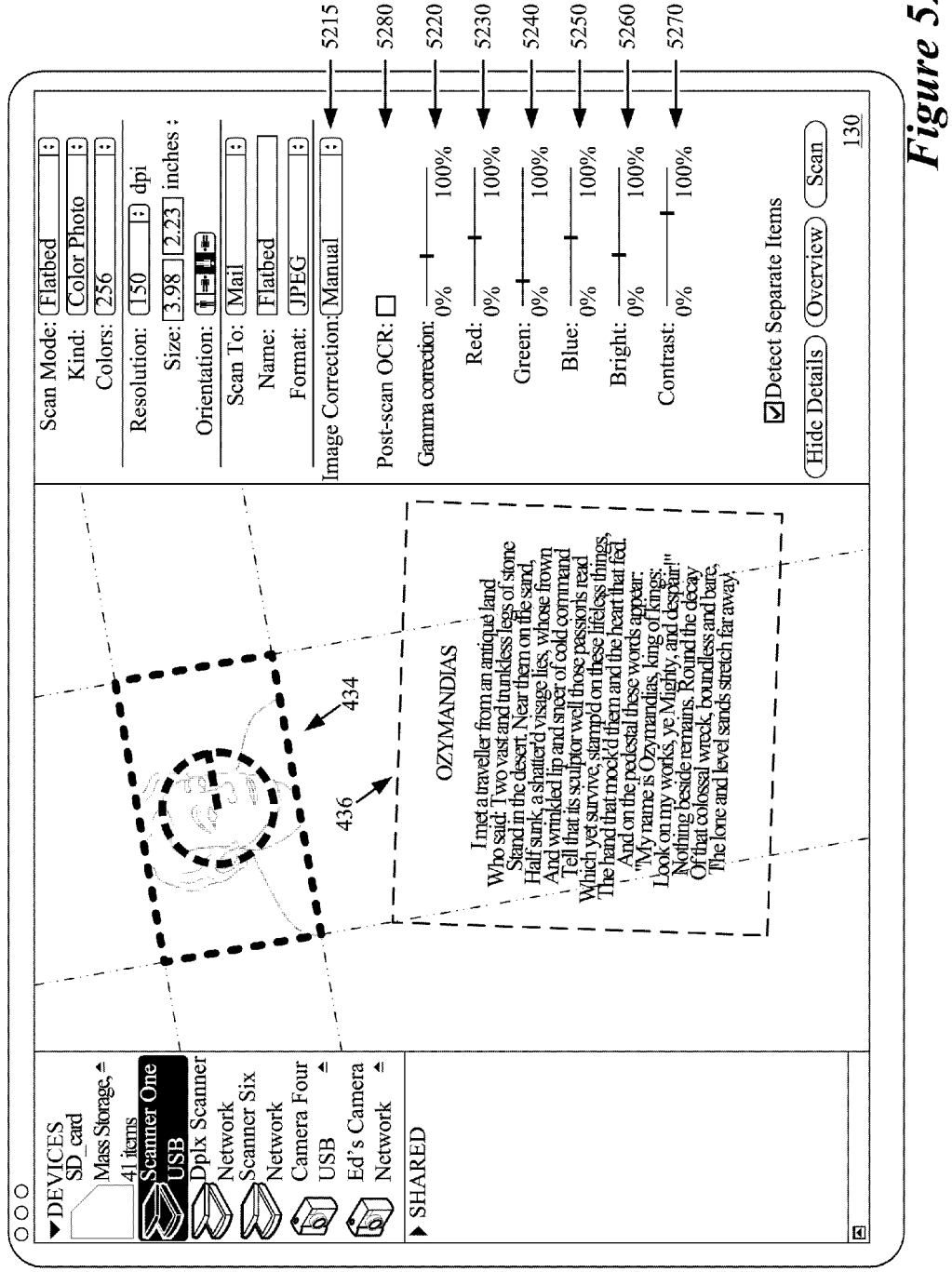
FIG. 52 illustrates a GUI with sliders and a check box set to automatically determine scan parameters.

FIG. 52 illustrates a GUI with sliders and a check box set to automatically determine scan parameters. The sliders represent a range of values that a user can select to override the automatically selected parameters. The sliders adjust various image processing parameters. FIG. 52 includes image correction mode control 5215, gamma correction slider 5220, red level slider 5230, green level slider 5240, blue level slider 5250, bright slider 5260, contrast slider 5270, and post-scan OCR checkbox 5280. Image correction mode control 5215 determines whether the image capture application will apply any image corrections to detailed scanned images. Gamma correction slider 5220 receives commands to adjust the gamma correction level of the image. Red level slider 5230, green level slider 5240, and blue level slider 5250 receive adjustments to the prominence of the red, green and blue levels in the image. Bright slider 5260 receives commands to adjust the luminance of the pixels of the image. Contrast slider 5270 receives commands to adjust the contrast levels of the image. Post-scan OCR checkbox 5280 determines whether an optical character recognition process will be applied to the scanned data after the scan.

Some embodiments provide controls that cause other controls to manifest. In this figure, image correction mode control 5215 provides options to set the image correction to "none", "manual", or "automatic". When, as here, image correction mode control 5215 is set to manual, the GUI provides image correction sliders 5220-5270.

As mentioned above, the scan parameters of the selected region are displayed as settings of the controls in control area 130. In this figure, image correction sliders 5220-5270 are set to the parameters automatically selected for the region containing item 434. The illustrated image correction sliders 5220-5270 change the chrominance and luminance values of the pixels in the scanned images. The user may adjust these sliders 5220-5270 by dragging the knobs on the sliders to override the image capture application's automatically selected values for these image correction parameters.

To help the user decide what values to set on the image correction sliders 5220-5270, some embodiments provide a preview of the effects of changes to these values. In some such embodiments, the image correction parameters are applied to the selected region in the scan display area to provide the user with a preview of the effects that various adjustments will have on the detailed scan of that particular region.

As mentioned above, some automatically determined parameters are displayed on controls that are toggles in the form of checkboxes. In FIG. 52, the OCR checkbox 5280 determines whether to apply an optical character recognition algorithm to the scanned image. The OCR checkbox 5280 is not checked for item 434, because the image capture application has chosen not to perform a post-scan OCR on an item that has no text in it. In the case of textual item 436, the OCR check box 5280 would be automatically checked. The user can click on the checkbox 5280 to check or uncheck and thus override the automatically determined post-scan OCR parameter.

Figure 53:
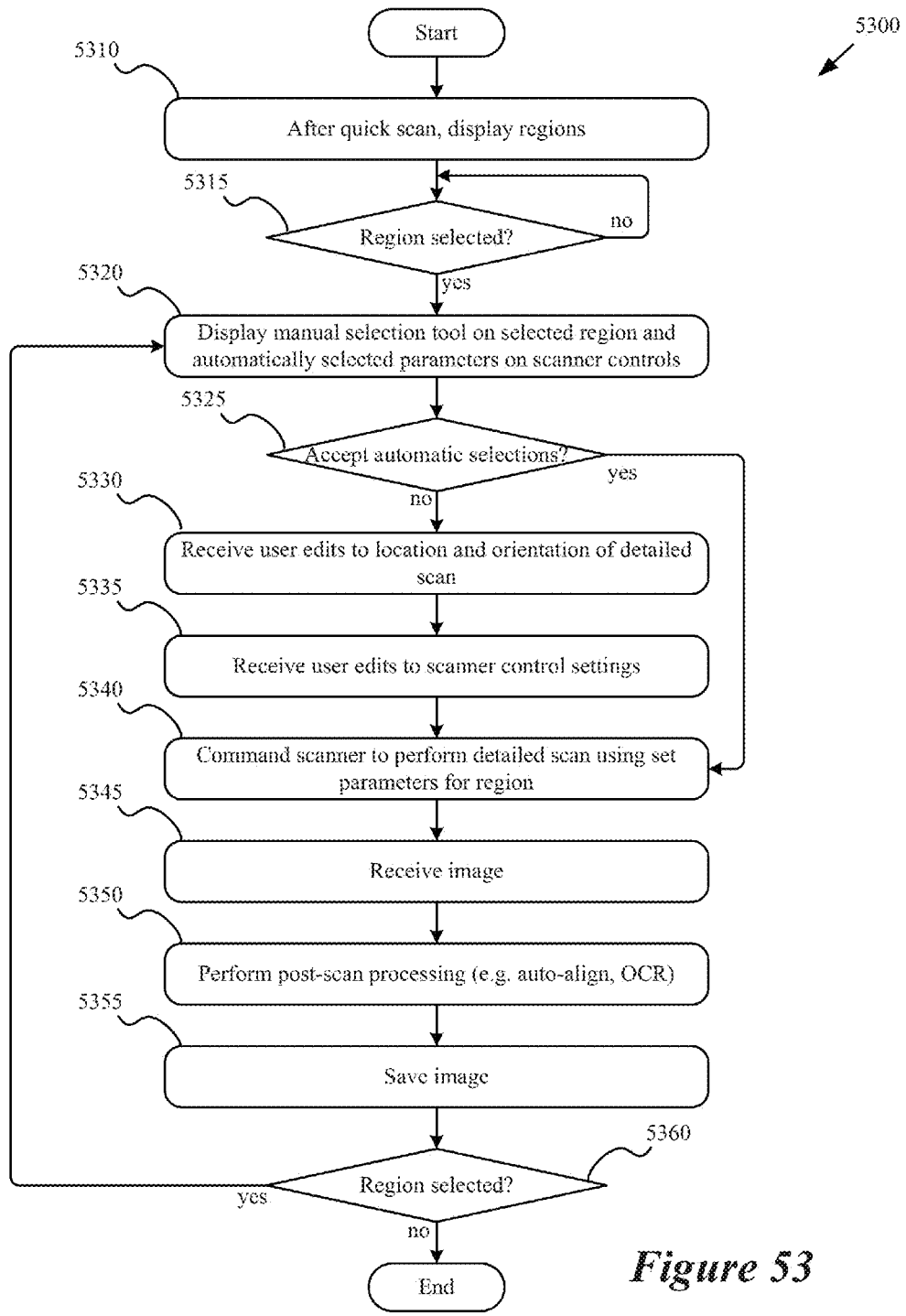
FIG. 53 conceptually illustrates the process of some embodiments for receiving manual adjustments to automatically identified regions and scanning parameters.

The above described manual override operations of the image capture applications of some embodiments can be performed by various processes. One such process is described below. FIG. 53 conceptually illustrates the process 5300 of some embodiments for receiving manual adjustments to automatically identified regions and scanning parameters. The process receives commands from a user and commands a scanner to perform various scans. Several figures described before FIG. 53 provide examples of the states of GUIs of some embodiments during the operations of process 5300. The description of FIG. 53 will note the figures associated with the various operations.

Some embodiments provide a user with manual scan options after directing a scanner to perform a preview scan, receiving a preview image from the scanner, and performing an automatic region decomposition operation that provides an initial identification of one or more separate regions in the scan document. The process 5300 begins after the preview scan when the process displays (at 5310) automatically identified regions that a user can select to activate manual editing tools. FIG. 47, described above, provides an example of a grouped region displayed for selection. FIG. 46, described above, provides an example of multiple separate regions displayed for selection.

The process then determines (at 5315) whether the user has selected one of the automatically identified regions. When the user has not selected an automatically identified region, the process waits until the user does select such a region. When the user does select such a region, the process provides (at 5320) editing tools that allow the user to adjust the identified regions by specifying the location, size, orientation, and scanner settings for one or more subsequent manual scan operations. FIG. 43, described above, provides an example of a GUI providing such editing tools.

The process then determines (at 5325) whether the user has accepted the automatic selections. In some embodiments, the process determines that the user has accepted the automatic selections when the user activates a manual control for performing a detailed scan without first editing the automatically selected parameters. When the process determines (at 5325) that the user has not accepted the automatic selections (e.g., by receiving a user command to edit the automatically selected parameters), the process receives (at 5330) user edits to the location, size, and orientation of the automatically identified scanning region. The edited region determines the location, size, and orientation of a pending detailed scan. FIG. 44, described above, provides an example of a series of user edits to the location, orientation, and size of a region.

The process then receives (at 5335) edits to the scanner control settings. The scanner control settings determine the scan parameters (e.g., resolution) for the pending detailed scan. They are automatically selected for each region by the image capture application after the preview scan. FIGS. 51 and 52, described above, provide examples of editable scanner control settings.

The process then receives (at 5340) a command to perform a detailed scan. The image capture application directs the scanner to scan the edited region using the edited scan parameters. The detailed scan is similar to the detailed scan described in section II. The process then receives (at 5345) a scanned image from the scanner. The process then performs (at 5350) any post scan processing that is required by the settings of the scan parameters (e.g., OCR, changing file formats, etc.). In some embodiments, the post-scan processing includes extracting a selected region from a larger set of image data provided by the scanner, as described in relation to FIG. 11 in section I. The process then saves (at 5355) the processed image. In some embodiments, saving the image includes forwarding the image to a selected application after it has been scanned, as described in relation to FIG. 8. The process then determines (at 5360) whether another region has been selected. When another region has been selected, then the process returns to operation 5320 and displays the manual selection tool on the new region. When another region has not been selected, the process 5300 ends.

While the above described process 5300 includes operations in a particular order, one of ordinary skill in the art will realize that in some embodiments these operations are performed in other orders, or in some cases skipped. For example, a user could choose to edit the scanner control settings and choose not to edit the location, orientation, or size of the scanning region. Similarly, in some embodiments, after a detailed scan is performed, the process will wait for another region to be selected or for some other action to end the process rather than simply ending if another region is not selected. As mentioned above, the following figures provide examples of the manual override features of some embodiments.

IV. Software Architecture

A. Application Architecture

In some embodiments, the image capture application runs as multiple separate modules on a single computer. Some embodiments run three separate types of modules: (1) a device module (in some embodiments, this is a driver) that launches when an image capture device associated with that module is connected to the computer, (2) a high level image capture client, and (3) an image capture extension that runs in the background and provides connections between the device modules and the high level applications.

Figure 54:
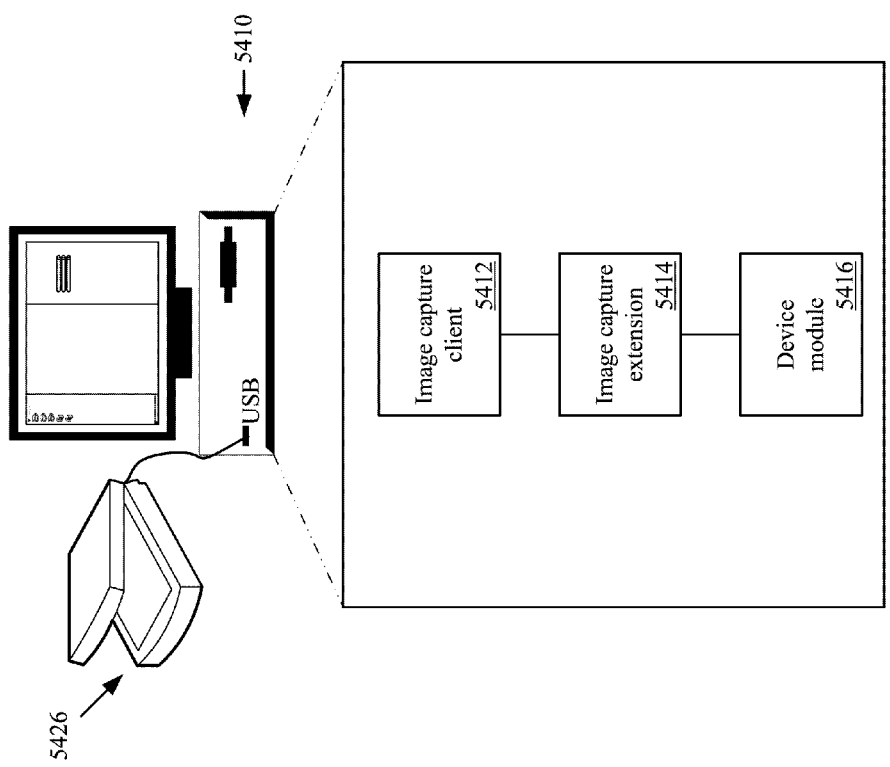
FIG. 54 illustrates the software architecture of some embodiments.

FIG. 54 illustrates the software architecture of some embodiments. The architecture provides separate modules for performing different types of operations. The figure shows computer 5410 and scanner 5426. Image capture client 5412, image capture extension 5414, and device module 5416 are executing on computer 5410. Scanner 5426 is an image capture device attached to computer 5410. Device module 5416 provides an interface between image capture extension 5414 and scanner 5426. Image capture client 5412 controls the user interface and other high level functions of the architecture. Image capture extension 5414 provides connections between device modules (in this figure, device module 5416) and image capture clients (in this figure, image capture client 5412).

Figure 57:
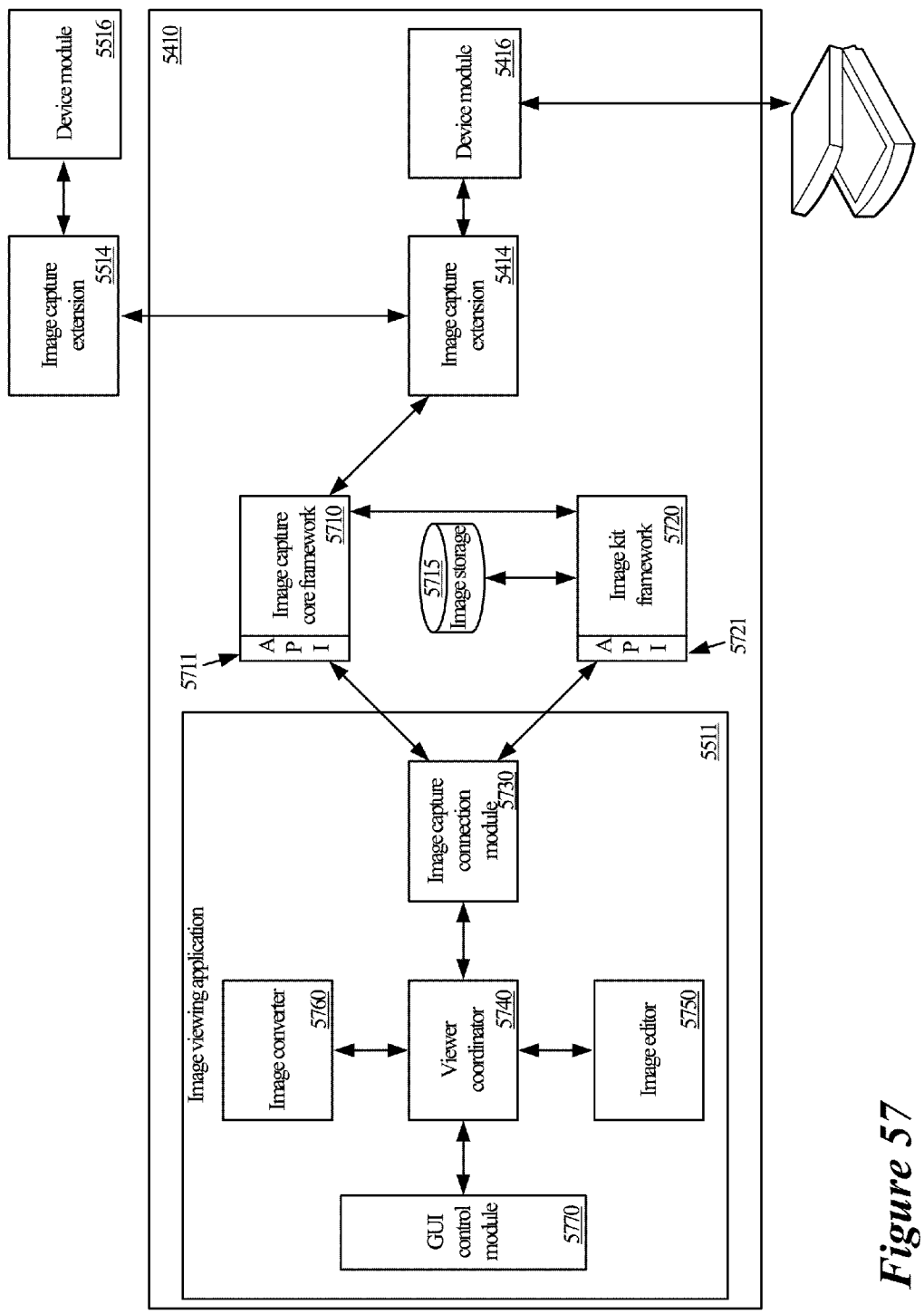
FIG. 57 conceptually illustrates an example of an application accessing a scanner through APIs of frameworks.

In some embodiments, the image capture client 5412 could be an application provided by the same entity (e.g., a computer company) that produces the image capture extension 5414. Alternatively, the image capture client could be a third party application that uses application programming interfaces (APIs) provided by the entity that produces the image capture extension 5414. The third party application that uses the APIs can be a word processor, an image viewer, an image editor, a spread sheet, a web browser, or any other types of application. The APIs enable applications produced by third parties to work with the attached devices through image capture extension 5414. A third party application using APIs of some embodiments is illustrated in FIG. 57, described below.

In FIG. 54, the device module 5416 is programmed by the makers of the image capture devices (or a third party programmer). In some embodiments, the makers of the image capture extension 5414 provide APIs to the makers of image capture devices. The makers of the image capture devices use the APIs to program device modules. The APIs enable the device modules to interface with the image capture extension 5414. Device module 5416 is the device module associated with scanner 5426. Accordingly, in some embodiments the device module 5416 launches automatically when scanner 5426 is connected to computer 5410.

The image capture extension 5414 runs in the background (without an interface visible to the end-user of the image capture clients). The image capture extension 5414 provides connections between device module 5416 and the image capture client 5412. In the image capture architecture, image capture extension 5414 acts as an intermediary between device modules and image capture clients. This relieves the programmers of image capture client 5412 from having to program their applications to work with individual devices such as scanner 5426.

In some embodiments, the image capture clients, extensions, and device modules are all executed as separate processes. Running the modules as separate processes makes it possible to dynamically add device modules to the architecture (e.g., when new image capture devices are connected.) The separation of the processes also allows multiple image capture clients and multiple device modules to use the same image capture extension and access device modules on separate computers. Some examples of such connections are illustrated in FIG. 55.

Figure 55:
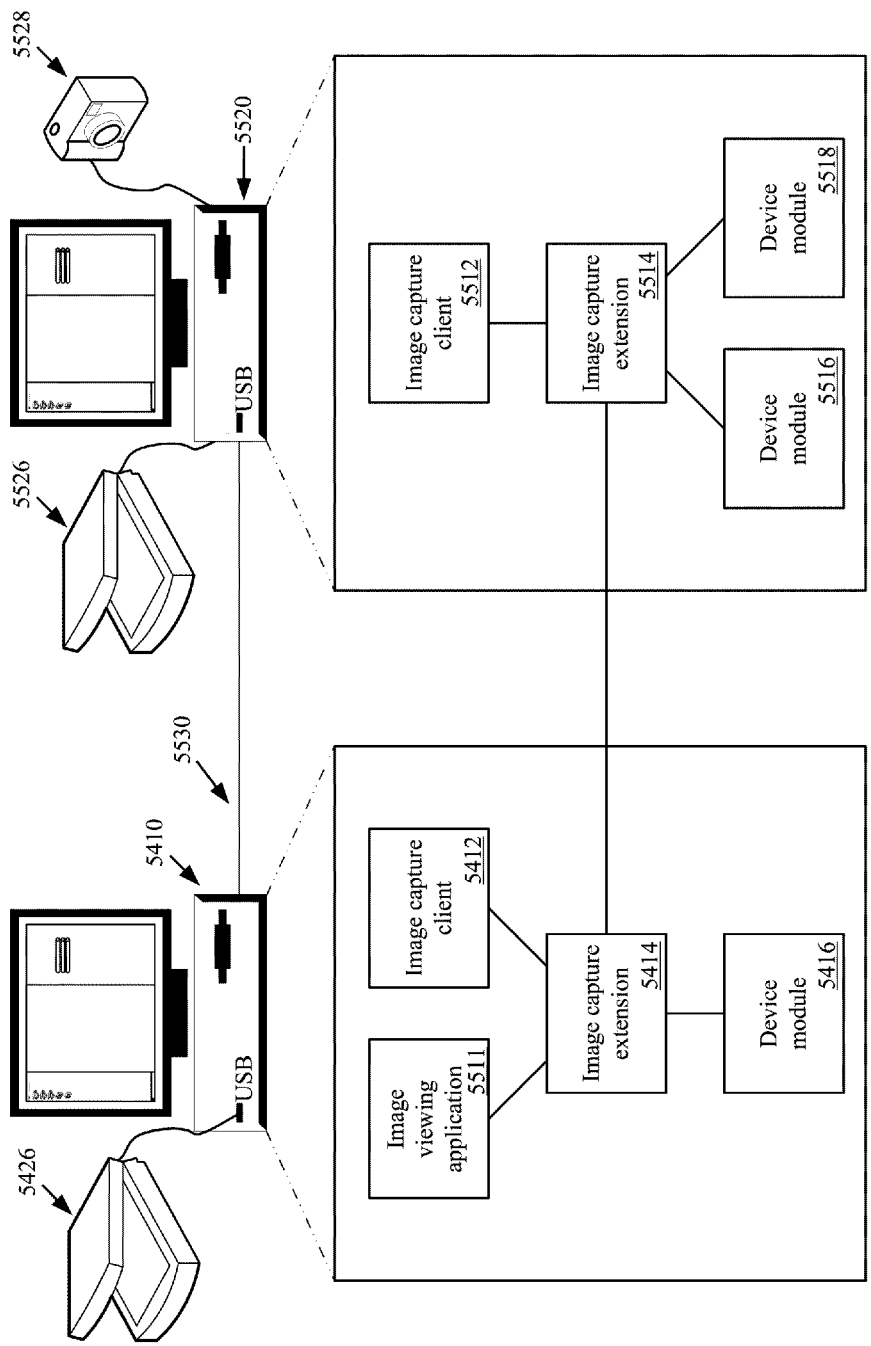
FIG. 55 conceptually illustrates an image capture architecture with multiple connections.

FIG. 55 conceptually illustrates an image capture architecture with multiple connections. The image capture architecture allows multiple applications on one computer to access multiple devices, including devices connected to another computer. This figure illustrates computer 5520, scanner 5526, camera 5528, and network 5530. The computers 5410 and 5520 are connected through network 5530. As shown in FIG. 55, computer 5410 is executing an image viewing application 5511 in addition to the modules shown in FIG. 54. The modules executing on computer 5520 include an image capture client 5512, an image capture extension 5514, and device modules 5516 and 5518.

Scanner 5526 and camera 5528 are image capture devices connected to computer 5520. Image viewing application 5511 is an application that accesses image capture devices through the image capture extension 5414. Image capture client 5512 is a copy of image capture client 5412. Image capture extension 5514 is a copy of image capture extension 5414. Device module 5516 controls scanner 5526. Device module 5518 controls scanner 5528.

The architecture allows multiple applications to access devices attached to the computer the applications are executing on. Image capture client 5412 and image viewing application 5511 are both connected to image capture extension 5414 at the same time. That is, both applications 5412 and 5511 interface with the image capture extension 5414 with copies of APIs provided by the makers of the image capture extension 5414. The image capture extension 5414 allows both applications to connect to device module 5416. In some embodiments, both applications can use the scanner 5426 at the same time. In other embodiments, the scanner 5426 is provided as a selectable device to both applications at the same time, but when one application actually begins to use the scanner 5426, the other application is unable to use the scanner 5426.

The architecture allows one application to access multiple devices. In this figure, image capture client 5512 has simultaneous access to scanner 5526 and camera 5528 through (1) the interface between image capture client 5512 and image capture extension 5514 and (2) the interfaces between the image capture extension 5514 and the device modules 5516 and 5518.

The architecture allows multiple applications to access multiple devices attached to a computer connected to the computer the applications are executing on. As shown in the figure, applications 5511 and 5412 can access scanner 5526 and camera 5528 over the network connection 5530. Specifically, image capture extension 5414 on computer 5410 interfaces with image capture extension 5514 on computer 5520. Through that interface and the interfaces between image capture extension 5514 and device modules 5516 and 5518, the image capture client 5412, and image viewing application 5511 can access the device modules 5516 and 5518, which control scanner 5526 and camera 5528. Similarly, image capture client 5512 can access scanner 5426 through (1) image capture extension 5514, (2) image capture extension 5414, and (3) device module 5416.

Figure 56:
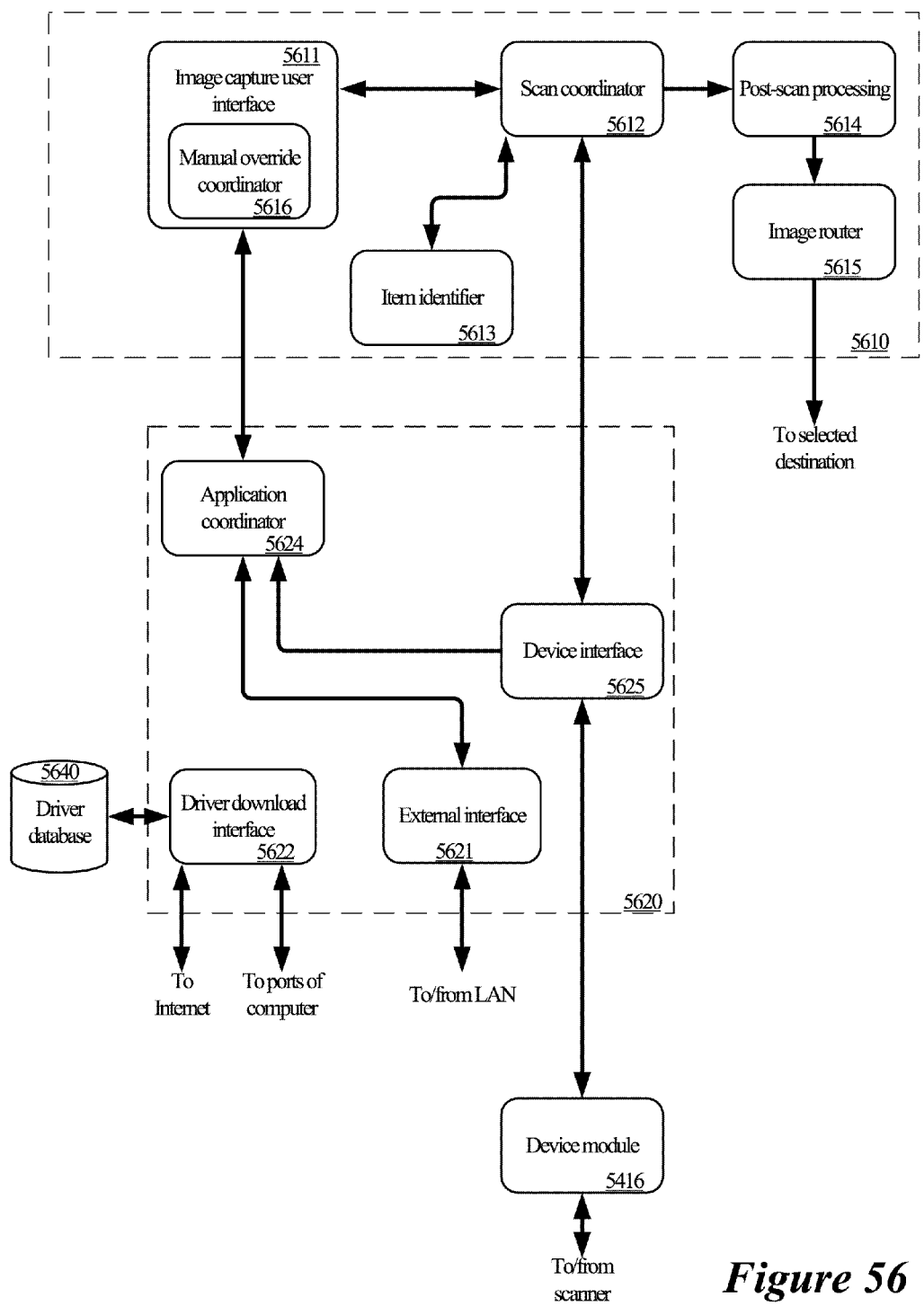
FIG. 56 illustrates client module group extension module group, and driver database.

Some embodiments implement some of the above described modules as sets of more specialized modules. FIG. 56 conceptually illustrates the software architecture of some embodiments with multiple specialized modules. The specialized modules perform particular operations that collectively implement the features of some embodiments of the image capture application described herein.

FIG. 56 illustrates client module group 5610, extension module group 5620, and driver database 5640. Client module group 5610 includes image capture user interface 5611, scan coordinator 5612, item identifier 5613, post-scan processing module 5614, image router 5615, and manual override coordinator 5616. Extension module group 5620 includes external interface 5621, driver download interface 5622, application coordinator 5624, and device interface 5625. Driver database 5640 is a storage location for device modules.

Client module group 5610 represents one possible arrangement of modules that perform the operations of image capture client 5412 in FIG. 54. Image capture user interface 5611 provides the GUI of some embodiments and receives commands from users though the UI. Scan coordinator 5612 manages the preview scans and detailed scans. Item identifier 5613 determines which regions of a scanner glass contain items and identify the type of content in each region. Post-scan processing module 5614 performs operations that modify scanned images after they are received by the image capture application. Image router 5615 sends images to the external applications selected to receive them. Manual override coordinator 5616 receives adjustments to parameters for detailed scans automatically selected by the image capture application. One of ordinary skill in the art will realize that module group 5610 is a conceptual group and that it does not necessarily reflect any actual item in the software. Group 5610 is merely one possible example of a set of modules that implement the image capture client 5412.

Module group 5620 represents one possible arrangement of modules that perform the operations of image capture extension 5414 in FIG. 55. External interface 5621 detects image capture extensions running on other computers of local network and detects scanners connected to the network. Driver download interface 5622 retrieves device modules (sometimes called "drivers") for newly detected image capture devices. Application coordinator 5624 provides data to the image capture user interface. Device interface 5625 provides an interface between the image capture application and the device module 5416. One of ordinary skill in the art will realize that the particular set of modules in FIG. 56 is merely one example of a set of modules that implement the image capture extension 5414.

The image capture user interface 5611 provides a GUI to allow interaction between the image capture application and a user. In some embodiments, the GUI is one of the GUIs described in section I. The GUI can receive a selection of a scanner and commands to perform a scan with that scanner. When the GUI receives a command to perform a scan, the image capture user interface 5611 activates the scan coordinator 5612. The scan coordinator 5612 then performs the required scan by commanding device interface 5625 to perform the scan. Device interface 5625 commands the device module 5416 to have the scanner perform the scan. The data from the scan is then passed back along the same route to the scan coordinator 5612.

If the commanded scan is a preview scan, the scan coordinator will send the preview scan data to item identifier 5613. Item identifier 5613 will then determine what regions of the glass contain images (in some cases separate images, in other cases groups), the nature of those images is (e.g., color or black and white), and the optimum scan parameters to apply to those images in a subsequent detailed scan.

The scan coordinator 5612 then provides the scan data and optimized scan parameters to the image capture user interface 5611, which in some embodiments displays the data to the user. In a manual scan mode, the image capture user interface 5611 accepts manual adjustments to the scan parameters through the manual override coordinator 5616.

If a detailed scan is commanded, the image capture user interface 5611 commands the scan coordinator 5612 to perform the detailed scan using the set parameters (location, resolution, etc). The command passes along through the device interface 5625 and device module 5416 to the scanner and the scan data returns will return back along the same route. The scan coordinator 5612 will then send the detailed scan data to the post-scan processing module 5614 for any necessary processing (image formatting, color adjustment, OCR, etc.), after which the processed image passes to the image router 5615 to be sent on to whatever application the user has specified. In some embodiments, the image router supplies scripts to the applications to command them to perform specific actions with the images (e.g., a script to a mail application could say to open a new e-mail with the image as an attachment). In some embodiments the image capture user interface 5611 sends the destination data directly to the image routing module 5615.

When an image capture device is initially connected to a port of the computer, the driver download interface 5622 determines whether there is a driver/device module for that image capture device in the driver database. In some embodiments if there is no locally available driver, the driver download interface 5622 downloads a driver/device module from the Internet (or from a driver disk or other source) for the new image capture device. The new driver/device module is then stored in driver database 5640. The driver/device module executes (e.g., like device module 5416) whenever the scanner is plugged into the computer. Some embodiments do not provide a driver download interface and instead rely on a driver download interface that is part of a separate application or part of the operating system.

One of ordinary skill in the art will realize that the modules in FIG. 56 are only one example of modules for implementing some embodiments. Other embodiments may provide individual modules that perform multiple operations attributed to multiple modules in FIG. 56. Similarly, some embodiments may provide multiple modules to perform operations depicted as being performed by a single module in FIG. 56. Also, some embodiments may provide different connection schemes for the modules of those embodiments. The application architecture shown in FIG. 56 includes a single image capture client that performs many image capture operations using modules that are part of the image capture client. However, some embodiments provide modules outside of the image capture client to perform such functions. These modules are grouped together in frameworks (sometimes called "libraries") that perform various image capture operations. In such embodiments, the image capture client interfaces with the frameworks using APIs and the frameworks handle the image capture operations. An image capture application with the same modules shown in FIG. 56 could be implemented as a client connected to external frameworks. An example of an embodiment that displays external frameworks is provided below.

B. Application Programming Interfaces

As mentioned above, in some embodiments an image capture client uses APIs to interface with frameworks that perform image capture operations (e.g., preview scans, manual scans, etc.). In such embodiments, the frameworks are accessible to clients from a variety of parties and that perform a variety of functions. For example, the image capture client of such embodiments could be programmed either by the same programmers as the frameworks, or by a third party with access to the APIs of the frameworks. In such embodiments, a client application could be another image capture application, an image viewing application, an image editing application, an e-mail application, a word processing application, or any other type of application whose programmers choose to access the functionality of the frameworks.

The APIs enable a form of black-box programming. The third party application acts as a front end and provides a user interface and a certain amount of functionality. An image capture engine that controls the scanners is provided in some embodiments. The third party application passes commands to the APIs of the image capture engine to cause the image capture engine to perform operations that control the scanners. The APIs enable applications produced by third parties as well as additional applications from the entity that produced the APIs to work with the attached devices without worrying about the internal mechanics of the image capture engine.

FIG. 57 conceptually illustrates an example of an application accessing a scanner through APIs of frameworks. In some embodiments frameworks are libraries of one or more files that contain modularized functions that are accessible through APIs that determine the expected inputs and outputs of the modularized functions. The frameworks and their APIs allow an application to supply a GUI that takes advantage of an image capture engine supplied separately. FIG. 57 includes an image capture core framework 5710 with APIs 5711, an image storage 5715, an image kit framework 5720 with APIs 5721, an image capture connection module 5730, a viewer coordinator 5740, an image editor 5750, an image converter 5760, and a GUI control module 5770. In this embodiment, the image capture engine includes the frameworks 5710 and 5720, the APIs 5711 and 5712 of the frameworks, and the image capture extension 5414.

Image capture core framework 5710 provides information about and from scanners to the image viewing application 5511. The APIs 5711 provide an interface between the image capture connection module 5730 and the image capture core framework 5710. As shown in FIG. 57, the image capture core framework 5710 in some embodiments is the framework that communicates with the image capture extension 5414. Accordingly, in some embodiments, the framework 5710 provides a communication path that allows framework 5720 to communicate with image capture extension 5414. Image storage 5715 stores image data received from scanners. Image kit framework 5720 provides various predefined GUI areas to the image viewing application 5511. The APIs 5721 provide an interface between the image capture connection module 5730 and the image kit framework 5720. Image capture connection module 5730 sends and receives data to and from the frameworks 5710 and 5720 in a protocol understood by the frameworks. Viewer coordinator 5740 handles the general processes of the image viewing application 5511. Image editor 5750 receives directives from a user to modify images. Image converter 5760 changes images from one format to another. GUI control module 5770 displays the GUI of the image viewing application 5511.

The frameworks 5710 and 5720 take commands that are formatted as calls to APIs 5711 and 5721 from the image viewing application 5511 and perform the operations dictated by those commands. In some embodiments, a call to an API of framework 5710 or 5720 can result in further calls from framework 5710 or 5720 to APIs in framework 5710, 5720 or image capture extension 5414. In some embodiments, the image capture core framework 5710 handles commands that involve communication with the scanners (and other image capture devices). The image kit framework 5720 handles commands that supply prearranged layouts for placement in the GUI of the image viewing application 5511 and direct auto-scan and manual scan operations. The prearranged layouts in some embodiments include graphical elements and predefined interfaces to allow the placement of data from the image capture core framework 5710 in the prearranged layout. For example, a prearranged layout could include a GUI section for displaying identified image capture devices and interfaces that place icons in the section. That is, icons that represent scanners identified through the image capture core framework 5710. Some examples of prearranged layouts are provided in the figures described below.

The operations of a preview scan API will now be described by reference to the modules shown in FIG. 57. Some embodiments provide an API for a preview scan similar to the preview scans described in sections II and III. When a user directs the image viewing application 5511 to perform a preview scan (e.g., by clicking on a control in the GUI provided by GUI control module 5770), a chain of commands passes from one of the illustrated modules to another. Specifically, a command (potentially using a command format unique to the image viewing application 5511) passes from (1) the GUI control module 5770, to (2) the viewer coordinator 5740, to (3) the image capture connection module 5730. The image capture connection module 5730 then uses a scan-preview-API to command the image kit framework 5720 to perform the preview scan.

The image kit framework 5720, using a command format of the image capture engine, passes the command to perform a preview scan along another chain. The command is passed to (1) the image capture core framework #5710, to (2) extension 5414, to (3) the device module 5416, to (4) the scanner. The scanner then performs the requested preview scan and passes the scan data (1) to the device module 5416, to (2) the image capture extension 5414, to (3) the image capture core framework 5710, to (4) the image kit 5720, to (5) the image storage 5715. The image kit framework 5720 then sends data about the captured image, possibly including the captured image itself, to the image capture connection module 5730, using a scan-report-API. The image capture connection module 5730 passes the data to the viewer coordinator 5740, which passes the scan on to the appropriate module of the image viewing application 5511. For example, the scan data can be passed to the image converter 5760 to be saved in a specified format. Alternatively, the data can be passed to an image editor 5750 so that the user can edit the scanned image before saving it (with the image converter 5760). In some embodiments, the image kit does not save the image to an image storage 5715. In such embodiments the image is stored elsewhere or stored by other modules.

The preview scan API allows the image viewing application 5511 to command a preview scan without having any information about any of the modules further down the chain. Similarly, some embodiments supply other APIs that the image viewing application 5511 can use to command the image capture engine to perform various operations. Some examples of these APIs will be described below. For example, if an API in the image kit framework 5720 starts a chain of commands through multiple modules that ultimately causes a scanner to perform a scan, the API would be described as "commanding a scanner to perform a scan". Only the final destination of the command chains will be identified, but one of ordinary skill in the art will understand that the commands are passed through several modules (and may be retranslated by APIs of other modules) to reach their target.

As described above, some embodiments provide an API that commands the scanner to perform a preview scan. Some embodiments provide an API that commands the image capture core framework 5710 to find image capture devices, an example of such an API, ICDeviceBrowser.h, is listed in Appendix B. in section VIII.C. Some embodiments provide an API that commands the image kit framework 5720 to decompose a preview image into separate regions. Some embodiments provide an API that commands the scanner to perform a detailed scan of a particular region. Some embodiments provide an API that commands the image capture core framework 5710 or image kit framework 5720 to send an image captured from a detailed scan to a selected external application (not shown). Some embodiments provide an API that commands the image kit framework 5720 to supply a GUI control to the GUI control module 5770 that allows a user to select the destination application for a scanned image.

Some embodiments provide an API that commands the image capture engine to perform an auto-scan. The auto-scan API: (1) commands the scanner to perform a preview scan with the scanner; (2) commands the image kit framework 5720 to decompose the preview image into separate regions; (3) commands the image capture core framework 5720 to select scanning parameters for each region, (4) commands the scanner to perform a detailed scan of each region, and (5) commands the image kit framework 5720 to send the detailed scan data to a preselected application (e.g., an application selected by a GUI control supplied by image kit framework 5720). Some embodiments provide a set of preview scan APIs that each commands one or more of the above described auto-scan operations. Some embodiments provide a single API that activates multiple separate APIs that collectively perform an auto-scan operation.

Some embodiments provide APIs that commands the image capture engine to perform a manual scan. The manual scan APIs: (1) command the scanner (e.g., through image capture extension 5414, and device module 5416) to perform a preview scan; (2) command the image kit framework 5720 to decompose the preview image into separate regions; (3) command the image kit 5720 to select scanning parameters for each region, (4) command the image kit framework 5720 to provide GUI tools for editing the regions and scan parameters; (5) command the scanner to perform a detailed scan of each region, and (6) commands the image kit framework 5720 to send the detailed scan data to a preselected application (e.g., an application selected by a GUI control supplied by image kit framework 5720). Some embodiments provide a set of manual scan APIs that each directs one or more of the above described operations. Other embodiments provide a single API that directs all the manual scan operations. Some embodiments provide a single API that activates multiple separate APIs that collectively perform a manual scan operation.

As mentioned above, in some embodiments the image kit framework 5720 supplies GUI areas to the GUI control module 5770. Some embodiments provide an API (or a set of APIs) that commands the image kit framework 5720 to supply the GUI control module 5770 with a device selection area, an example of such an API, IKDeviceBrowserView.h, is listed in Appendix A in section VII.A. Some embodiments provide an API (or a set of APIs) that commands the image kit framework 5720 to supply the GUI control module 5770 with a scanner control area, an example of such an API, IKScannerView.h, is listed in Appendix A in section VII.B. Some embodiments provide an API that commands the image kit framework 5720 to supply the GUI control module 5770 with a single window that simultaneously displays a device selection area and a scanner control area. Some embodiments provide an API that commands the image kit framework 5720 to supply the GUI control module 5770 with a single window that simultaneously displays a device selection area, a scanner control area, and a scan display area.

FIG. 57 illustrates the frameworks and their associated APIs as software modules that are not part of any other applications. However, in some embodiments, these frameworks and their associated APIs are part of one image capture utility program that can perform the above-described image capture operations on its own, or can make available its frameworks and engines to other applications through the frameworks' APIs. As described above by reference to FIG. 57, these other applications can use such APIs to provide image capture functionality to their users. In some embodiments, a third party application may be executed along with the frameworks as part of a single process in an operating system. In some embodiments, a particular version of frameworks that are used by an application may be installed on a computer along with that application, rather than being present as part of the operating system.

FIGS. 58-62 conceptually illustrate one example of an image viewing application using the APIs from the image capture core framework 5710 and the image kit framework 5720. FIGS. 58-62 illustrate a GUI 5800 of the image viewing application at various stages of a scan operation that it performs with the use of the APIs.

Figure 58:
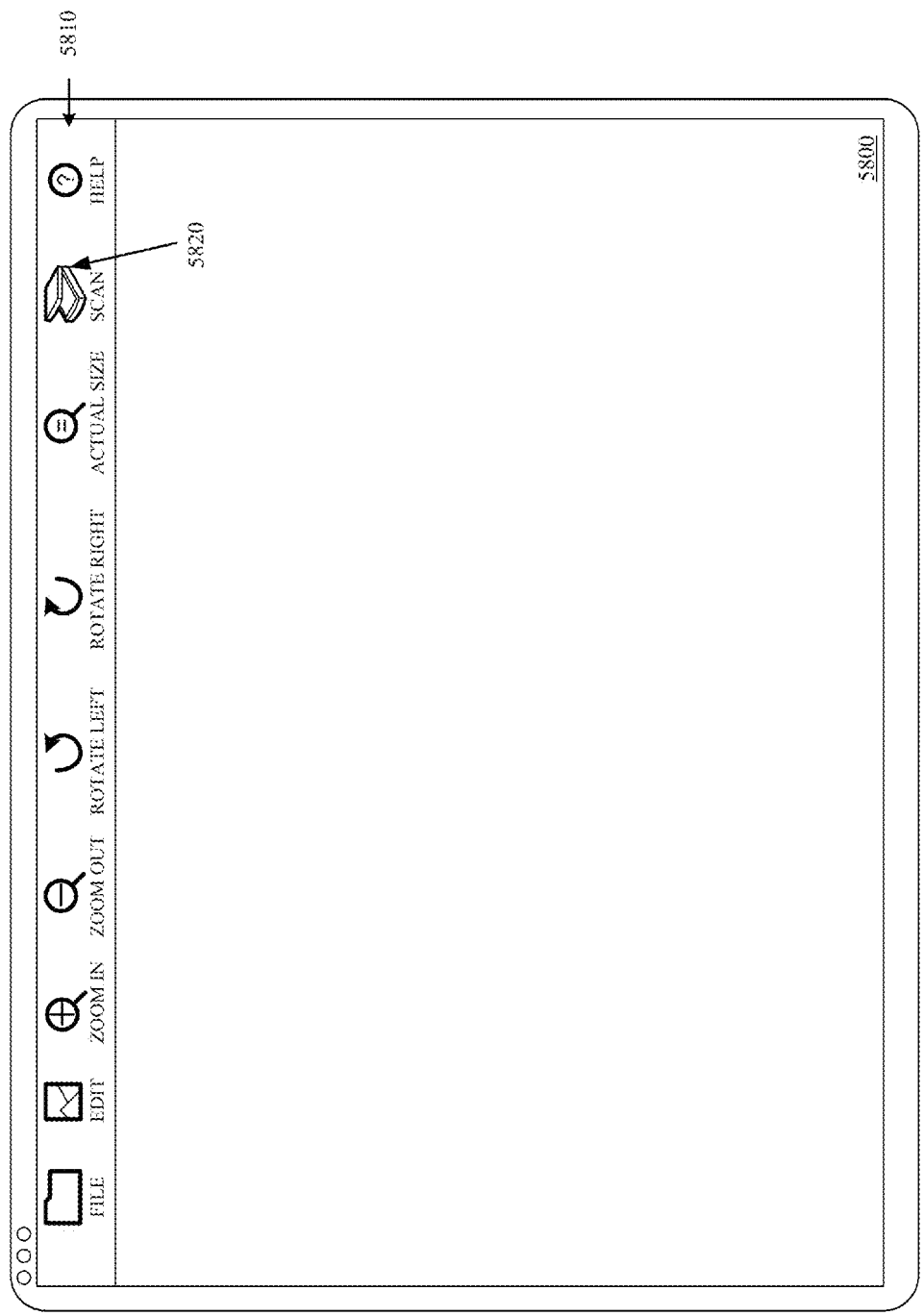
FIG. 58 illustrates a first stage that is before the user of the image viewing application has invoked the image capture functionalities.

FIG. 58 illustrates a first stage that is before the user of the image viewing application has invoked the image capture functionalities. As shown in this figure, GUI 5800 includes a menu bar 5810, which displays icons of functions native to the image viewing application. The image viewing application can perform some or all of its native functions without engaging the APIs from the frameworks. The image viewing application has also invoked library elements in the APIs provided by the frameworks 5710 and 5720 to create a selectable scanner icon 5820 within menu bar 5810. In some embodiments, the APIs of the image kit framework 5720 provide the scanner icon to the image viewing application.

The presence of the scan icon 5820 in the menu bar 5810 indicates to the user that the image viewing application has engaged the APIs and is now ready to perform functions provided by the image capture extension.

Figure 59:
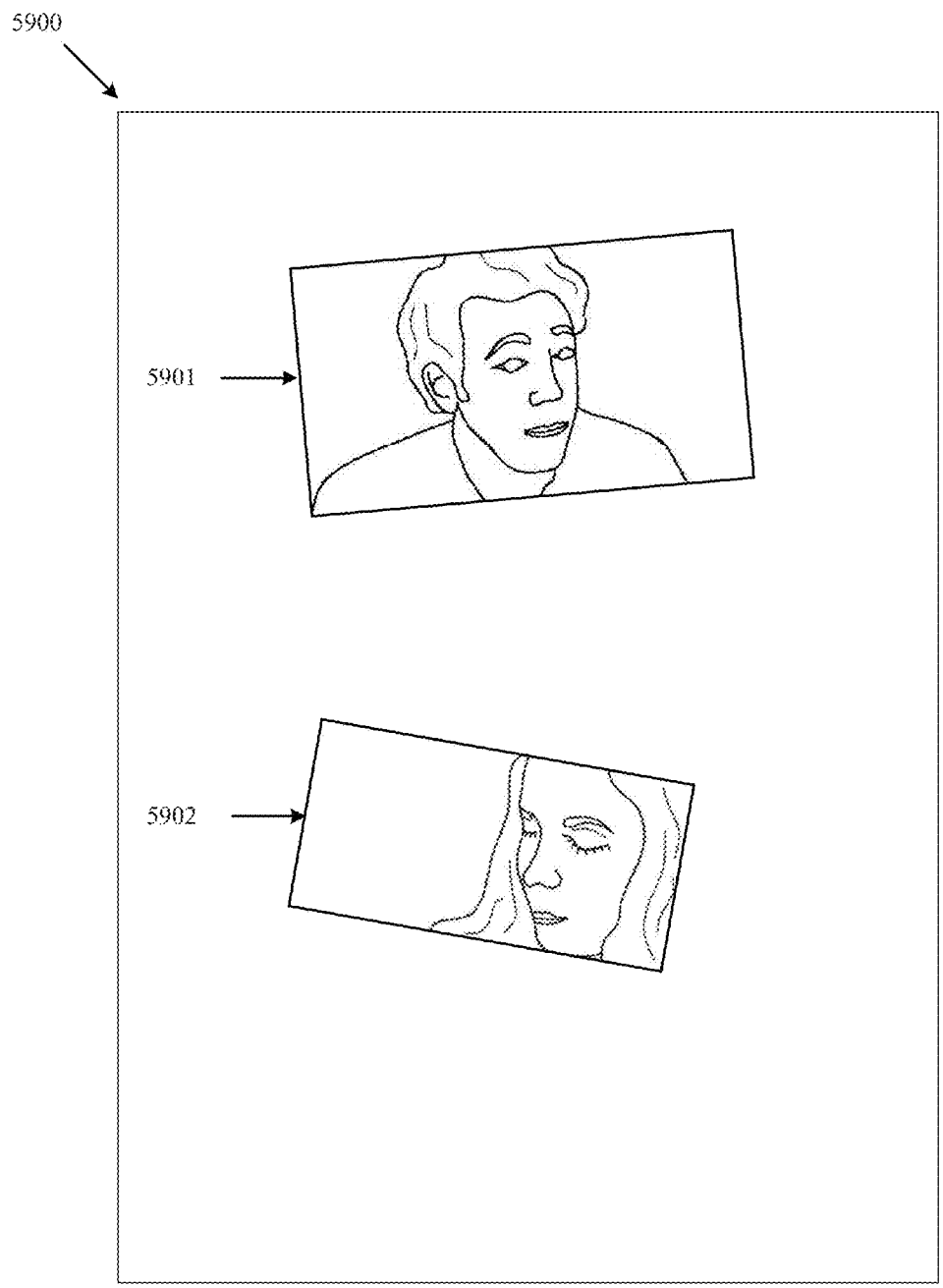
FIG. 59 illustrates two pieces of content that the user intends to scan using the image viewing application.

FIG. 59 illustrates two pieces of content that the user intends to scan using the image viewing application. One piece of content is a photo 5901 of a man, and the other piece of content is a photo 5902 of a woman. These two pieces of content could be two sections of a single document 5900 placed on the scanner bed of a flatbed scanner, or of a single document fed through a document feeder of a scanner. These two pieces of content could further be two separate items placed on the scanner bed of a flatbed scanner. As shown in FIG. 59, the two pieces of contents are not aligned to the edges of the scanner.

Figure 60:
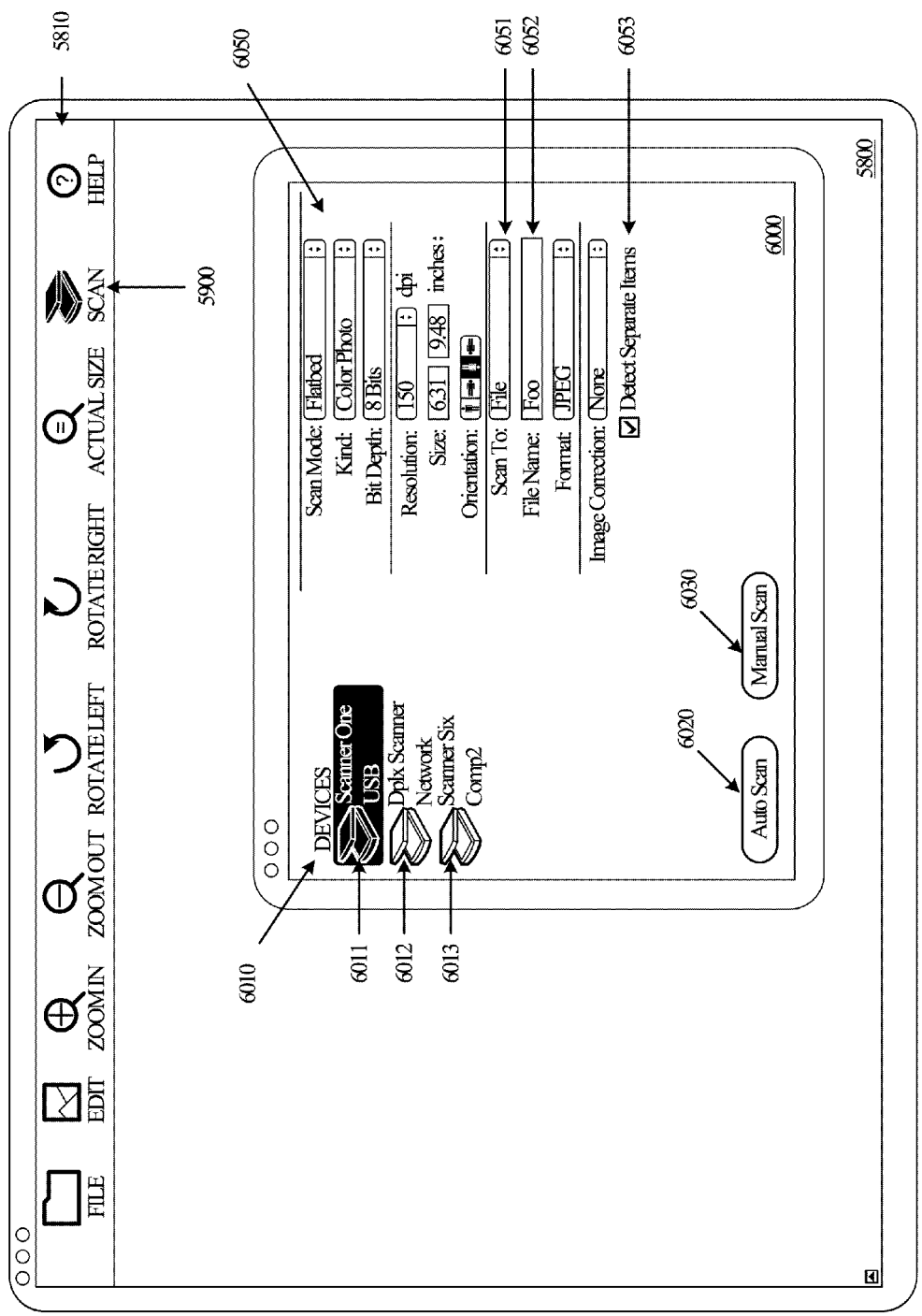
FIG. 60 illustrates a second stage that is after the user has selected the scanner icon in the menu bar.

FIG. 60 illustrates a second stage that is after the user has selected the scanner icon 5820 in the menu bar 5810. As the user selects the scanner icon, the GUI 5800 opens an image capture window 6000. In some embodiments, the image viewing application creates the image capture window 6000 using graphical elements provided by the APIs of the image kit framework 5720. The image capture window 6000 displays visual objects such as scanner options "Auto Scan" button 6020, a "Manual Scan" button 6030, a device view 6010, and a scanner view 6050. The device view 6010 displays visual objects such as scanner icons 6011, 6012, and 6013. The scanner view 6050 includes various visual objects such as "Scan To" option 6051, "File Name" option 6052, and "Detect Separate Items" checkbox 6053. In some embodiments, the image viewing application uses the APIs of the image kit framework 5720 to create and place some or all of these visual objects inside the image capture window 6000. In other embodiments, the image viewing application creates and places its own visual objects within the image capture window.

Within the device view 6010, the presence of scanner icons 6011, 6012 and 6013 indicates that the image viewing application now has access to these three scanners. The image viewing application learns of the availability of these scanners from the APIs of the image capture core framework 5710. As soon as the user selects the scanner icon 6011, the APIs of the image capture core framework 5710 populate the scanner view 6050 with scan options that corresponds to the selected scanner.

The user can change the scan options in scanner view 6050 by selecting buttons within the scan view. For example, if the user wants to send the scanned image directly to a file, the user can change the "Scan To" option 6051 to "File" to indicate that the user has chosen a file as the destination of the scanned image. The user may further want to change the name of the destination file, in this instance to "Foo" by changing the "File Name" option 6052.

The scan view 6050 also includes checkboxes to let the user of the image viewing application decide how to perform the scan. For example, by checking "Detect Separate Items" checkbox 6053, the user has decided to decompose a scanned document into separate images. For a scanned document generated from the two pieces of contents 5901 and 5902 in FIG. 59, the image viewing application will receive two separate scanned images from the APIs of image capture core framework 5710 after the framework has decomposes the scanned document and performed scan.

The image capture window 6000 also includes "Autoscan" button 6020 and the "Manual Scan" button 6030. In some embodiments, when the user click on the "Auto-scan" button 6020, the image viewing application invokes the auto-scan routines in the image capture core framework 5710 and uses graphical elements from the image kit framework 5720 to perform auto-scan operation as described above in Section II. Likewise, when the user click on the "Manual Scan" button 6030, the image viewing application invokes the manual scan routines in the image capture core framework 5710 and uses graphical elements from the image kit framework 5720 to perform manual scan operation as described above in Section III. The image capture core framework 5710 directs the scanner to perform the scan operation and deliver the scanned image back to the image viewing application via the APIs.

Figure 61:
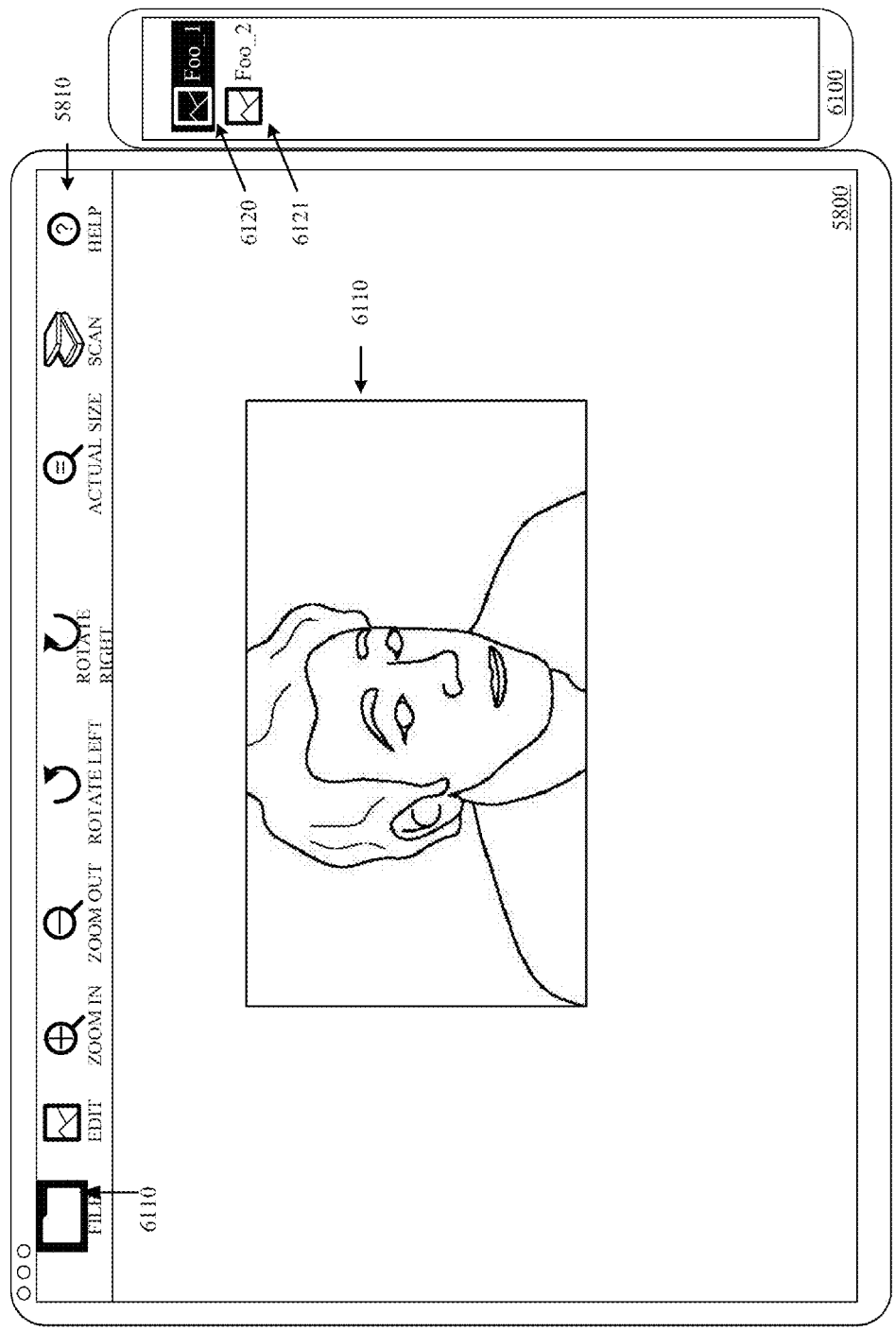
FIG. 61 illustrates a third stage that is after the image capture core framework has performed auto-scan and the image viewing application has received the scanned image from the scan.

FIG. 61 illustrates a third stage that is after the image capture core framework 5710 has performed auto-scan and the image viewing application has received the scanned image from the scan. In this example, the image viewing application receives two scanned images from the APIs of the image capture core framework because the "Detect Separate Items" checkbox was checked and because there are two pieces of content 5901 and 5902 in this scan. Since the user also set the "Scan To" option to "File" and "File Name" option to "Foo", the image capture core framework 5710 saved the decomposed scanned image into two images files named "Foo__1" and "Foo__2".

When the user clicks on the "FILE" icon 6110, the image viewing application pops an image file window 6100. The image file window 6100 displays two icons 6120 and 6121 to represent the image files "Foo__1" and "Foo__2", which are delivered to the image viewing application by the image capture core framework 5710. When the user clicks on the icon 6120 to select image file "Foo__1", the image viewing application displays an image 6110, which is the scanned image of the photo 5901 in FIG. 59. Although the photo 5901 was not properly aligned to the edge of the scanner, the image capture core framework 5710 has automatically aligned the scanned image as part of the auto-scan operation it performs. Thus as shown in FIG. 61, the image 6110 is now aligned to the edges of the GUI.

Figure 62:
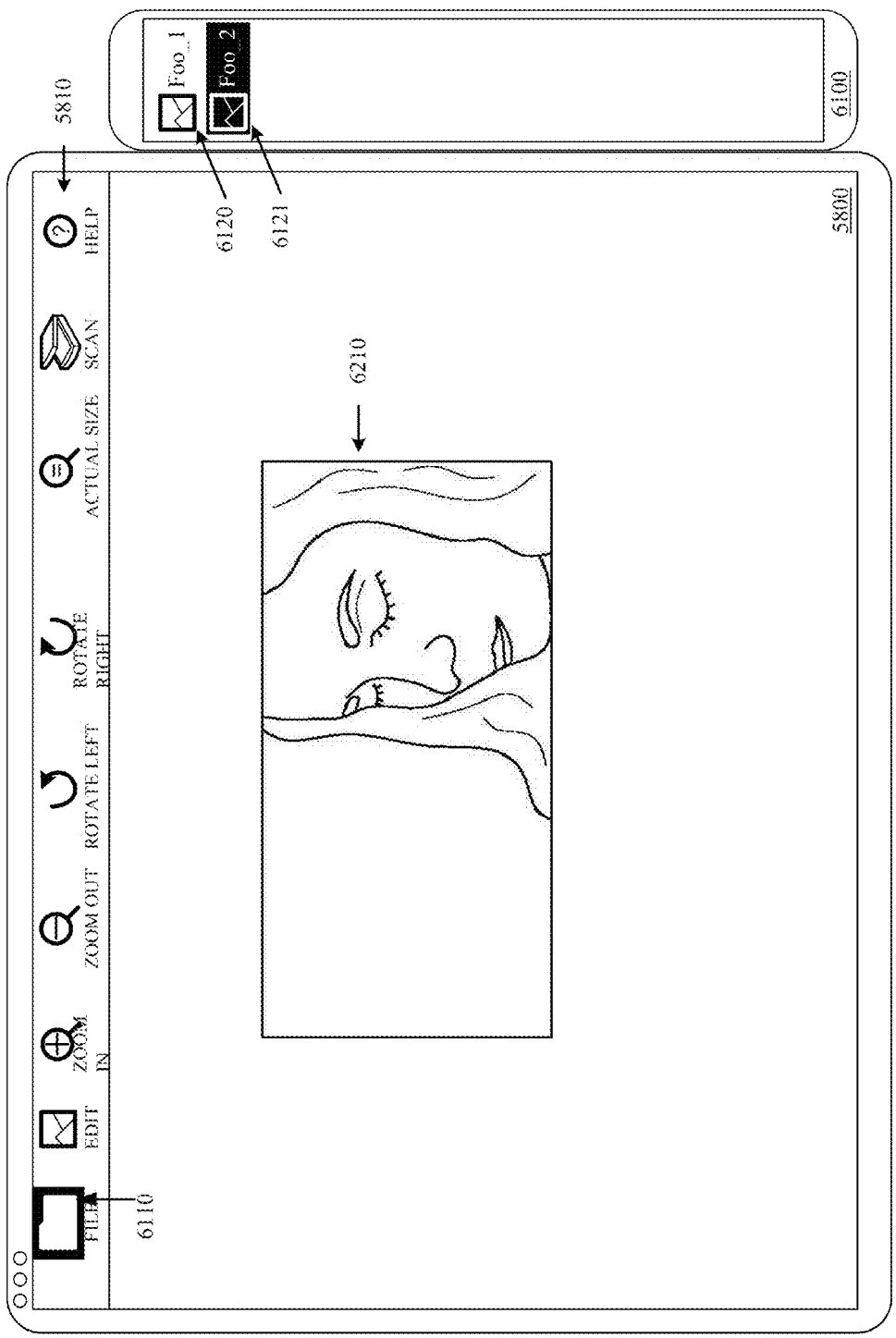
FIG. 62 illustrates a fourth stage in which the image viewing application displays the other scanned image received from image capture extension after the auto-scan operation.

FIG. 62 illustrates a fourth stage in which the image viewing application displays the other scanned image received from image capture extension after the auto-scan operation. When the user clicks on the icon 6121 to select image file "Foo__2", the image viewing application displays an image 6210, which is the scanned image of the photo 5902 in FIG. 59. Although the photo 5902 was not properly aligned to the edges of the scanner, the image capture core framework 5710 has automatically aligned the scanned image as part of the auto-scan operation it performs. Thus as shown in FIG. 62, the image 6210 is now aligned to the edges of the GUI.

V. Process for Defining an Image Capture Application

Figure 63:
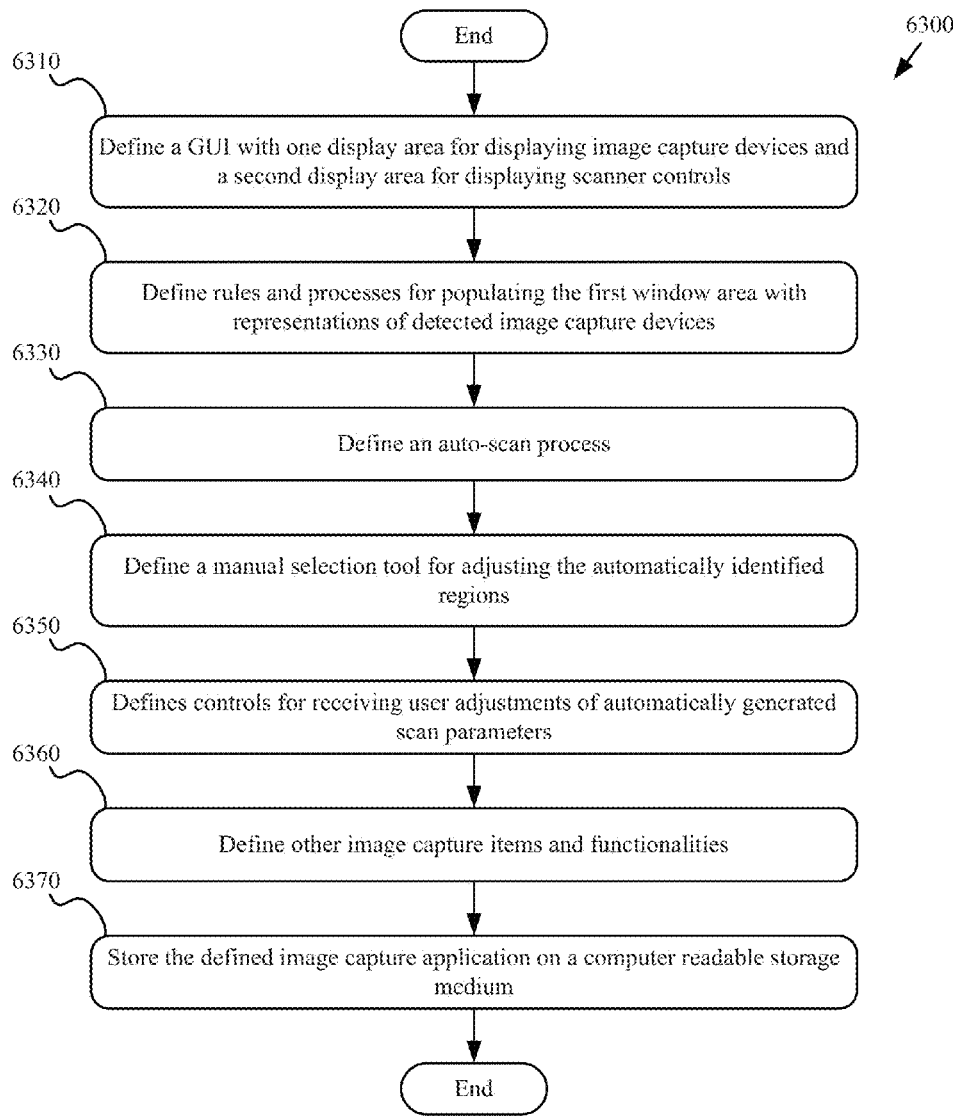
FIG. 63 illustrates a process for producing a computer readable medium that stores an image capture application.

FIG. 63 conceptually illustrates a process 6300 of some embodiments for defining and storing an image capture application of some embodiments, such as the applications described in sections I-III, above. Specifically, process 6300 illustrates the operations used to define several of the elements shown in GUI 200. As shown, process 6300 begins by defining (at 6310) a GUI with a window that has a first window area for displaying representations of image capture devices and a second window area for displaying controls of the image capture devices. GUI 200 in FIG. 2 is one example of such a GUI. In some embodiments, defining the GUI includes defining modules and/or APIs to display the first window area and modules and/or APIs to display the second window area.

The process defines (at 6320) rules and processes for populating the first window area with representations of detected image capture devices. For example, scanners and cameras connected directly or through a network to a computer on which the image capture application runs. In some embodiments, defining rules and procedures comprises defining modules and/or APIs to retrieve a list of image capture devices from a scanner detecting module of an operating system such as image capture extension 5414.

The process defines (at 6330) an auto-scan process for (1) commanding an initial scan that generates a scanned document, (2) identifies separate regions of the scanned document, (3) automatically generating scan parameters for each identified area, and (4) commanding secondary scans of each identified region according to the automatically generated scan parameters. The auto-scan process described in section II is an example of such an auto-scan process. In some embodiments, defining the auto-scan process includes defining modules and/or APIs for command the individual operations of the auto-scan.

The process defines (at 6340) a manual selection tool for adjusting the automatically identified regions. Manual selection tool 4400 is an example of such a manual selection tool. In some embodiments, defining the manual override tool comprises defining modules and/or APIs for displaying the manual selection tool and receiving commands from a user through the manual selection tool.

The process then defines (at 6350) controls for receiving user adjustments of the automatically generated scan parameters. FIGS. 51 and 52 illustrate several examples of such controls. In some embodiments, defining the controls comprises defining modules and/or APIs for displaying the controls and receiving commands from a user through the controls.

The process then defines (at 6360) other image capture items and functionalities. Examples of such functionalities may include additional angle indicators for the manual selection tool, post-processing procedures, etc. The process defines these additional tools in order to create an image capture application that has many additional features to the features described above. In some embodiments, defining such functionalities comprises defining modules and/or APIs for such functionalities.

Process 6300 then stores (at 6370) the defined image capture application (i.e., the defined modules and/or APIs, modules, GUI items, etc.) on a computer readable storage medium. The computer readable storage medium may be a disk (e.g., CD, DVD, hard disk, etc.) or a solid-state storage device (e.g., flash memory) in some embodiments. One of ordinary skill in the art will recognize that the various elements defined by process 6300 are not exhaustive of the modules, rules, processes, and GUI items that could be defined and stored on a computer readable storage medium for an image capture application incorporating some embodiments of the invention. In addition, the process 6300 is a conceptual process, and the actual implementations may vary. For example, different embodiments may define the various elements in a different order, may define several elements in one operation, may decompose the definition of a single element into multiple operations, etc. In addition, the process 6300 may be implemented as several sub-processes or combined with other operations within a macro-process.

VI. Computer System

Many of the above-described processes and modules are implemented as software processes that are specified as a set of instructions recorded on a computer readable storage medium (also referred to as a computer readable medium or a machine readable medium). When these instructions are executed by one or more computational element(s) (such as processors or other computational elements like ASICs and FPGAs), they cause the computational element(s) to perform the actions indicated in the instructions. Computer is meant in its broadest sense (within the field of computing devices), and can include any electronic device with a processor. Examples of computer readable media include, but are not limited to, CD-ROMs, flash drives, RAM chips, hard drives, EPROMs, etc.

As used in this specification and any claims of this application, the terms "computer", "server", "processor", and "memory" all refer to electronic or other technological devices. These terms exclude people, groups of people, or aspects of people (e.g., the term "memory" as used herein does not include human memory). For the purposes of the specification, the terms "display" (as a verb) or "displaying" means displaying by an electronic device. The term "displaying" excludes handwriting on paper, painting, and other forms of creating an image that do not involve electronic devices. As used in this specification and any claims of this application, the terms "computer readable medium" and "computer readable media" are entirely restricted to tangible, physical objects that store information in a form that is readable by a computer and/or other electronic devices. These terms exclude any carrier waves, wireless signals, wired download signals, electronic signals, and any other ephemeral signals.

In this specification, the term "software" is meant to include firmware residing in physical devices such as read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 64:
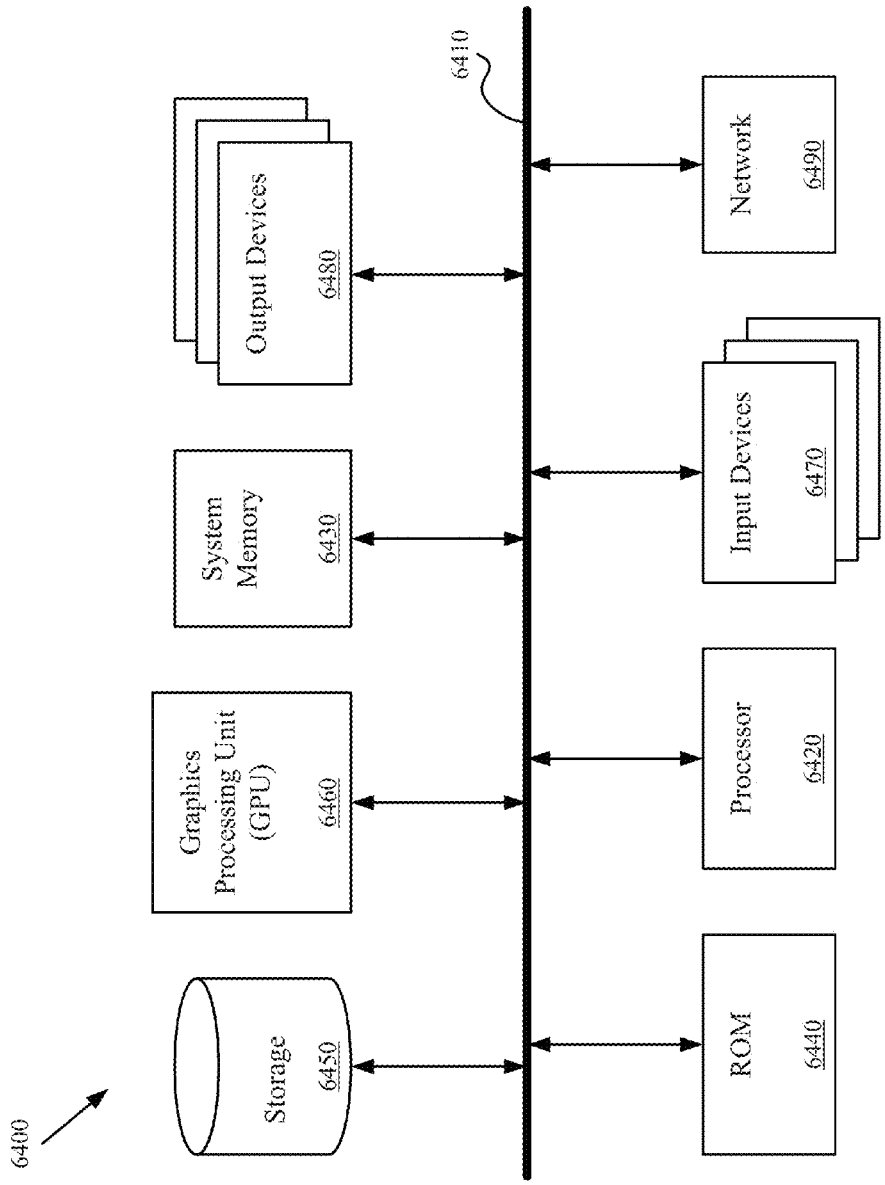
FIG. 64 conceptually illustrates a computer system with which some embodiments of the invention are implemented.

FIG. 64 conceptually illustrates a computer system 6400 with which some embodiments of the invention are implemented. The computer system includes various types of computer readable mediums and interfaces for various other types of computer readable mediums. Computer system 6400 includes a bus 6410, a processor 6420, a system memory 6430, a read-only memory (ROM) 6440, a permanent storage device 6450, a graphics processing unit (GPU) 6460, input devices 6470, output devices 6480, and a network connection 6490.

The bus 6410 collectively represents all system, peripheral, and chipset buses that support communication among internal devices of the computer system 6400. For instance, the bus 6410 communicatively connects one or more processors 6420 with the system memory 6430, the read-only memory 6440, and the permanent storage device 6450.

From these various memory units, the processor 6420 retrieves instructions to execute and data to process in order to execute the processes of the invention. In some embodiments the processor comprises a Field Programmable Gate Array (FPGA), an ASIC, or various other electronic components for executing instructions. The read-only-memory (ROM) 6440 stores static data and instructions that are needed by the processor 6420 and other modules of the computer system.

The permanent storage device 6450, on the other hand, is a read-and-write memory device. This device is a non-volatile memory unit that stores instructions and data even when the computer system 6400 is off. Some embodiments of the invention use a mass-storage device (such as a magnetic or optical disk and its corresponding disk drive) as the permanent storage device 6450. Some embodiments use one or more removable storage devices (flash memory card or memory stick) as the permanent storage device 6450. Some embodiments use a removable storage device (such as a floppy disk, flash drive, or CD-ROM) as the permanent storage device.

Like the permanent storage device 6450, the system memory 6430 is a read-and-write memory device. However, unlike storage device 6450, the system memory 6430 is a volatile read-and-write memory, such as a random access memory (RAM). The system memory stores some of the instructions and data that the processor needs at runtime.

Instructions and/or data needed to perform processes of some embodiments are stored in the system memory 6430, the permanent storage device 6450, the read-only memory 6440, or any combination of the three. For example, the various memory units include instructions for processing multimedia items in accordance with some embodiments. From these various memory units, the processor 6420 retrieves instructions to execute and data to process in order to execute the processes of some embodiments.

In some embodiments, the bus 6410 connects to the GPU 6460. The GPU of some embodiments performs various graphics processing functions. These functions may include display functions, rendering, compositing, and/or other functions related to the processing or display of graphical data.

The bus 6410 also connects to the input and output devices 6470 and 6480. The input devices 6470 enable the user to communicate information and select commands to the computer system. The input devices 6470 include alphanumeric keyboards, touch-screens, and cursor-controllers. The input devices also include audio input devices (e.g., microphones, MIDI musical instruments, etc.) and video input devices (e.g., video cameras, still cameras, optical scanning devices, etc.).

The present application describes a GUI that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the GUI to control (e.g., select, move) objects in the GUI. However, in some embodiments, objects in the GUI can also be controlled or manipulated through other control, such as touch control. In some embodiments, touch control is implemented through an input device that can detect the presence and location of touch on a display of the device. An example of such a device is a touch screen device. In some embodiments, with touch control, a user can directly manipulate objects by interacting with the GUI that is displayed on the display of the touch screen device. For instance, a user can select a particular object in the GUI by simply touching that particular object on the display of the touch screen device. As such, in some embodiments when touch control is utilized, a cursor is not even provided for enabling selection of an object of a GUI. However, when a cursor is provided in a GUI, touch control can be used to control the cursor in some embodiments.

The output devices 6480 include printers, electronic display devices that display still or moving images, and electronic audio devices that play audio generated by the computer system. Electronic display devices in some embodiments display the graphical aspects of a GUI. Electronic display devices include devices such as cathode ray tubes (CRT), liquid crystal displays (LCD), light emitting diode displays (LED) including organic light emitting diode displays (OLED), plasma display panels (PDP), surface-conduction electron-emitter displays (alternatively referred to as a "surface electron display" or SED), electronic paper, etc. Audio output devices include a PC's sound card and speakers, a speaker on a cellular phone, a Bluetooth® earpiece, etc. Some or all of these output devices may be wirelessly or optically connected to the computer system.

Finally, as shown in FIG. 64, bus 6410 also couples computer 6400 to a network 6490 through a network adapter (not shown). In this manner, the computer can be a part of a network of computers (such as a local area network (LAN), a wide area network (WAN), or an Intranet) or a network of networks (such as the Internet). Internet. For example, the computer 6400 may be coupled to a web server (through network 6490) so that a web browser executing on the computer 6400 can interact with the web server as a user interacts with a GUI that operates in the web browser.

Any or all of the components of computer system 6400 may be used in conjunction with the invention. However, one of ordinary skill in the art will appreciate that any other system configuration may also be used in conjunction with the invention or components of the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., USB drives, flash drives, SD cards, mini-SD cards, micro-SD cards, etc.), magnetic and/or solid state hard drives, read-only and recordable blu-ray discs, ultra density optical discs, any other optical or magnetic media, and floppy disks.

The computer-readable media stores a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter. In some embodiments, the hardware includes one or more of the above described computer-readable medium, memory, or storage.

It should be recognized by one of ordinary skill in the art that any or all of the components of computer system 6400 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. For example, several embodiments were described above by reference to particular image capture applications with particular features and components (e.g., particular arrangements of window areas). However, one of ordinary skill will realize that other embodiments might be implemented with other types of image capture applications with other types of features and components (e.g., other arrangements of window areas).

Moreover, while the examples shown illustrate many individual modules as separate blocks, one of ordinary skill in the art would recognize that some embodiments combine these modules into a single functional block or element. One of ordinary skill in the art would also recognize that some embodiments divide a particular module into multiple modules.

Cursor operations can be managed any number of ways, e.g., use of a mouse, trackpad, etc., but also touch screen based operations. Some embodiments do not even have cursor for enabling selection in touch screen approaches. The media editing application can be a standalone application on a desktop, part of another program (e.g., part of the OS), part of a server based solution (fat client, thin client/browser based/web based), etc., or some combination of the preceding.

One of ordinary skill in the art will realize that, while the invention has been described with reference to numerous specific details, the invention can be embodied in other specific forms without departing from the spirit of the invention. For instance, alternate embodiments are implemented by using a generic processor to implement the video processing functions instead of using a GPU. One of ordinary skill in the art would understand that the invention is not to be limited by the foregoing illustrative details, but rather is to be defined by the appended claims.

The following Appendices provide examples of frameworks. Appendix A includes the APIs of an example image kit framework, while Appendix B includes the APIs of an example of an image capture core framework. One of ordinary skill in the art will realize that frameworks with different listings can still fall within the scope of the inventions. For example, some embodiments could use some APIs from the Image Capture framework from Apple®.

VII. Appendix A

Image Kit APIs

A. IK Device Browser View

```
//
// IKDeviceBrowserView.h
// ImageKit
//
// Copyright 2008 Apple Inc. All rights reserved.
//
#if MAC_OS_X_VERSION_MAX_ALLOWED>=MAC_OS_X_VERSION_10_6
#import <Cocoa/Cocoa.h>
#import <ImageCaptureCore/ImageCaptureCore.h>
@class IKDeviceBrowserView;
/*!
    @protocol IKDeviceBrowserViewDelegate
    @abstract A delegate of IKDeviceBrowserView must conform to
IKDeviceBrowserViewDelegate protocol.
 */
@protocol IKDeviceBrowserViewDelegate
@required
/*!
    @method deviceBrowserView:selectionDidChange:
    @abstract This message is sent when the user selection did change.
 */
-(void)deviceBrowserView: (IKDeviceBrowserView*)deviceBrowserView selectionDidChange: (ICDevice*)device;
@optional
/*!
    @method deviceBrowserView:didEncounterError:
    @abstract This message is sent every time the device browser reports an error.
 */
-(void)deviceBrowserView: (IKDeviceBrowserView*)deviceBrowserView didEncounterError: (NSError*)error;
@end
enum
{
    IKDeviceBrowserViewDisplayModeTable,
    IKDeviceBrowserViewDisplayModeOutline,
    IKDeviceBrowserViewDisplayModeIcon
};
typedef NSInteger IKDeviceBrowserViewDisplayMode;
/*!
    @class IKDeviceBrowserView
 */
@interface IKDeviceBrowserView: NSView
{
@private
    id_privateData;
}
/*!
    @property delegate
    @abstract delegate of the IKDeviceBrowserView.
 */
@property (assign) id<IKDeviceBrowserViewDelegate> delegate;
/*!
 */
/*!
 */
/*!
    @property displaysLocalScanners
    @abstract for device filtering- indicates that the IKDeviceBrowserView should include local scanners.
 */
@property BOOL displaysLocalScanners;
/*!
    @property displaysNetworkScanners
    @abstract for device filtering—indicates that the IKDeviceBrowserView should include network/shared scanners.
 */
@property BOOL displaysNetworkScanners;
/*!
    @property mode
    @abstract one of the supported display modes (table, outline, or icon mode).
 */
@property IKDeviceBrowserViewDisplayMode mode;
/*!
    @property selectedDevice
 */
@property (readonly) ICDevice*selectedDevice;
@end
#endif
```

B. IK Scanner Device View
```
//
// IKScannerView.h
// ImageKit
//
// Copyright 2008 Apple Inc. All rights reserved.
//
    #if
MAC_OS_X_VERSION_MAX_ALLOWED>=MAC_
OS_X_VERSION_10_6
#import <Cocoa/Cocoa.h>
#import <ImageCaptureCore/ImageCaptureCore.h>
@class IKScannerDeviceView;
/*!
    @protocol IKScannerDeviceViewDelegate
    @abstract A delegate of IKScannerDeviceView must conform to IKScannerDeviceViewDelegate protocol.
*/
    @protocol IKScannerDeviceViewDelegate
    @optional
/*!
    @method  scannerDeviceView:didScanToURL:fileData:error:
    @abstract This message is sent for each image that gets scanned.
    @discussion Based on the IKScannerDeviceViewTransferMode the downloaded file will be saved on disk using the 'url', or returned in memory as NSData
*/
-(void)scannerDeviceView: (IKScannerDeviceView*)scannerDeviceView didScanToURL: (NSURL*)url fileData: (NSData*)data error: (NSError*)error;
/*!
    @method scannerDeviceView:didEncounterError:
    @abstract This message is sent every time the scanner device reports an error.
*/
-(void)scannerDeviceView: (IKScannerDeviceView*)scannerDeviceView didEncounterError: (NSError*)error;
@end
enum
{
    IKScannerDeviceViewTransferModeFileBased=0,
    IKScannerDeviceViewTransferModeMemoryBased
};
typedef NSInteger IKScannerDeviceViewTransferMode;
enum
{
    IKScannerDeviceViewDisplayModeSimple,
    IKScannerDeviceViewDisplayModeAdvanced
};
typedef NSInteger IKScannerDeviceViewDisplayMode;
/*!
    @class IKScannerDeviceView
    @abstract IKScannerDeviceView displays a UI to work with Image Capture supported scanners.
*/
@interface IKScannerDeviceView: NSView
{
@private
    id _privateData;
}
/*!
    @property delegate
    @abstract delegate of the IKScannerDeviceView.
*/
@property (assign)   id<IKScannerDeviceViewDelegate> delegate;
/*!
    @property scannerDevice
    @abstract the scanner device.
*/
@property (assign) ICScannerDevice*scannerDevice;
/*!
    @property mode
    @abstract current display mode.
*/
@property IKScannerDeviceViewDisplayMode mode;
/*!
    @property hasDisplayModeSimple
    @abstract support a simple scanning UI.
*/
@property BOOL hasDisplayModeSimple;
/*!
    @property hasDisplayModeAdvanced
    @abstract support advanced scanning UI.
*/
@property BOOL hasDisplayModeAdvanced;
/*!
    @property transferMode
    @abstract transfer mode either file based—or—in memory.
*/
@property IKScannerDeviceViewTransferMode transferMode;
/*!
    @property scanControlLabel
    @abstract label for the 'Scan' control.
*/
@property (copy) NSString*scanControlLabel;
/*!
    @property overviewControlLabel
    @abstract label for the 'Overview' control.
*/
@property (copy) NSString*overviewControlLabel;
/*!
    @property displaysDownloadsDirectoryControl
    @abstract show a downloads directory control.
*/
@property BOOL displaysDownloadsDirectoryControl;
/*!
    @property downloadsDirectory
    @abstract downloads directory.
*/
@property (retain) NSURL*downloadsDirectory;
/*!
    @property documentName
    @abstract document name.
*/
@property (copy) NSString*documentName;
/*!
    @property displaysPostProcessApplicationControl
    @abstract show a postprocessing application control.
*/
@property BOOL displaysPostProcessApplicationControl;
/*!
    @property postProcessApplication
    @abstract postprocessing application.
*/
@property (retain) NSURL*postProcessApplication;
@end
#endif
```

VIII. Appendix B

Image Capture Core APIs

A. IC Common Constants

```
//
// ICCommonConstants.h
// ImageCaptureCore
//
// Copyright (c) 2008 Apple, Inc., all rights reserved.
//
// Best viewed with the following settings: Tab width 4, Indent
width 2, Wrap lines, Indent wrapped lines by 3, Page guide
128.
//
/*!
    @enum ICEXIFOrientationType
    @abstract Type representing EXIF Orientation tag value
    @discussion The meaning of this value is defined by the
EXIF specification. Here is what the letter F would look like
if it were tagged correctly and displayed by a program that
ignores the orientation tag (thus showing the stored image):
```

| 1       | 2       | 3       | 4       |
|---------|---------|---------|---------|
| 8888888 | 8888888 | 88      | 88      |
| 88      | 88      | 88      | 88      |
| 8888    | 8888    | 8888    | 8888    |
| 88      | 88      | 88      | 88      |
| 88      | 88      | 8888888 | 8888888 |

| 5          | 6          | 7          | 8          |
|------------|------------|------------|------------|
| 8888888888 | 88         | 88         | 8888888888 |
| 88 88      | 88 88      | 88 88      | 88 88      |
| 88         | 8888888888 | 8888888888 | 88         |

```
*/
enum
{
    ICEXIFOrientation1=1, // Normal
    ICEXIFOrientation2=2, // Flipped horizontally
    ICEXIFOrientation3=3, // Rotated 180-∞
    ICEXIFOrientation4=4, // Flipped vertically
    ICEXIFOrientation5=5, // Rotated 90-∞ CCW and flipped
vertically
    ICEXIFOrientation6=6, // Rotated 90-∞ CCW
    ICEXIFOrientation7=7, // Rotated 90-∞ CW and flipped
vertically
    ICEXIFOrientation8=8, // Rotated 90-∞ CW
};
typedef NSUInteger ICEXIFOrientationType;
/*!
    @enum ICReturnCode
    @discussion
    Definition of codes returned by APIs in ImageCaptureCore
framework
    @constant ICReturnSuccess
    Operation successful.
    @constant ICReturnInvalidParam
    An invalid parameter was found.
    @constant ICReturnCommunicationTimedOut
    Communication between different components of Image
Capture timed out.
    @constant ICReturnScanOperationCanceled
    The scan operation is canceled.
    @constant ICReturnScannerinUseByLocalUser
    Scanner is being used by a local user.
    @constant ICReturnScannerinUseByRemoteUser
    Scanner is being used by a remote user.
    @constant ICReturnDeviceFailedToOpenSession
    Failed to open a session on a specified device.
    @constant ICReturnDeviceFailedToCloseSession
    Failed to close a session on a specified device.
    @constant ICReturnScannerFailedToSelectFunctionalUnit
    Failed to select a functional unit on the specified scanner.
    @constant ICReturnScannerFailedToCompleteOverviewScan
    Overview scan operation failed to complete on the speci-
fied scanner.
    @constant ICReturnScannerFailedToCompleteScan
    Scan operation failed to complete on the specified scanner.
    @constant ICReturnReceivedUnsolicitedScannerStatusInfo
    An unsolicited status information was received from a
scanner.
    @constant ICReturnReceivedUnsolicitedScannerErrorInfo
    An unsolicited error information was received from a scan-
ner.
    @constant ICReturnDownloadFailed
    A non-specific error occurred while downloading a file.
    @constant ICReturnUploadFailed
    A non-specific error occurred while updownloading a file.
    @constant ICReturnFailedToCompletePassThroughCommand
    Failed to complete a pass-through (e.g., PTP pass-through)
command.
*/
typedef enum ICReturnCode
{
    ICReturnSuccess=0,
    ICReturnInvalidParam=-9922,
    ICReturnCommunicationTimedOut=-9923,
    ICReturnScanOperationCanceled=-9924,
    ICReturnScannerinUseByLocalUser=-9925,
    ICReturnScannerinUseByRemoteUser=-9926,
    ICReturnDeviceFailedToOpenSession=-9927,
    ICReturnDeviceFailedToCloseSession=-9928,
    ICReturnScannerFailedToSelectFunctionalUnit=-9929,
    ICReturnScannerFailedToCompleteOverviewScan=-9930,
    ICReturnScannerFailedToCompleteScan=-9931, ICReturnReceivedUnsolicitedScannerStatusInfo=-9932,
    ICReturnReceivedUnsolicitedScannerErrorInfo=-9933,
    ICReturnDownloadFailed=-9934,
    ICReturnUploadFailed=-9935,
    ICReturnFailedToCompletePassThroughCommand=-9936,
    ICReturnDownloadCanceled=-9937
} ICReturnCode;
//
```

B. IC Device

```
//
// ICDevice.h
// ImageCaptureCore
//
// Copyright (c) 2008 Apple, Inc., all rights reserved.
//
// Best viewed with the following settings: Tab width 4, Indent
width 2, Wrap lines, Indent wrapped lines by 3, Page guide
128.
//
/*!
    @header ICDevice
```

ICDevice is an abstract class that represents a device supported by Image Capture. ImageCaptureCore defines two concrete subclasses of ICDevice, and ICScannerDevice. ICDeviceBrowser creates instances of these two subclasses to represent scanners it finds.
*/
@class ICDevice;
/*!
@enum ICDeviceType
@abstract Image Capture Device Types
@constant ICDeviceTypeScanner Scanner device.
*/
enum
{
    ICDeviceTypeScanner=0x00000002
};
typedef NSUInteger ICDeviceType;
/*!
@enum ICDeviceLocationType
@abstract Image Capture Device Location Types
@constant ICDeviceLocationTypeLocal Device found directly attached to the Macintosh via its USB or FireWire port.
@constant ICDeviceLocationTypeShared Device found over the network by searching for devices shared by other Macintosh hosts.
@constant ICDeviceLocationTypeBonjour Device found over the network by searching for Bonjour services supported by Image Capture.
@constant ICDeviceLocationTypeBluetooth Device found as a paired Bluetooth device.
*/
enum
{
    ICDeviceLocationTypeLocal=0x00000100,
    ICDeviceLocationTypeShared=0x00000200,
    ICDeviceLocationTypeBonjour=0x00000400,
    ICDeviceLocationTypeBluetooth=0x00000800
};
typedef NSUInteger ICDeviceLocationType;
/*!
@enum ICDeviceTypeMask
@abstract Image Capture Device Type Mask
@constant ICDeviceTypeMaskScanner Mask to detect a scanner device.
*/
enum
{
    ICDeviceTypeMaskScanner=0x00000002
};
typedef NSUInteger ICDeviceTypeMask;
/*!
@enum ICDeviceLocationTypeMask
@abstract Image Capture Device Location Type Mask
@constant ICDeviceLocationTypeMaskLocal Mask to detect a local (e.g., USB or FireWire) device.
@constant ICDeviceLocationTypeMaskShared Mask to detect a device by another Macintosh host.
@constant ICDeviceLocationTypeMaskBonjour Mask to detect a network device that publishes a Bonjour service.
@constant ICDeviceLocationTypeMaskBluetooth Mask to detect paired Bluetooth device.
@constant ICDeviceLocationTypeMaskRemote Mask to detect a remote (shared, Bonjour, Bluetooth) device.
*/
enum
{
    ICDeviceLocationTypeMaskLocal=0x00000100,
    ICDeviceLocationTypeMaskShared=0x00000200,
    ICDeviceLocationTypeMaskBonjour=0x00000400,
    ICDeviceLocationTypeMaskBluetooth=0x00000800,
    ICDeviceLocationTypeMaskRemote=0x0000FE00
};
typedef NSUInteger ICDeviceLocationTypeMask;
// Constants used to identify the transport type used by a device.
/*!
@const ICTransportTypeUSB
@abstract ICTransportTypeUSB
@discussion Indicates that the device uses USB transport.
*/
extern NSString*const ICTransportTypeUSB;
/*!
@const ICTransportTypeFireWire
@abstract ICTransportTypeFireWire
@discussion Indicates that the device uses FireWire transport.
*/
extern NSString*const ICTransportTypeFireWire;
/*!
@const ICTransportTypeBluetooth
@abstract ICTransportTypeBluetooth
@discussion Indicates that the device uses Bluetooth transport.
*/
extern NSString*const ICTransportTypeBluetooth;
/*!
@const ICTransportTypeTCPIP
@abstract ICTransportTypeTCPIP
@discussion Indicates that the device uses TCP/IP transport. These devices are discovered using Bonjour.
*/
extern NSString*const ICTransportTypeTCPIP;
/*!
@const ICTransportTypeMassStorage
@abstract ICTransportTypeMassStorage
@discussion Indicates that the device use mounts as a mass-storage volume.
*/
extern NSString*const ICTransportTypeMassStorage;
// Constants used to identify button-press on a device.
/*!
@const ICButtonTypeScan
@abstract ICButtonTypeScan
@discussion Indicates that the "Scan" button on the device was pressed.
*/
extern NSString*const ICButtonTypeScan;
/*!
@const ICButtonTypeMail
@abstract ICButtonTypeMail
@discussion Indicates that the "Mail" button on the device was pressed.
*/
extern NSString*const ICButtonTypeMail;
/*!
@const ICButtonTypeCopy
@abstract ICButtonTypeCopy
@discussion Indicates that the "Copy" button on the device was pressed.
*/
extern NSString*const ICButtonTypeCopy;
/*!
@const ICButtonTypeWeb

```
    @abstract ICButtonTypeWeb
    @discussion Indicates that the "Web" button on the device
was pressed.
*/
extern NSString*const ICButtonTypeWeb;
/*!
    @const ICButtonTypePrint
    @abstract ICButtonTypePrint
    @discussion Indicates that the "Print" button on the device
was pressed.
*/
extern NSString*const ICButtonTypePrint;
/*!
    @const ICButtonTypeTransfer
    @abstract ICButtonTypeTransfer
    @discussion Indicates that the "Transfer" button on the
device was pressed.
*/
extern NSString*const ICButtonTypeTransfer;
// Constants used for device status notifications.
/*!
    @const ICStatusNotificationKey
    @abstract ICStatusNotificationKey
    @discussion Key for a non-localized notification string.
*/
extern NSString*const ICStatusNotificationKey;
/*!
    @const ICLocalizedStatusNotificationKey
    @abstract ICLocalizedStatusNotificationKey
    @discussion Key for a localized notification string.
*/
extern NSString*const ICLocalizedStatusNotificationKey;
// Constants used to describe capabilities of a device
/*!
    @const ICDeviceCanEjectOrDisconnect
    @abstract ICDeviceCanEjectOrDisconnect
    @discussion Indicates either the device is mounted as a
mass-storage volume and can be ejected or the it is a remote
device with an active connection that can be disconnected.
*/
extern NSString*const ICDeviceCanEjectOrDisconnect;
ICDeviceDelegate
/*!
    @protocol ICDeviceDelegate <NSObject>
    @abstract A delegate of ICDevice must conform to ICDe-
viceDelegate protocol.
*/
@protocol ICDeviceDelegate <NSObject>
@required
/*!
    @method didRemoveDevice:
    @abstract This message is sent to the delegate to inform
that a device has been removed.
*/
-(void)didRemoveDevice:(ICDevice*)device;
@optional
/*!
    @method device: didOpenSessionWithError:
    @abstract This message is sent when a session is opened
on a device.
    @discussion This message completes the process initiated
by the message "requestOpenSession" sent to the device
object.
*/
-(void)device:(ICDevice*)device    didOpenSessionWithEr-
ror:(NSError*)error;
/*!
    @method deviceDidBecomeReady:
    @abstract This message is sent when the device is ready.
    @discussion A scanner device is ready when its functional
units are found and the default functional unit is selected for
use.
*/
-(void)deviceDidBecomeReady:(ICDevice*)device;
/*!
    @method device:didCloseSessionWithError:
    @abstract This message is sent when a session is closed on
a device.
    @discussion This message completes the process initiated
by the message "requestCloseSession" sent to the device
object. This message is also sent if the device module in
control of the device ceases to control the device.
*/
-(void)device:(ICDevice*)device    didCloseSessionWithEr-
ror:(NSError*)error;
/*!
    @method deviceDidChangeName:
    @abstract This message is sent if the name of a device
changes.
    @discussion This happens if the device module overrides
the default name of the device reported by the device's trans-
port layer, or if the name of the filesystem volume mounted by
the device is changed by the user.
*/
-(void)deviceDidChangeName:(ICDevice*)device;
/*!
    @method deviceDidChangeSharingState:
    @abstract This message is sent when the sharing state of a
device has changes.
    @discusson Any Image Capture client application can
choose to share the device over the network using the sharing
or webSharing facility in Image Capture.
*/
-(void)deviceDidChangeSharingState:(ICDevice*)device;
/*!
    @method device: didReceiveStatusInformation:
    @abstract This message is sent to the device delegate when
status information is received from a scanner.
    @discussion <TODO: Document the key-value pairs in the
status dictionary. Provide examples>
*/
-(void)device:(ICDevice*)device didReceiveStatusInforma-
tion:(NSDictionary*)status;
/*!
    @method scannerDevice:didEncounterError:
    @abstract This message is sent to the device delegate when
a scanner device encounters an error.
*/
-(void)device:(ICDevice*)device didEncounterError:(NSEr-
ror*)error;
/*!
    @method device: didReceiveButtonPress:
    @abstract This message is sent to the device delegate if a
button is pressed on the device.
    @discussion This message is sent only if a session is open
on the device. The value of 'buttonType' argument is one of
the ICButtonType*values defined above.
*/
-(void)device:(ICDevice*)device    didReceiveButtonPress:
(NSString*)buttonType;
@end
-ICDevice
/*!
    @class ICDevice
```

@abstract ICDevice is an abstract class that represents a device supported by Image Capture facility. ImageCaptureCore defines two concrete subclasses of ICDevice, and ICScannerDevice. ICDeviceBrowser creates instances of these two subclasses to represent scanners it finds.
*/
@interface ICDevice: NSObject
{
@private
    id_deviceProperties;
}
/*!
    @property delegate
    @abstract The delegate to receive messages once a session is opened on the device. It must conform to ICDeviceDelegate protocol. In addition it should respond to selectors defined in ICScannerDeviceDelegate protocols in order to effectively interact with the device object. The messages this delegate can expect to receive are described by these protocols.
*/
@property(assign) id <ICDeviceDelegate> delegate;
/*!
    @property type
    @abstract Ôø° The type of the device as defined by ICDeviceType OR'd with its ICDeviceLocationType. The type of this device can be obtained by AND'ing the value retuned by this property with an appropriate ICDeviceTypeMask. The location type of this device can be obtained by AND'ing the value retuned by this property with an appropriate ICDeviceLocationTypeMask.
*/
@property(readonly) ICDeviceType type;
/*!
    @property name
    @abstract Ôø° Name of the device as reported by the device module or by the device transport when a device module is not in control of this device. This name may change if the device module overrides the default name of the device reported by the device's transport, or if the name of the filesystem volume mounted by the device is changed by the user.
*/
@property(readonly) NS String*name;
/*!
    @property icon
    @abstract Ôø° Icon image for the device.
*/
@property(readonly) CGImageRef icon;
/*!
    @property capabilities
    @abstract Ôø° The capabilities of the device as reported by the device module.
*/
@property(readonly) NSArray*capabilities;
/*!
    @property modulePath
    @abstract Ôø° Filesystem path of the device module that is associated with this device. scanner-specific capabilities are defined in ICScannerDevice.h.
*/
@property(readonly) NS String*modulePath;
/*!
    @property moduleVersion
    @abstract Ôø° The bundle version of the device module associated with this device. This may change if an existing device module associated with this device is updated or a new device module for this device is installed.
*/
@property(readonly) NS String*moduleVersion;
/*!
    @property moduleExecutableArchitecture
    @abstract Ôø° Executable Architecture of the device module in control of this device. This is equal to a value as defined in NSBundle.h or CFBundle.h.
*/
@property(readonly) int moduleExecutableArchitecture;
/*!
    @property remote
    @abstract Ôø° Indicates whether the device is a remote device published by Image Capture device sharing facility.
*/
@property(readonly, getter=is Remote) BOOL remote;
/*!
    @property shared
    @abstract Ôø° Indicates whether the device is shared using the Image Capture device sharing facility. This value will change when sharing of this device is enabled or disabled.
*/
@property(readonly, getter=is Shared) BOOL shared;
/*!
    @property hasConfigurableWiFiInterface
    @abstract Ôø° Indicates whether the device can be configured for use on a WiFi network.
*/
@property(readonly) BOOL hasConfigurableWiFiInterface;
/*!
    @property transportType
    @abstract Ôø° The transport type used by the device. The possible values are: ICTransportTypeUSB, ICTransportTypeFireWire, ICTransportTypeBluetooth, ICTransportTypeTCPIP, or ICTransportTypeMassStorage.
*/
@property(readonly) NSString*transportType;
/*!
    @property hasOpenSession
    @abstract Ôø° Indicates whether the device has an open session.
*/
@property(readonly) BOOL hasOpenSession;
/*!
    @property UUIDString
    @abstract Ôø° A string representation of the Universally Unique ID of the device.
*/
@property(readonly) NSString*UUIDString;
/*!
    @property buttonPressed
    @abstract Ôø° A string object with one of the ICButtonType*values defined above.
*/
@property(readonly) NSString*buttonPressed;
/*!
    @property autolaunchApplicationPath
    @abstract Ôø° Filesystem path of an application that is to be automatically launched when this device is added.
*/
@property(readwrite,copy)
NSString*autolaunchApplicationPath;
/*!
    @method requestOpenSession:
    @abstract This message requests to open a session on the device.

@discussion Make sure the receiver's delegate is set prior to sending this message; otherwise this message will be ignored. This request is completed when the delegate receives a "device:didOpenSessionWithError:" message. No more messages will be sent to the delegate if this request fails.
*/
-(void)requestOpenSession;
/*!
@method requestCloseSession
@abstract This message requests to close a previously opened session on this device.
@discussion This request is completed when the delegate receives a "device:didCloseSessionWithError:" message. This will be the last message sent to the delegate.
*/
-(void)requestCloseSession;
/*!
@method requestYield
@abstract This message requests the device module in control of this device to yield control.
@discussion This message should be used only if the client is planning on communiting with the device directly. The device module may not yield control of the device if it has an open session.
*/
-(void)requestYield;
@end
　　C. IC Device Browser
//
// ICDeviceBrowser.h
// ImageCaptureCore
//
// Copyright (c) 2008 Apple, Inc., all rights reserved.
//
// Best viewed with the following settings: Tab width 4, Indent width 2, Wrap lines, Indent wrapped lines by 3, Page guide 128.
//
/*!
@header ICDeviceBrowser
@discussion The ICDeviceBrowser object is used to find devices such as scanners that are supported by Image Capture. These device may be directly attached to the USB or FireWire bus on the host computer, shared by other computers, or available over a TCP/IP network. This object communicates with an Image Capture agent process asynchronously to accomplish this. There is only one instance of this class per process.
*/
import <ImageCaptureCore/ICDevice.h>
// Forward declarations
@class ICDeviceBrowser;
ICDeviceBrowserDelegate
/*!
@protocol ICDeviceBrowserDelegate <NSObject>
@abstract A delegate of ICDeviceBrowser must conform to ICDeviceBrowserDelegate protocol.
*/
@protocol ICDeviceBrowserDelegate <NSObject>
@required
/*!
@method deviceBrowser:didAddDevice:moreComing:
@abstract This message is sent to the delegate to inform that a device has been added.

@discussion If several devices are found during the initial search, then this message is sent once for each device with the value of 'moreComing' set to YES in each message except the last one.
*/
-(void)deviceBrowser:(ICDeviceBrowser*)browser didAddDevice:(ICDevice*)device moreComing:(BOOL)moreComing;
/*!
@method deviceBrowser:didRemoveDevice:moreGoing:
@abstract This message is sent to the delegate to inform that a device has been removed.
@discussion If several devices are removed at the same time, then this message is sent once for each device with the value of 'moreGoing' set to YES in each message except the last one.
*/
-(void)deviceBrowser:(ICDeviceBrowser*)browser didRemoveDevice:(ICDevice*)device moreGoing:(BOOL)moreGoing;
@optional
/*!
@method deviceBrowser:deviceDidChangeName:
@abstract This message is sent if the name of a device changes.
@discussion This happens if the device module overrides the default name of the device reported by the device's transport layer, or if the name of the filesystem volume mounted by the device is changed by the user.
*/
-(void)deviceBrowser:(ICDeviceBrowser*)browser deviceDidChangeName:(ICDevice*)device;
/*!
@method deviceBrowser: deviceDidChangeSharingState:
@abstract This message is sent when the sharing state of a device has changes.
@discusson Any Image Capture client application can choose to share the device over the network using the sharing or webSharing facility in Image Capture.
*/
-(void)deviceBrowser:(ICDeviceBrowser*)browser deviceDidChangeSharingState:(ICDevice*)device;
/*!
@method deviceBrowser:requestsSelectDevice:
@abstract This message is sent when an event that occurred on the device may be of interest to the client application.
@discussion In Mac OS X 10.6, this message is sent when a button is pressed on a device and the current application is the target for that button press. In the case of the button-press event, if a session is open on the device, this message will not be sent to the browser delegate, instead the message 'device: didReceiveButtonPress:' is sent to the device delegate.
*/
-(void)deviceBrowser:(ICDeviceBrowser*)browser requestsSelectDevice:(ICDevice*)device;
@optional
/*!
@method deviceBrowserDidEnumerateLocalDevices:deviceDidChangeSharingState:
@abstract This message is sent after the device browser completes sending 'deviceBrowser:didAddDevice:moreComing:' message for all local devices.
@discussion Detecting locally connected devices (USB and FireWire devices) is faster than detecting devices connected using a network protocol. An Image Capture client application may use this message to update its user interface to let the user know that it has completed looking for locally connected devices and then start looking for network devices.
*/
-(void)deviceBrowserDidEnumerateLocalDevices:(ICDeviceBrowser*)browser;
@end
ICDeviceBrowser
/*!
    @class ICDeviceBrowser
    @abstract The ICDeviceBrowser object is used to find devices such as scanners that are supported by Image Capture. These device may be directly attached to the USB or FireWire bus on the host computer, shared by other computers, or available over a TCP/IP network. This object communicates with an Image Capture agent process asynchronously to accomplish this. There is only one instance of this class per process.
*/
@interface ICDeviceBrowser: NSObject
{
@private
    id_privateData;
}
/*!
    @property delegate
    @abstract The delegate. It must conform to ICDeviceBrowserDelegate protocol. The messages this delegate can expect to receive are described by ICDeviceBrowserDelegate protocol.
*/
@property(assign) id <ICDeviceBrowserDelegate> delegate;
/*!
    @property browsing
    @abstract Indicates whether the device browser is browsing for devices.
*/
@property(readonly, getter=is Browsing) BOOL browsing;
/*!
    @property browsedDeviceTypeMask
    @abstract A mask whose set bits indicate the type of device(s) being browsed after the receiver receives the start message. This property can be changed while the browser is browsing for devices. This property can be constructed by OR'd values of ICDeviceTypeMask with values of ICDeviceLocationTypeMask.
*/
@property(readwrite) ICDeviceTypeMask browsedDeviceTypeMask;
/*!
    @property devices
    @abstract All devices found by the browser. This property will change as devices appear and disappear.
*/
@property(readonly) NSArray*devices;
/*!
    @method sharedDeviceBrowser
    @abstract This is the designated initializer.
*/
-(id)init;
/*!
    @method start:
    @abstract This message tells the receiver to start looking for devices.
    @discussion Make sure that the receiver's delegate is set prior to sending this message; otherwise this message will be ignored. The messages the delegate can expect to receive are described by ICDeviceBrowserDelegate protocol.
*/
-(void)start;
/*!
    @method stop:
    @abstract This method tells the receiver to stop looking for devices.
    @discussion This will free all device instances that are not in use.
*/
-(void)stop;
@end D. IC Scanner Device //
// ICScannerDevice.h
// ImageCaptureCore
//
// Copyright (c) 2008 Apple Inc., all rights reserved.
//
// Best viewed with the following settings: Tab width 4, Indent width 2, Wrap lines, Indent wrapped lines by 3, Page guide 128.
//
/*!
    @header ICScannerDevice
    ICScannerDevice is a concrete subclass of ICDevice class. ICDeviceBrowser creates instances of this class. In this release, an instance of ICScannerDevice class is intended to be used by the ICScannerDeviceView object. The ICScannerDeviceView class encapsulates the complexities of setting scan parameters, performing scans and saving the result. The developer should consider using ICScannerDeviceView instead of building their own views using the ICScannerDevice object.
*/
import <ImageCaptureCore/ICDevice.h>
import <ImageCaptureCore/ICScannerFunctionalUnits.h>
// Constants used for device status notifications.
/*!
    @const ICScannerStatusWarmingUp
    @abstract ICScannerStatusWarmingUp
    @discussion A non-localized notification string to indicate that the scanner is warming up.
*/
extern NSString*const ICScannerStatusWarmingUp;
/*!
    @const ICScannerStatusWarmUpDone
    @abstract ICScannerStatusWarmUpDone
    @discussion A non-localized notification string to indicate that the scanner has warmed up.
*/
extern NSString*const ICScannerStatusWarmUpDone;
/*!
    @const ICScannerStatusRequestsOverviewScan
    @abstract ICScannerStatusRequestsOverviewScan
    @discussion A non-localized notification string to indicate that the scanner is requesting an overview scan to be performed.
*/
extern NSString*const ICScannerStatusRequestsOverviewScan;
-Constants
/*!
    @enum ICScannerTransferMode
    @abstract Transfer mode to be used when transferring scan data from the scanner functional unit.

@constant ICScannerTransferModeFileBased Save the scan as a file.
@constant ICScannerTransferModeMemoryBased Transfer the scan as data.
*/
enum
{
    ICScannerTransferModeFileBased=0,
    ICScannerTransferModeMemoryBased=1
};
typedef NSUInteger IC ScannerTransferMode;
Forward Declarations
@class ICScannerDevice;
ICScannerDeviceDelegate
/*!
    @protocol ICScannerDeviceDelegate <ICDeviceDelegate>
    @abstract A delegate of ICScannerDevice must conform to ICScannerDeviceDelegate protocol.
    @discussion The ICScannerDeviceDelegate protocol inherits from the ICDeviceDelegate protocol.
*/
@protocol ICScannerDeviceDelegate <ICDeviceDelegate>
@optional
/*!
    @method scannerDeviceDidBecomeAvailable:
    @abstract This message is sent when another client closes an open session on the scanner.
    @discussion Scanners require exclusive access, only one client can open a session on a scanner. The scanner is available if it does not have a session opened by another client. Attempting to open a session on a scanner that already has an open session for another client will result in an error. A client that wants to open a session on a scanner as soon as it is available should implement this method and send "requestOpenSession" message to scanner object from that method.
*/
-(void)scannerDeviceDidBecomeAvailable:(ICScannerDevice*)scanner;
/*!
    @method scannerDevice:didSelectFunctionalUnit:error:
    @abstract This message is sent when a functional unit is selected on the scanner device.
    @discussion A functional unit is selected immediately after the scanner device is instantiated and in response to "requestSelectFunctionalUnit:" message.
*/
-(void)scannerDevice:(ICScannerDevice*)scanner didSelectFunctionalUnit:(ICScannerFunctionalUnit*)functionalUnit error:(NSError*)error;
/*!
    @method scannerDevice:didScanToURL:data:
    @abstract This message is sent when the scanner device receives the requested scan. If selectedFunctionalUnit is a document feeder, then this message will be sent once for each scanned page.
    @discussion This message is sent when the scanner device receives the requested scan. If selectedFunctionalUnit is a document feeder, then this message will be sent once for each scanned page.
*/
-(void)scannerDevice:(ICScannerDevice*)scanner didScanToURL:(NSURL*)url data:(NSData*)data;
/*!
    @method scannerDevice:didCompleteOverviewScanWithError:
    @abstract This message is sent after the scanner device completes an overview scan.
    @discusson This message is sent after the scanner device completes an overview scan.
*/
-(void)scannerDevice:(ICScannerDevice*)scanner didCompleteOverviewScanWithError: (NSError*)error;
/*!
    @method scannerDevice:didCompleteScanWithError:
    @abstract This message is sent after the scanner device completes a scan.
    @discusson This message is sent after the scanner device completes a scan.
*/
-(void)scannerDevice:(ICScannerDevice*)scanner didCompleteScanWithError:(NSError*)error;
@end
/*!
    @class ICScannerDevice
    @abstract ICScannerDevice is a concrete subclass of ICDevice class. ICDeviceBrowser creates instances of this class.
    @discussion In this release, an instance of ICScannerDevice class is intended to be used by the ICScannerDeviceView object. The ICScannerDeviceView class encapsulates the complexities of setting scan parameters, performing scans and saving the result. The developer should consider using ICScannerDeviceView instead of building their own views using the ICScannerDevice object.
*/
@interface ICScannerDevice: ICDevice
{
@private
    id_scannerProperties;
}
/*!
    @property availableFunctionalUnitTypes
    @abstract Ôø° An array of functional unit types available on this scanner device. This is an array of NSNumber objects whose values are of type ICScannerFunctionalUnitType.
*/
@property(readonly)
NSArray*availableFunctionalUnitTypes;
/*!
    @property selectedFunctionalUnit
    @abstract Ôø° The currently selected functional unit on the scanner device.
*/
@property(readonly)
ICScannerFunctionalUnit*selectedFunctionalUnit;
/*!
    @property transferMode
    @abstract Ôø° The transfer mode for scanned document.
*/
@property ICScannerTransferMode transferMode;
/*!
    @property downloadsDirectory
    @abstract Ôø° The downloads directory.
*/
@property(retain) NSURL*downloadsDirectory;
/*!
    @property documentName
    @abstract Ôø° The document name.
*/
@property(copy) NSString*documentName;
/*!
    @property documentUTI @abstract Ôø° The document UTI. Currently supported UTIs are: kUTTypeJPEG, kUTTypeJPEG2000, kUTType-TIFF, kUTTypePNG etc.
*/
@property(copy) NSString*documentUTI;
/*!
@method requestSelectFunctionalUnit:delegate:selector:contextInfo:
@abstract Requests the scanner device to select a functional unit.
@discussion When this request is completed, the delegate will be notified using the 'scannerDevice:didSelectFunctionalUnit:error:' message.
*/
-(void)requestSelectFunctionalUnit:(ICScannerFunctionalUnitType)type;
/*!
@method requestOverviewScan
@abstract Starts an overview scan on selectedFunctionalUnit.
@discussion When this request is completed, the delegate will be notified using the 'scannerDevice:didCompleteOverviewScanWithError:' message. The content of error returned should be examined to determine if the request completed successfully.
*/
-(void)requestOverviewScan;
/*!
@method requestScan
@abstract Starts a scan on selectedFunctionalUnit.
@discussion When this request is completed, the delegate will be notified using the 'scannerDevice:didCompleteScanWithError:' message. The content of error returned should be examined to determine if the request completed successfully.
*/
-(void)requestScan;
/*!
@method cancelScan
@abstract Cancels the current scan operation started by sending a 'requestOverviewScan' or 'requestScan'.
*/
-(void)cancelScan;
@end
   E. IC Scanner Functional Units
//
// ICScannerFunctionalUnits.h
// ImageCaptureCore
//
// Copyright (c) 2008 Apple Inc., all rights reserved.
//
// Best viewed with the following settings: Tab width 4, Indent width 2, Wrap lines, Indent wrapped lines by 3, Page guide 128.
//
/*!
@header ICScannerFunctionalUnit
@abstract ICScannerFunctionalUnit is an abstract class that represents a scanner functional unit. ImageCaptureCore defines three concrete subclasses of ICScannerFunctionalUnit: ICScannerFunctionalUnitFlatbed, ICScannerFunctionalUnitPositiveTransparency, ICScannerFunctionalUnitNegativeTransparency and ICScannerFunctionalUnitDocumentFeeder. ICScannerDevice creates instances of these concrete subclasses.
*/
import <ImageCaptureCore/ICCommonConstants.h>
-Constants
/*!
@enum ICScannerFunctionalUnitType
@abstract Scanner Functional Unit Types
@constant ICScannerFunctionalUnitTypeFlatbed Flatbed functional unit.
@constant ICScannerFunctionalUnitTypePositiveTransparency Transparency functional unit for scanning positives.
@constant ICScannerFunctionalUnitTypeNegativeTransparency Transparency functional unit for scanning negatives.
@constant ICScannerFunctionalUnitTypeDocumentFeeder Document feeder functional unit.
*/
enum
{
    ICScannerFunctionalUnitTypeFlatbed=0,
    ICScannerFunctionalUnitTypePositiveTransparency=1,
    ICScannerFunctionalUnitTypeNegativeTransparency=2,
    ICScannerFunctionalUnitTypeDocumentFeeder=3
};
typedef NSUInteger ICScannerFunctionalUnitType;
/*!
@enum ICScannerMeasurementUnit
@abstract Unit of measurement used by the scanner. This corresponds to values used for ICAP_UNITS as defined in the TWAIN Specification.
@constant ICScannerMeasurementUnitInches 1 inch=2.54 cm
@constant ICScannerMeasurementUnitCentimeters 1 cm=1.00 cm or $\frac{1}{2.54}$ inches
@constant ICScannerMeasurementUnitPicas 1 pica=0.42333333 cm or $\frac{1}{6}$ inches
@constant ICScannerMeasurementUnitPoints 1 point=0.0352777775 cm or $\frac{1}{72}$ inches
@constant ICScannerMeasurementUnitTwips 1 twip=0.0001763888 cm or $\frac{1}{1440}$ inches
@constant ICScannerMeasurementUnitPixels
*/
enum
{
    ICScannerMeasurementUnitInches=0,
    ICScannerMeasurementUnitCentimeters=1,
    ICScannerMeasurementUnitPicas=2,
    ICScannerMeasurementUnitPoints=3,
    ICScannerMeasurementUnitTwips=4,
    ICScannerMeasurementUnitPixels=5
};
typedef NSUInteger ICScannerMeasurementUnit;
/*!
@enum ICScannerBitDepth
@abstract Bits per channel in the scanned image.
@constant ICScannerBitDepth1Bit 1-bit image.
@constant ICScannerBitDepth8Bits Image with 8 bits per channel.
@constant ICScannerBitDepth16Bits Image with 16 bits per channel.
*/
enum
{
    ICScannerBitDepth1Bit=1,
    ICScannerBitDepth8Bits=8,
    ICScannerBitDepth16Bits=16
};
typedef NSUInteger ICScannerBitDepth;
/*!
@enum ICScannerColorDataFormatType @abstract Identifies color data formats. Only relevant for multi-channel data. Corresponds to "ICAP_PLANARCHUNKY" of the TWAIN Specification.
 @constant ICScannerColorDataFormatTypeChunky For multi-channel data (e.g., RGB) data from all channels are interleaved.
 @constant ICScannerColorDataFormatTypePlanar For multi-channel data (e.g., RGB) each channel is transferred sequentially.
*/
enum
{
  ICScannerColorDataFormatTypeChunky=0,
  ICScannerColorDataFormatTypePlanar=1
},
typedef NSUInteger ICScannerColorDataFormatType;
/*!
 @enum ICScannerPixelDataType
 @abstract Pixel data types. Corresponds to "ICAP_PIXELTYPE" of the TWAIN Specification.
 @constant ICScannerPixelDataTypeBW Monochrome 1 bit pixel image.
 @constant ICScannerPixelDataTypeRGB Color image RGB color space.
 @constant ICScannerPixelDataTypePalette Indexed Color image.
 @constant ICScannerPixelDataTypeCMY Color image in CMY color space.
 @constant ICScannerPixelDataTypeCMYK Color image in CMYK color space.
 @constant ICScannerPixelDataTypeYUV Color image in YUV color space.
 @constant ICScannerPixelDataTypeYUVK Color image in YUVK color space.
 @constant ICScannerPixelDataTypeCIEXYZ Color image in CIEXYZ color space.
*/
enum
{
  ICScannerPixelDataTypeBW=0,
  ICScannerPixelDataTypeGray=1,
  ICScannerPixelDataTypeRGB=2,
  ICScannerPixelDataTypePalette=3,
  ICScannerPixelDataTypeCMY=4,
  ICScannerPixelDataTypeCMYK=5,
  ICScannerPixelDataTypeYUV=6,
  ICScannerPixelDataTypeYUVK=7,
  ICScannerPixelDataTypeCIEXYZ=8
};
typedef NSUInteger IC ScannerPixelDataType;
/*!
 @enum ICScannerDocumentType
 @abstract Document size types. Corresponds to "ICAP_SUPPORTEDSIZES" used by the Image Capture scanner modules. Also refer to TWAIN 1.9 Specification, page 9-483.
 @constant ICScannerDocumentTypeDefault This is the platten size. Not valid for scanners without a platten.
 @constant ICScannerDocumentTypeA4 A4, 210.00 mm×297.00 mm
 @constant ICScannerDocumentTypeB5 B5/JIS B5, 182.00 mm×257.00 mm
 @constant ICScannerDocumentTypeUSLetter US Letter, 8.5,Äù×11.0,Äù, 215.90 mm×279.40 mm
 @constant ICScannerDocumentTypeUSLegal US Legal, 8.5,Äù×14.0,Äù, 215.90 mm×355.60 mm
 @constant ICScannerDocumentTypeA5 A5, 148.00 mm×210.00 mm
 @constant ICScannerDocumentTypeISOB4 B4/ISO B4, 250.00 mm×353.00 mm
 @constant ICScannerDocumentTypeISOB6 B6/ISO B6, 125.00 mm×176.00 mm
 @constant ICScannerDocumentTypeUSLedger US Ledger, 11,Äù×17.0,Äù, 279.40 mm×431.80 mm
 @constant ICScannerDocumentTypeUSExecutive US Executive, 7.25"×10.5", 184.15 mm×266.70 mm
 @constant ICScannerDocumentTypeA3 A3, 297.00 mm×420.00 mm
 @constant ICScannerDocumentTypeISOB3 B3/ISO B3, 353.00 mm×500.00 mm
 @constant ICScannerDocumentTypeA6 A6, 105.00 mm×148.00 mm
 @constant ICScannerDocumentTypeC4 C4, 229.00 mm×324.00 mm
 @constant ICScannerDocumentTypeC5 C5, 162.00 mm×229.00 mm
 @constant ICScannerDocumentTypeC6 C6, 114.00 mm×162.00 mm
 @constant ICScannerDocumentType4A0 4A0, 1682.00 mm×2378.00 mm
 @constant ICScannerDocumentType2A0 2A0, 1189.00 mm×1682.00 mm
 @constant ICScannerDocumentTypeA0 A0, 841.00 mm×1189.00 mm
 @constant ICScannerDocumentTypeA1 A1, 594.00 mm×841.00 mm
 @constant ICScannerDocumentTypeA2 A2, 420.00 mm×594.00 mm
 @constant ICScannerDocumentTypeA7 A7, 74.00 mm×105.00 mm
 @constant ICScannerDocumentTypeA8 A8, 52.00 mm×74.00 mm
 @constant ICScannerDocumentTypeA9 A9, 37.00 mm×52.00 mm
 @constant ICScannerDocumentType10 A10, 26.00 mm×37.00 mm
 @constant ICScannerDocumentTypeISOB0 ISO B0, 1000.00 mm×1414.00 mm
 @constant ICScannerDocumentTypeISOB1 ISO B1, 707.00 mm×1000.00 mm
 @constant ICScannerDocumentTypeISOB2 ISO B2, 500.00 mm×707.00 mm
 @constant ICScannerDocumentTypeISOB5 ISO B5, 176.00 mm×250.00 mm
 @constant ICScannerDocumentTypeISOB7 ISO B7, 88.00 mm×125.00 mm
 @constant ICScannerDocumentTypeISOB8 ISO B8, 62.00 mm×88.00 mm
 @constant ICScannerDocumentTypeISOB9 ISO B9, 44.00 mm×62.00 mm
 @constant ICScannerDocumentTypeISOB10 ISO B10, 31.00 mm×44.00 mm
 @constant ICScannerDocumentTypeJISB0 JIS B0, 1030.00 mm×1456.00 mm
 @constant ICScannerDocumentTypeJISB1 JIS B1, 728.00 mm×1030.00 mm
 @constant ICScannerDocumentTypeJISB2 JIS B2, 515.00 mm×728.00 mm
 @constant ICScannerDocumentTypeJISB3 JIS B3, 364.00 mm×515.00 mm
 @constant ICScannerDocumentTypeJISB4 JIS B4, 257.00 mm×364.00 mm
 @constant ICScannerDocumentTypeJISB6 JIS B6, 128.00 mm×182.00 mm @constant ICScannerDocumentTypeJISB7 JIS B7, 91.00 mm×128.00 mm
@constant ICScannerDocumentTypeJISB8 JIS B8, 64.00 mm×91.00 mm
@constant ICScannerDocumentTypeJISB9 JIS B9, 45.00 mm×64.00 mm
@constant ICScannerDocumentTypeJISB10 JIS B10, 32.00 mm×45.00 mm
@constant ICScannerDocumentTypeC0 C0, 917.00 mm×1297.00 mm
@constant ICScannerDocumentTypeC1 C1, 648.00 mm×917.00 mm
@constant ICScannerDocumentTypeC2 C2, 458.00 mm×648.00 mm
@constant ICScannerDocumentTypeC3 C3, 324.00 mm×458.00 mm
@constant ICScannerDocumentTypeC7 C7, 81.00 mm×114.00 mm
@constant ICScannerDocumentTypeC8 C8, 57.00 mm×81.00 mm
@constant ICScannerDocumentTypeC9 C9, 40.00 mm×57.00 mm
@constant ICScannerDocumentTypeC10 C10, 28.00 mm×40.00 mm
@constant ICScannerDocumentTypeUSStatement US Statement, 5.5,Äù×8.5,Äù, 139.70 mm×215.90 mm
@constant ICScannerDocumentTypeBusinessCard Business Card, 90.00 mm×55.00 mm
@constant ICScannerDocumentTypeE Japanese E, 3.25"×4.75" 82.55 mm×120.65 mm 11:16
@constant ICScannerDocumentType3R 3R, 3.5"×5" 88.90 mm×127.00 mm 7:10
@constant ICScannerDocumentType4R 4R, 4"×6" 101.60 mm×152.40 mm 2:3
@constant ICScannerDocumentType5R 5R, 5"×7" 127.00 mm×177.80 mm 5:7
@constant ICScannerDocumentType6R 6R, 6"×8" 152.40 mm×203.20 mm 3:4
@constant ICScannerDocumentType8R 8R, 8"×10" 203.20 mm×254.00 mm 4:5
@constant ICScannerDocumentTypeS8R S8R 8"×12" 203.20 mm×304.80 mm 2:3
@constant ICScannerDocumentType10R 10R, 10"×12" 254.00 mm×304.80 mm 5:6
@constant ICScannerDocumentTypeS10R S10R, 10"×15" 254.00 mm×381.00 mm 2:3
@constant ICScannerDocumentType11R 11R, 11"×14" 279.40 mm×355.60 mm 11:14
@constant ICScannerDocumentType12R 12R, 12"×15" 304.80 mm×381.00 mm 4:5
@constant ICScannerDocumentTypeS12R S12R, 12"×18" 304.80 mm×457.20 mm 2:3
*/
enum
{
　ICScannerDocumentTypeDefault=0,
　ICScannerDocumentTypeA4=1,
　ICScannerDocumentTypeB5=2,
　ICScannerDocumentTypeUSLetter=3,
　ICScannerDocumentTypeUSLegal=4,
　ICScannerDocumentTypeA5=5,
　ICScannerDocumentTypeISOB4=6,
　ICScannerDocumentTypeISOB6=7,
　ICScannerDocumentTypeUSLedger=9,
　ICScannerDocumentTypeUSExecutive=10,
　ICScannerDocumentTypeA3=11,
　ICScannerDocumentTypeISOB3=12,
　ICScannerDocumentTypeA6=13,
　ICScannerDocumentTypeC4=14,
　ICScannerDocumentTypeC5=15,
　ICScannerDocumentTypeC6=16,
　ICScannerDocumentType4A0=17,
　ICScannerDocumentType2A0=18,
　ICScannerDocumentTypeA0=19,
　ICScannerDocumentTypeA1=20,
　ICScannerDocumentTypeA2=21,
　ICScannerDocumentTypeA7=22,
　ICScannerDocumentTypeA8=23,
　ICScannerDocumentTypeA9=24,
　ICScannerDocumentType10=25,
　ICScannerDocumentTypeISOB0=26,
　ICScannerDocumentTypeISOB1=27,
　ICScannerDocumentTypeISOB2=28,
　ICScannerDocumentTypeISOB5=29,
　ICScannerDocumentTypeISOB7=30,
　ICScannerDocumentTypeISOB8=31,
　ICScannerDocumentTypeISOB9=32,
　ICScannerDocumentTypeISOB10=33,
　ICScannerDocumentTypeJISB0=34,
　ICScannerDocumentTypeJISB1=35,
　ICScannerDocumentTypeJISB2=36,
　ICScannerDocumentTypeJISB3=37,
　ICScannerDocumentTypeJISB4=38,
　ICScannerDocumentTypeJISB6=39,
　ICScannerDocumentTypeJISB7=40,
　ICScannerDocumentTypeJISB8=41,
　ICScannerDocumentTypeJISB9=42,
　ICScannerDocumentTypeJISB10=43,
　ICScannerDocumentTypeC0=44,
　ICScannerDocumentTypeC1=45,
　ICScannerDocumentTypeC2=46,
　ICScannerDocumentTypeC3=47,
　ICScannerDocumentTypeC7=48,
　ICScannerDocumentTypeC8=49,
　ICScannerDocumentTypeC9=50,
　ICScannerDocumentTypeC10=51,
　ICScannerDocumentTypeUSStatement=52,
　ICScannerDocumentTypeBusinessCard=53,
　ICScannerDocumentTypeE=60,
　ICScannerDocumentType3R=61,
　ICScannerDocumentType4R=62,
　ICScannerDocumentType5R=63,
　ICScannerDocumentType6R=64,
　ICScannerDocumentType8R=65,
　ICScannerDocumentTypeS8R=66,
　ICScannerDocumentType10R=67,
　ICScannerDocumentTypeS10R=68,
　ICScannerDocumentType11R=69,
　ICScannerDocumentType12R=70,
　ICScannerDocumentTypeS12R=71
};
typedef NSUInteger ICScannerDocumentType;
/*!
@enum ICScannerFunctionalUnitState
@abstract A flag to indicate the scanner functional unit's state
@constant ICScannerStateReady The scanner functional unit is ready for operation.
@constant ICScannerStateScanInProgress The scanner functional unit is performing a scan.
@constant ICScannerStateOverviewScanInProgress The scanner functional unit is performing an overview scan.

```
*/
enum
{
    ICScannerFunctionalUnitStateReady=(1<<0),
    ICScannerFunctionalUnitStateScanInProgress=(1<<1),
    ICScannerFunctionalUnitStateOverviewScanInProgress=(1<<2)
};
typedef unsigned int ICScannerFunctionalUnitState;
/*!
    @enum ICScannerFeatureType
    @abstract Scanner Feature Types
    @constant ICScannerFeatureTypeEnumeration This feature can have one of several discrete values, strings or numbers.
    @constant ICScannerFeatureTypeRange This value of this feature lies within a range.
    @constant ICScannerFeatureTypeBoolean The value of this feature can be YES or NO.
*/
enum
{
    ICScannerFeatureTypeEnumeration=0,
    ICScannerFeatureTypeRange=1,
    ICScannerFeatureTypeBoolean=2,
    ICScannerFeatureTypeTemplate=3
};
typedef NSUInteger ICScannerFeatureType;
ICScannerFeature
/*!
    @class ICScannerFeature
    @abstract ICScannerFeature class is an abstract base class used to describe a scanner feature. ImageCaptureCore defines three concrete subclasses of ICScannerFeature: ICScannerFeatureEnumeration, IC ScannerFeatureRange and ICScannerFeatureBoolean.
    @discussion The scanner functional units may have one or more instances of these classes to allow users to choose scanner-specific settings or operations before performing a scan.
*/
@interface ICScannerFeature: NSObject
{
@private
    id_sfProps;
}
/*!
    @property type
    @abstract Ôø° Scanner feature type.
*/
@property(readonly) ICScannerFeatureType type;
/*!
    @property internalName
    @abstract Ôø° The internal name of this feature.
*/
@property(readonly) NSString*internalName;
/*!
    @property humanReadableName
    @abstract The human readable name of this feature.
*/
@property(readonly) NSString*humanReadableName;
/*!
    @property tooltip
    @abstract Ôø° Tooltip text describing the feature.
*/
@property(readonly) NSString*tooltip;
@end
ICScannerFeatureEnumeration
/*!
    @class ICScannerFeatureEnumeration
    @abstract ICScannerFeatureEnumeration object is used to represent a feature of a scanner functional unit that can have one of several discrete values.
    @discussion
*/
@interface ICScannerFeatureEnumeration: ICScannerFeature
{
@private
    id_evProps;
}
/*!
    @property currentValue
    @abstract The current value. The current value can be set to one of the possible values in the "values" property belowÔø°.
*/
@property(assign) id currentValue;
/*!
    @property defaultValue
    @abstract Ôø° The default value. The default value can be set to one of the possible values in the "values" property below.
*/
@property(readonly) id defaultValue;
/*!
    @property values
    @abstract An array of possible values. All items in this array must be of same typeÔø°.
*/
@property(readonly) NSArray*values;
/*!
    @property menuItemLabels
    @abstract Ôø° The human readable menu item labels to be used in a menu to allow the user to select the current value from an array of possible values.
*/
@property(readonly) NSArray*menuItemLabels;
/*!
    @property menuItemLabelsTooltips
    @abstract Ôø° Tooltip text associated with the menu items.
*/
@property(readonly) NSArray*menuItemLabelsTooltips;
@end
ICScannerFeatureRange
/*!
    @class ICScannerFeatureRange
    @abstract ICScannerFeatureRange object is used to represent a property of a scanner functional unit whose value lies within a range.
    @discussion
*/
@interface ICScannerFeatureRange: ICScannerFeature
{
@private
    id_rvProps;
}
/*!
    @property currentValue
    @abstract Ôø° The current value. Attempting to set the current value to a value that is not coincident with a step will result in a value corresponding to the nearest step being assigned to the current value.
```

```
*/
@property(assign) CGFloat currentValue;
/*!
    @property defaultValue
    @abstract The default valueÔø°. Attempting to set the
default value to a value that is not coincident with a step will
result in a value corresponding to the nearest step being
assigned to the default value.
*/
@property(readonly) CGFloat defaultValue;
/*!
    @property minValue
    @abstract The minimum value.
*/
@property(readonly) CGFloat minValue;
/*!
    @property maxValue
    @abstract Ôø° The maximum value.
*/
@property(readonly) CGFloat maxValue;
/*!
    @property stepSize
    @abstract Ôø° The step size.
*/
@property(readonly) CGFloat stepSize;
@end
ICScannerFeatureBoolean
/*!
    @class ICScannerFeatureBoolean
    @abstract ICScannerFeatureBoolean object is used to represent a property of a scanner functional unit whose value can be YES or NO.
    @discussion
*/
@interface ICScannerFeatureBoolean: ICScannerFeature
{
@private
    id _bvProps;
}
/*!
    @property value
    @abstract Ôø° The value of this feature.
*/
@property(readwrite) BOOL value;
@end
ICScannerFeatureTemplate
/*!
    @class ICScannerFeatureTemplate
    @abstract ICScannerFeatureTemplate object is used to
define a group of one or more rectangular scan areas that can
be used with a scanner functional unit.
    @discussion
*/
@interface ICScannerFeatureTemplate: ICScannerFeature
{
@private
    id _tvProps;
}
@property(readonly) NSArray*targets;
@end
ICScannerFunctionalUnit
/*!
    @class ICScannerFunctionalUnit
    @abstract ICScannerFunctionalUnit is an abstract class
that represents a scanner functional unit. ImageCaptureCore
defines three concrete subclasses of ICScannerFunctionalUnit: ICScannerFunctionalUnitFlatbed, ICScannerFunctionalUnitPositiveTransparency, ICScannerFunctionalUnitNegativeTransparency and ICScannerFunctionalUnitDocumentFeeder. ICScannerDevice creates instances of these concrete subclasses.
*/
@interface ICScannerFunctionalUnit: NSObject
{
@private
    id _fuProps;
}
/*!
    @property type
    @abstract Ôø° Functional unit type.
*/
@property(readonly) ICScannerFunctionalUnitType type;
/*!
    @property pixelDataType
    @abstract Ôø° The pixel data type.
*/
@property(readwrite) IC ScannerPixelDataType pixelDataType;
/*!
    @property supportedBitDepths
    @abstract Ôø° Supported bit depths. The values in this set are valid values defined by ICScannerBitDepth.
*/
@property(readonly) NSIndexSet*supportedBitDepths;
/*!
    @property bitDepth
    @abstract Ôø° The bit depth to use when performing the final scan. This will always be one of the supported bit depths.
*/
@property(readwrite) ICScannerBitDepth bitDepth;
/*!
    @property supportedMeasurementUnits
    @abstract Ôø° Supported measurement units. The values in this set are valid values defined by ICScannerMeasurementUnit.
*/
@property(readonly) NSIndexSet*supportedMeasurementUnits;
/*!
    @property measurementUnit
    @abstract Ôø° Current measurement unit. This will always be one of the supported measurement units.
*/
@property(readwrite) ICScannerMeasurementUnit measurementUnit;
/*!
    @property supportedResolutions
    @abstract Ôø° Supported scan resolutions in DPI.
*/
@property(readonly) NSIndexSet*supportedResolutions;
/*!
    @property preferredResolutions
    @abstract Ôø° Preferred scan resolutions in DPI.
*/
@property(readonly) NSIndexSet*preferredResolutions;
/*!
    @property resolution
    @abstract Ôø° Current scan resolution. This will always be one of the supported resolution values.
*/
@property(readwrite) NSUInteger resolution;
/*!
    @property supportedScaleFactors
    @abstract Ôø° Supported scale factors in percentage.
```

```
*/
@property(readonly) NSIndexSet*supportedScaleFactors;
/*!
    @property preferredScaleFactors
    @abstract Ôø° Preferred scale factors in percentage.
*/
@property(readonly)NSIndexSet*preferredScaleFactors;
/*!
    @property scaleFactor
    @abstract Ôø° Current scale factor. This will always be one of the supported scale factor values.
*/
@property(readwrite) NSUInteger scaleFactor;
/*!
    @property templates
    @abstract An array of objects of type ICScannerFeatureTemplate.
*/
@property(readonly) NSArray*templates;
/*!
    @property vendorFeatures
    @abstract An array of objects of type ICScannerFeature.
*/
@property(readonly) NSArray*vendorFeatures;
/*!
    @property physicalSize
    @abstract Ôø° Physical size of the scan area in current measurement unit.
*/
@property(readonly) NSSize physicalSize;
/*!
    @property scanArea
    @abstract Ôø° This property along with scanAreaOrientation describes the area to be scanned.
*/
@property(readwrite) NSRect scanArea;
/*!
    @property scanAreaOrientation
    @abstract Ôø° Desired orientation of the scan area. This property along with scanArea describes the area to be scanned.
    @discussion This property is set to ICEXIFOrientationl initially. This property is not used by the IC ScannerFunctionalUnitDocumentFeeder subclass.
*/
@property(readwrite)   ICEXIFOrientationType   scanAreaOrientation;
/*!
    @property           acceptsThresholdForBlackAndWhiteScanning
    @abstract Ôø° Indicates if this functional unit accepts threshold value to be used when performing a scan in black & white.
*/
@property(readonly)   BOOL   acceptsThresholdForBlackAndWhiteScanning;
/*!
    @property usesThresholdForBlackAndWhiteScanning
    @abstract Ôø° Indicates if this functional unit uses threshold value to be used when performing a scan in black & white.
*/
@property(readwrite) BOOL usesThresholdForBlackAndWhiteScanning;
/*!
    @property defaultThresholdForBlackAndWhiteScanning
    @abstract Ôø° Default threshold value used when performing a scan in black & white. This value is from 0 to 255.
*/
@property(readonly) unsigned char defaultThresholdForBlackAndWhiteScanning;
/*!
    @property thresholdForBlackAndWhiteScanning
    @abstract Ôø° Threshold value to be used when performing a scan in black & white. This value should be from 0 to 255.
*/
@property(readwrite)   unsigned   char   thresholdForBlackAndWhiteScanning;
/*!
    @property state
    @abstract Ôø° Indicates the current state of the functional unit.
*/
@property(readonly) ICScannerFunctionalUnitState state;
/*!
    @property scanInProgress
    @abstract Ôø° Indicates if a scan is in progress.
*/
@property(readonly) BOOL scanInProgress;
/*!
    @property scanProgressPercentDone
    @abstract Ôø° Indicates percentage of scan completed.
*/
@property(readonly) CGFloat scanProgressPercentDone;
/*!
    @property canPerformOverviewScan
    @abstract Ôø° Indicates if this functional unit can perform an overview scan. Not all functional units can perform an overview scan. For example, a document feeder or a sheet feeder unit cannot perform an overview scan.
*/
@property(readonly) BOOL canPerformOverviewScan;
/*!
    @property overviewScanInProgress
    @abstract Ôø° Indicates if an overview scan is in progress.
*/
@property(readonly) BOOL overviewScanInProgress;
/*!
    @property overviewImage
    @abstract Ôø° Overview scan image. This property will be NULL for functional units that do not support overview scans.
*/
@property(readonly) CGImageRef overviewImage;
/*!
    @property overviewResolution
    @abstract Ôø° Overview image resolution. Value assigned to this will be constrained by resolutions allowed by the device.
*/
@property(readwrite) NSUInteger overviewResolution;
@end
ICScannerFunctionalUnitFlatbed
/*!
    @class IC ScannerFunctionalUnitFlatbed
    @abstract ICScannerFunctionalUnitFlatbed is a concrete subclass of ICScannerFunctionalUnit class. ICScannerDevice creates instances of this class.
    @discussion This represents the flatbed unit on the scanner.
*/
@interface  ICScannerFunctionalUnitFlatbed:  ICScannerFunctionalUnit
```

```
{
@private
   id_fbProps;
}
@end
ICScannerFunctionalUnitPositiveTransparency
/*!
   @class ICScannerFunctionalUnitPositiveTransparency
   @abstract        ICScannerFunctionalUnitPositiveTransparency is a concrete subclass of ICScannerFunctionalUnit class. ICScannerDevice creates instances of this class.
   @discussion This represents the transparency unit on the scanner for scanning positives
*/
@interface ICScannerFunctionalUnitPositiveTransparency: ICScannerFunctionalUnit
{
@private
   id_ptrProps;
}
@end
ICScannerFunctionalUnitNegativeTransparency
/*!
   @class ICScannerFunctionalUnitNegativeTransparency
   @abstract        ICScannerFunctionalUnitNegativeTransparency is a concrete subclass of ICScannerFunctionalUnit class. ICScannerDevice creates instances of this class.
   @discussion This represents the transparency unit on the scanner for scanning negatives.
*/
@interface        ICScannerFunctionalUnitNegativeTransparency: ICScannerFunctionalUnit
{
@private
   id_ntrProps;
}
@end
ICScannerFunctionalUnitDocumentFeeder
/*!
   @class ICScannerFunctionalUnitDocumentFeeder
   @abstract ICScannerFunctionalUnitDocumentFeeder is a concrete subclass of ICScannerFunctionalUnit class. ICScannerDevice creates instances of this class.
   @discussion This represents the document feeder unit on the scanner.
*/
@interface     ICScannerFunctionalUnitDocumentFeeder: ICScannerFunctionalUnit
{
@private
   id_dfProps;
}
/*!
   @property supportedDocumentTypes
   @abstract Ôø° Supported document types. The values in this set are valid values defined by ICScannerDocumentType.
*/
@property(readonly)
NSIndexSet*supportedDocumentTypes;
/*!
   @property documentType
   @abstract Ôø° Current document type. This will always be one of the supported sizes.
*/
@property(readwrite) IC ScannerDocumentType documentType;
/*!
   @property documentSize
   @abstract Ôø° Document size of the current document type expressed in current measurement unit.
*/
@property(readonly) NSSize documentSize;
/*!
   @property supportsDuplexScanning
   @abstract Ôø° Indicates whether duplex scanning is supported.
*/
@property(readonly) BOOL supportsDuplexScanning;
/*!
   @property duplexScanningEnabled
   @abstract Ôø° Indicates whether duplex scanning is enabled.
*/
@property(readwrite) BOOL duplexScanningEnabled;
/*!
   @property documentLoaded
   @abstract Ôø° Indicates whether the feeder has documents to scan.
   @discussion This value will change when the document is loaded or removed from the feeder, if the scanner module has the capability to detect this state.
*/
@property(readonly) BOOL documentLoaded;
/*!
   @property oddPageOrientation
   @abstract Ôø° Desired orientation of the odd pages of the scanned document.
   @discussion This property is set to ICEXIFOrientationl initially.
*/
@property(readwrite) ICEXIFOrientationType oddPageOrientation;
/*!
   @property evenPageOrientation
   @abstract Ôø° Desired orientation of the even pages of the scanned document.
   @discussion This property is set to ICEXIFOrientationl initially.
*/
@property(readwrite)    ICEXIFOrientationType    evenPageOrientation;
@end
   F. Image Capture Core
//
// ImageCaptureCore.h
// ImageCaptureCore
//
// Copyright (c) 2008 Apple Inc., all rights reserved.
//
// Best viewed with the following settings: Tab width 4, Indent width 2, Wrap lines, Indent wrapped lines by 3, Page guide 128.
//
#import <ImageCaptureCore/ICCommonConstants.h>
#import <ImageCaptureCore/ICDeviceBrowser.h>
#import <ImageCaptureCore/ICDevice.h>
import <ImageCaptureCore/ICScannerFunctionalUnits.h>
#import <ImageCaptureCore/ICScannerDevice.h>
```

I claim:

1. A non-transitory machine readable medium storing an image capture application for execution on a device, the image capture application comprising sets of instructions for:
   receiving a scanned electronic document based on a first scan; and
   automatically and without user input:
   identifying a plurality of component regions within the scanned electronic document that contain content, wherein a first component region is identified as containing content of a first type and a second component region is identified as containing content of a second type that is different from the first type of content based on attributes for a corresponding component region,
   identifying a set of scan parameters for the first and second component regions based on the attributes for the corresponding component region, and
   obtaining a second scan of the first and second component regions based on the set of scan parameters identified for the corresponding component region.

2. The non-transitory machine readable medium of claim 1, wherein the set of instructions for obtaining the second scan of each region comprises a set of instructions for performing a plurality of different individual secondary scan operations, wherein each different secondary scan operation is performed for a different region automatically and without user intervention.

3. The non-transitory machine readable medium of claim 1, wherein the set of instructions for identifying a component region comprises a set of instructions for determining boundaries of the component region by analyzing the scanned electronic document.

4. The non-transitory machine readable medium of claim 1, wherein the set of instructions for identifying the set of scan parameters for the first and second component regions comprises a set of instructions for determining the content types for the first and second component regions using the attributes for the corresponding component region, and generating the set of scan parameters for the corresponding component region based on the attributes for the corresponding component region.

5. The non-transitory machine readable medium of claim 1, wherein the set of scan parameters comprises color depth.

6. The non-transitory machine readable medium of claim 1, wherein the set of instructions for obtaining the second scan of a region on the set of scan parameters for that component region comprises a set of instructions for commanding a scanner to perform a scan of the component region according to a first subset of the scan parameters.

7. The non-transitory machine readable medium of claim 6, wherein the set of instructions for obtaining the second scan of the component region on the set of scan parameters for that component region comprises a set of instructions for processing an image garnered from the scan according to a second subset of the scan parameters relate to post-scan processing of the image.

8. The non-transitory machine readable medium of claim 1, wherein the image capture application further comprises sets of instructions for:
   receiving an input to forego an attempt to decompose the scanned electronic document into a plurality of component regions; and
   foregoing said identifying the component region, identifying the scan parameters for each component region, and obtaining a second scan of each component region, when the input to forego the attempt to decompose is received.

9. The non-transitory machine readable medium of claim 1, wherein the set of instructions for obtaining the second scan of each component region comprises sets of instructions for:
   identifying a set of pre-defined scanner settings from attributes identified for the component region; and
   based on the identified set of scanner settings, directing a scanner to perform the second scan of the component region.

10. The non-transitory machine readable medium of claim 9, wherein the pre-defined scanner settings are defined by an author of the image capture application.

11. The non-transitory machine readable medium of claim 9, wherein the pre-defined scanner settings are defined by a user of the image capture application before the scanned electronic document is generated by the first scan.

12. The non-transitory machine readable medium of claim 1, wherein the sets of instructions for identifying the component regions, identifying the scan parameters and obtaining the second scan for each region comprises sets of instructions for generating application program interface (API) calls to a set of image capture engines to identify the component regions, identify the scan parameters, and obtain the second scan for each region.

13. A non-transitory machine readable medium for storing an image capture application for execution on a device, the image capture application comprising sets of instructions for:
   receiving a scanned electronic document that was produced by a first scan: and
   automatically and without user input:
   identifying a plurality of component regions within the scanned electronic document that contain content, wherein a first component region is identified as containing content of a first type and a second component region is identified as containing content of a second type that is different from the first type of content based on attributes for a corresponding component region;
   rotating at least one of the first and second component regions with respect to the scanned electronic document based on the attributes for the at least one of the first and second component regions; and
   extracting and storing each component region separately.

14. The non-transitory machine readable medium of claim 13, wherein the set of instructions for extracting a component region comprises a set of instructions for performing a second scan of an area that includes that component region.

15. The non-transitory machine readable medium of claim 14, wherein said area excludes other identified component regions.

16. The non-transitory machine readable medium of claim 14 wherein said second scan uses more computationally intensive scanning algorithms than said first scan.

17. The non-transitory machine readable medium of claim 14 wherein said second scan has a higher resolution than said first scan.

18. The non-transitory machine readable medium of claim 13, wherein the set of instructions for extracting the component region further comprises a set of instructions for extracting the image representing the component region from the scan of the mea that includes the component region and rotating the extracted image to counter the rotation of the component region relative to the scanned electronic document.

19. The non-transitory machine readable medium of claim 13, wherein the image capture application further comprises a set of instructions for saving a plurality of component regions of a single type in a single storage structure.

20. The non-transitory machine readable medium of claim 13, wherein the image capture application further comprises a set of instructions for saving component regions of different types in different storage structures.

21. The non-transitory, machine readable medium of claim 13,
wherein the set of instructions for receiving the scanned electronic document comprises a set of instructions for sequentially receiving a plurality of scanned electronic documents,
the image capture application further comprising sets of instructions for:
in each scanned electronic document,
identifying a plurality of component regions within the scanned electronic document; and
extracting and storing each component region separately.

22. The non-transitory machine readable medium of claim 21, wherein the image capture application further comprises a set of instructions for saving data extracted from the plurality of component regions of a single type from different scanned electronic documents in a single storage structure.

23. The non-transitory machine readable medium of claim 22, wherein data extracted from the component regions of different types are stored in different storage structures.

24. The non-transitory machine readable medium of claim 13, wherein the sets of instructions for identifying, extracting and storing the component regions comprises sets of instructions for generating application program interface (API) calls to a set of image capture engines to identify, extract and store the component regions.

25. A method of enabling control of a scanner, the method comprising:
defining an image capture engine; and
defining application programming interfaces (APIs) for commanding said image capture engine to obtain an initial scanned electronic document, the APIs further commanding said image capture engine to automatically and without user input identify a plurality of component regions within the initial scanned electronic document that contain content, wherein a first component region is identified as containing content of a first type and a second component region is identified as containing content of a second type that is different from the first type of content based on attributes for a corresponding region, identify a set of scan parameters for the first and second component regions based on the attributes for the corresponding component region, and obtain, based on the set of scan parameters, a second scan of the first and second component regions by performing a plurality of different individual secondary scan operations, wherein each different secondary scan operation is performed for a different component region.

26. The method of claim 25, wherein the APIs are further for commanding the image capture engine to send an image garnered in a detailed scan of one region to a selected non-transitory machine application.

27. The method of claim 25 further comprising defining additional APIs for identifying a set of borders for each of separate region.

28. The method of claim 25, wherein the APIs for decomposing scan data into separate regions further comprise additional APIs for commanding a threshold operation on the scanned electronic document.

29. The method of claim 28, wherein the APIs for decomposing the scan data into the separate regions further comprise additional APIs for determining contiguous areas in the scanned electronic document after the threshold operation.

30. The method of claim 29, wherein the APIs for decomposing the scan data into the separate regions further comprise additional APIs for eliminating extraneously identified contiguous areas in the scanned electronic document after the threshold operation.

31. The method of claim 30, wherein the APIs for decomposing the scan data into the separate regions further comprise additional APIs for detecting edges of non-extraneous identified contiguous areas in the scanned electronic document.

32. The method of claim 31, wherein the APIs for decomposing the scan data into the separate regions further comprise additional APIs for determining borders of the detected edges.

33. The method of claim 25 further comprising defining additional APIs for selecting a set of scan parameters for detailed scan of each region.

34. The method of claim 25 further comprising defining a set of additional APIs for revealing a scanned image of a region that is rotated relative to the electronic scanned document, wherein said image is revealed at right angles to the region.

35. A non-transitory machine readable medium storing an image capture application for execution by at least one processing unit, the image capture application comprising sets of instructions for:
receiving a scanned electronic document comprising a first type of content and a second different type of content; and
automatically and without user input:
identifying, in the scanned electronic document, a first component region that contains the first type of content and a second component region that contains the second type of content based on attributes for the corresponding component region;
obtaining a second scan of each of the first and second component regions using first and second set of parameters determined by attributes for the corresponding component region; and
post processing the second scan of each of the first and second component regions by performing a first set of operations on the second scan of the first component region and performing a second different set of operations on the second scan of the second component region.

36. The non-transitory machine readable medium of claim 35, wherein the set of instructions for obtaining the second scan of each of the first and second component regions comprises a set of instructions for performing a plurality of different individual second scan operation, wherein each different second scan operation is performed for a different region automatically and without user intervention.

37. For an image capture application, a method of scanning a document, the method comprising:
receiving a scanned electronic document computing text content and image content; and
automatically and without user input:
identifying, in the scanned electronic document, a first component region that contains the text content and a second component region that contains the image content based on attributes for corresponding component region
obtaining a second scan of each of the first and second component regions using first and second set of parameters determined by the attributes for the corresponding component region, and post processing the second scan of each of the first and second component regions by performing optical character recognition on the text content and performing a rotation operation that at least partially rotates the image content with respect to the scanned electronic document.

38. The method of claim 37, wherein obtaining the second scan of each of the first and second component regions comprises performing a plurality of different individual secondary scan operations, wherein each different secondary scan operation is performed for a different region automatically and without user intervention.

* * * * *